United States Patent
Zeisberg et al.

(10) Patent No.: US 12,440,479 B2
(45) Date of Patent: Oct. 14, 2025

(54) PREVENTION OR TREATMENT OF CHRONIC ORGAN INJURY

(71) Applicants: GEORG-AUGUST-UNIVERSITAET GOETTINGEN, STIFTUNG OEFFENTLICHEN RECHTS, UNIVERSITAETSMEDIZIN, Goettingen (DE); BOARD OF REGENTS, THE UNIVERSITY OF TEXAS SYSTEM, Austin, TX (US)

(72) Inventors: Michael Zeisberg, Goettingen (DE); Elisabeth Zeisberg, Goettingen (DE); Björn Tampe, Goettingen (DE); Désiree Tampe, Goettingen (DE); Gerhard Anton Mueller, Tuebingen (DE); Raghu Kalluri, Houston, TX (US)

(73) Assignees: GEORG-AUGUST-UNIVERSITAET GOETTINGEN, STIFTUNG OEFFENTLICHEN RECHTS, UNIVERSITAETSMEDIZIN, Goettingen (DE); BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 1388 days.

(21) Appl. No.: 17/042,027

(22) PCT Filed: Mar. 27, 2019

(86) PCT No.: PCT/EP2019/057712
§ 371 (c)(1),
(2) Date: Sep. 25, 2020

(87) PCT Pub. No.: WO2019/185708
PCT Pub. Date: Oct. 3, 2019

(65) Prior Publication Data
US 2021/0008044 A1  Jan. 14, 2021

Related U.S. Application Data

(60) Provisional application No. 62/649,245, filed on Mar. 28, 2018.

(51) Int. Cl.
| | |
|---|---|
| *A61K 31/35* | (2006.01) |
| *A61K 31/436* | (2006.01) |
| *A61K 31/4439* | (2006.01) |
| *A61K 31/496* | (2006.01) |
| *A61P 1/16* | (2006.01) |
| *A61P 9/00* | (2006.01) |
| *A61P 13/12* | (2006.01) |
| *C12N 15/113* | (2010.01) |

(52) U.S. Cl.
CPC ............ *A61K 31/436* (2013.01); *A61K 31/35* (2013.01); *A61K 31/4439* (2013.01); *A61K 31/496* (2013.01); *A61P 1/16* (2018.01); *A61P 9/00* (2018.01); *A61P 13/12* (2018.01); *C12N 15/1137* (2013.01); *C12N 2310/14* (2013.01); *C12N 2310/3233* (2013.01)

(58) Field of Classification Search
CPC ........................................................ A61K 31/35
See application file for complete search history.

(56) References Cited

U.S. PATENT DOCUMENTS

| | | | |
|---|---|---|---|
| 4,329,353 | A | 5/1982 | Stokbroekx |
| 6,251,932 | B1 | 6/2001 | Reichelt |
| 2007/0021405 | A1 | 1/2007 | Abouabdellah et al. |
| 2010/0092460 | A1 | 4/2010 | Shi et al. |
| 2016/0074390 | A1 | 3/2016 | Kovach |

FOREIGN PATENT DOCUMENTS

| | | |
|---|---|---|
| WO | WO 98/37865 A1 | 9/1998 |
| WO | WO 00/09109 A2 | 2/2000 |
| WO | WO 2005/090347 A1 | 9/2005 |
| WO | WO 2012/151153 A | 11/2012 |
| WO | WO 2014/005080 A1 | 1/2014 |
| WO | WO 2016/040877 A1 | 3/2016 |

OTHER PUBLICATIONS

Adams et al., "Rapid Turnover of Mcl-1 Couples Translation to Cell Survival and Apoptosis," The Journal of Biological Chemistry, vol. 282, No. 9, Mar. 2, 2007, pp. 6192-6200 (10 pages total).

Aksöyek et al., "Intestinal Ischemic Preconditioning Protects the Intestine and Reduces Bacterial Translocation," Shock, vol. 18, No. 5, 2002, pp. 476-480.

Alarcón et al., "Nuclear CDKs Drive Smad Transcriptional Activation and Turnover in BMP and TGF-β Pathways," Cell, vol. 139, Nov. 13, 2009, pp. 757-769.

Albiñana et al., "Immunosuppressor FK506 Increases Endoglin and Activin Receptor-Like Kinase 1 Expression and Modulates Transforming Growth Factor-β1 Signaling in Endothelial Cells," Molecular Pharmacology, vol. 79, No. 5, 2011, pp. 833-843.

(Continued)

*Primary Examiner* — John S Kenyon
(74) *Attorney, Agent, or Firm* — Birch, Stewart, Kolasch & Birch, LLP

(57) ABSTRACT

The present disclosure is directed to novel therapeutic approaches for the prevention, treatment and/or delaying progression of chronic injury, progressive loss of functional parenchymal cells, or fibrosis of an organ. Specifically disclosed are agents for use in increasing homodimer-formation of ARNT in an organ in the prevention, treatment and/or delaying progression of chronic injury, progressive loss of functional parenchymal cells, or fibrosis of said organ, as further defined in the claims. In embodiments, said agent may be (i) an inhibitor of protein phosphatase 2A (PP2A) activity, (ii) an inhibitor of the transcriptional repressor complex FKBP12/YY1, or (iii) an expression construct, which is capable of over-expressing ARNT in said organ, as well as combinations of (i), (ii), and/or (iii).

24 Claims, 28 Drawing Sheets

Specification includes a Sequence Listing.

(56) References Cited

OTHER PUBLICATIONS

Altschul et al., "Gapped BLAST and PSI-BLAST: a new generation of protein database search programs," Nucleic Acids Research, vol. 25, No. 17, 1997, pp. 3389-3402.
Antonsson et al., "Constitutive Function of the Basic Helix-Loop-Helix/PAS Factor Arnt." The Journal of Biological Chemistry, vol. 270, No. 23, Jun. 9, 1995, pp. 13968-13972.
Bechtel et al., "Methylation determines fibroblast activation and fibrogenesis in the kidney," Nature Medicine, vol. 16, No. 5, May 2010, pp. 544-559 (8 pages total).
Blank et al., "BMP7 promotes proliferation of nephron progenitor cells via a JNK-dependent mechanism," Development, vol. 136, No. 21, 2009, pp. 3557-3566.
Blum et al., "Morpholinos: Antisense and Sensibility," Developmental Cell, vol. 35, Oct. 26, 2015, pp. 145-149 (17 pages total).
Chan et al., "Expression of Aryl Hydrocarbon Receptor Nuclear Translocator Enhances Cisplatin Resistance by Upregulating MDR 1 Expression in Cancer Cells, " Molecular Pharmacology, vol. 84, Oct. 2013, pp. 591-602.
Chang, MD et al., "Intravenous Administration of Bone Morphogenetic Protein-7 After Ischemia Improves Motor Function in Stroke Rats," Stroke, 2003, pp. 558-564.
Chen et al., "Genome-wide analysis of YY2 versus YY1 target genes," Nucleic Acids Research, vol. 38, No. 12, 2010 (published online Mar. 9, 2010), pp. 4011-4026.
Chilov et al., "Induction and nuclear translocation of hypoxia-inducible factor-1 (HIF-1): heterodimerization with ARNT is not necessary for nuclear accumulation of HIF-1alpha," J. Cell. Sci., vol. 112, Pt. 8, 1999, pp. 1203-1212 (12 pages total).
Cicora et al., "Preconditioning donor with a combination of tacrolimus and rapamacyn to decrease ischaemia-reperfusion injury in a rat syngenic kidney transplantation model," Clinical and Experimental Immunology, vol. 167, Sep. 15, 2011, pp. 169-177.
Clavien, et al., "Protective Effects of Ischemic Preconditioning for Liver Resection Performed Under Inflow Occlusion in Humans," Annals of Surgery, vol. 232, No. 2. Aug. 2000, pp. 155-162.
Cumming et al., "Pharmacological preconditioning of primary rat cardiac myocytes by FK506," Basic Res Cardiol, vol. 91, No. 5, 1996, pp. 367-373.
Cuny et al., "Structure-activity relationship study of bone morphogenetic protein (BMP) signaling inhibitors," Bioorg Med Chem Left., vol. 18, No. 15, Aug. 1, 2008, pp. 4388-4392 (16 pages total).
Darcy et al., "A novel library screen identifies immunosuppressors that promote osteoblast differentiation, " Bone, vol. 50, 2012 (published online Mar. 13, 2012), pp. 1294-1303.
Deng et al., "Blocking protein phosphatase 2A signaling prevents endothelial-to-mesenchymal transition and renal fibrosis: a peptide-based drug therapy," Scientific Reports, vol. 6, No. 19821, pp. 1-13.
Dunn et al., "Calcineurin is Required for Skeletal Muscle Hypertrophy," The Journal of Biological Chemistry, vol. 274, No. 31, Jul. 30, 1999, pp. 21908-21912 (5 pages).
Eberling et al., "The Immunophilin Ligand GPI-1046 Does Not Have Neuroregenerative Effects in MPTP-Treated Monkeys," Experimental Neurology, vol. 178, 2002, pp. 236-242.
Eden et al., "Discovering Motifs in Ranked Lists of DNA Sequences." PLoS Computational Biology, vol. 3, Issue 3, e39, Mar. 2007, pp. 0508-0522 (16 pages total).
Eden et al., "GOrilla: a fool for discovery and visualization of enriched GO terms in ranked gene lists," BMC Bioinformatics, vol. 10, No. 48, Feb. 3, 2009, pp. 1-7.
Ekberg, MD et al., "Reduced Exposure to Calcineurin Inhibitors in Renal Transplantation," The New England Journal of Medicine, vol. 357, Dec. 20, 2007, pp. 2562-2575.
Er et al., "Ischemic Preconditioning for Prevention of Contrast-Medium-Induced Nephropathy: Randomized Pilot RenPro-Trial (Renal Protection Trial)," J. Am. Heart Assoc., Jun. 26, 2012, pp. 96-103 (36 pages total).
Feng et al., "Identification of Genes and Pathways Associated with Kidney Ischemia-Reperfusion Injury by Bioinformatics Analyses," Kidney & Blood Pressure Research, vol. 41, 2016 (published online Feb. 4, 2016), pp. 48-54.
Feng et al., "Protective Effect of FK506 on Myocardial ischemia/Reperfusion Injury by Suppression of CaN and ASK1 Signaling Circuitry," Cardiovasc Toxicol, vol. 11, 2011 (published online Nov. 13, 2010), pp. 18-27.
Feng et al., "Specificity in Smad Signaling," Annu. Rev. Cell Dev. Biol., 2005, pp. 659-693 (38 pages total).
Flechner et al., "Kidney Transplant Rejection and Tissue Injury by Gene Profiling of Biopsies and Peripheral Blood Lymphocytes," American Journal of Transplantation, vol. 4, 2004, pp. 1475-1489.
Flier et al., "Identification of Epithelial to Mesenchymal Transition as a Novel Source of Fibroblasts in Intestinal Fibrosis," The Journal of Biological Chemistry, vol. 285, No. 26, Jun. 25, 2010, pp. 20202-20212 (12 pages total).
Forristal et al., "Hypoxia inducible factor (HIF)-2α accelerates disease progression in mouse models of leukemia and lymphoma but is not a poor prognosis factor in human AML," Leukemia, vol. 29, 2015, pp. 2075-2085.
Galvin et al., "Multiple Mechanism of Transcriptional Repression by YY1," Molecular and Cellular Biology, vol. 17, No. 7, Jul. 1997, pp. 3723-3732.
Garcia-Criado et al., "Tacrolimus (FK506) Down-Regulates Free Radical Tissue Levels, Serum Cytokines, And Neutrophil Infiltration after Severe Liver Ischemia," Transplantation, vol. 64, Aug. 27, 1997, pp. 594-598 (16 pages total).
Gardella et al., "Aryl hydrocarbon receptor nuclear translocator (ARNT) isoforms control lymphoid cancer cell proliferation through differentially regulating tumor suppressor p53 activity." Oncotarget, vol. 7, No. 10, Feb. 20, 2016, pp. 10710-10722.
Glynne et al., "How self-tolerance and the immunosuppressive drug FK506 prevent B-cell mitogenesis," Nature, vol. 403, Feb. 10, 2000, pp. 672-676.
Gordon et al., "Transcription factor YY1: structure, function, and therapeutic implications in cancer biology," Oncogene, vol. 25, 2006, pp. 1125-1142.
Grande et al., "Snail1-Induced partial epithelial-to-mesenchymal transition drives renal fibrosis in mice and can be targeted to reverse established disease," Nature Medicine, Advance Online Publication, Aug. 3, 2015, pp. 1-9 (11 pages total).
Grigoryev et al., "Genomic Profiling of Kidney Ischemia-Reperfusion Reveals Expression of Specific Alloimmunity-Associated Genes: Linking "Immune" and "Nonimmune" Injury Events," Transplantation Proceedings, vol. 38, 2006, pp. 3333-3336.
Günther et al., "Effects of Sample Timing and Treatment on Gene Expression in Early Acute Renal Allograft Rejection," Transplantation, vol. 91, No. 3, Feb. 15, 2011, pp. 323-329.
Guo et al., "IL-13 Induces YY1 through the AKT Pathway in Lung Fibroblasts, " PLOS One, vol. 10, No. 3, Mar. 16, 2015, pp. 1-18.
Guo et al., "YY1TargetDB: an integral information resource for Yin Yang 1 target loci," Database, vol. 2013, 2013, pp. 1-10 (11 pages total).
Hapgood et al., "Specific protein-DNA interactions at a xenobiotic-responsive element: Copurification of dioxin receptor and DNA-binding activity," Proc. Natl. Acad. Sci. USA, vol. 86, Jan. 1989, pp. 60-64.
Haverty et al., "Characterization of a Renal Tubular Epithelial Cell Line Which Secretes the Autologous Target Antigen of Autoimmune Experimental Interstitial Nephritis," The Journal of Cell Biology, vol. 107, Oct. 1988, pp. 1359-1368.
Heinemeyer et al., "Databases on transcriptional regulation: Transfac. TRRD and Compel," Nucleic Acids Research, vol. 26, No. 1, 1998, pp. 362-367.
Helander et al., "Basic Tilted Helix Bundle—A new protein fold in human FKBP25/FKBP3 and HectD1," Biochemical and Biophysical Research Communications, vol. 447, 2014 (published online Mar. 22, 2014), pp. 26-31.
Hieronymus et al., "Gene expression signature-based chemical genomic prediction identifies a novel class of HSP90 pathway modulators," Cancer Cell, vol. 10, Oct. 2006, pp. 321-330.

(56) References Cited

OTHER PUBLICATIONS

Ho et al., "The Mechanism of Action of Cyclosporin A and FK506," Clinical Immunology and Immunopathology, vol. 80, No. 3, Article No. 0140, Sep. 1996, pp. S40-S45.
Hoffman et al., "Cloning of a Factor Required for Activity of the Ah (Dioxin) Receptor," Science, vol. 252, May 17, 1991, pp. 954-958.
Hong et al., "LB100, a small molecule inhibitor of PP2A with potent chemo- and radio-sensitizing potential," Cancer Biology & Therapy, vol. 16, May 28, 2015, Issue 6, pp. 821-833.
Hüser et al., "Graft Preconditioning with Low-dose Tacrolimus (FK506) and Nitric Oxide Inhibitor Aminoguanidine (AGH) Reduces Ischemia/reperfusion Injury after Liver Transplantation in the Rat," Arch Pharm Res, vol. 32, No. 2, 2009, pp. 215-220.
Iliodromitis et al., "Ischemic preconditioning: Protection against myocardial necrosis and apoptosis." Vascular Health and Risk Management, vol. 3, No. 5, 2007, pp. 629-637.
Jensen, et al., "Remote Ischemic Preconditioning Protects the Brain Against Injury After Hypothermic Circulatory Arrest," Circulation, vol. 123, 2011, pp. 714-721 (9 pages total).
Jiang et al., "Distinct Patterns of Cytokine Gene Suppression by the Equivalent Effective Doses of Cyclosporine and Tacrolimus in Rat Heart Allografts," Immunobiology, vol. 202, 2000, pp. 280-292.
Joo et al., "Ischemic Preconditioning Provides Both Acute and Delayed Protection against Renal Ischemia and Reperfusion Injury in Mice," J Am Soc Nephrol, vol. 17, 2006, pp. 3115-3123.
Ju et al., "Tissue transcriptome-driven identification of epidermal growth factor as a chronic kidney disease biomarker," Kidney Disease, vol. 7, Issue 316, Dec. 2, 2015, pp. 1-10 (11 pages total).
Kapitsinou et al., "Endothelial HIF-2 mediates protection and recovery from ischemic kidney injury," The Journal of Clinical Investigation, May 2014, pp. 1-14 (15 pages total).
Kapitsinou et al., "Molecular mechanisms of ischemic preconditioning in the kidney," Am J Physiol Renal Physiol, vol. 309, Aug. 26, 2015, pp. F821-F834.
Karamperis et al., "Comparison of the Pharmacokinetics of Tacrolimus and Cyclosporine at Equivalent Molecular Doses." Transplantation Proceedings, vol. 35, 2003, pp. 1314-1318.
Kelsey, "Ischaemic preconditioning for preventing contrast-induced AKI," Nature Reviews Nephrology, vol. 8, No. 492, Sep. 2012 (published online Jul. 17, 2012), 1 page.
Ko et al., "Cytosine methylation changes in enhancer regions of core pro-fibrotic genes characterize kidney fibrosis development," Genome Biology, vol. 14, No. R108, 2013, pp. 1-14.
Ko et al., "Therapeutic Potential of Tacrolimus on Acute Myocardial Infarction in Minipigs: Analysis with Serial Cardiac Magnetic Resonance and Changes at Histological and Protein Levels," BioMed Research International, vol. 2014, 2014, pp. 1-13 (14 pages total).
Kunz et al., "FAP1, a homologue of human transcription factor NF-X1, competes with rapamycin for binding to FKBP12 in yeast," Molecular Microbiology, vol. 37, No. 6, 2000, pp. 1480-1493.
Kurisaki et al., "Nuclear Factor YY1 Inhibits Transforming Growth Factor 6- and Bone Morphogenetic Protein-Induced Cell Differentiation," Molecular and Cellular Biology, vol. 23, No. 13, Jul. 2003, pp. 4494-4510.
Labrande et al., "Neuroprotective Effects of Tacrolimus (FK506) in a Model of Ischemic Cortical Cell Cultures: Role of Glutamate Uptake and FK506 Binding Proteins 12 kDa," Neuroscience, vol. 137, 2006, pp. 231-239.
Lamb et al., "The Connectivity Map: Using Gene-Expression Signatures to Connect Small Molecules, Genes, and Disease," Science, vol. 313, Sep. 29, 2006, pp. 1929-1935 (8 pages total).
Laping, "ALK5 inihibition in renal disease," Current Opinion in Pharmacology, vol. 3, 2003, pp. 204-208.
Laskow et al., "An Open-Label, Concentration-Ranging Trial of FK506 in the Primary Kidney Transplantation: A Report of the United States Multicenter FK506 Kidney Transplant Group: 1," Transplantation, vol. 62, Oct. 15, 1996, pp. 900-905.
LeBleu et al., "Origin and function of myofibroblasts in kidney fibrosis," Nature Medicine, Advance Online Publication, Jun. 30, 2013, pp. 1-8.
Lee et al., "Identification of ARNT-regulated BIRC3 as the target factor in cadmium renal toxicity." Scientific Reports, vol. 7, Article No. 17287, 2017, 16 pages total.
Levine et al., "Okadaic acid increases ARNT homodimer transactivation potential," Cell Biology and Toxicology, vol. 18, 2002, pp. 109-120.
Li et al., "MethPrimer: designing primers for methylation PCRs." Oxford University Press, vol. 18, No. 11, 2002, pp. 1427-1431.
Li et al., "Protection Against Ischemic Brain Damage in Rats by Immunophilin Ligand GPI-1046." Journal of Neuroscience Research, vol. 76, 2004, pp. 383-389.
Li et al., "Transcriptional Activation Function of the Mouse Ah Receptor Nuclear Translocator," The Journal of Biological Chemistry, vol. 269, No. 45, 1994, pp. 28098-28105.
Liang et al., "Novel mechanism of regulation of fibrosis in kidney tumor with tuberous sclerosis," Molecular Cancer, vol. 12, No. 49, 2013, pp. 1-11.
Lin et al., "Yin Yang 1 Is a Novel Regulator of Pulmonary Fibrosis," Am J Repir Crit Care Med, vol. 183, 2011, pp. 1689-1697.
Lin, MD et al., "Osteogenic Protein-1 Protects Against Cerebral Infarction Induced by MCA Ligation in Adult Rats," Stroke, Jan. 1999, pp. 126-133.
Liu et al., "Calcineurin Is a Common Target of Cyclophilin-Cyclosporin A and FKBP-FK506 Complexes." Cell, vol. 66, Aug. 23, 1991, pp. 807-815.
Lovisa et al., "Epithelial-to-mesenchymal transition induces cell cycle arrest and parenchymal damage in renal fibrosis." Nature Medicine. Aug. 3, 2015, pp. 1-12 (15 pages total).
Lu et al., "Yin Yang 1 promotes hepatic steatosis through repression of farnesoid X receptor in obese mice," Gut, vol. 63, 2014, pp. 170-178 (10 pages total).
Lu, et al., "The effect of a PP2A inhibitor on the nuclear receptor corepressor pathway in glioma," J Neurosurg, vol. 113, Aug. 2010, pp. 225-233.
Ma et al., "Transcriptional Activation by the Mouse Ah Receptor," The Journal of Biological Chemistry, vol. 270, No. 21, May 26, 1995, pp. 12697-12703.
Ma et al., "Xenon Preconditioning Protects against Renal Ichemic-Reperfusion Injury via HIF-1α Activation," J Am Soc Nephrol, vol. 20, 2009, pp. 713-720.
Ma et al., The BMP Coreceptor RGMb Promotes While the Endogenous BMP Antagonist Noggin Reduces Neurite Outgrowth and Peripheral Nerve Regeneration by Modulating BMP Signaling. The Journal of Neuroscience, vol. 31, No. 50, Dec. 14, 2011, pp. 18391-18400.
MacKintosh et al., "Tautomycin from the bacterium *Streptomyces verticillatus*," Federation of European Biochemical Societies, vol. 277, No. 1,2, Dec. 1990, pp. 137-140.
Maltepe et al., "Abnormal angiogenesis and responses to glucose and oxygen deprivation in mice lacking the protein ARNT," Nature, vol. 386, Mar. 27, 1997, pp. 403-407.
Massagué, "TGF-β Signal Transduction," Annu. Rev. Biochem., vol. 67, 1998, pp. 753-791.
Matsumoto et al., "Angiotensin II-induced cardiac hypertrophy and fibrosis are promoted in mice lacking Fgf16," Genes to Cells, vol. 18, 2013, pp. 544-553.
Meng et al., "Role of the TGF-β/BMP-7/Smad pathways in renal diseases," Clinical Science, vol. 124, 2013 (published online Oct. 31, 2012), pp. 243-254.
Merino et al., "BMP-7 attenuates left ventricular remodelling under pressure overload and facilitates reverse remodeling and functional recovery," Cardiovascular Research Advance Access, Apr. 11, 2016, pp. 1-51 (52 pages total).
Moon et al., "IN-1130, a novel transforming growth factor-6 type I receptor kinase (ALK5) inhibitor, suppresses renal fibrosis in obstructive nephropathy," Kidney International vol. 70, 2006 (published online Aug. 23, 2006), pp. 1234-1243.
Morcos et al., "Vivo-Morpholinos: A non-peptide transporter delivers Morpholinos into a wide array of mouse tissues," BioTechniques, vol. 45, No. 6, 2008, pp. 613-622 (7 pages total).
Murry et al., "Preconditioning with ischemia: a delay of lethal cell injury in ischemic myocardium." Circulation, vol. 74, No. 5, Nov. 1986, pp. 1124-1136 (14 pages total).

(56) References Cited

OTHER PUBLICATIONS

Muthukrishnan et al., "Concurrent BMP7 and FGF9 signalling governs AP-1 function to promote self-renewal of nepron progentior cells," Nature Communications, vol. 6, No. 10027, Dec. 4, 2015, pp. 1-13.

Myllärniemi et al., "Gremlin-mediated Decrease in Bone Morphogenetic Protein Signaling Promotes Pulmonary Fibrosis," American Journal of Respiratory and Critical Care Medicine, vol. 177, 2008, pp. 321-329.

Naesens et al., "Calcineurin Inhibitor Nephrotoxicity," Clin J Am Soc Nephrol, vol. 4, 2009, pp. 481-508.

Nakagawa et al., "Molecular Markers of Tubulointerstitial Fibrosis and Tubular Cell Damage in Patients with Chronic Kidney Disease," PLOS One, Aug. 28, 2015, pp. 1-14.

Nezami et al., "Pharmacological preconditioning of random-pattern skin flaps with local FK506 in nicotine-treated rats: interaction with nitric oxide system," Journal of Plastic, Reconstructive & Aesthetics Surgery, vol. 62, 2009, pp. e643-e644.

Oltean, MD et al., "Reduced Liver Injury and Cytokine Release After Transplantation of Preconditioned Intestines," Journal of Surgical Research, vol. 154 No. 1, Jun. 1, 2009, pp. 30-37.

Pan et al.. "Protective effect of tracrolimus postconditioning on oxidative stress injury provoked by spinal cord ischemia-reperfusion in rats." Natl Med J China, vol. 93, No. 47, Dec. 17, 2013, pp. 3796-3800, with English abstract.

Pan et al., "Tacolimus Postconditioning Alleviates Apoptotic Cell Death in Rats after Spinal Cord Ischemia-reperfusion Injury via Up-regulating Protein-Serine-Threonine Kinases Phosphorylation," J. Huazhong Uni Sci Technol, vol. 33, No. 6, 2013, pp. 852-856.

Pardo et al., "Inhibition of Calcineurin by FK506 Protects against Polyglutamine-Huntinglin Toxicity through an Increase of Huntingtin Phosphorylation at S421," The Journal of Neuroscience, vol. 26, No. 5, Feb. 1, 2006, pp. 1635-1645.

Piscione et al., "BMP7 controls collecting tubule cell proliferation and apoptosis via Smad1-dependent and -independent pathways." Am J Physiol Renal Physiol, vol. 280, 2001, pp. F19-F33.

Ramadoss et al., "The Transactivation Domain of the Ah Receptor Is a Key Determinant of Cellular Localization and Ligand-Independent Nucleocytoplasmic Shuttling Properties," Biochemistry, vol. 44, 2005, pp. 11148-11159.

Reich et al., "A Molecular Signature of Proteinuria in Glomerulonephritis." PLoS One, vol. 5, Issue 10, e13451, Oct. 2010, pp. 1-11.

Rodriguez-Hernandez et al., "The Immunosuppressant FK506 Uncovers a Positive Regulatroy Cross-talk between the Hog1p and Gcn2p Pathways," The Journal of Biological Chemistry, vol. 278, No. 36. Sep. 5, 2003, pp. 33887-33895 10 pages total).

Roider et al., "Predicting transcription factor affinities to DNA from a biophysical model," Genome analysis, vol. 23, No. 2, Nov. 10, 2006, pp. 134-141.

Roth et al., "Gene expression analyses reveal molecular relationships among 20 regions of the humans CNS," Neurogenetics, vol. 7, 2006, pp. 67-80.

Rung et al., "Reuse of publica genome-wide gene expression data," Nature Reviews Genetics, Advance Online Publication, Dec. 27, 2012, pp. 1-11.

Safe, "Molecular biology of the Ah receptor and its role in carcinogenesis," Toxicology Letters, vol. 120, 2001, pp. 1-7.

Saito et al., "Primary cilia modulate balance of canonical and non-canonical Wnt signaling responses in the injured kidney," Fibrogenesis & Tissue Repair, vol. 8, No. 6, 2015, pp. 1-11.

Sakr et al., "The Protective Effect of FK506 Pretreatment Against Renal Ischemia/Reperfusion Injury in Rats," Transplantation, vol. 53, No. 5, May 1992, pp. 987-991 (13 pages total).

Sawada et al., "Experimental Studies on Protective Effect of FK506 Against Hepatic Ischemia-Reperfusion Injury," The Journal of Medical Investigation, vol. 63, Aug. 2016, pp. 262-269.

Schmid et al., "Modular Activation of Nuclear Factor-κB Transcriptional Programs in Human Diabetic Nephropathy," Diabetes, vol. 55, Nov. 2006, pp. 2993-3003.

Schneider-Poetsch et al., "Inhibition of eukaryotic translation elongation by cycloheximide and lactimidomycin," Nature Chemical Biology, vol. 6, Mar. 2010, pp. 209-217.

Schreiber et al., "The mechanism of action of cyclosporin A and FK506," Immunology Today, vol. 13, No. 4, 1992, pp. 136-142.

Sekine et al., "Unique and Overlapping Transcriptional Roles of Arylhydrocarbon Receptor Nuclear Translocator (Arnt) and Arnt2 in Xenobiotic and Hypoxic Responses," The Journal of Biological Chemistry, vol. 281, No. 49, Dec. 8, 2006, pp. 37507-37516 (11 pages total).

Sharkey et al., "Immunophilins mediate the neuroprotective effects of FK506 in focal cerebral ischaemia," Nature, vol. 371, Sep. 22, 1994, pp. 336-339.

Shen et al., "Inhibition of TGF-β1-receptor posttranslational core fucosylation attenuates rat renal interstitial fibrosis," Kidney International, vol. 84, 2013, pp. 64-77.

Shen et al., "The fibrodysplasia ossificans progressiva R206H ACVR1 mutation activates BMP-independent chrondrogenesis and zebrafish embryo ventralization," The Journal of Clinical Investigations, vol. 119, No. 11, Nov. 2009, pp. 3462-3472.

Shi et al., "Everything you have wanted to know about Yin Yang 1 . . . " Biochimica et Biophysica Acta, vol. 1332, 1997, pp. F49-F66.

Shi et al., "Transcriptional Repression by YY1, a Human GLI-Krüppel-Related Protein, and Relief of Repression by Adenovirus E1A Protein," Cell, vol. 67, Oct. 18, 1991, pp. 377-388.

Shin et al., "Hedgehog Signaling Restrains Bladder Cancer Progression by Eliciting Stromal Production of Urothelial Differentiation Factors," Cancel Cell, vol. 26, Oct. 13, 2014, pp. 521-533 (28 pages total).

Siekierka et al., "A cytosolic binding protein for the immunosuppressant FK506 has peptidyl-prolyl isomerase activity but is distinct from cyclophilin," Nature, vol. 341, Oct. 26, 1989, pp. 755-757.

Sogawa et al., "Possible function of Ah receptor nuclear translocator (Arnt) homodimer in transcriptional regulation," Proc. Natl. Acad. Sci. USA, vol. 92, Mar. 1996, pp. 1936-1940.

Soncul, et al., "Role of Ischemic Preconditioning on Ischemia-Reperfusion Injury of the Lung," Chest, vol. 115, No. 6, Jun. 1999, pp. 1672-1677.

Spandidos et al., "PrimerBank: a resource of human and mouse PCR primer pairs for gene expression detection and quantification," Nucleic Acids Research, vol. 38, Database issue, 2010 (published online Nov. 11, 2009), pp. D792-D799.

Spiekerkoetter et al., "FK506 activates BMPR2, rescues endothelial dysfunction, and reverses pulmonary hypertension," The Journal of Clinical Investigation, vol. 123, No. 8, Aug. 2013, pp. 3600-3613 (15 pages total).

Spiekerkoetter, "FK506 (Tacrolimus) in Pulmonary Arterial Hypertension (TransformPAH)," ClinicalTrials.gov. Identifiers: NCT01847945, Jul. 24, 2012, pp. 1-7.

Spiekerkoetter, MD et al., "Low-Dose FK506 (Tacrolimus) in End-Stage Pulmonary Arterial Hypertension." American Journal of Respiratory and Critical Care Medicine, vol. 192, No. 2, Jul. 15, 2015, pp. 254-257.

Stauffer et al., "Transgenic over-expression of YY1 induces pathologic cardiac hypertrophy in a sex-specific manner," Biochemical and Biophysical Research Communications, vol. 462, 2015 (published online Apr. 29, 2015), pp. 131-137.

Steiner et al., "Neurotrphic immunophilin ligands stimulate structural and functional recovery in neurodegenerative animal models," Proc. Natl. Acad. Sci. USA, vol. 94, Mar. 1997, pp. 2019-2024.

Stringa et al., "Ischemic Preconditioning and Tacrolimus Pretreatment as Strategies to Attenuate Intestinal Ischemia-Reperfusion Injury in Mice," Transplantation Proceedings, 2013, vol. 45, pp. 2480-2485.

Stringa et al., "Pretreatment Combination Reduces Remote Organ Damage Secondary to Intestinal Reperfusion Injury in Mice: Follow-up Study," Transplantation Proceedings, vol. 48, 2016, pp. 210-216.

Sugimoto et al., "Activin-like kinase 3 is important for kidney regeneration and reversal of fibrosis," Nature Medicine, vol. 18, No. 3, Mar. 2012, pp. 396-404 (10 pages total).

Sugimoto et al., "BMP-7 functions as a novel hormone to facilitate liver regneration," The FASEB Journal, vol. 21, Jan. 2007, pp. 256-264.

(56) References Cited

OTHER PUBLICATIONS

Sugimoto et al., "Renal Fibrosis and Glomerulosclerosis ina New Mouse Model of Diabetic Nephropathy and Its Regression by Bone Morphogenic Protein-7 and Advanced Gylcation End Product Inhibitors," Diabetes, vol. 56, Jul. 2007, pp. 1826-1833.
Sun et al., "Design and Structure-Based Study of New Potential FKBP12 Inhibitors," Biophysical Journal, vol. 85 No. 5, Nov. 2003, pp. 3194-3201.
Swanson et al., "DNA Binding Specificities and Pairing Rules of the Ah Receptor, ARNT, and SIM proteins," The Journal of Biological Chemistry, vol. 270, No. 44, Nov. 3, 1995, pp. 26292-26302.
Szklarczyk et al., "String v10: protein-protein interaction networks, integrated over the tree of life," Nucleic Acids Research, vol. 43, 2015 (published online Oct. 28, 2014), pp. D447-D452.
Tampe et al., "Induction of Tet3-dependent Epigenetic Remodeling by Low-dose Hydralazine Attenuates Progression of Chronic Kidney Disease," EBioMedicine, vol. 2, 2015 (published online Nov. 8, 2014), pp. 19-36.
Tampe et al., "Potential approaches to reverse or repair renal fibrosis," Nature Reviews, Nephrology, vol. 10, Apr. 2014, pp. 226-237.
Tampe et al., "Tet3-Mediated Hydroxymethylation of Epigenetically Silenced Genes Contributes to Bone Morphogenic Protein 7-Induced Reversal of Kidney Fibrosis," J Am Soc Nephrol, vol. 25, 2014, pp. 905-912 (33 pages total).
Tanaka et al., "Immunosuppressive (FK506) and non-immunosuppressive (GP11046) immunophilin ligands activate neurotrophic factors in the mouse brain," Brain Research, vol. 970, 2003, pp. 250-253.
Tateishi, MD et al., "The immunosuppressant FK506 promotes development of the chondorgenic phenotype in human synovial stromal cells via modulation of the Smad signaling pathway," OsteoArthritis and Cartilage, vol. 15, No. 6, 2007, pp. 709-718.
Thrasos Innovation, Inc., "A Study of THR-184 in Patients at Risk of Developing Cardiac Surgery Associated-Acute Kidney Injury (CSA-AKI)," ClinicalTrials.gov, Identifier: NCT01830920, Apr. 12, 2013, pp. 1-7.
Torlaković et al., "Development of Methods for Measurement of the Integrity of Dopaminergic Pathways in a Rat Model of Parkinson's Disease," Carleton University Cognitive Science Technical Report, 2002, pp. 1-19.
Valentine et al., "Neuroimmunophilin Ligands Protect Cavernous Nerves after Crush Injury in the Rat: New Experimental Paradigms," European Urology, vol. 51, 2007 (published online Nov. 16, 2006), pp. 1724-1731.
Vukicevic et al., Osteogenic protein-1 (bone morphogenetic protein-7) reduces severity of injury after ischemic acute renal faulure in rat, The Journal of Clinical Investigation, vol. 102, No. 1, Jul. 1998, pp. 202-214 (14 pages total).
Weinbrenner, MD et al., "Fostriecin, an Inhibitor of Protein Phosphatase 2A, Limits Myocardial Infarct Size Even When Administered After Onset of Ischemia," Circulation, vol. 98, Sep. 1, 1998, pp. 899-905.
Whissell et al., "The transcription factor GATA5 enables self-renewal of colon adenoma stem cells by repressing BMP gene expression," Nature Cell Biology, Advance Online Publication, Jun. 22, 2014, pp. (24 pages total).
Whitlock, JR et al., "Induction of Cytochrome P4501A1," Annu. Rev. Pharmacol. Toxicol., vol. 39, 1999, pp. 103-125 (24 pages total).
Wood et al., "The Role of the Aryl Hydrocarbon Receptor Nuclear Translocator (ARNT) in Hypoxic Induction of Gene Expression," The Journal of Biological Chemistry, vol. 271, No. 25, Jun. 21, 1996, pp. 15117-15123.
Woroniecka et al., "Transcriptome Analysis of Human Diabetic Kidney Disease," Diabetes, vol. 60, Sep. 2011, pp. 2354-2369.
Wu et al., "Cardiac-specific ablation of ARNT leads to lipotoxicity and cardiomyopathy," The Journal of Clinical Investigation, vol. 124, No. 11, Nov. 2014, pp. 4795-4806.
Xu et al., "Endocardial Fibroelastosis is Caused by Aberrant Endothelial to Mesenchymal Transition," Circ Res. 2015, pp. 857-866 (37 pages total).
Xu et al., "Epigenetic balance of aberrant Rasal 1 promoter methylation and hydroxymethylation regulates cardiac fibrosis," Cardiovascular Research, vol. 105, 2015, pp. 279-291.
Yang et al., "Bone Morphogenic Protein-7 inhibits silica-induced pulmonary fibrosis in rats." Toxicology Letters, 2013, pp. 103-108 (17 pages total).
Yang et al., "Cyclophilin A and FKBP12 Interact with YY1 and Alter Its Transcriptional Activity," The Journal of Biological Chemistry, vol. 270, No. 26, Jun. 23, 1995, pp. 15187-15193.
Yang et al., "Epithelial cell cycle arrest in G2/M mediates kidney fibrosis after injury," Nature Medicine, vol. 16, No. 5. May 2010, pp. 535-543 (10 pages total).
Yang et al.. "Pharmacological Preconditioning with Low-Dose Cyclosporine or FK506 Reduces Subsequent Ischemia/Reperfusion Injury in Rat Kidney," Transplantation vol. 72, No. 11, Dec. 15, 2001, pp. 1753-1759.
Yang et al., "Preconditioning with Cyclosporine A or FK506 Differentially Regulates Mitogen-Activated Protein Kinase Expression in Rat Kidneys with Ischemia/Reperfusion Injury," Transplantation, vol. 75, No. 1, 2003, pp. 20-24.
Yang et al., "The FK506-binding protein 25 functionally associates with histone deacetylases and with transcription factor YY1," The EMBO Journal, vol. 20, No. 17, 2001, pp. 4814-4825.
Ye et al., "Primer-BLAST: A tool to design target-specific primers for polymerase chain reaction," BMC Bioinformatics, vol. 13, No. 134, 2012, pp. 1-11.
Yokoyama et al., "Evaluation of the Protective Effect of Cyclosporin A and FK506 on Abnormal Cytosolic and Mitochondrial Ca2+ Dynamics During Ischemia and Exposure to High Glutamate . . . Preparations," J Pharmacol Sci, vol. 120, 2012 (published online Oct. 26, 2012), pp. 228-240.
Yoon et al., "Preconditioning Strategies for Kidney Ischemia Reperfusion Injury: Implications of the "Time-Window" in Remote Ischemic Preconditioning," PLOS One, vol. 10, No. 4, Apr. 16, 2015, pp. 1-11.
Yu et al., "Dorsmorphin inhibits BMP signals required for embryogenesis and iron metabolism," Nature Chemical Biology, vol. 4, No. 1, Jan. 2008, pp. 33-41.
Zahir et al., "Ischemic Preconditioning Improves the Survival of Skin and Myocutaneous Flaps in a Rat Model," Plastic and Reconstructive Surgery, vol. 102, No. 1, Jul. 1998, pp. 140-150.
Zawadzka et al., "Immunosuppressant FK506 affects multiple signaling pathways and modulates gene expression in astrocytes," Molecular and Cellular Neuroscience, vol. 22, 2003, pp. 202-209.
Zeisberg et al., "BMP-7 counteracts TGF-J1-Induced epithelial-to-mesenchymal transition and reverses chronic renal injury," Nature Medicine, vol. 9, No. 7, Jul. 2003 (published online Jun. 15, 2003), pp. 964-968.
Zeisberg et al., "Bone Morphogenic Protein-7 Induces Mesenchymal to Epithelial Transition in Adult Renal Fibroblasts and Facilitates Regeneration of Injured Kidney," The Journal of Biological Chemistry, vol. 280, No. 9, Mar. 4, 2005, pp. 8094-8100.
Zeisberg et al., "Bone morphogenic protein-7 inhibits progression of chronic renal fibrosis associated with two genetic mouse models," Am J Physiol Renal Physiol, vol. 285, Dec. 2003, pp. F1060-F1067.
Zeisberg et al., "Endothelial-to-mesenchymal transition contributes to cardiac fibrosis," Nature Medicine, vol. 13, No. 8, Aug. 2007 (published online Jul. 29, 2007), pp. 952-961.
Zeisberg et al., "Fibroblasts Derive from Hepatyocytes in Liver Fibrosis via Epithelial to Mesenchymal Transition," The Journal of Biological Chemistry, vol. 282, No. 32, Aug. 10, 2007, pp. 23337-23347.
Zhang et al., "Regeneration of Dopaminergio Function in 6-Hydroxydopamine-Lesioned Rats by Neuroimmunophilin Ligand Treatment." The Journal of Neuroscience, vol. 21. RC156, 2001, pp. 1-6.
Zhao et al, "Arterial Pressure Monitoring in Mice," Curr Protoc Mouse Biol., vol. 1. 2011, pp. 105-122 (26 pages total).

(56) References Cited

OTHER PUBLICATIONS

European Communication pursuant to Article 94(3) EPC for European Application No. 19719160.4, dated Oct. 4, 2023.
Zeisberg et al., "Pharmacological Induction of ARNT/HIF1β Attenuates Chronic Organ Failure," Mechanisms Associated with Kidney Fibrosis—I, 2017, 2 pages total.

A

B

C

PREVENTION OR TREATMENT OF CHRONIC ORGAN INJURY

CROSS REFERENCE TO RELATED APPLICATIONS

This application is the National Phase of PCT International Application No. PCT/EP2019/057712, filed on Mar. 27, 2019, which claims priority under 35 U.S.C. 119(e) to U.S. Provisional Application No. 62/649,245, filed on Mar. 28, 2018, all of which are hereby expressly incorporated by reference into the present application.

The present disclosure is directed to novel therapeutic approaches for the prevention, treatment and/or delaying progression of chronic injury, progressive loss of functional parenchymal cells, or fibrosis of an organ. Specifically disclosed are agents for use in increasing homodimer-formation of ARNT in an organ in the prevention, treatment and/or delaying progression of chronic injury, progressive loss of functional parenchymal cells, or fibrosis of said organ, as further defined in the claims. In embodiments, said agent may be (i) an inhibitor of protein phosphatase 2A (PP2A) activity, (ii) an inhibitor of the transcriptional repressor complex FKBP12/YY1, or (iii) an expression construct, which is capable of over-expressing ARNT in said organ, as well as combinations of (i), (ii), and/or (iii).

BACKGROUND OF THE INVENTION

Injury in any organ triggers a complex signaling cascade that involves various cellular and molecular responses, ultimately culminating in tissue fibrosis, loss of functional parenchyma and organ failure. Progressive fibrosis and impaired regenerative capacity is still an unmet biomedical challenge, because once chronic lesions have manifested, no effective therapies are available as of yet for clinical use.

Progression of chronic kidney disease (CKD) is unequivocally characterized by loss of functional tubular epithelium, inflammation and progressive fibrosis. Just like chronic progressive failure of any other parenchymal organ, progression of chronic kidney failure towards end-stage renal disease (ESRD) is an unmet biomedical challenge, because effective therapies to target progressive loss of functional parenchymal cells and organ fibrosis are not yet available. While efforts to implement interventional therapeutic regimens to treat already established chronic kidney lesion were all frustrane, it has been known for decades that parenchymal organs including the kidney can be preconditioned to resist later ensuing tissue injuries, preventing both progressive loss of functional epithelium and kidney fibrosis (4-17). Despite compelling evidence for the effectiveness of either ischemic or pharmacological preconditioning in the context of anticipated injury such as ischemic injury during organ transplantation, the underlying mechanisms have remained elusive. Among different preconditioning approaches, several independent studies highlighted efficacy of FK506 (synonym Tacrolimus or Fujimycin) administration to protect against acute experimental injuries (18), involving various parenchymal organs including kidney (19-22), heart (23-25), liver (26-28), lung (18, 29), brain (30, 31), spinal cord (32, 33), skin (34), and intestine (35).

FK506 is a macrolide calcineurin inhibitor (CNI) that elicits immunosuppression by inhibition of calcineurin phosphatase activity and subsequent reduction of NF-AT- and NFκB-dependent transcription of pro-inflammatory cytokines (36, 37). FK506 is commonly used to lower risk of rejection after allogeneic organ transplantation, albeit its clinical utility is limited by its nephrotoxicity resulting in chronic kidney failure (38, 39). While possible renoprotection by FK506 preconditioning appears counter-intuitive in light of its clinically established nephrotoxicity, effective organ protection was demonstrated at FK506 doses far below concentrations required to achieve calcineurin-dependent immunosuppression (picomolar versus nanomolar range) (19-31), suggesting involvement of alternate, calcineurin-independent and yet unknown mechanisms.

SUMMARY OF THE INVENTION

The present inventors aimed to elucidate molecular mechanisms underlying the protective activity of low-dose FK506 administration and to explore if this pathway could be utilized to even protect from chronic progressive organ failure.

The inventors discovered a novel FKBP12/YY1/ARNT signaling axis, which controls endogenous BMP signaling responses via transcriptional regulation of canonical BMP receptor ALK3, ultimately attenuating chronic progressive kidney disease. The inventors further demonstrate that FK506-binding proteins FKBP12 and YY1 interact to form a transcriptional repressor complex and that disruption of such complex by administration of either low-dose FK506, small molecule FKBP12 inhibitor GPI-1046, or by direct targeting of FKBP12/YY1 using in vivo-morpholinos induces expression of transcription factor ARNT (synonym HIF1β), which subsequently induces ALK3 transcription by binding to its palindromic E-box motif specific for ARNT homodimers. Pharmacological induction of ARNT/HIF1β not only attenuated chronic kidney injury when administered before kidney injury, but also when treatment was initiated when kidney injury had already been established. the inventors finally provide evidence that such protective effect is not limited to the kidney, but also effective in models of chronic heart and liver injury.

Prompted by previous observations that ARNT homodimer formation can be enforced by inhibition of protein phosphatases PP1 and PP2A (163), the inventors here further aimed to gain insights if such mechanism can be utilized to boost protection of functional parenchyma. The inventors found that selective PP2A inhibition by small molecule compound LB-100 effectively increases endogenous ARNT. On a mechanistic level, inhibition of PP2A preserves ARNT phosphorylation and protects ARNT from proteolytic degradation, associated with enhanced ARNT/HIF1β homodimer formation. Enforced ARNT/HIF1β homodimer formation is associated with enhanced protection from chronic organ failure in kidney, heart and liver.

In summary, the inventors disclose a novel organ-protective mechanism, which can be pharmacologically modulated and therapeutically targeted by immunophilin ligands FK506, GPI-1046 or in vivo morpholino approaches. The inventors further disclose a novel approach to induce ARNT/HIF1β homodimer formation, ultimately associated with attenuation of chronic organ failure.

In particular disclosed is an agent for use in increasing homodimer-formation of ARNT in an organ in the prevention, treatment and/or delaying progression of chronic injury, progressive loss of functional parenchymal cells, or fibrosis of said organ. In embodiments, the increased homodimer-formation of ARNT is to increase the expression of ALK3. For example, the increased homodimer-formation of ARNT is by an increased expression of ARNT. In certain embodiments, the increased homo-dimer formation of ARNT is to protect said organ against chronic injury, progressive loss of functional parenchymal cells, or fibrosis. Said chronic injury, progressive loss of functional parenchymal cells, or fibrosis can be caused by a chronic progressive disease, or by a long-term exposure to a substance which is toxic for said organ; optionally wherein said substance is a pharmaceutical agent, or by a long-term ischemia. In specific embodiments, said agent is for use in the prevention, treatment and/or delaying progression of chronic kidney disease. In certain embodiments, said agent is for use in the prevention of and/or in delaying progression to end-stage renal disease. In some embodiments, said agent is for use in the prevention, treatment, and/or in delaying progression of pulmonary fibrosis. In other embodiments, said agent is for use in the prevention, treatment, and/or in delaying progression of a fibrosis selected from the group of cystic fibrosis, idiopathic pulmonary fibrosis, progressive massive fibrosis, liver cirrhosis, artrial fibrosis of the heart, endomyocardial fibrosis, glial scar of the brain, keloid of the skin, Crohn's disease of the intestine. In further embodiments, said agent is for use in the prevention, treatment, and/or in delaying progression of chronic cardiac injury. In certain embodiments, said agent is for protecting from impairment of organ function or histopathological patterns of chronified injury, such as fibrosis, cirrhosis, loss of functional parenchyma, atrophy, applied before, during, or after injury. In some embodiments, said agent is for use in the treatment of prevention of diabetes mellitus, in particular diabetic end-organ damage, including diabetic nephropathy.

The invention as such and its preferred embodiments is defined by the claims.

DETAILED DESCRIPTION OF THE PREFERRED EMBODIMENTS

The present disclosure is directed to an agent for use in increasing homodimer-formation of ARNT in an organ in the prevention, treatment and/or delaying progression of chronic injury, progressive loss of functional parenchymal cells, or fibrosis of said organ. Similarly, further disclosed is the use of an agent for the preparation of a medicament for increasing homodimer-formation of ARNT in an organ in the prevention, treatment and/or delaying progression of chronic injury, progressive loss of functional parenchymal cells, or fibrosis of said organ. Also contemplated is a method for increasing homodimer-formation of ARNT in an organ of a subject to be treated in the prevention, treatment and/or delaying progression of chronic injury, progressive loss of functional parenchymal cells, or fibrosis of said organ, comprising the step of administering said agent to said subject.

As demonstrated below the intention and purpose of increasing the homodimer-formation of ARNT is to increase the expression of ALK3. Activity of protective canonical BMP signaling in kidney, heart, lung and liver depends on presence of the type I BMP receptor ALK3, inducing BMP signaling upon ligand binding and dimerization with type II BMP receptor BMPR2, subsequently mediating anti-fibrotic and pro-regenerative BMP signaling responses (29, 53-56, 58-68). Thus, the increased homodimer formation of ARNT is to protect said organ against chronic injury, progressive loss of functional parenchymal cells, or fibrosis. Accordingly, in certain embodiments, the increased homodimer-formation of ARNT is by an increased expression of ARNT, which in turn will form more homodimers of ARNT.

In view of the foregoing, the term "increasing homodimer-formation of ARNT" is actually intended to mean to increase the expression of ALK3 via an increased homodimer-formation of ARNT. Therefore, an increase of homodimer-formation of ARNT can be tested for by quantitative PCR as an increase of ALK3 expression in said organ following administration of an effective amount of said agent as compared to ALK3 expression in said organ prior to treatment with said agent, e.g. prior to commencement with the treatment with said agent or at the trough concentration. Briefly, for SYBR-based real-time PCR, cDNA synthesis is performed by using DNase I digestion (Invitrogen, Carlsbad, USA) and SuperScript II Reverse Transcriptase (Invitrogen, Carlsbad, USA) according to the manufacturer's protocol. 1 µL of reverse-transcribed cDNA is added to the reaction mixture containing the primer pair (200 nmol/L each) and diluted 2× Fast SYBR Green Master Mix (Applied Biosystems, Carlsbad, USA) in a final volume of 20 µL for each PCR reaction. The real-time PCR reactions are performed in a 96-well reaction plate using the StepOne Plus Real-Time System (Applied Biosystems, Carlsbad, USA) and are done in triplicates. An initiation step at 95° C. for 20 seconds is followed by 40 cycles at 95° C. for 3 seconds and 60° C. for 30 seconds, with one cycle of dissociation at 95° C. for 15 seconds, 60° C. for 60 seconds, and 95° C. for 15 seconds. The intercalation of SYBR Green dye and its fluorescent signal is directly proportional to the amount of amplified DNA and is transformed into the cycle threshold (Ct). For normalization, the Ct values of the housekeeping genes Gapdh and Actb are subtracted from the Ct values of the gene of interest to generate the dCt values. The relative expression levels are calculated using the equation $2^{-ddCt}$. Suitable oligonucleotide sequences are listed in Table 9. In some embodiments, said chronic injury, progressive loss of functional parenchymal cells, or fibrosis is caused by a chronic progressive disease. In other embodiments, said chronic injury, progressive loss of functional parenchymal cells, or fibrosis is caused by a long-term exposure to a substance which is toxic for said organ. For example, said substance is a pharmaceutical agent which is administered as a long-term treatment, which substance has toxic side-effects to said organ. I still other embodiments, said chronic injury, progressive loss of functional parenchymal cells, or fibrosis may be caused by a long-term ischemia.

In certain embodiments, the organ is of mesoderm origin. Examples for organs of mesoderm origin are kidney, heart, intestine, and spleen. In preferred embodiments, the organ of mesoderm origin is an organ selected from kidney, heart, and intestine; more preferably wherein the organ of mesoderm origin is an organ selected from kidney and heart. In light of the following examples, in a particularly preferred embodiment the organ of mesoderm origin is kidney.

In other embodiments, the organ may be of entoderm origin. Examples of an organ of entoderm origin is lung or liver. In preferred embodiments, the organ of entoderm origin is lung.

In still other embodiments, the organ is of ektoderm origin. Examples for an organ of ektoderm origin are brain, spinal cord, and skin. In preferred embodiments, the organ of ektoderm origin is an organ selected from brain and spinal cord. In a particularly preferred embodiment, the organ of ektoderm origin is brain.

In certain embodiments, the organ may be a parenchymatous organ. Examples of an parenchymatous organ is kidney, liver, spleen, and pancreas. In preferred embodiments, the parenchymatous organ is an organ selected from kidney and liver. In light of the examples shown below, a particularly preferred embodiment is wherein the parenchymatous organ is kidney.

Generally, the agent of the present disclosure is useful for protecting from impairment of organ function or histopathological patterns of chronified injury, such as fibrosis, cirrhosis, loss of functional parenchyma, atrophy, applied before, during, or after injury. In light of the foregoing, the agent of the present disclosure is particularly useful in the prevention, treatment and/or delaying progression of chronic kidney disease. In particular, the agent of the present disclosure is useful in the prevention of and/or in delaying progression to end-stage renal disease. Likewise, in case the organ is lung, the agent of the present invention is useful in the prevention, treatment, and/or in delaying progression of pulmonary fibrosis.

However, as shown and explained in the examples section below, the agents useful in the present disclosure can be applied in the prevention, treatment, and/or in delaying progression of any fibrosis. Depending on the organ, the fibrosis may be selected from the group of cystic fibrosis, idiopathic pulmonary fibrosis, progressive massive fibrosis, liver cirrhosis, artrial fibrosis of the heart, endomyocardial fibrosis, glial scar of the brain, keloid of the skin, Crohn's disease of the intestine. As further demonstrated below, the agent of the present disclosure may also be advantageously applied in the prevention, treatment, and/or in delaying progression of chronic cardiac injury. Further contemplated are embodiments, wherein said agent is for use in the treatment of prevention of diabetes mellitus, in particular diabetic end-organ damage, including diabetic nephropathy.

As demonstrated in the examples, the increase of homodimer-formation of ARNT can be accomplished by different ways. Specifically, increased homodimer-formation, and thus increased ALK3 expression was demonstrated by increasing the expression of ARNT, by increasing the stability of endogenous ARNT such as by inhibiting protein phosphatase 2A (PP2A) activity, or by inhibiting the transcriptional repressor complex of ARNT which is FKBP12/YY1. These routes of increasing homodimer-formation of ARNT can be pursued separately or in combination.

As noted above, in one embodiment, the agent for use in the present disclosure is an inhibitor of protein phosphatase 2A (PP2A) activity. While in principle said inhibitor of PP2A activity may be used in combination with any organ considered suitable herein, in one embodiment the organ may be an organ other than heart, lung, spleen, brain or spinal cord. Inhibitors of PP2A activity are known in the art or can be easily prepared using routine procedures only. For example, the inhibitor may be a siRNA (or another similar RNAi molecule such as shRNA, or microRNA) such that the abundance of mRNA coding for PP2A activity is reduced in the organ to be treated. Designing and producing siRNAs forms part of the average skill of the person skilled in the art, and sequences for PP2A can be retrieved from publicly accessible databases. A particular suitable subgroup of RNAi molecules are vivo morpholinos. As generally known in the field, vivo morpholinos are modified RNAs showing an increased stability due to morpholino modifications of the oligonucleotide backbone.

However, in a particularly preferred embodiment, said inhibitor of protein phosphatase 2A (PP2A) activity is a small molecule. Such small molecules are known in the art. For example, small molecule may be selected from (i) an oxabicycloheptane or oxabicycloheptene such as LB-100, LB-102 and LB-107, (ii) okadaic acid, (iii) fostriecin, and (iv) calyculin A.

Suitable oxabicycloheptanes and oxabicycloheptenes are disclosed in WO 2014/005080, in particular the compounds shown on pages 9 to 34, and LB100, LB102 and LB107 are disclosed on page 45 of WO 2014/005080, and or the compounds shown on pages 32 to 47 of WO 2016/040877. Further contemplated are pharmaceutically acceptable salts and esters of these compounds. WO 2014/005080 and WO 2016/040877 in their entirety, and in particular the above indicated passages, are incorporated herein by reference.

Okadaic acid (CAS 78111-17-8) and pharmaceutically acceptable salts thereof are known in the art. Okadaic acid is also commercially available and has the following structure

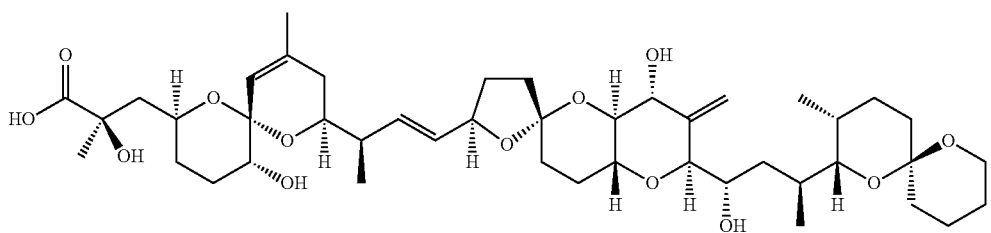 [SMILES: C=C1[C@@H](O)[C@@H]2O[C@]3(CC[C@H](/C=C/[C@@H](C)[C@@H]4CC(C)=C[C@@]5(O[C@H](C[C@@](C)(O)C(=O)O)CC[C@H]5O)O4)O3)CC[C@H]2O[C@@H]1[C@@H](O)C[C@H](C)[C@H]1O[C@@]2(CCCCO2)CC[C@H]1C]

Fostriecin (CAS 87860-39-7) and pharmaceutically acceptable salts thereof are known in the art. Fostriecin is commercially available and has the following structure

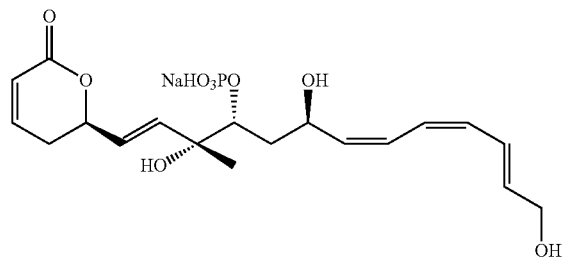

Calyculin A (CAS 101932-71-2) and pharmaceutically acceptable salts thereof are known in the art. Calyculin A is commercially available and has the following structure

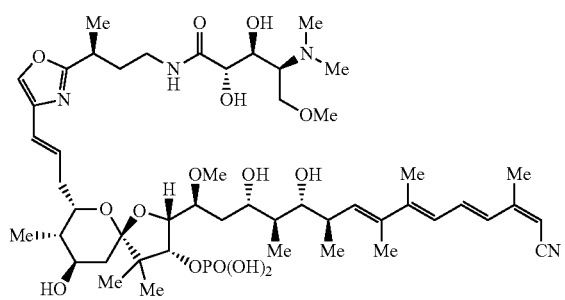

In light of the examples, a particular preferred embodiment is wherein said inhibitor of protein phosphatase 2A (PP2A) activity is LB-100. As demonstrated below LB-100 may suitably be administered in an effective dose in the range of 0.075-7.5 mg/kg body weight per day, preferably in the range of 0.1-7 mg/kg body weight per day, more preferably in the range of 0.15-6 mg/kg body weight per day, more preferably in the range of 0.2-5 mg/kg body weight per day, more preferably in the range of 0.5-4 mg/kg body weight per day, more preferably in the range of 0.75-3 mg/kg body weight per day, more preferably in the range of 1-2 mg/kg body weight per day, such as at 2 mg/kg body weight per day.

As further demonstrated in the examples below, ARNT homodimer formation can be likewise enhanced by using an inhibitor of the transcriptional repressor complex FKBP12/YY1. Accordingly, in another preferred embodiment, the agent for use of the present disclosure is an inhibitor of the transcriptional repressor complex FKBP12/YY1. Generally, any suitable inhibitor of the transcriptional repressor complex FKBP12/YY1, i.e. any inhibitor of its constituents FKBP12 or YY1, may be used.

In one embodiment, the agent for use of the present disclosure may be an inhibitor of FKBP12. Non-limiting examples of such an inhibitor are a small molecule, a siRNA, and a vivo morpholino. Such a small molecule can be selected, for example, from (i) a pipecolic acid derivative such as GPI 1046, GPI 1044, GPI 1102, GPI 1116, or GPI 1206, (ii) rapamycin, FK 506 or derivatives thereof.

Suitable pipecolic acid derivatives have an affinity for FKBP12, and inhibit FKBP12 upon binding. Suitable pipecolic acid derivatives are disclosed on pages 22 to 57 of WO 00/09109. An assay for testing binding to and inhibition of FKBP12 is disclosed on pages 59 and 60 of WO 00/09109. GPI 1046 (CAS 186452-09-5) and pharmaceutically acceptable salts thereof are known in the art. GPI 1046 is commercially available and has the following structure:

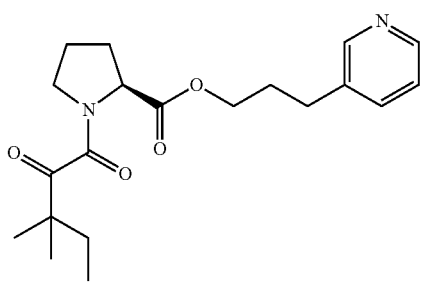 [SMILES: CCC(C)(C)C(=O)C(=O)N1CCC[C@H]1C(=O)OCCCc1cccnc1]

GPI 1044, GPI 1102, GPI 1116, and GPI 1206 are disclosed on pages 11 and 12 of WO 00/09109. WO 00/09109 in its entirety, and in particular the above indicated passages, are incorporated herein by reference.

Further inhibitors of FKBP12, such as GPI-1046 and analogues thereof, and their synthesis are disclosed in WO 98/37885, in particular on pages 6 to 18 and 23 to 25 of WO 98/37885. WO 98/37885 in its entirety, and in particular the above indicated passages, are incorporated herein by reference. Further immunophilin ligands suitable for use in the present disclosure are described in U.S. Pat. No. 4,329,353, in particular in the claims, and in U.S. Pat. No. 6,251,932, in particular in the claims, both of which are incorporated in their entirety by reference.

FK506, also known as tacrolimus (CAS 104987-11-3) is generally known in the art, and commercially available. Further, numerous derivatives of FK506 are described in the patent and non-patent prior art, which are also contemplated to be useful herein, as long as these derivatives act as an inhibitor of FKBP12, thereby promoting ARNT homodimer formation, as can be determined using the above described quantitative PCR assay.

While in principle said inhibitor of FKBP12 may be used in combination with any organ considered suitable herein, in one embodiment the organ may be an organ other than heart, liver, lung, brain, skin, or intestine; in another embodiment, the organ may be an organ other than heart, liver, lung, brain, skin, intestine, or kidney.

In light of the examples, a particular preferred embodiment is wherein said agent for use in the present disclosure is GPI 1046. As demonstrated below, GPI 1046 may suitably be administered in an effective dosage of 10-30 mg/kg body weight per day such as subcutaneously at a dose of 10 mg/kg body weight per day.

In another embodiment demonstrated to be useful in the examples section herein, said agent for use in the present disclosure is FK506 or a derivative thereof. As demonstrated below, FK506 or its derivative may suitably be administered in an effective dosage of 0.02-2 mg/kg body weight per day, preferably in an effective dosage of 0.075-0.2 mg/kg body weight per day.

In still another embodiment demonstrated to be useful in the examples section herein, said agent for use in the present disclosure is a vivo morpholino which inhibits/downregulates FKBP12. As exemplified in the examples, a suitable vivo morpholino may comprise or preferably consist of the sequence shown in SEQ ID NO: 9. Such a vivo morpholino may suitably be administered in an effective amount of 1-50 mg/kg body weight per day, preferably 5-25 mg/kg body weight per day, more preferably 10-15 mg/kg body weight per day, such as 12.5 mg/kg body weight per day.

The foregoing alternatives can be combined, as also demonstrated in the examples herein.

For example, a combination of two inhibitors of the transcriptional repressor complex FKBP12/YY1 are contemplated, such as a combination of GPI 1046 and FK506, e.g. administered in the dosages as described above. More specifically, the agent for use in the present disclosure may be a combination of (i) GPI 1046, optionally wherein GPI 1046 is administered in an effective dosage of 10-30 mg/kg body weight per day such as subcutaneously at a dose of 10 mg/kg body weight per day; and (ii) FK-506 or a derivative thereof, optionally administered in an effective dosage of 0.02-2 mg/kg body weight per day, preferably in an effective dosage of 0.075-0.2 mg/kg body weight per day.

As an alternative to an inhibitor of FKBP12, the inventors have demonstrated herein that ARNT homodimer formation may likewise be enhanced using an inhibitor of YY1. For example, said inhibitor may be selected from a vivo morpholino and a siRNA. In an embodiment demonstrated to be useful in the examples section herein, said agent for use in the present disclosure is a vivo morpholino which inhibits/downregulates YY1. As exemplified in the examples, a suitable vivo morpholino may comprise or preferably consist of the sequence shown in SEQ ID NO: 10. Such a vivo morpholino may suitably be administered in an effective amount of 1-50 mg/kg body weight per day, preferably 5-25 mg/kg body weight per day, more preferably 10-15 mg/kg body weight per day, such as 12.5 mg/kg body weight per day. While in principle said inhibitor of YY1 may be used in combination with any organ considered suitable herein, in one embodiment the organ may be an organ other than lung.

Instead of enhancing ARNT homodimer formation by its stability and/or endogenous regulation, a further appealing alternative is to directly deliver ARNT in its protein form to the organ, e.g. by fusing same to protein transduction domains, or by directly expressing ARNT in said organ. Accordingly, in a further embodiment the agent for use in the present disclosure is an expression construct, which is capable of over-expressing ARNT in said organ. The amino acid sequence of ARNT and its coding nucleotide sequence are known and publicly derivable/available from gene bank data bases. The coding sequence is preferably functionally linked with regulatory transcriptional and/or translational elements which are functional in the organ to be treated. In one embodiment, the expression construct comprises ARNT in an expression cassette, as generally known in the art. Alternatively, the expression construct may be in a form which is not transcribed but translated into ARNT, e.g., in form of a mRNA. Such an expression construct may only require translational regulatory elements. Thus, the expression construct may be in the form of a recombined DNA, cDNA, RNA or modified RNA. In case the coding sequence of ARNT is in an expression cassette, said expression of ARNT is under the control of a constitutive promoter. However, in order to reduce bystander effects, in a more preferred embodiment said expression of ARNT is under the control of a selective or inducible promoter, optionally wherein said expression of ARNT is under the control of a promoter which selectively expresses ARNT in said organ. The choice of the promoter will thus depend on the organ to be treated, and the skilled person will know how to select a suitable promoter sequence.

In addition, certain embodiments are contemplated herein, in which the agent for use in the present disclosure is a combination of at least two of (i) an inhibitor of protein phosphatase 2A (PP2A) activity, (ii) an inhibitor of the transcriptional repressor complex FKBP12/YY1, and (iii) an expression construct, which is capable of over-expressing ARNT in said organ. As demonstrated in the examples, a suitable combination is a combination of (i) an inhibitor of protein phosphatase 2A (PP2A) activity, and (ii) an inhibitor of the transcriptional repressor complex FKBP12/YY1. For example, as demonstrated in the examples herein, a combination of GPI 1046 and FK-506 may further be combined with the PP2A inhibitor LB100. GPI 1046 may be administered in an effective dosage of 10-30 mg/kg body weight per day such as subcutaneously at a dose of 10 mg/kg body weight per day; and FK-506 or a derivative thereof may be administered in an effective dosage of 0.02-2 mg/kg body weight per day, preferably in an effective dosage of 0.075-0.2 mg/kg body weight per day. LB-100 may suitably be administered in an effective dose in the range of 0.075-7.5 mg/kg body weight per day, preferably in the range of 0.1-7 mg/kg body weight per day, more preferably in the range of 0.15-6 mg/kg body weight per day, more preferably in the range of 0.2-5 mg/kg body weight per day, more preferably in the range of 0.5-4 mg/kg body weight per day, more preferably in the range of 0.75-3 mg/kg body weight per day, more preferably in the range of 1-2 mg/kg body weight per day, such as at 2 mg/kg body weight per day.

Further disclosed are the following medical uses: An agent for use in increasing homodimer-formation of ARNT in an organ in the prevention of chronic injury, progressive loss of functional parenchymal cells, or fibrosis of said organ. An agent for use in increasing homodimer-formation of ARNT in an organ in delaying progression of chronic injury, progressive loss of functional parenchymal cells, or fibrosis of said organ. An agent for use in increasing expression of ALK3 via increased homodimer-formation of ARNT in an organ in the prevention of chronic injury, progressive loss of functional parenchymal cells, or fibrosis of said organ. An agent for use in increasing expression of ALK3 via increased homodimer-formation of ARNT in an organ in delaying progression of chronic injury, progressive loss of functional parenchymal cells, or fibrosis of said organ. An agent for use in increasing expression of ALK3 via increased expression of ARNT in an organ in the prevention of chronic injury, progressive loss of functional parenchymal cells, or fibrosis of said organ. An agent for use in increasing expression of ALK3 via increased expression of ARNT in an organ in delaying progression of chronic injury, progressive loss of functional parenchymal cells, or fibrosis of said organ. An agent for use in increasing expression of ARNT in an organ in the prevention of chronic injury, progressive loss of functional parenchymal cells, or fibrosis of said organ. An agent for use in increasing expression of ARNT in an organ in delaying progression of chronic injury, progressive loss of functional parenchymal cells, or fibrosis of said organ. An agent capable of increasing homodimer-formation of ARNT in an organ for use in the prevention of chronic injury, progressive loss of functional parenchymal cells, or fibrosis of said organ. An agent capable of increasing homodimer-formation of ARNT in an organ for use in delaying progression of chronic injury, progressive loss of functional parenchymal cells, or fibrosis of said organ. An agent capable of increasing expression of ALK3 via increased homodimer-formation of ARNT in an organ for use in the prevention of chronic injury, progressive loss of functional parenchymal cells, or fibrosis of said organ. An agent capable of increasing expression of ALK3 via increased homodimer-formation of ARNT in an organ for use in delaying progression of chronic injury, progressive loss of functional parenchymal cells, or fibrosis of said organ. An agent capable of increasing expression of ALK3 via increased expression of ARNT in an organ for use in the prevention of chronic injury, progressive loss of functional parenchymal cells, or fibrosis of said organ. An agent capable of increasing expression of ALK3 via increased expression of ARNT in an organ for use in delaying progression of chronic injury, progressive loss of functional parenchymal cells, or fibrosis of said organ. An agent capable of increasing expression of ARNT in an organ for use in the prevention of chronic injury, progressive loss of functional parenchymal cells, or fibrosis of said organ. An agent capable of increasing expression of ARNT in an organ for use in delaying progression of chronic injury, progressive loss of functional parenchymal cells, or fibrosis of said organ. An agent for use in increasing homodimer-formation of ARNT in an organ in protecting said organ against chronic injury, progressive loss of functional parenchymal cells, or fibrosis. An agent for use in increasing expression of ALK3 via increased homodimer-formation of ARNT in an organ in protecting said organ against chronic injury, progressive loss of functional parenchymal cells, or fibrosis. An agent for use in increasing expression of ALK3 via increased expression of ARNT in an organ in protecting said organ against chronic injury, progressive loss of functional parenchymal cells, or fibrosis. An agent for use in increasing expression of ARNT in an organ in protecting said organ against chronic injury, progressive loss of functional parenchymal cells, or fibrosis. An agent capable of increasing homodimer-formation of ARNT in an organ for use in protecting said organ against chronic injury, progressive loss of functional parenchymal cells, or fibrosis. An agent capable of increasing expression of ALK3 via increased homodimer-formation of ARNT in an organ for use in protecting said organ against chronic injury, progressive loss of functional parenchymal cells, or fibrosis. An agent capable of increasing expression of ALK3 via increased expression of ARNT in an organ for use in protecting said organ against chronic injury, progressive loss of functional parenchymal cells, or fibrosis. An agent capable of increasing expression of ARNT in an organ for use in protecting said organ against chronic injury, progressive loss of functional parenchymal cells, or fibrosis. Preferred embodiments of these medical uses are as described above.

Further disclosed are: A use of an agent for the preparation of a medicament for increasing homodimer-formation of ARNT in an organ in the prevention of chronic injury, progressive loss of functional parenchymal cells, or fibrosis of said organ. A use of an agent for the preparation of a medicament for increasing homodimer-formation of ARNT in an organ in delaying progression of chronic injury, progressive loss of functional parenchymal cells, or fibrosis of said organ. A use of an agent for the preparation of a medicament for increasing expression of ALK3 via increased homodimer-formation of ARNT in an organ in the prevention of chronic injury, progressive loss of functional parenchymal cells, or fibrosis of said organ. A use of an agent for the preparation of a medicament for increasing expression of ALK3 via increased homodimer-formation of ARNT in an organ in delaying progression of chronic injury, progressive loss of functional parenchymal cells, or fibrosis of said organ. A use of an agent for the preparation of a medicament for increasing expression of ALK3 via increased expression of ARNT in an organ in the prevention of chronic injury, progressive loss of functional parenchymal cells, or fibrosis of said organ. A use of an agent for the preparation of a medicament for increasing expression of ALK3 via increased expression of ARNT in an organ in delaying progression of chronic injury, progressive loss of functional parenchymal cells, or fibrosis of said organ. A use of an agent for the preparation of a medicament for increasing expression of ARNT in an organ in the prevention of chronic injury, rogressive loss of functional parenchymal cells, or fibrosis of said organ. A use of an agent for the preparation of a medicament for increasing expression of ARNT in an organ in delaying progression of chronic injury, progressive loss of functional parenchymal cells, or fibrosis of said organ. A use of an agent capable of increasing homodimer-formation of ARNT in an organ for the preparation of a medicament for the prevention of chronic injury, progressive loss of functional parenchymal cells, or fibrosis of said organ. A use of an agent capable of increasing homodimer-formation of ARNT in an organ for the preparation of a medicament for delaying progression of chronic injury, progressive loss of functional parenchymal cells, or fibrosis of said organ. A use of an agent capable of increasing expression of ALK3 via increased homodimer-formation of ARNT in an organ for the preparation of a medicament for the prevention of chronic injury, progressive loss of functional parenchymal cells, or fibrosis of said organ. A use of an agent capable of increasing expression of ALK3 via increased homodimer-formation of ARNT in an organ for the preparation of a medicament for delaying progression of chronic injury, progressive loss of functional parenchymal cells, or fibrosis of said organ. A use of an agent capable of increasing expression of ALK3 via increased expression of ARNT in an organ for the preparation of a medicament for the prevention of chronic injury, progressive loss of functional parenchymal cells, or fibrosis of said organ. A use of an agent capable of increasing expression of ALK3 via increased expression of ARNT in an organ for the preparation of a medicament for delaying progression of chronic injury, progressive loss of functional parenchymal cells, or fibrosis of said organ. A use of an agent capable of increasing expression of ARNT in an organ for the preparation of a medicament for the prevention of chronic injury, progressive loss of functional parenchymal cells, or fibrosis of said organ. An agent capable of increasing expression of ARNT in an organ for the preparation of a medicament for delaying progression of chronic injury, progressive loss of functional parenchymal cells, or fibrosis of said organ. A use of an agent for the preparation of a medicament for increasing homodimer-formation of ARNT in an organ in protecting said organ against chronic injury, progressive loss of functional parenchymal cells, or fibrosis. A use of an agent for the preparation of a medicament for increasing expression of ALK3 via increased homodimer-formation of ARNT in an organ in protecting said organ against chronic injury, progressive loss of functional parenchymal cells, or fibrosis. A use of an agent for the preparation of a medicament for increasing expression of ALK3 via increased expression of ARNT in an organ in protecting said organ against chronic injury, progressive loss of functional parenchymal cells, or fibrosis. A use of an agent for the preparation of a medicament for increasing expression of ARNT in an organ in protecting said organ against chronic injury, progressive loss of functional parenchymal cells, or fibrosis. A use of an agent capable of increasing homodimer-formation of ARNT in an organ for the preparation of a medicament for protecting said organ against chronic injury, progressive loss of functional parenchymal cells, or fibrosis. A use of an agent capable of increasing expression of ALK3 via increased homodimer-formation of ARNT in an organ for the preparation of a medicament for protecting said organ against chronic injury, progressive loss of functional parenchymal cells, or fibrosis. A use of an agent capable of increasing expression of ALK3 via increased expression of ARNT in an organ for the preparation of a medicament for protecting said organ against chronic injury, progressive loss of functional parenchymal cells, or fibrosis. A use of an agent capable of increasing expression of ARNT in an organ for the preparation of a medicament for protecting said organ against chronic injury, progressive loss of functional parenchymal cells, or fibrosis. Preferred embodiments of these medical uses are as described to above.

Further disclosed are the following methods: A method for increasing homodimer-formation of ARNT in an organ in the prevention of chronic injury, progressive loss of functional parenchymal cells, or fibrosis of said organ in a patient, comprising the step of administering to said patient a suitable agent as disclosed above. A method for increasing homodimer-formation of ARNT in an organ in delaying progression of chronic injury, progressive loss of functional parenchymal cells, or fibrosis of said organ in a patient, comprising the step of administering to said patient a suitable agent as disclosed above. A method for increasing expression of ALK3 via increased homodimer-formation of ARNT in an organ in the prevention of chronic injury, progressive loss of functional parenchymal cells, or fibrosis of said organ in a patient, comprising the step of administering to said patient a suitable agent as disclosed above. A method for increasing expression of ALK3 via increased homodimer-formation of ARNT in an organ in delaying progression of chronic injury, progressive loss of functional parenchymal cells, or fibrosis of said organ in a patient, comprising the step of administering to said patient a suitable agent as disclosed above. A method for increasing expression of ALK3 via increased expression of ARNT in an organ in the prevention of chronic injury, progressive loss of functional parenchymal cells, or fibrosis of said organ in a patient, comprising the step of administering to said patient a suitable agent as disclosed above. A method for increasing expression of ALK3 via increased expression of ARNT in an organ in delaying progression of chronic injury, progressive loss of functional parenchymal cells, or fibrosis of said organ in a patient, comprising the step of administering to said patient a suitable agent as disclosed above. A method for increasing expression of ARNT in an organ in the prevention of chronic injury, progressive loss of functional parenchymal cells, or fibrosis of said organ in a patient, comprising the step of administering to said patient a suitable agent as disclosed above. A method for increasing expression of ARNT in an organ in delaying progression of chronic injury, progressive loss of functional parenchymal cells, or fibrosis of said organ in a patient, comprising the step of administering to said patient a suitable agent as disclosed above. A method for the prevention of chronic injury, progressive loss of functional parenchymal cells, or fibrosis of an organ in a patient, comprising the step of administering to said patient an agent capable of increasing homodimer-formation of ARNT in said organ. A method for delaying progression of chronic injury, progressive loss of functional parenchymal cells, or fibrosis of an organ in a patient, comprising the step of administering to said patient an agent capable of increasing homodimer-formation of ARNT in said organ. A method for the prevention of chronic injury, progressive loss of functional parenchymal cells, or fibrosis of an organ in a patient, comprising the step of administering to said patient an agent capable of increasing expression of ALK3 via increased homodimer-formation of ARNT in said organ. A method for delaying progression of chronic injury, progressive loss of functional parenchymal cells, or fibrosis of an organ in a patient, comprising the step of administering to said patient an agent capable of increasing expression of ALK3 via increased homodimer-formation of ARNT in said organ. A method for the prevention of chronic injury, progressive loss of functional parenchymal cells, or fibrosis of an organ in a patient, comprising the step of administering to said patient an agent capable of increasing expression of ALK3 via increased expression of ARNT in said organ. A method for delaying progression of chronic injury, progressive loss of functional parenchymal cells, or fibrosis of an organ in a patient, comprising the step of administering to said patient an agent capable of increasing expression of ALK3 via increased expression of ARNT in said organ. A method for the prevention of chronic injury, progressive loss of functional parenchymal cells, or fibrosis of an organ in a patient, comprising the step of administering to said patient an agent capable of increasing expression of ARNT in said organ. A method for delaying progression of chronic injury, progressive loss of functional parenchymal cells, or fibrosis of an organ in a patient, comprising the step of administering to said patient an agent capable of increasing expression of ARNT in said organ. A method for increasing homodimer-formation of ARNT in an organ in protecting said organ against chronic injury, progressive loss of functional parenchymal cells, or fibrosis in a patient, comprising the step of administering to said patient a suitable agent as disclosed above. A method for increasing expression of ALK3 via increased homodimer-formation of ARNT in an organ in protecting said organ against chronic injury, progressive loss of functional parenchymal cells, or fibrosis in a patient, comprising the step of administering to said patient a suitable agent as disclosed above. A method for increasing expression of ALK3 via increased expression of ARNT in an organ in protecting said organ against chronic injury, progressive loss of functional parenchymal cells, or fibrosis in a patient, comprising the step of administering to said patient a suitable agent as disclosed above. A method for increasing expression of ARNT in an organ in protecting said organ against chronic injury, progressive loss of functional parenchymal cells, or fibrosis in a patient, comprising the step of administering to said patient a suitable agent as disclosed above. A method for protecting an organ against chronic injury, progressive loss of functional parenchymal cells, or fibrosis in a patient, comprising the step of administering to said patient an agent capable of increasing homodimer-formation of ARNT in said organ. A method for protecting an organ against chronic injury, progressive loss of functional parenchymal cells, or fibrosis in a patient, comprising the step of administering to said patient an agent capable of increasing expression of ALK3 via increased homodimer-formation of ARNT in said organ. A method for protecting an organ against chronic injury, progressive loss of functional parenchymal cells, or fibrosis in a patient, comprising the step of administering to said patient an agent capable of increasing expression of ALK3 via increased expression of ARNT in said organ. A method for protecting an organ against chronic injury, progressive loss of functional parenchymal cells, or fibrosis in a patient, comprising the step of administering to said patient an agent capable of increasing expression of ARNT in said organ. Preferred embodiments of these therapeutic methods are as described above.

The invention is further described in the following Figures and Examples, which are not to be construed to limit the invention. The scope of the invention is defined by the claims only.

EXAMPLES

Materials and Methods

Figure 1:
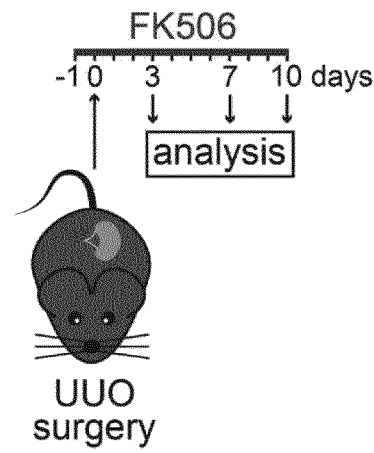
FIG. 1: Mice were challenged with UUO and treated with either vehicle buffer, FK506 (0.02, 0.075, 0.2, 5.0 mg/kg orally per day, respectively) or CsA (10 mg/kg orally per day) starting one day prior of surgery.
Figure 2:
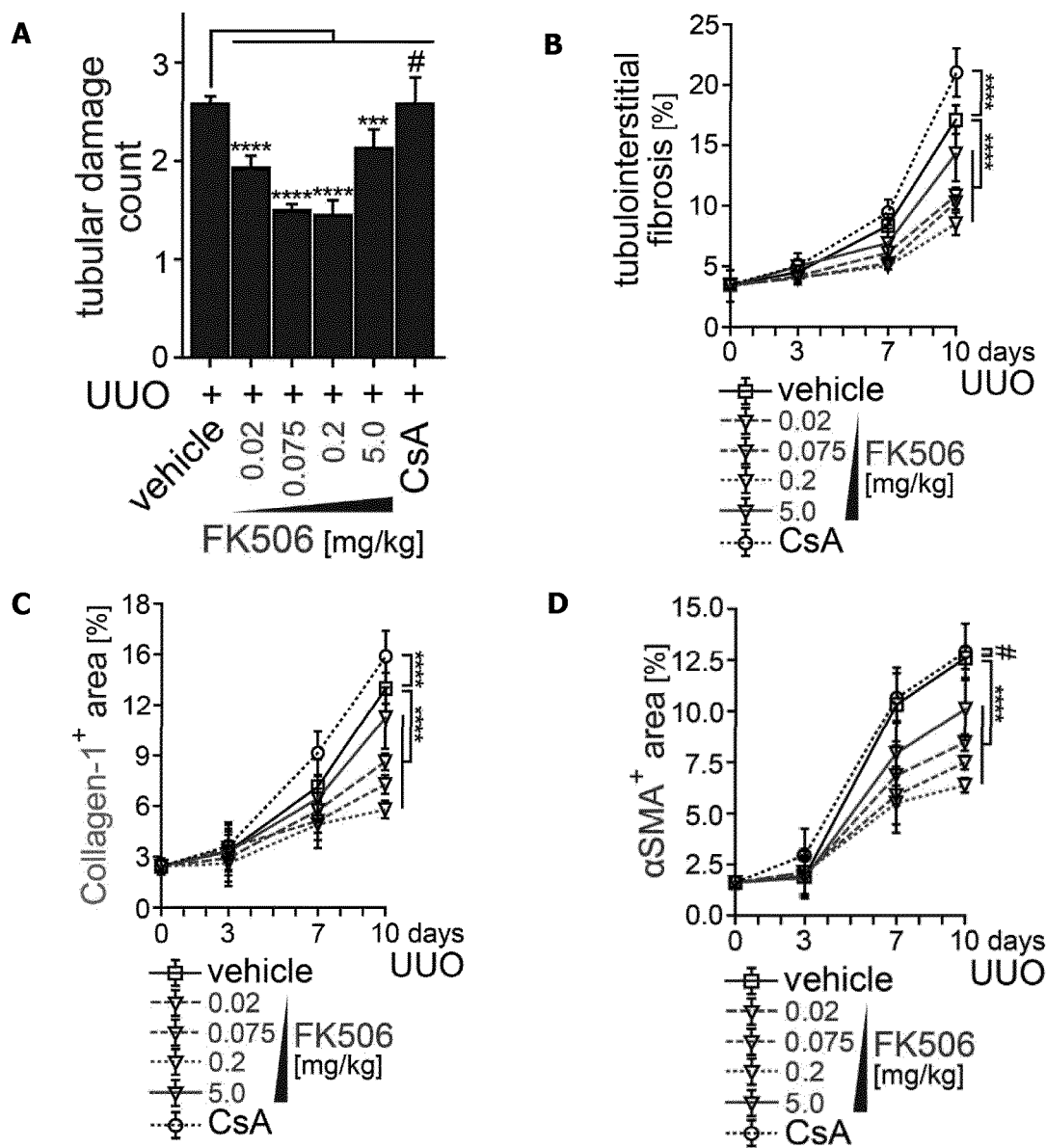
FIG. 2: (A) Tubular damage at day 10 after ureteral obstruction was semi-quantitatively scored using PAS-stained kidney sections (0=healthy, 1=mild, 2=moderate, 3=severe, n=6/group, data are presented as means±s.d., * $p<0.001$,  $p<0.0001$, # no significance, values of p were calculated using one-way ANOVA with Bonferroni post-hoc analysis). (B) The graph summarizes average means of relative tubulointerstitial fibrosis 3, 7 and 10 days after ureteral obstruction (n=6/group, data are presented as means±s.d.,  $p<0.0001$, values of p were calculated using one-way ANOVA with Bonferroni post-hoc analysis). (C) In mice receiving FK506, areas positive for Collagen-1 was assessed (n=6/group, data are presented as means±s.d.,  $p<0.0001$, values of p were calculated using one-way ANOVA with Bonferroni post-hoc analysis). (D) The graph summarizes average means of areas positive for aSMA 3, 7 and 10 days after ureteral obstruction (n=6/group, data are presented as means±s.d.,  p<0.0001, # no significance, values of p were calculated using one-way ANOVA with Bonferroni post-hoc analysis). (E,F) Intrarenal expression levels of Collagen-1a1 and Acta2 (aSMA) were analyzed by qRTPCR in total kidney lysates (n=3-4/group, data are presented as means±s.d., ** p<0.0001, # no significance, values of p were calculated using one-way ANOVA with Bonferroni post-hoc analysis).
Figure 2:
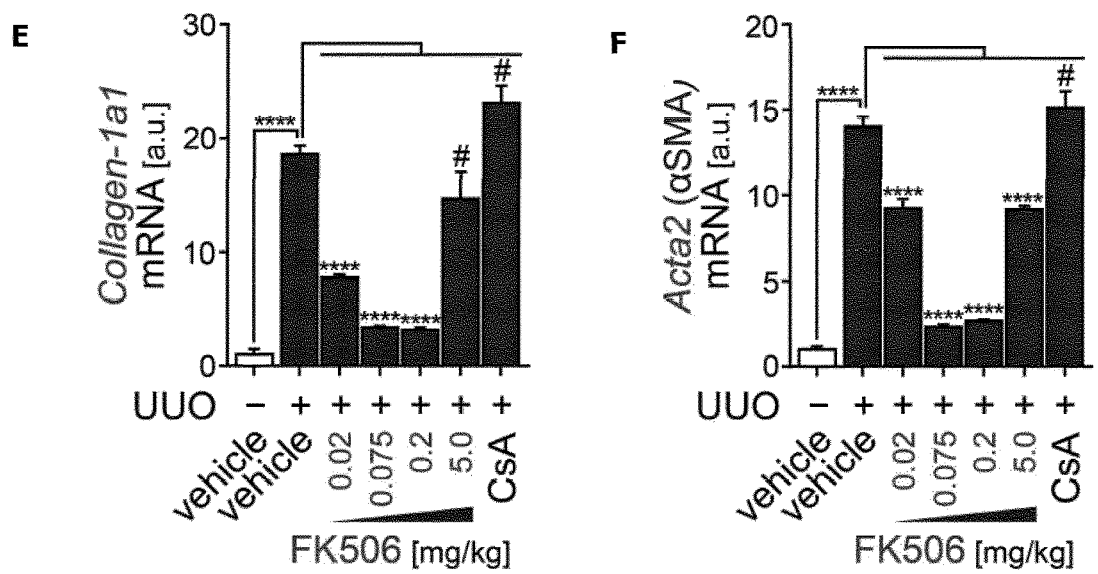

Human Kidney Specimens.

The use of parts of human specimens for research purposes as approved by the Ethics Committee of the University Medicine Göttingen, clinical data are presented in Table 6.

Animals.

All studies and inclusion/exclusion of animals were performed according to the German animal care and ethics legislation and had been carried out with the approval of the local government authorities (LAVES) and the University Medicine Göttingen. Experimental protocols are detailed below. B6;12954-Yy1tm2Yshi/J (referred as Yy1fl/fl) mice were obtained from Jackson Laboratory (Bar Harbor, USA), Tg(Ggt1-cre)M3Egn/J (referred as yGTcre+) mice were previously described and genetic backgrounds were identical when comparing experimental groups (53, 152).

Unilateral Ureteral Obstruction (UUO).

Eight to twelve weeks-old C57/6, yGTcre−;Yy1fl/fl and yGTcre+;Yy1fl/fl mice were anesthetized with isoflurane inhalation (2-3%), analgesia was performed by subcutaneous injection of 0.1 mg/kg body weight per day Buprenorphine. The ureter was separated from the surrounding tissues and two ligatures were placed about 5 mm apart in upper two-thirds of the left ureter to obtain reliable obstruction. Mice were sacrificed 3, 7 or 10 days after ureteral obstruction for further analyses, as described before (53, 153-155).
Angiotensin II (AT II)-Induced Cardiac Hypertrophy and Fibrosis.

Eight to twelve weeks old C57BL/6 mice were anesthetized with isoflurane inhalation (2-3%), analgesia was performed by subcutaneous injection of 0.1 mg/kg body weight Buprenorphine per day. Osmotic minipumps (Alzet, Cupertino, USA) were loaded with AT II to continuously deliver 1.44 µg/kg body weight per day and implanted subcutaneously (123). Mice were sacrificed 14 days after implantation for further analyses.
Tetrachlormethan (CCl14)-Induced Liver Fibrosis.

Eight to twelve weeks-old C57BL/6 mice were intraperitoneally injected with 0.25 (first injection), 0.5 (second injection) and 1 mL/kg body weight CCl4 (25% v/v dissolved in sterile oil) twice a week (63). Mice were sacrificed after 42 days for further analyses.
Blood Pressure Measurements.

Measurements of blood pressure were performed using a tail cuff system, systolic, diastolic, mean arterial pressure (MAP) and heart rate were recorded (156).

FK506/CsA Preparation and Treatment.

FK506 and Cyclosporine A (CsA) were purchased as powders with a purity of >98% (Abcam Biochemicals, Cambridge, UK). FK-506 and CsA stock solutions (0.2 mg/mL) were prepared by dissolving the compound in saline (0.9% NaCl) containing 1.25% PEG40 Castor Oil (spectrum chemicals & laboratory products, USA) and 2% ethanol. On the basis of an average drinking volume of 3 mL and a body weight of 20 g per mouse, FK506 and CsA stock solutions were diluted in glucose-water (5%) and orally applied. One day before surgery, mice were treated orally with either vehicle buffer glucose (5%), with 0.02, 0.075, 0.2, 5.0 mg/kg body weight per day FK506, or 10 mg/kg body weight per day CsA, respectively. Solutions were changed once a day and mice were sacrificed at indicated time points.

FK506 blood Concentration Measurements.

FK506 concentration in whole blood samples of mice was measured using colorimetric FK506 Elisa Kit (Abnova, Taipei, Japan) according to the manufacturer's protocol. Briefly, 25 µL of whole blood samples and standard solutions containing 0, 2, 10 and 50 ng/mL FK506 were analyzed by OD measurements at 450 nanometer (nm) wavelength.
Ldn-193189 Treatment.

Mice were injected intraperitoneally with 3 mg/kg body weight per day LDN-193189 (LDN, Sigma, St. Louis, USA) in DMSO twice daily starting one day prior of surgery, control mice received equivalent volume of vehicle DMSO.
In Vivo-Morpholino (VMO) Treatment.

Mice were injected intraperitoneally with 12.5 mg/kg body weight in vivo-morpholinos (Gene Tools, Philomath, USA) in saline at a final volume of 100 µL every other day starting two days prior of surgery (114), sequence alignments were performed using NCBI Nucleotide Blast and are listed in Tables 3-5 (157). A control in vivo-morpholino that targets a human β-globin intron mutation was used as standard control (116). In vivo-morpholino sequences are listed in Table S.

Gpi-1046 Treatment.

Mice were injected subcutaneously with 10 mg/kg body weight per day GPI-1046 (Santa Cruz Biotechnology, Dallas, USA) in DMSO once daily starting one day prior of surgery, control mice received equivalent volume of vehicle DMSO. For oral administration, GPI-1046 stock solution was diluted in glucose-water (5%) and orally applied on the basis of an average drinking volume of 3 mL and a body weight of 20 g per mouse. Three days after challenging with UUO, mice were treated orally with either vehicle buffer glucose (5%) or 30 mg/kg body weight per day GPI-1046, respectively.
LB-100 Treatment.

Mice were injected intraperitoneally with 2 mg/kg body weight LB-100 (LDN, Sigma, St. Louis, USA) every alternate day starting at the day of surgery, control mice received equivalent volume of vehicle buffer.
Histology.

Paraffin-embedded specimens were sectioned at 3 µm, periodic acid-Schiff (PAS), Masson's Trichrome Stain (MTS) and Sirius Red/Fast green was performed at the University Medicine Göttingen. For morphometric analysis of interstitial fibrosis, fibrotic areas were assessed by using cellSens (Olympus, Tokyo, Japan) software. Ten visual fields were selected randomly for each MTS stained section at 200× magnification and the relative interstitial fibrotic area was evaluated by using a 10 mm2 graticule. Tubular damage was analysed after PAS stain and graded according to a semi-quantitative score of 0 to 3 (0: normal, 1: mild, 2: moderate, 3: severe) at 400× magnification in a total number of 100 tubules per section (158). To evaluate collagen deposition, sections were stained with Sirius red in a saturated aqueous solution of picric acid containing 0.1% Direct Red 80 (Sigma, St. Louis, USA), ten visual fields were selected randomly for each section at 400× magnification and evaluated by using a 10 mm2 graticule.
Cardiomyocyte Diameter.

Cardiomyocyte diameters were determined from 100 random fibers in PAS-stained heart sections using cellSens (Olympus, Tokyo, Japan) software.
Immunohistochemistry.

Paraffin-embedded specimens were deparaffinized in xylene and rehydrated in ethanol containing distilled water. Tissue sections were stained using polyclonal antibodies against ALK3 (sc-20736, Santa Cruz Biotechnology, Dallas, USA) and ARNT (3718S, Cell Signaling, Danvers, USA), peroxidase labeling was performed using Vectastain Universal Elite ABC Kit (Vector Laboratories, Burlingame, USA) according to the manufacturer's protocol. AEC Substrate-Chromogen (Dako, Glostrup, Denmark) was applied for peroxidase visualization according to the manufacturer's protocol. Nuclear counterstain was performed by using Mayer's Hematoxylin Solution (Sigma, St. Louis, USA).
Immunofluorescence.

For immunofluorescent staining, primary antibodies against ARNT (5537S, Cell Signaling, Danvers, USA), Hif1α (H6535, Sigma, St. Louis, USA), Hif2α (ab20654, Abcam Biochemicals, Cambridge, UK), phosphorylated Smad1/5/8 (pSmad1/5/8, sc-12353, Santa Cruz Biotechnology, Dallas, USA), CD45 (550539, BD Biosciences, Franklin Lakes, USA), Collagen-1 (ab34710, Abcam Biochemicals, Cambridge, UK), α-smooth muscle actin (aSMA, A5228, Sigma, St. Louis, USA), FKBP12 (ab2918, Abcam Biochemicals, Cambridge, UK) and YY1 (ab12132, Abcam Biochemicals, Cambridge, UK) were used, secondary antibodies were labeled with Alexa Fluor 488 or 568 (Life Technologies, Carlsbad, USA). Renal basement membranes were stained with antibodies against Collagen-4 (1340-30, SouthernBiotech, Birmingham, USA), cardiac cell membranes with antibodies against WGA (W11261, Life Technologies, Carlsbad, USA). Nuclear staining was performed using 4',6-diamidino-2-phenylindole (DAPI, Vector Laboratories, Burlingame, USA). Relative areas positive for Collagen-1, aSMA, tubular nuclei positive for ARNT and pSmad1/5/8 were quantified in 10 high power fields per section at 400× magnification.

Cell Culture.

HK-2 (ATTC, Manassas, USA) are immortalized proximal tubule epithelial cells derived from normal adult human kidney. The murine proximal tubular epithelial cell line MCT was generated from the renal cortex of SJL mice (75). All cells were routinely tested negative for the presence of mycoplasma contamination. None of the cell lines used in this manuscript is listed in the ICLAC and NCBI Biosample database of misidentified cell lines. Cells were cultured in Dulbecco's modified Eagle's (DMEM, Gibco, Carlsbad, USA) medium supplemented with 100 g/mL penicillin, 100 g/mL streptomycin and 10% heat-inactivated fetal bovine serum (FBS, Sigma, St. Louis, USA) at 37° C. in 5% CO2. For RNA extractions, cells were seeded in 6 well culture plates at 105 cells per well in antibiotic free standard growth medium. After 24 hours, cells were stimulated with FK506 (Abcam Biochemicals, Cambridge, UK) or Cyclosporin A (CsA, Sigma, St. Louis, USA) dissolved in DMSO at indicated concencentrations. Cells were harvested for further analysis 6 hours after incubation. To examine de novo protein syntheses, cells were again plated in 6 well culture plates as initially described and then pre-treated with the translation blocker Cycloheximide (CHX, 10 μg/mL, Sigma, St. Louis, USA). After one hour of incubation, 200 pM FK506 was applied for additional 6 hours.

In Vitro Transfection.

One night before transfection, MCT cells were seeded in 6 well culture plates at a concentration of $1.5-2\times 10^5$ per well in antibiotic-free DMEM (Gibco, Carlsbad, USA) supplemented with 10% heat-inactivated fetal bovine serum (FBS, Sigma, St. Louis, USA). For knockdown experiments, 60 pmol siRNA (Santa Cruz Biotechnology, Dallas, USA) or scrambled siRNA (scrRNA, Santa Cruz Biotechnology, Santa Cruz, USA) was transfected, for over-expression experiments, 2 μg plasmid DNA was transfected using Lipofectamine 2000 reagent (Invitrogen, Carlsbad, USA). After 4 hours of incubation, transfection medium was replaced by antibiotic-free medium and cells recovered overnight. For stimulation experiments, cells were stimulated the day after with 200 M FK506 (Abcam Biochemicals, Cambridge, UK) dissolved in DMSO and harvested after 6 hours of incubation for RNA and protein analysis.

Alk3 Promoter Constructs.

Site-directed mutagenesis of the palindromic E-box motif CACGTG (SEQ ID NO: 1) to TATATA (SEQ ID NO: 2) within the proximal ALK3 promoter was performed using a QuikChange XL Site-Directed Mutagenesis Kit (Agilent Technologies, Santa Clara, USA). The original ALK3 promoter construct (Gene Universal Inc., Newark, USA) was fragmented into two parts (335 and 794 bp) using PCR amplification and restriction digestion. The 335 bp fragment containing the E-box binding site was amplified using primers with KpnI (primer sequence: 5'-GGGGGTACCGAGGTAGTGACAGTTCTT-3'; SEQ ID NO: 3) and BsmI cutting sites (primer sequence: 5'-CCCTGCATTCATTACTCA-3'; SEQ ID NO: 4). The purified PCR products were cloned into pGEM-T-Easy (Promega, Madison, USA) vector for site-directed mutagenesis (primer sequence: 5'-GTGATCCGGAGAACGC-TATATACTCCACGTTCCTCCCG-3' (SEQ ID NO: 5) and 5'-GTAGCGAAAGCCTGG CG-3'; SEQ ID NO: 6). The reaction was carried out according to is the manufacturer's recommendation containing 10 ng of DNA template, 5 μL of 10× reaction buffer, 125 ng of primers, 1 μL of dNTP mix, 3 μl of QuikSolution and 1 μL of PfuTurbo DNA polymerase in a final volume of 50 μL. The thermal cycling condition was initiated with a denaturating step at 95° C. for 3 minutes followed by 25 cycles containing 95° C. for 50 seconds, 60° C. for 50 seconds, 68° C. for 4 minutes and a final extension at 68° C. for 7 minutes. 1 μL Dpn1 (2.5 U/μL) was added and incubated for 2 hours at 37° C. to remove the original template from the reaction. The PCR reaction was transformed into XL10-Gold Ultracompetent Cells (Agilent Technologies, Santa Clara, USA). The resulting 335 bp mutated fragment was digested with KpnI/BsmI restriction enzymes and subcloned to a pGL3-basic vector (Promega, Madison, USA) together with the BsmI/HindIII digested 794 bp fragment. All plasmids were carefully sequenced to confirm that mutations were placed at the proper position.

Promoter Analysis.

For promoter analysis, cells were co-transfected at 75% confluence with 4 μg plasmid DNA, 4 μg of promoter construct DNA and 0.1 μg renilla luciferase internal control vector pGL4.73 (Promega, Madison, USA) in 6-well plates using Lipofectamine 2000 reagent (Invitrogen, Carlsbad, USA) according to the manufacturer's instructions. Growth medium was not replaced during incubation. After 48 hours, transfected cells were washed in PBS. Firefly and renilla luciferase activity of 20 μL cell extract was determined using the Dual-Luciferase Reporter Assay System (Promega, Madison, USA) according to the manufacturer's instructions. Signals were normalized to renilla luciferase for each sample.

RNA Isolation.

Total RNA was extracted from cells using TRIzol Reagent (Life technologies, Carlsbad, USA), tissue was shredded using TissueLyser LT (Qiagen, Hilden, Germany). Subsequent RNA purification procedure was performed by PureLink RNA Mini Kit (Ambion, Carlsbad, USA) according to the manufacturer's protocol.

Quantitative Real-Time PCR Quantification (qRT-PCR).

For SYBR-based real-time PCR, cDNA synthesis was performed by using DNase I digestion (Invitrogen, Carlsbad, USA) and SuperScript II Reverse Transcriptase (Invitrogen, Carlsbad, USA) according to the manufacturer's protocol. 1 μL of reverse-transcribed cDNA was added to the reaction mixture containing the primer pair (200 nmol/L each) and diluted 2× Fast SYBR Green Master Mix (Applied Biosystems, Carlsbad, USA) in a final volume of 20 μL for each PCR reaction. The real-time PCR reactions were performed in a 96-well reaction plate using the StepOne Plus Real-Time System (Applied Biosystems, Carlsbad, USA) and were done in triplicates. An initiation step at 95° C. for 20 seconds was followed by 40 cycles at 95° C. for 3 to seconds and 60° C. for 30 seconds, with one cycle of dissociation at 95° C. for 15 seconds, 60° C. for 60 seconds, and 95° C. for 15 seconds. The intercalation of SYBR Green dye and its fluorescent signal is directly proportional to the amount of amplified DNA and was transformed into the cycle threshold (Ct). For normalization, the Ct values of the housekeeping genes Gapdh and Actb were subtracted from the Ct values of the gene of interest to generate the dCt values. The relative expression levels were calculated using the equation $2^{-ddCt}$. Oligonucleotide sequences are listed in Table 9.

RT2 Profile PCR Array.

To compare qPCR-validated cDNA samples after FK506 treatment and DMSO control, gene expression profiling was performed using commercially available plates (PAHS-075Z/PAMM-002Z/PAMM032Z, SABiosciences, Qiagen, Hilden, Germany). HK-2 cells were plated in 6 well culture plates as previously described and stimulated with 150 ng/mL FK506, MCT cells with 200 pM FK506. After 6 hours, cells were dissolved and RNA was isolated, digested and reverse transcripted. The 25 ng cDNA equivalent of total RNA was added to the reaction mixture containing diluted 2× $RT^2$ SYBR Green ROX qPCR Mastermix (Qiagen, Hilden, Germany) in a final volume of 25 µL for each well of the RT2 Profiler PCR. PCR reactions were performed under recommended thermal cycling conditions (10 min at 95° C., 15 s at 95° C., 1 min at 60° C. for 40 cycles). To verify PCR specificity, dissociation curve analysis was generated. Relative levels of mRNA expression were normalized in all the samples with expression levels of included housekeeping genes, and data analysis was done using an web-based analysis software provided by SABiosciences. Transcription factor binding sites within the ALK3 proximal promoter was performed 5000 basepairs relative to transcriptional start site using TRANSFAC database (98).

Western Blot Analyses.

Tissue and cells were homogenized in NP40 lysis buffer (Life technologies, Carlsbad, USA) supplemented with protease inhibitor cocktail (Roche, Basel, Switzerland). After sonication, protein samples were resolved by a 4-12% Bis-Tris polyacrylamide gel electrophoresis system (Novex, Carlsbad, USA) and transferred onto a nitrocellulose membrane (GE Healthcare, Freiburg, Deutschland), followed by a blocking step with 5% dry milk or 5% bovine serum albumin (BSA) in TBS-T (TBS pH 7.2, 0.1% Tween-20) to prevent unspecific bindings. After incubation with respective primary antibodies against ALK3 (ABD51, Merck Millipore, Billerica, USA) and ALK6 (ABD50, Merck Millipore, Billerica, USA), pSmad1/5/8 (13820, Cell Signaling, Danvers, USA), Arnt (3718, Cell Signaling, Danvers, USA), Fkbp12 (ab2918, Abcam Biochemicals, Cambridge, UK), NFATc1 (sc-7294, Santa Cruz Biotechnology, Dallas, USA), NFATc2 (sc-7295, Santa Cruz Biotechnology, Dallas, USA), β-actin (A5316, Sigma, St. Louis, USA) and Gapdh (5G4, HyTest, Turku, Finland), secondary HRP-conjugated antibodies were used (Dako, Glostrup, Denmark). Luminescence was detected by using chemiluminescent substrate (Cell Signaling, Danvers, USA) on a ChemiDoc XRS system (Bio-Rad, Hercules, USA). Native protein samples were prepared with Native PAGE Sample Prep kit (Novex, Carlsbad, USA) according to the manufacturer's instruction. Non-denaturating native gel electrophoresis was performed with Native PAGE 3-12% Bis-Tris Protein gel (Novex, Carlsbad, USA).

Co-Immunoprecipitation (CoIP).

CoIP was performed with Protein G Immunoprecipitation Kit (Roche, Basel, Switzerland). Protein A/G PLUS Agarose beads (Santa Cruz Biotechnology, Santa Cruz, USA) were used for the lysate pre-cleaning and pull-down. For each CoIP, 2×$10^7$ MCT cells have been used following the manufacturer's instructions. Yy1 (ab12132, Abcam Biochemicals, Cambridge, UK), Fkbp12 (ab2918, Abcam Biochemicals, Cambridge, UK), Arnt (3718, Cell Signaling, Danvers, USA), GFP (MA5-15256, Thermo Fisher Scientific, Waltham, USA) and myc-tag antibodies (2276, Cell Signaling, Danvers, USA) were used for immunoprecipitation, detection of co-immunoprecipitated Fkbp12 (ab12132, Abcam Biochemicals, Cambridge, UK), Hif1α (H6535, Sigma, St. Louis, USA), Ahr (MA1-514, Thermo Fisher Scientific, Waltham, USA), GFP (MA5-15256, Thermo Fisher Scientific, Waltham, USA) and myc-tag (2276, Cell Signaling, Danvers, USA) was performed by immunoblotting.

Chromatin Immunoprecipitation (ChIP).

DNA and protein interaction was performed with the OneDay ChIP Kit (Diagenode, Seraing, Belgium) according to the manufacturer's instructions. 2×$10^7$ MCT cells have been used for each ChIP reaction. Cell lysates were sonicated using an ultrasonic processor S-4000 (Misonix, Farmingdale, USA). Immunoprecipitation was performed with a ChIP grade antibody against Yy1 (ab12132, Abcam Biochemicals, Cambridge, UK) and Arnt (3718, Cell Signaling, Danvers, USA). Enriched DNA was analyzed by qRT-PCR with EpiTect ChIP qPCR primers for genomic Arnt (Qiagen, Hilden, Germany), oligonucleotide sequences for genomic Alk3 are listed in Table 10.

Analyses of Publicly Available Array Datasets.

Datasets provided publicly were analyzed according to general recommendations (159). For gene ontology analysis, 5% of most significant up-regulated genes in response to FK506 were extracted from Nephroseq database (nephroseq.org) based on genome-wide transcriptional expression datasets for bioactive small molecules (accession number GSE5258) (44, 45), and process analysis was performed using Gene Ontology enRIchment anaLysis and visuaLizAtion tool (GORILLA) using a value of $p<0.001$ threshold (46, 47). Protein-protein interactions were extracted from Search Tool for the Retrieval of Interacting Genes/Proteins (STRING) using highest confidence (score 0.900) (91), prediction of transcription factors regulating 5% of most significant up-regulated genes in response to FK506 extracted from Nephroseq database based on genome-wide transcriptional expression datasets for bioactive small molecules (accession number GSE5258) was performed using Predicting ASsociated Transcription factors from Annotated Affinities (PASTAA) within 200 basepairs upstream transcriptional start site, maximum affinity level and values of $p<0.05$ (44, 45, 92). Human transcriptome array data are shown as $\log_2$ median centered intensities extracted from Nephroseq database (accession numbers GSE69438, GSE66494, GSE35487, GSE30566, GSE21785, GSE1563, GSE3526) (127-132, 141), and $\log_2$ expression values extracted from GEO2R (accession numbers GSE48944 and GSE14964) (133, 139).

Statistical Analysis.

The numbers of individual mice and independent experiments are indicated in the corresponding figure legends. For single group comparison, Student's t test was used to determine statistical significance. One-way ANOVA with Bonferroni post-hoc analysis was used for multiple comparisons of samples to determine statistical significance. Linear regression was performed comparing indicated pairs of parameters, $r^2$ and values of p are indicated in the corresponding graphs. Statistical significance was defined as values of $p<0.05$, indicated as * $p<0.05$,  $p<0.01$, * $p<0.001$ or **** $p<0.0001$. Prism 5 software (GraphPad, La Jolla, USA) was used for statistical analysis.

Example 1—Identification of the FKBP12/YY1/ARNT Signaling Axis, which Controls Endogenous BMP Signaling Responses Via Transcriptional Regulation of Canonical BMP Receptor ALK3

Low-Dose FK506 Protects the Kidney from Chronic Organ Injury Dependent on Enhanced ALK3 Signaling Based on previous reports that FK506 preconditioning regimens effectively protect the kidney from acute experimental injuries (19-22), the inventors first aimed to validate organ protection upon low-dose FK506 administration in a murine model of chronic renal injury. For this purpose, the inventors challenged C57BL/6 mice with the non-immunological, mechanical model of unilateral ureter obstruction (UUO), resulting in injury of the tubular epithelium and severe interstitial fibrosis within 10 days after ureteral obstruction. Based on previous regimens (19-31), the inventors administered low-dose FK506 (0.02, 0.075 and 0.2 mg/kg orally per day) to mice starting one day prior to challenge with UUO (FIG. 1). As controls, the inventors also included standard-immunosuppressive dose FK506 (5.0 mg/kg orally per day) and Cyclosporine A (CsA, 10 mg/kg orally per day) (40, 41), an alternative CNI immunosuppressant that acts via dimerizing with cycophilin A (independent of FKBPs) (42, 43).

Histopathological analysis demonstrated that FK506 reduced both, chronic tubular injury and interstitial fibrosis with an optimum dose of 0.075 and 0.2 mg/kg FK506 per day (FIG. 2A-F). In contrast, administration of CsA failed to attenuate tubular injury or interstitial fibrosis (FIG. 2A-F), suggesting that observed anti-fibrotic and pro-regenerative efficacy of low-dose FK506 was mediated by mechanisms independent of calcineurin phosphatase inhibition. Administration of low-dose FK506 (0.02, 0.075 and 0.2 mg/kg orally per day) resulted in picomolar, sub-immunosuppressive FK506 blood concentrations of 245±73, 452±71 and 535±36 µg/mL, respectively.

Figure 3:
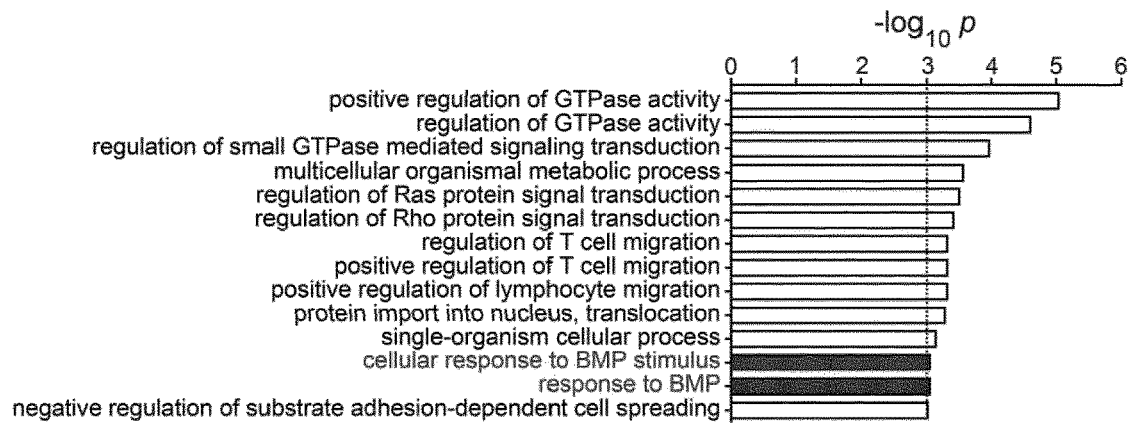
FIG. 3: Based on genome-wide transcriptional expression datasets for bioactive small molecules (accession number GSE5258), pathway analysis of differentially expressed genes induced in response to FK506 is shown (data are presented as process analyses of $-\log_{10} p$).

To gain insights into underlying mechanisms, the inventors next performed gene set enrichment analysis of transcriptional expression datasets for bioactive small molecules (accession number GSE5258) with evidence that FK506 induces expression of genes involved in BMP signaling responses (GO terms GO:0071772 and GO:0071773, FIG. 3 and Table 1) (44-47), including the proto-typical type I BMP receptor ALK3 (synonym type I BMP receptor serine/threonine kinase, BMPR1A). These findings were in line with previous reports demonstrating that lowdose FK506 is a strong inducer of endogenous BMP signaling responses (48-51), mediated by enhanced transcription and increased signaling of type I BMP receptors (29, 52). Multiple independent studies demonstrated that induction of BMP signaling through administration of type I BMP receptor ALK3 ligands protected against fibrosis and loss of functional parenchymal cells in various organs including kidney (53-57), but also heart (58-61), liver (62, 63), lung (64, 65), brain (66, 67), and intestine (68). Furthermore, it was demonstrated that protective activity of BMPs is specifically mediated by canonical BMP receptor ALK3, and that suppressed ALK3 expression limits regenerative capacity of injured tubular epithelium (53).

Figure 4:
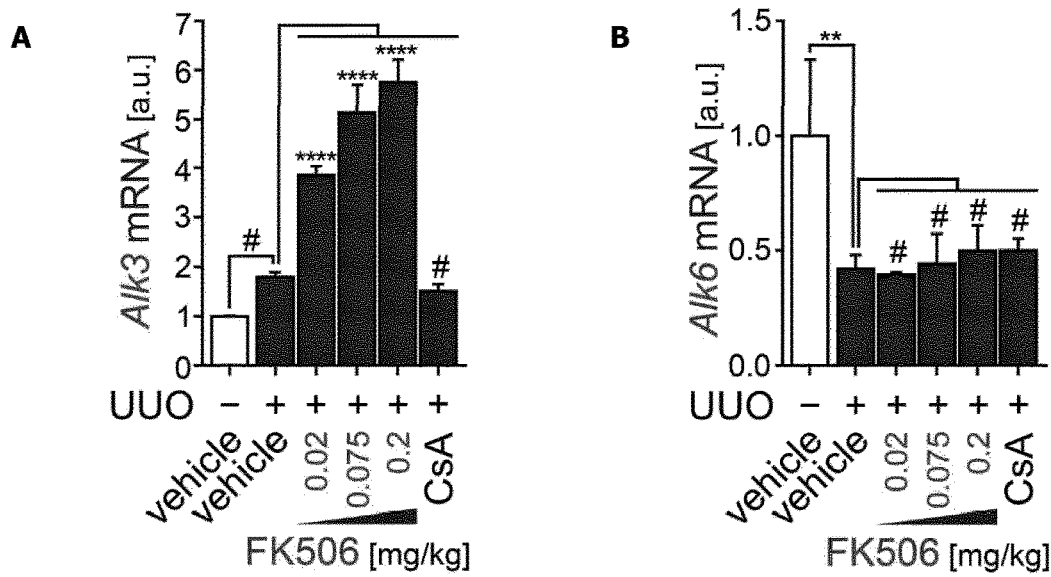
FIG. 4: (A,B) Mice were challenged with UUO and treated with either vehicle buffer, indicated concentrations of FK506 or CsA starting one day prior of surgery. Analyzed by qRT-PCR 10 days after ureteral obstruction, the bar graphs reflect relative mRNA expression levels of type I BMP receptors Alk3 and Alk6 (n=3/group, data are presented as means±s.d.,  p<0.1, p<0.0001, # no significance, values of p were calculated using one-way ANOVA with Bonferroni post-hoc analysis). (C-E) Analyzed by immunoblotting of total kidney to lysates and immunostaining, type I BMP receptor Alk3 and pSmad1/5/8 was assessed, reflecting activation of BMP signaling (n=6/group, data are presented as means±s.d., * p<0.05,  p<0.01, ** p<0.0001, # no significance, values of p were calculated using one-way ANOVA with Bonferroni post-hoc analysis).
Figure 4:
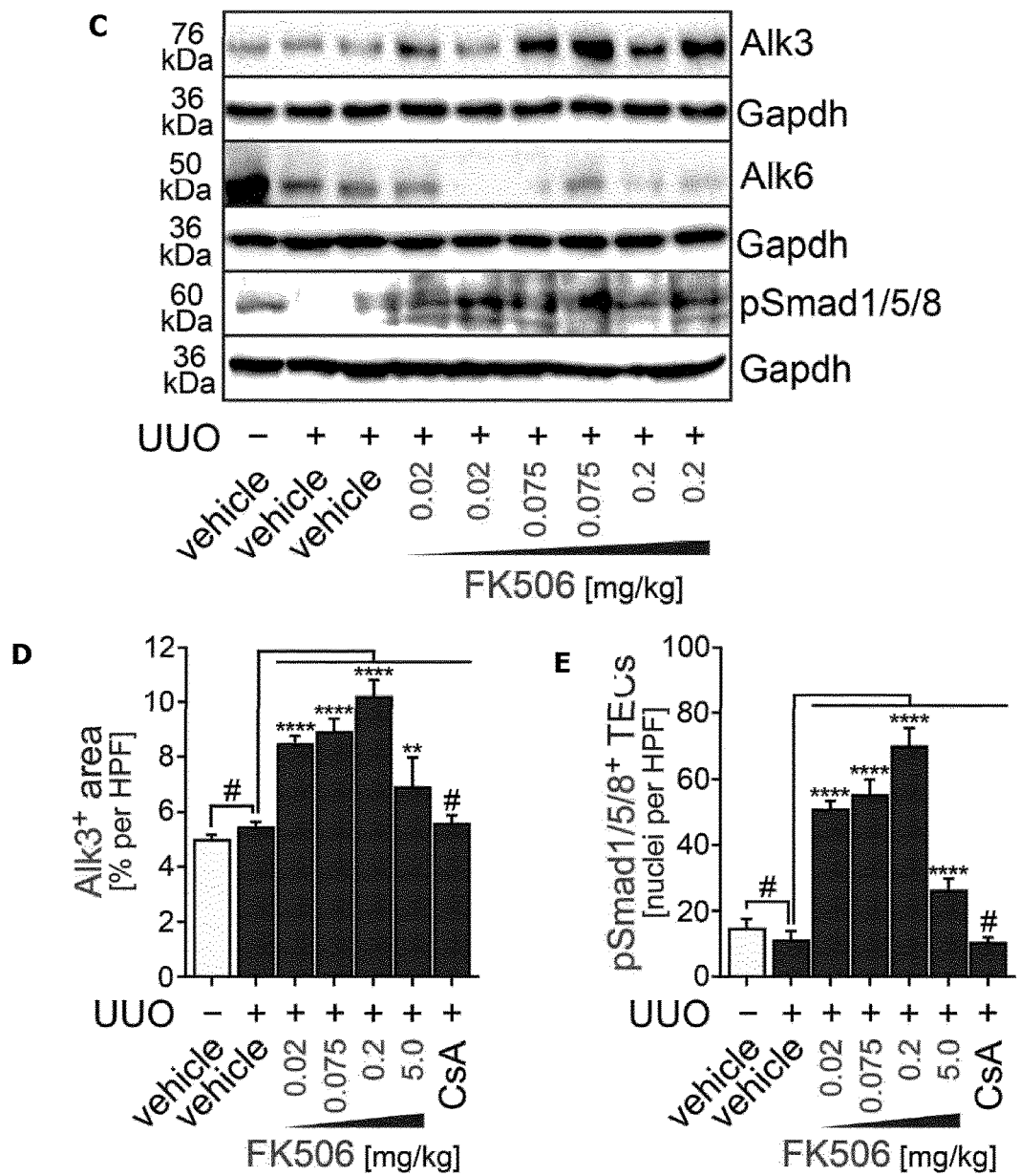
Figure 5:
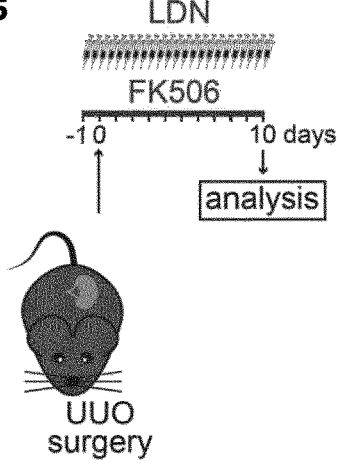
FIG. 5: Mice were challenged with UUO and treated with either vehicle buffer or low-dose FK506 (0.2 mg/kg orally per day) when specifically canonical pSmad1/5/8-dependent ALK3 signaling transduction was pharmacologically blocked with small molecule LDN-193189 (LDN, 3 mg/kg intraperitoneally per day).
Figure 6:
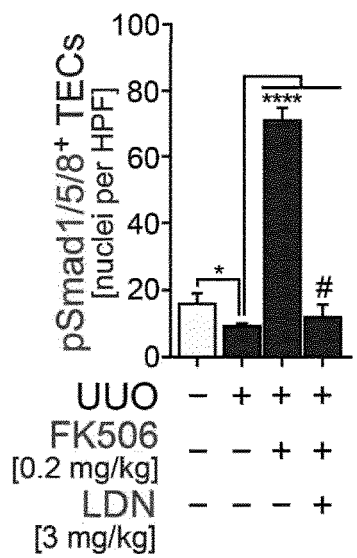
FIG. 6: Alk3 and pSmad1/5/8 were analyzed by immunostaining (n=6/group, data are presented as means±s.d., * p<0.05, **** p<0.0001, # no significance, values of p were calculated using one-way ANOVA with Bonferroni post-hoc analysis).
Figure 7:
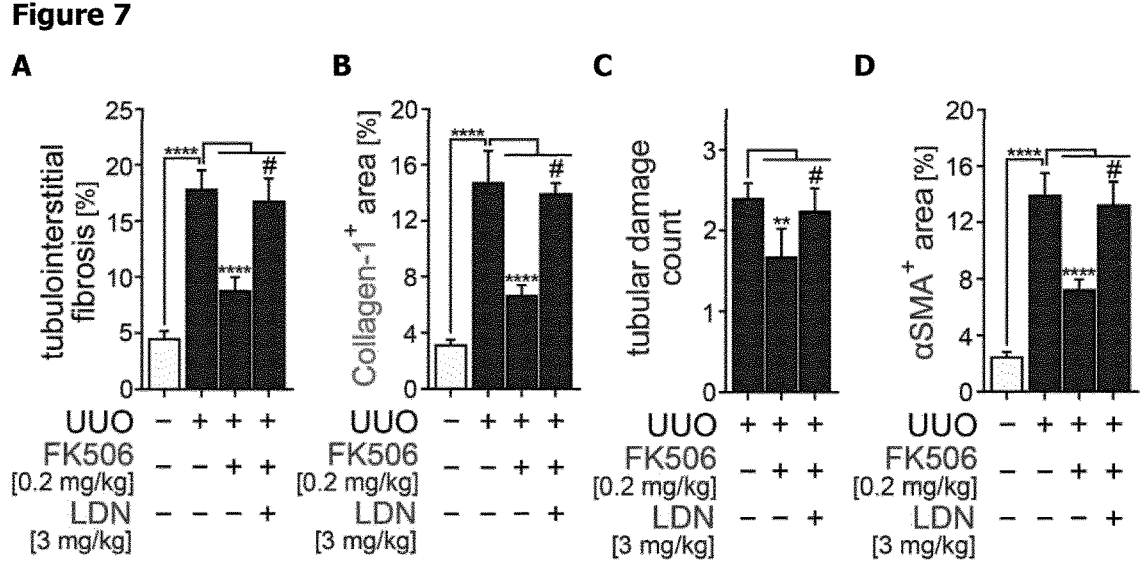
FIG. 7: (A,B) The panels show data for PAS-stained fibrotic kidney sections and sections immunolabelled with primary antibodies against Collagen-1 (n=6/group, data are presented as means±s.d., ** p<0.0001, # no significance, values of p were calculated using one-way ANOVA with Bonferroni post-hoc analysis). (C,D) To elucidate the specific contribution of identified ALK3-dependent canonical BMP signaling responses to FK506-mediated protection, mice were challenged with UUO and treated with either vehicle buffer or low-dose FK506 (0.2 mg/kg orally per day, previously established as most effective) when specifically canonical pSmad1/5/8-dependent ALK3 signaling transduction was pharmacologically blocked with small molecule LDN-193189 (LDN, 3 mg/kg intraperitoneally per day). The graph summarizes average means of relative tubulointerstitial fibrosis and areas positive for aSMA in PAS stainings and sections immunolabelled with primary antibodies against aSMA 10 days after ureteral obstruction (n=6/group, data are presented as means±s.d.,  p<01, * p<0.0001, # no significance, values of p were calculated using one-way ANOVA with Bonferroni post-hoc analysis).

Based on identification of FK506-induced ALK3 expression in transcriptional profiling datasets and known protective activity of ALK3-mediated BMP signaling, the inventors next explored if observed reno-protective effect of low-dose FK506 was due to enhanced ALK3 transcription and subsequently enhanced BMP signaling responses. Canonical BMP signaling in general is characterized by nuclear translocation of phosphorylated signal transducer proteins pSmad1, pSmad5 and/or pSmad8 (69-71). Activity of protective canonical BMP signaling in kidney, heart, lung and liver depends on presence of the type I BMP receptor ALK3, inducing BMP signaling upon ligand binding and dimerization with type II BMP receptor BMPR2, subsequently mediating anti-fibrotic and pro-regenerative BMP signaling responses (29, 53-56, 58-68). To explore a possible causal link between low-dose FK506, ALK3-dependent BMP signaling and reno-protection, the inventors analyzed ALK3 receptor expression and downstream Smad1/5/8 phosphorylation (pSmad1/5/8) in kidneys of mice which had received low-dose FK506. Analysis of UUO-challenged murine kidneys revealed that FK506 specifically induced expression of ALK3, but not of related type I BMP receptor ALK6 (FIG. 4A-C). FK506-induced ALK3 expression was associated with nuclear pSmad1/5/8 accumulation (correlating with protective efficacy of low-dose FK506, FIG. 4C-E), whereas non-protective CsA failed to induce ALK3 expression and pSmad1/5/8 (correlating with failure of CsA to protect injured kidneys, FIG. 4A-E). To further substantiate the observed link between low-dose FK506, ALK3 and reno-protection, the inventors treated UUO-challenged mice with dorsomorphin derivate small molecule LDN-193189 (LDN, 3 mg/kg intraperitoneally per day), a specific BMP type I receptor kinase inhibitor and blocker of ALK3-dependent signal transduction (FIG. 5) (48, 72-74). LDN did not impact efficacy of FK506 to induce ALK3 expression, but effectively inhibited downstream pSmad1/5/8 signaling responses (FIG. 6). Inhibition of canonical BMP signaling responses completely blocked FK506-mediated reno-protection (FIG. 7A-D), confirming that FK506 elicits protection from chronic organ failure by induction of canonical BMP signaling responses.

In summary, the inventors' studies demonstrated that low-dose FK506 protected UUO-challenged kidneys from chronic injury, and that such reno-protection was due to increased ALK3 expression and subsequently enhanced BMP signaling responses towards endogenously present ALK3 ligands. The inventors' data did not provide explanation how FK506 could specifically induce ALK3 transcription to this point.

YY1 lnks Immunophilin FKBP12 and ALK3 transcription in Response to FK506

Figure 8:
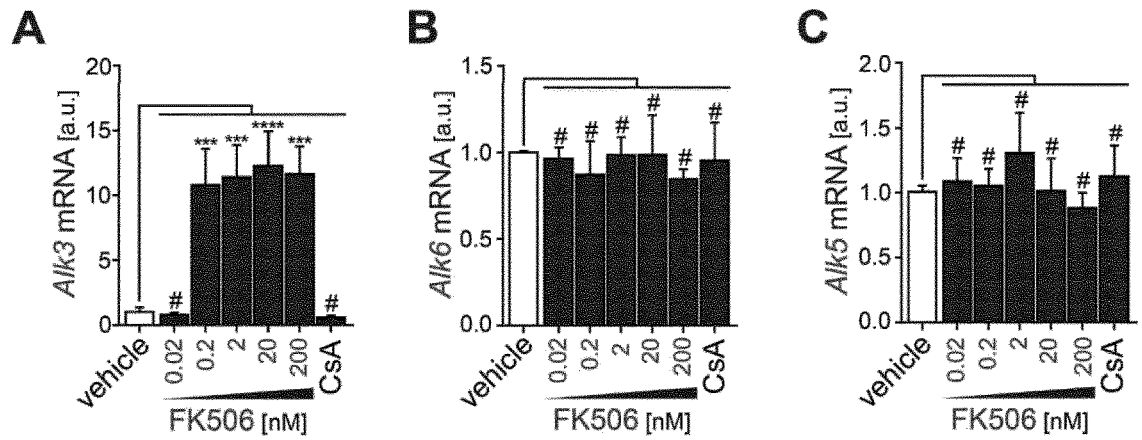
FIG. 8: (A-C) TECs were exposed to either DMSO alone (vehicle), DMSO containing indicated concentrations of FK506 (0.02, 0.2, 2, 20, 200 nM, respectively) or equimolar Cyclosporine A (CsA, 10 nM), mRNA expression levels of type I BMP receptors Alk3, Alk5 and Alk6 were analyzed by qRT-PCR (n=3 independent experiments, data are presented as means±s.d., * p<0.001, ** p<0.0001, # no significance, values of p were calculated using one-way ANOVA with Bonferroni post-hoc analysis).
Figure 9:
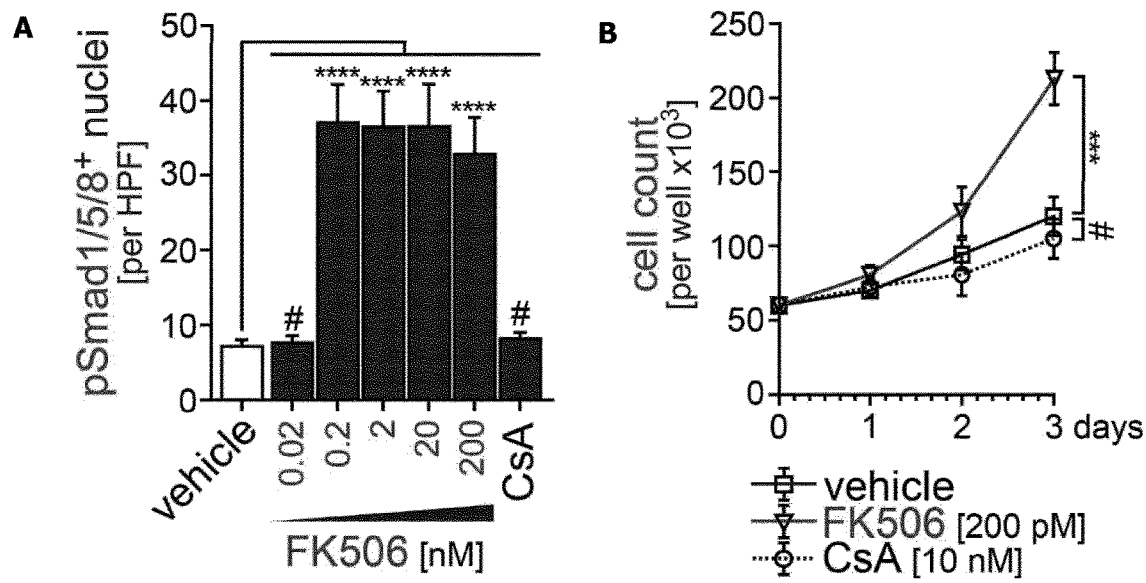
FIG. 9: (A) TECs were exposed to DMSO alone (vehicle) or DMSO containing indicated concentrations of FK506, representative photomicrographs of phosphorylated Smad1/5/8 complex (pSmad1/5/8) immunostainings overlayed with differential interference contrast (DIC, scale bars 25 μm) are analyzed (n=3 independent experiments, data are presented as means±s.d., ** p<0.0001, # no significance, values of p were calculated using one-way ANOVA with Bonferroni post-hoc analysis). (B) TECs were seeded at a density of 60,000 per well and proliferative activity was determined at indicated time points (n=3 independent to experiments, data are presented as means±s.d., * p<0.001, # no significance, values of p were calculated using one-way ANOVA with Bonferroni post-hoc analysis).
Figure 11:
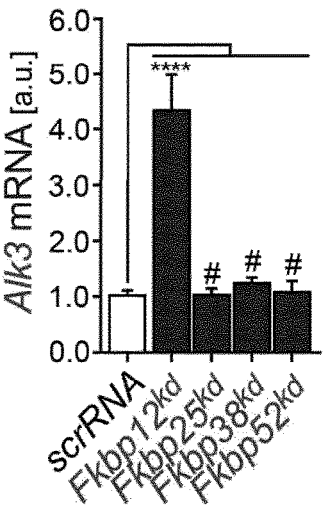
FIG. 11: As analyzed by qRT-PCR, Alk3 mRNA expression levels in TECs were analyzed after siRNA-mediated knockdown of Fkbp12 (Fkbp2ka), Fkbp25 (Fkbp25kd), Fkbp38 (Fkbp38kd) or Fkbp56 (Fkbp56kd, n=3 independent experiments, data are presented as means±s.d., **** p<0.001, # no significance, values of p were calculated using one-way ANOVA with Bonferroni post-hoc analysis).
Figure 12:
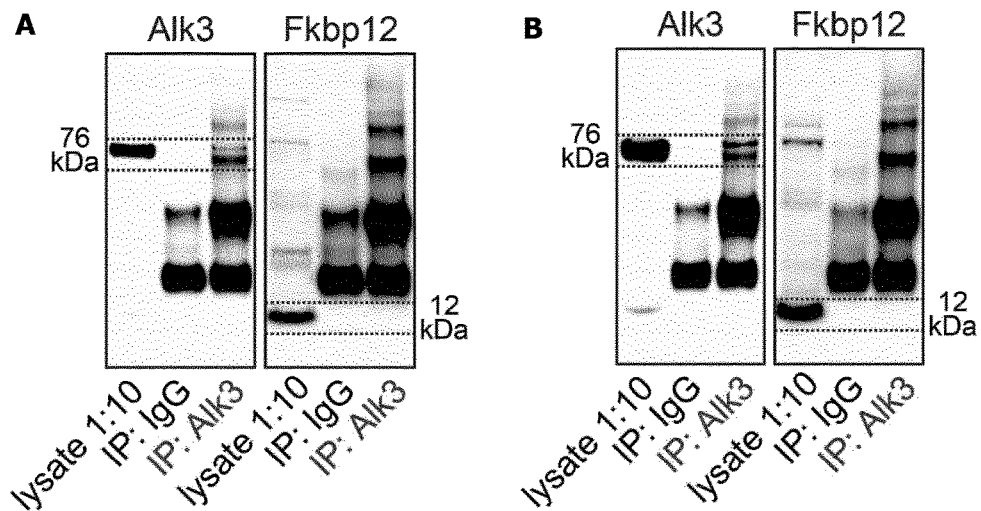
FIG. 12: (A) As analyzed by co-immunoprecipitation after Fkbp12 pull-down (IP: Fkbp12), direct interaction between Fkbp12 and Alk3 was assessed. (B) As analyzed by co-immunoprecipitation after Fkbp12 pull-down (IP: Fkbp12), direct interaction between Fkbp12 and Alk3 was assessed.
Figure 13:
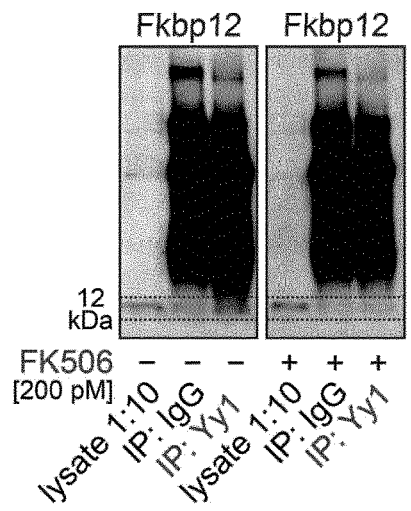
FIG. 13: As analyzed by co-immunoprecipitation after Yy1 pull-down (IP: Yy1), direct interaction between Yy1 and Fkbp12 was assessed.
Figure 14:
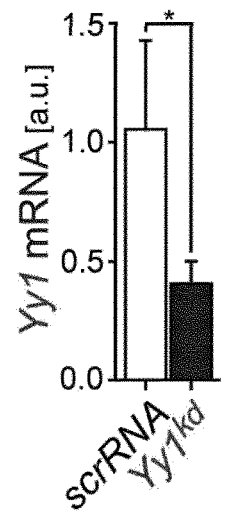
FIG. 14: Analyzed by qRT-PCR, the bar graphs summarize relative Yy1 mRNA expression levels (n=3 independent experiments, data are presented as means±s.d., * p<0.05, values of p were calculated using Student's t test).
Figure 15:
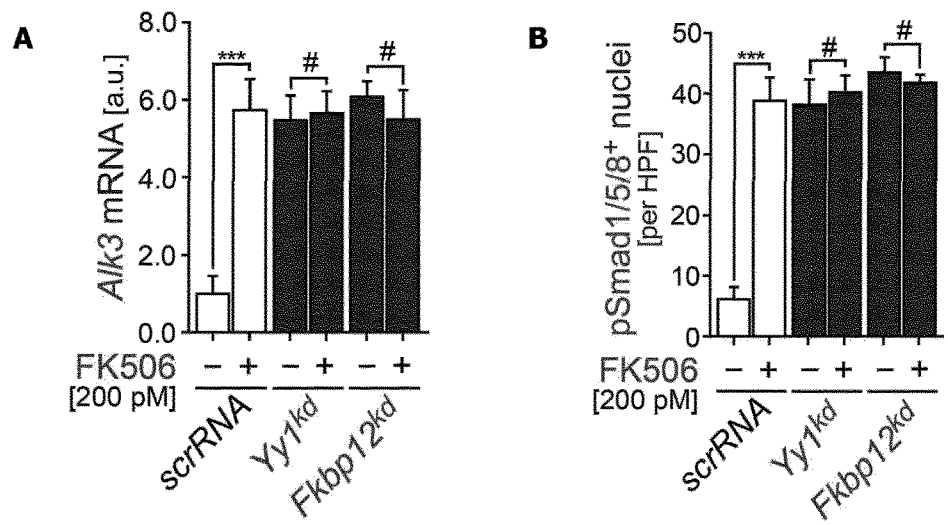
FIG. 15: (A) Alk3 mRNA expression levels were assessed by qRTPCR after knockdown of either Yy1 (Yy1kd) or Fkbp12 (Fkbp12kd) and exposure to FK506 (n=3 independent experiments, data are presented as means±s.d., * p<0.001, # no significance, values of p were calculated using Student's t test). (B) Representative photomicrographs of pSmad1/5/8 immunostainings overlayed with differential interference contrast (DIC, scale bars 25 μm) are analyzed (n=3 independent experiments, data are presented as means±s.d., * p<0.001, # no significance, values of p were calculated using Student's t test).

The inventors next aimed to gain insights into the molecular mechanisms underlying observed increased ALK3 transcription upon low-dose FK506 administration. Because within the kidney, tubular epithelial cells (TECs) have been established as primary targets of ALK3-mediated BMP signaling (53), and because the inventors had observed robust protection of the tubular epithelium upon FK506 treatment in the inventors' initial studies, the inventors decided to focus here on TECs. The inventors exposed murine TECs to different concentrations of FK506 ranging from standard nanomolar dosages used for immunosuppression in transplant patients (2-200 nM as compared to immunosuppressive doses ranging from 6.2 to 18.7 nM) (75, 76), down to picomolar concentrations (0.02-0.2 nM) reflecting FK506 regimens which the inventors had used in the inventors' murine studies. FK506 induced optimal ALK3 transcription at concentrations from 0.2 nM to 2 nM, whereas higher concentrations had no further enhancing effects (FIG. 8A). In contrast, expression levels of the related type I BMP receptor ALK6 or its counterpart ALK5 (synonym TGFBR1, mediating pro-fibrotic TGFβ signaling) (77-79), were not increased (FIG. 8B,C). Increased ALK3 transcription in TECs was associated with accumulation of pSmad1/5/8 and proliferative activity (FIG. 9A,B), both indicating functional activation of canonical BMP signaling (80-83). FK506 elicits biological function by complexing with distinct FK506-binding proteins (FKBPs) characterized by prolyl isomerase activity and acting as folding chaperones for proteins containing proline residues (84, 85). FKBP-FK506 complexes are best known for inhibiting calcineurin phosphatase activity, but numerous additional proteins are targeted by distinct FK506-FKBP complexes, most notably including FKBP family members FKBP12, FKBP25, FKBP38 and FKBP56 (84, 85). Because the inventor's studies had revealed that observed protective activity of low-dose FK506 was independent of calcineurin phosphatase inhibition, the inventors next aimed to identify involved FKBP family members and subsequently targeted proteins. To identify FKBP family members involved in mediating FK506-induced ALK3 transcription, the inventors next depleted aforementioned FKBPs in cultured TECs by siRNA-mediated knockdown experiments (FIG. 1A-D). Whereas knockdown of FKBP25, FKBP38 and FKBP56 had no significant effects on ALK3 transcription, depletion of FKBP12 (Fkbp12kd) induced ALK3 mRNA expression without further addition of FK506 to culture media (FIG. 11). Previous reports established that FKBP12 is capable of inhibiting ALK3-dependent receptor signaling by direct interaction (29). Such interaction was not detectable in cultured TECs (FIG. 12A,B), suggesting that the immunophilin FKBP12 suppresses ALK3-dependent receptor signaling by repressing ALK3 transcription to regulate canonical BMP signaling responses. However, FKBPs including FKBP12 do not possess DNA binding properties themselves, but are known to interact with a subset of transcriptional regulators to impact gene expression (86-90), and FK506 is known to elicit biological functions by interaction with such FKBP/transcriptional regulator complexes (87). Based on these prerequisites, the inventors hypothesized that FKBP12 alters ALK3 transcription by interacting with a to-be-determined transcriptional regulator, and that FK506-induced ALK3 expression and canonical BMP signaling responses via interaction with this FKBP12/transcriptional regulator complex. Among FKBP12 interacting proteins (91), the inventors identified Yin Yang 1 (YY1) predicted to regulate transcription of differentially expressed genes induced in response to FK506 (accession number GSE5258, and Table 2) (44, 45, 92). YY1 is a GLI-Kruppel family member known to either repress or activate a diverse number of gene promoters (93-95). Repressive function of YY1 on transcription of select genes is dependent on its interaction with adaptor proteins such as FKBPs, which increases its DNA binding properties (86-90). The inventors hypothesized that disruption of repressive FKBP12/YY1 complexes by FK506 is involved in enhanced ALK3 transcription and activation of canonical BMP signaling responses. Co-immunoprecipitation using antibodies to YY1 (IP: Yy1) confirmed direct interaction of YY1 and FKBP12 in cultured TECs, while such FKBP12/YY1 interaction was not detectable when FK506 was added to culture media (FIG. 13). While in untreated TECs, FKBP12 and YY1 were equally present and detection of FKBP12/YY1 complexes correlated with low ALK3 expression levels, depletion of YY1 (Yy1kd) by siRNA-mediated knockdown (FIG. 14) was equally effective in induction of ALK3 transcription and subsequent BMP signaling activation as compared to FKBP12-depleted cells (Fkbp12kd, FIG. 15A,Band Figure A). In addition, supplementation of FK506 to culture media did not additionally induce ALK3 transcription and BMP signaling responses when YY1 had been depleted (FIG. 15A,B), indicating that FK506-mediated ALK3 induction is primarily dependent on YY1.

Figure 16:
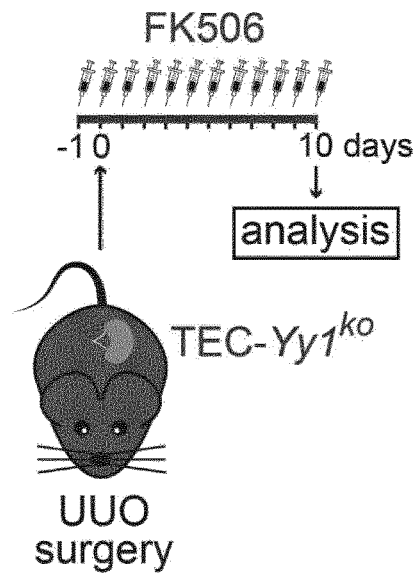
FIG. 16: Mice conditionally depleted for YY1 in TECs (yGTcre+;Yy1/f/1 and corresponding littermate controls (yGTcre–;Yy1fl/fl) were challenged with UUO and treated with either vehicle buffer or FK506 (0.2 mg/kg orally per day) starting one day prior of surgery.
Figure 17:
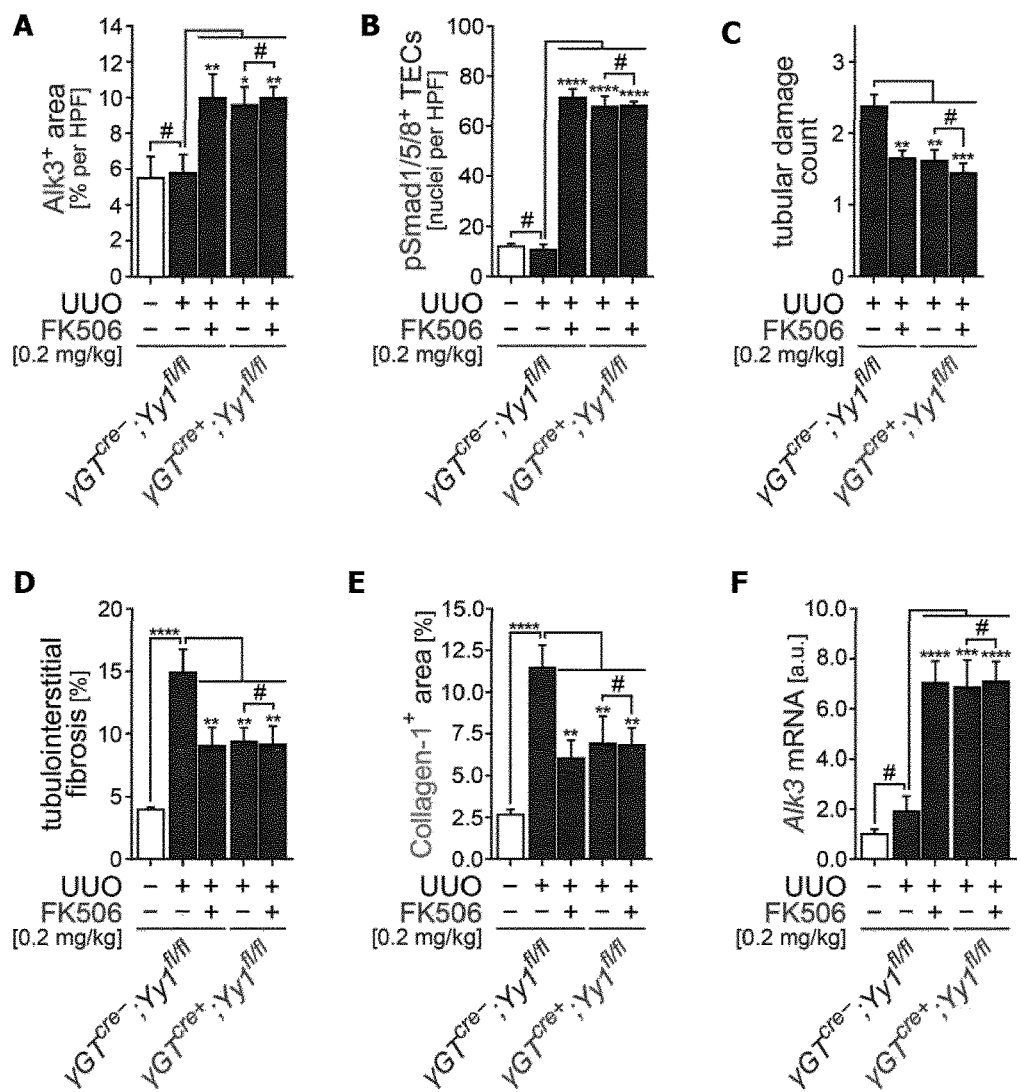
FIG. 17: (A-E) Representative photomicrographs of immunostainings for Alk3, pSmad1/5/8, PAS-stained fibrotic kidney sections, MTS and Collagen-1 in mice challenged with UUO are analyzed (n=3/group, data are presented as means±s.d., * p<0.05,  p<0.01, * p<0.001, ** p<0.0001, # no significance, values of p were calculated using one-way ANOVA with Bonferroni post-hoc analysis). (F) Alk3 mRNA expression levels were analyzed by qRT-PCR (n=3/group, data are presented as means±s.d., p<0.01, * p<0.001, **** p<0.0001, # no significance, values of p were calculated using one-way ANOVA with Bonferroni post-hoc analysis).

To further substantiate that tubular YY1 is equally involved in transcriptional ALK3 repression in injured kidneys, the inventors next generated mice conditionally depleted for YY in TECs (referred as yGTcre+;Yy1fl/fl). In mice challenged with UUO (FIG. 16), conditional YY depletion in TECs resulted in robust induction of BMP signaling responses, protection from tubular injury and renal fibrogenesis based on enhanced ALK3 transcription (FIG. 17A-F). When YY1 was depleted in TECs, administration of FK506 had no additive effects (FIG. 17A-F), indicating that FK506-mediated anti-fibrotic and pro-regenerative efficacy is dependent on presence and modulation of YY1 signaling in TECs. In summary, the inventors' studies demonstrated that presence of FKBP12, YY1 and their respective complex formation correlated with low ALK3 expression. The inventors' studies further revealed that depletion of FKBP12/YY1 complexes by knockdown of either FKBP12 or YY1 induced ALK3 transcription, suggesting that observed transcriptional induction of ALK3 upon exposure to FK506 was mediated by disruption of the FKBP12/YY1 repressor complex.

Figure 10:
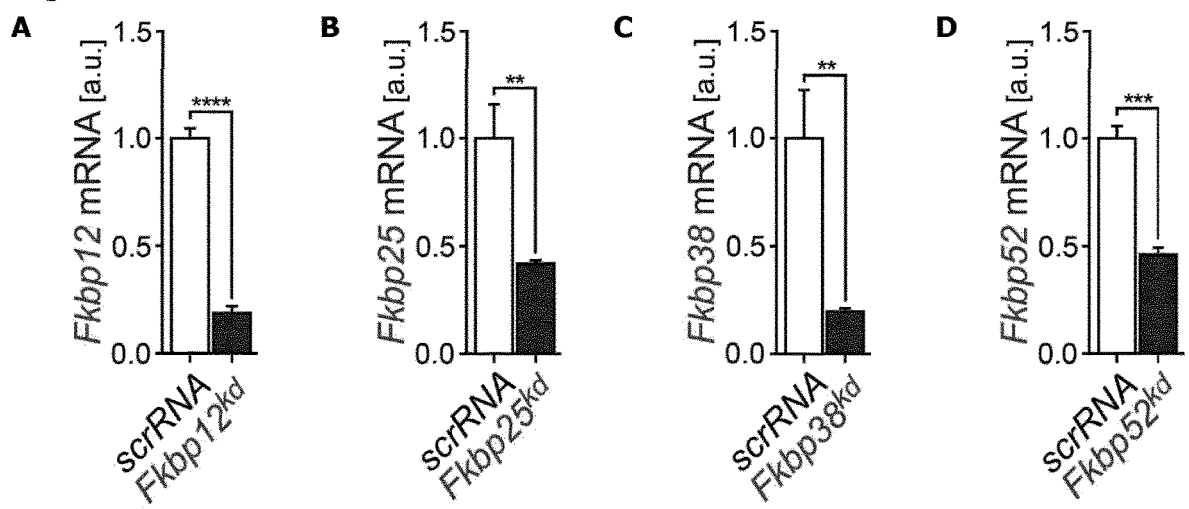
FIG. 10: (A-D) Tubular epithelial cells (MCT) were transfected with either scrambled RNA (scrRNA), siRNA targeting Fkbp12 (Fkbp12kd), Fkbp25 (Fkbp25kd), Fkbp38 (Fkbp38kd, Fkbp52 (Fkbp52kd). Analyzed by qRT-PCR, the bar graphs summarize relative mRNA expression levels (n=3 independent experiments, data are presented as means±s.d.,  p<0.01, * p<0.001, **** p<0.0001, values of p were calculated using Student's t test).
Figure 18:
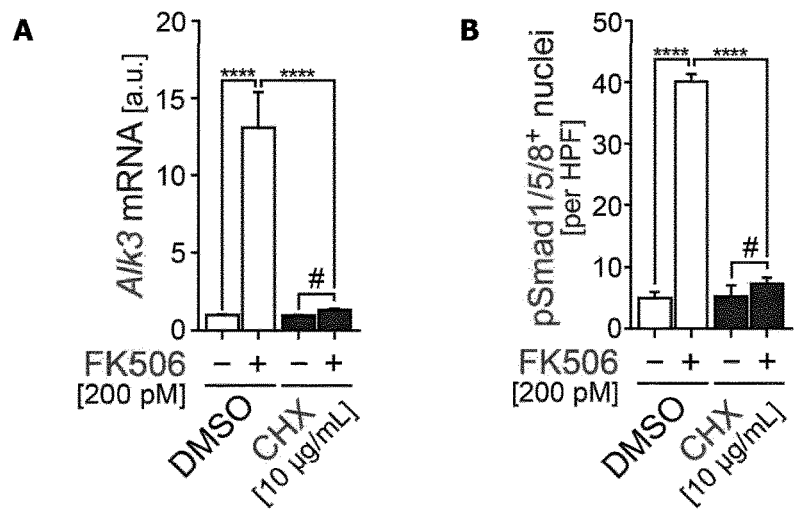
FIG. 18: (A) TECs were exposed to the protein translation blocker cycloheximide (CHX) one hour prior FK506 incubation, Alk3 mRNA expression was assessed by qRT-PCR (n=3 independent experiments, data are presented as means±s.d., ** p<0.001, # no significance, values of p were calculated using one-way ANOVA with Bonferroni post-hoc analysis). (B) BMP signaling responses reflected by nuclear pSmad1/5/8 accumulation was analyzed by immunostaining overlayed with differential interference contrast (DIC, scale bars 25 μm, n=3 independent experiments, data are presented as means±s.d., ** p<0.0001, # no significance, values of p were calculated using one-way ANOVA with Bonferroni post-hoc analysis).
Figure 19:
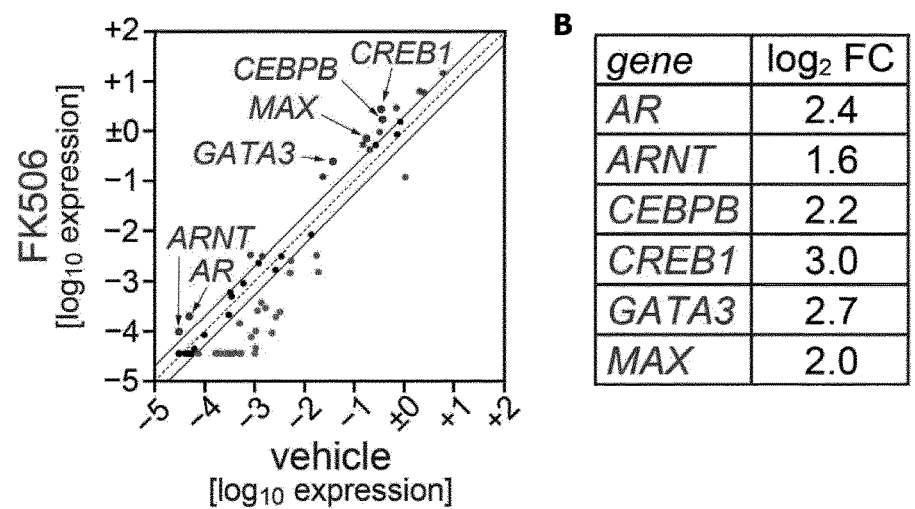
FIG. 19: FK506-mediated transcriptional network alterations were analyzed by transcription factor array analysis and subsequent prediction of putative binding motifs within the ALK3 proximal promoter, log base 2 fold changes ($\log_2$ FC) are shown.
Figure 20:
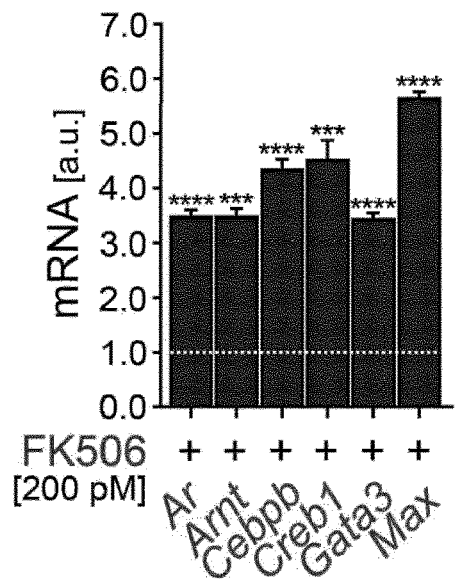
FIG. 20: Identified transcriptional factors induced by FK506 were validated by qRT-PCR upon FK506 exposure (n=3 independent experiments, data are presented as means±s.d., * p<0.001, ** p<0.0001, values of p were calculated using Student's t test in comparison to DMSO-treated control cells).
Figure 21:
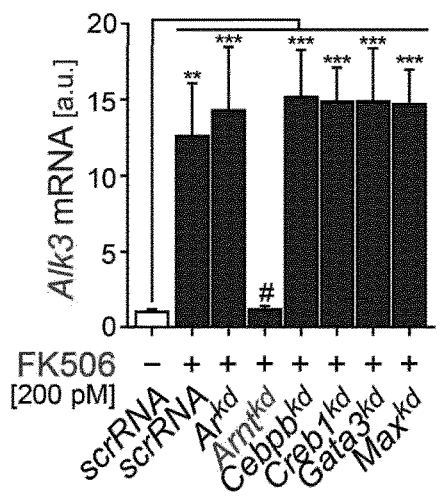
FIG. 21: Alk3 mRNA levels were analyzed by qRT-PCR after siRNA-mediated knockdown (n=3 independent experiments, data are presented as means±s.d.,  p<0.01, * p<0.001, # no significance, values of p were calculated using one-way ANOVA with Bonferroni post-hoc analysis).
Figure 23:
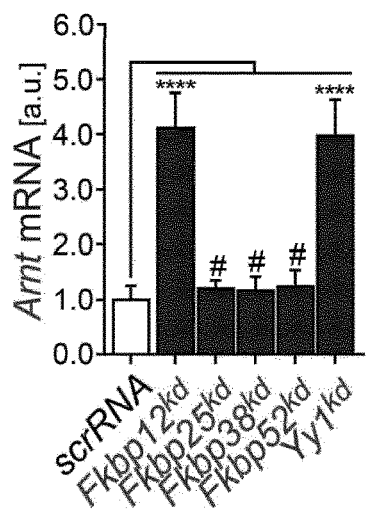
FIG. 23: As analyzed by qRT-PCR, Arnt mRNA expression levels in TECs after siRNA-mediated knockdown of Fkbp12 (Fkbp12kd), Fkbp25 (Fkbp25kd), Fkbp38 (Fkbp38kd), Fkbp52 (Fkbp52kd) or Yy1 (Yy1kd) are shown (n=3 independent experiments, data are presented as means±s.d., **** p<0.0001, # no significance, values of p were calculated using one-way ANOVA with Bonferroni post-hoc analysis).
Figure 24:
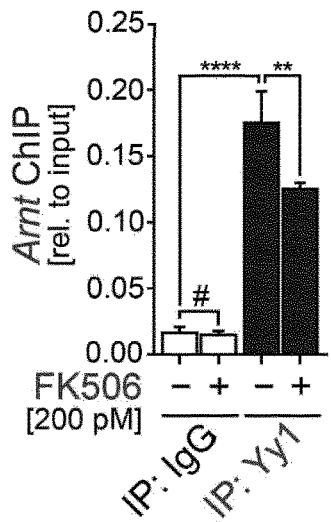
FIG. 24: Binding of Yy1 to the Arnt proximal promoter was analyzed by Chromatin immunoprecipitation (ChIP) and subsequent target PCR after Yy1 pull-down (IP: Yy1, n=3 technical replicates, data are presented as means±s.d.,  p<0.01, ** p<0.0001, # no significance, values of p were calculated using one-way ANOVA with Bonferroni post-hoc analysis).
Figure 25:
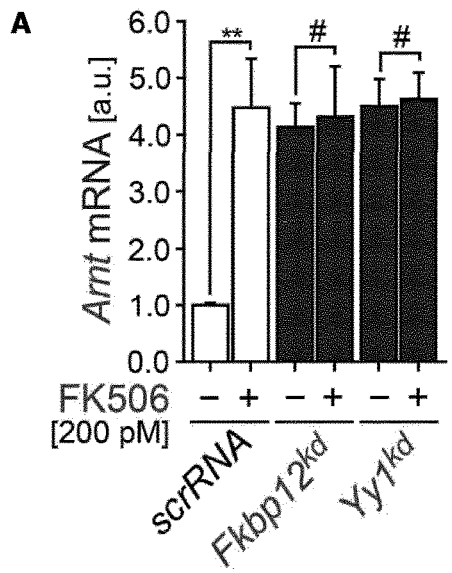
FIG. 25: (A) As assessed by qRT-PCR, Alk3 mRNA expression levels after knockdown of either Fkbp12 (Fkbp12kd) or Yy1 (Yy1kd) are shown (n=3 independent experiments, data are presented as means±s.d.,  p<0.01, # no significance, values of p were calculated using Student's t test). (B) Arnt protein levels were analyzed by immunostaining overlayed is with differential interference contrast (DIC, scale bars 25 μm, n=3 independent experiments, data are presented as means±s.d., ** p<0.0001, # no significance, values of p were calculated using Student's t test).
Figure 25:
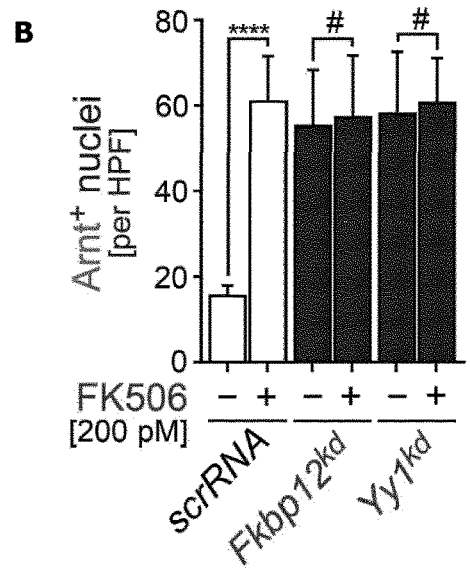
Figure 26:
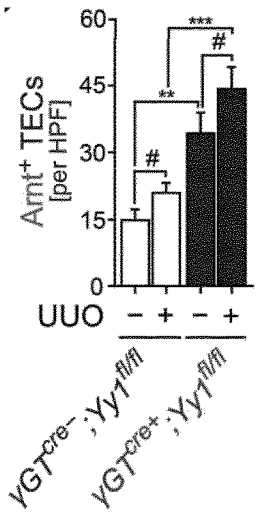
FIG. 26: Representative kidney sections of yGTcre+; Yy1fl/fl and yGTcre−;Yy1fl/fl mice immunolabelled with primary antibodies against Arnt are analyzed (n=3/group, data are presented as means±s.d.,  p<0.01, * p<0.001, # no significance, values of p were calculated using one-way ANOVA with Bonferroni post-hoc analysis).
Figure 27:
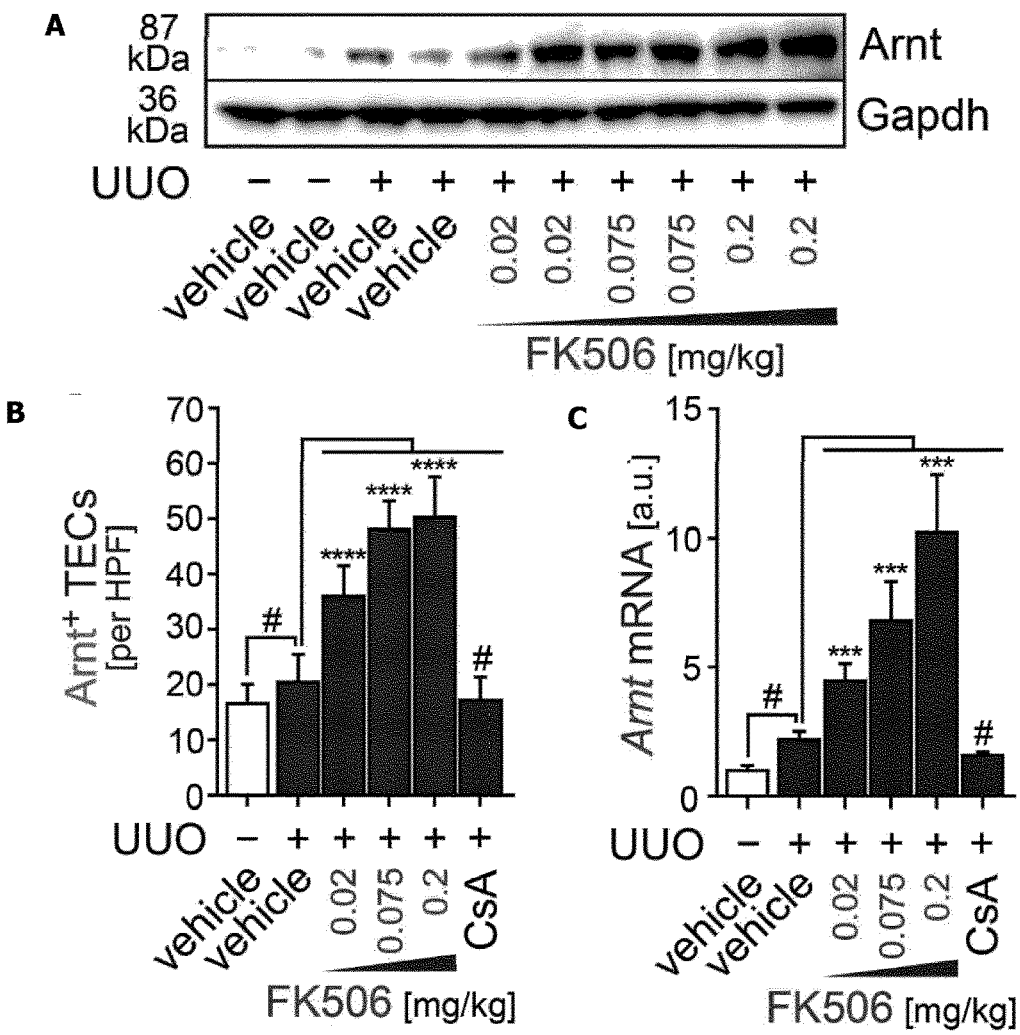
FIG. 27: (A,B) Arnt protein levels were analyzed by immunoblotting and immunostaining (n=6/group, data are presented as means±s.d., ** p<0.0001, # no significance, values of p were calculated using one-way ANOVA with Bonferroni post-hoc analysis). (C) Arnt mRNA from total kidney lysates was analyzed by qRT-PCR. (n=3-6/group, data are presented as means±s.d., * p<0.001, # no significance, values of p were calculated using one-way ANOVA with Bonferroni post-hoc analysis).

ARNT/HIF1β Causally Links Disruption of FKBP12/YY1 Complexes to Increased ALK3 Transcription In control experiments in which Cycloheximide (CHX, 10 µg/mL) was added to cell culture media to block protein translation, FK506 failed to induce ALK3 transcription and also activation of canonical BMP signaling responses (nuclear pSmad1/5/8, FIG. 18A,B). These observations suggested that de novo translation of yet unknown mediator(s) is required to induce ALK3 transcription after release from FKBP12/YY1 transcriptional is repressor complexes. Evidence that ALK3 transcription is not directly regulated by modulation of FKBP12/YY1 complexes is additionally supported by absence of putative YY1 binding motifs within the ALK3 proximal promoter region (96, 97). To identify factors linking disruption of FKBP12/YY1 complexes and ALK3 transcription, the inventors next used an unbiased, array-based approach to analyze expression levels of distinct transcriptional factors in TEC cultures in response to FK506. Based on computational prediction of putative transcriptional factor binding sites (98), the inventors identified 6 candidate transcriptional factors with a binding motif within the ALK3 proximal promoter at least 2-fold induced upon FK506 exposure: AR, ARNT, CEPB, CREB1, GATA3 and MAX (FIG. 19A,B). While qRT-PCR confirmed increased mRNA expression levels of all identified targets upon exposure to FK506 (FIG. 20), only siRNA-mediated depletion of ARNT (Arntkd) prevented transcriptional ALK3 induction in response to FK506, whereas depletion of AR, CEBPB, CREB1, GATA3 or MAX had no significant impact on ALK3 expression (FIG. 21 and FIG. 22A-F). Furthermore, the inventors observed robust ARNT induction upon depletion of either FKBP12 (Fkbp12kd) or YY1 (Yy1kd) (FIG. 23 and FIG. 10A,E), suggesting ARNT as possible link between FKBP12/YY1 complex disruption and enhanced ALK3 transcription. These observations were further supported by transcriptional expression datasets with robust induction of ARNT and enrichment of ARNT-regulated genes induced in response to FK506 (accession number GSE5258, Table 2) (44, 45, 92). To further explore the role of ARNT transcription as causal link between FKBP12/YY1 complex disruption and increased ALK3 expression, the inventors performed ARNT ChIP PCR using antibodies to YY1 for immunoprecipitation (IP: Yy1). ChIP demonstrated binding of YY1 to its putative motif within the ARNT proximal promoter in cultured TECs that had been maintained in control media without FK506 (with low ALK3 expression levels, FIG. 24). Addition of FK506 to culture media (associated with enhanced ALK3 transcription) reduced YY1 binding to the ARNT proximal promoter (FIG. 24), associated with transcriptional ARNT induction (FIG. 25A,B). Observed induction of ARNT upon depletion of either FKBP12 or YY1 was not further enhanced by FK506, supplementation of culture media with FK506 did not additionally induce ARNT mRNA and protein levels in experiments in which ARNT expression had been induced by FKBP12 (Fkbp12ko) or YY1 depletion (Yy1ko, FIG. 25A, B), supporting that FK506-mediated ARNT induction is dependent on modulation of a repressive FKBP12/YY1 signaling axis. These findings in cultured TECs were further confirmed by significantly increased ARNT expression levels in yGTcre+;Yy1fl/fl conditional knockout mice (FIG. 26, correlating with enhanced ALK3 transcription and renoprotection). Furthermore, renal ARNT expression was significantly increased in mice treated with low-dose FK506, but not in mice that had been given CsA (FIG. 27A-C, again correlating with enhanced ALK3 transcription and renoprotection).

Figure 22:
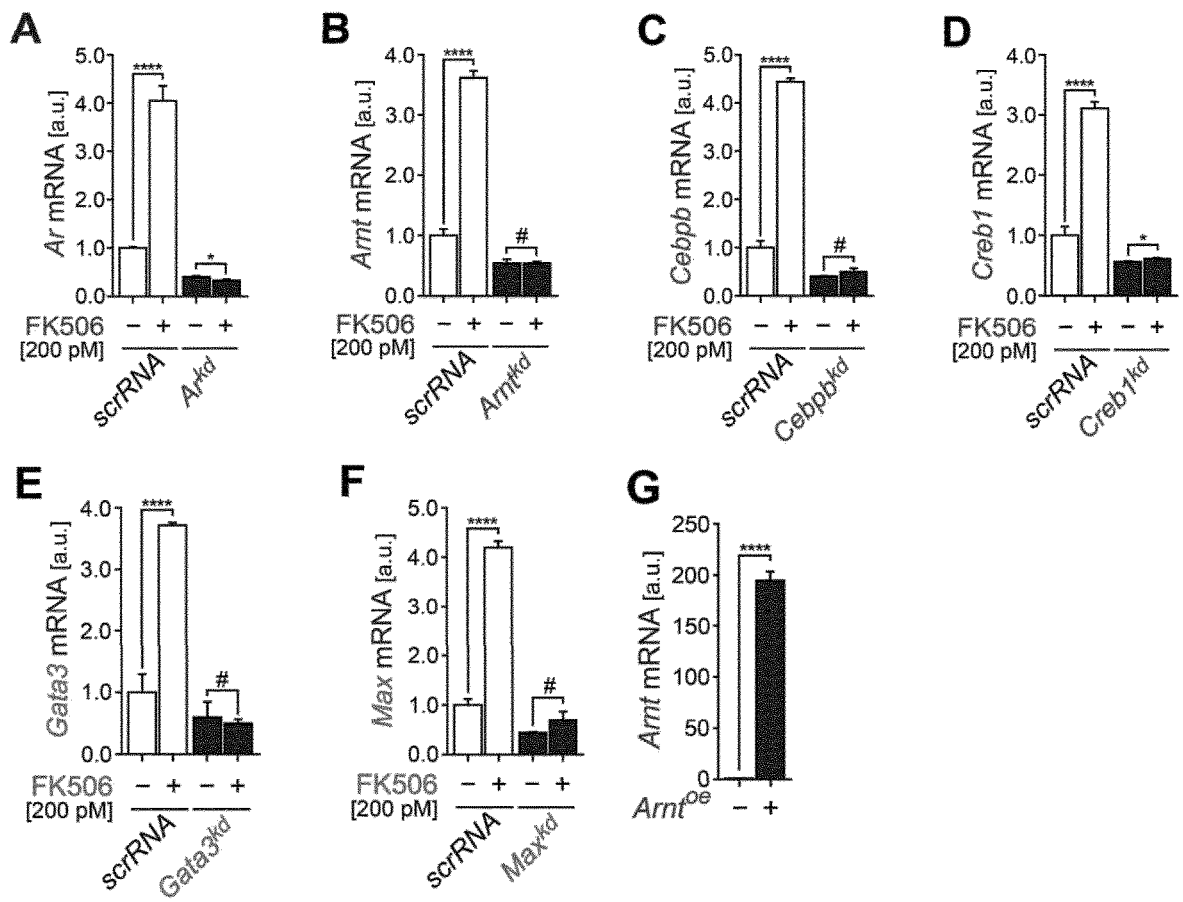
FIG. 22: (A-F) TECs were transfected with either scrambled RNA (scrRNA), siRNA targeting Ar (Arkd), Arnt (Arntkd), Cebpb (Cebpbkd), Creb1 (Creb1kd), Gata3 (Gata3kd) or Max (Maxkd). Analyzed by qRT-PCR, the bar graphs summarize relative mRNA expression levels in response to FK506 (200 pM, n=3 independent experiments, data are presented as means±s.d., * p<0.05, ** p<0.0001, # no significance, values of p were calculated using Student's t test). (G) Analyzed by qRT-PCR, Arnt over-expression (Arntoe) was assessed (n=3 independent experiments, data are presented as means±s.d., ** p<0.0001, values of p were calculated using Student's t test).
Figure 28:
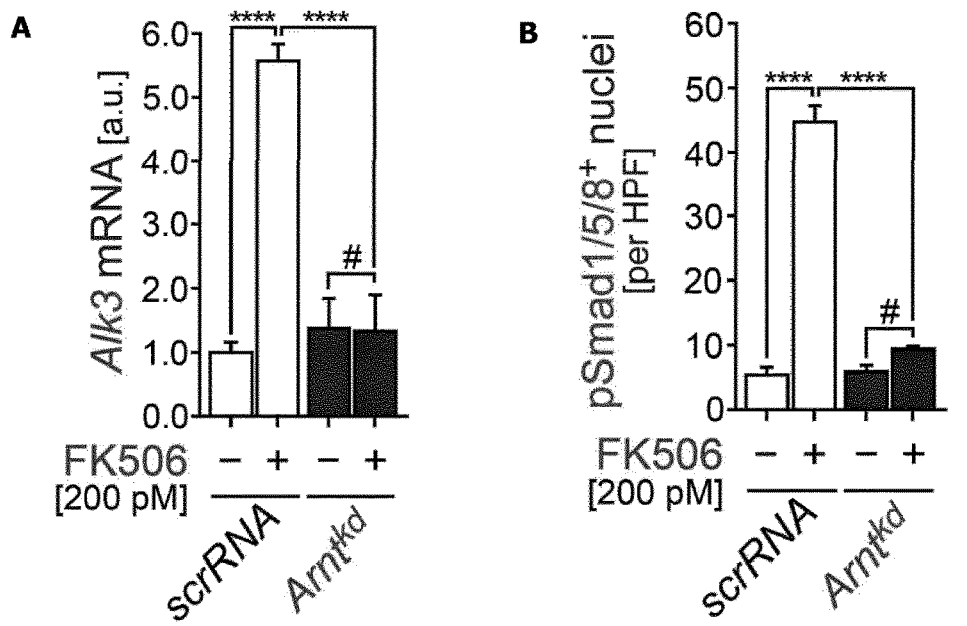
FIG. 28: (A) Alk3 mRNA was assessed by qRT-PCR after depletion of Arnt (Arntkd, n=3 independent experiments, data are presented as means±s.d., ** p<0.0001, # no significance, values of p were calculated using one-way ANOVA with Bonferroni post-hoc analysis). (B) Efficacy of BMP signaling activation was analyzed by immunostaining overlayed with differential interference contrast (DIC, scale bars 25 μm, n=3 independent experiments, data are presented as means±s.d., ** p<0.0001, # no significance, values of p were calculated using one-way ANOVA with Bonferroni post-hoc analysis).
Figure 29:
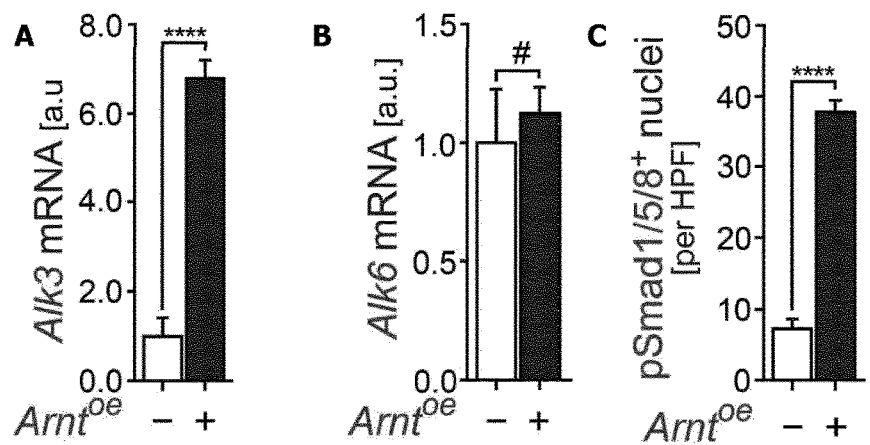
FIG. 29: (A,B) Alk3 and Alk6 mRNA expression levels analyzed by qRT-PCR are shown (n=3 independent experiments, data are presented as means±s.d., ** p<0.0001, # no significance, values of p were calculated using Student's t test). (C) BMP signaling responses in cultured TECs were assessed by pSmad1/5/8 immunostaining overlayed with differential interference contrast (DIC, scale bars 25 m, n=3 independent experiments, data are presented as means±s.d., ** p<0.0001, values of p were calculated using Student's t test).

To further substantiate the causal link between ARNT and ALK3 induction, the inventors next analyzed efficacy of FK506 to enhance ALK3 transcription when ARNT induction in response to FK506 was blocked in cultured TECs (Arntkd, FIG. 22B). When ARNT induction was depleted, FK506 failed to induce ALK3 transcription (FIG. 28A) or nuclear pSmad1/5/8 accumulation (FIG. 28B). In addition, transgenic ARNT over-expression in cultured TECs (Arntoe, FIG. 22G) alone was sufficient to specifically induce type I BMP receptor ALK3 mRNA expression and nuclear pSmad1/5/8 accumulation (FIG. 29A-C), confirming that ARNT effectively mediates transcriptional ALK3 induction and downstream BMP signaling responses.

Figure 30:
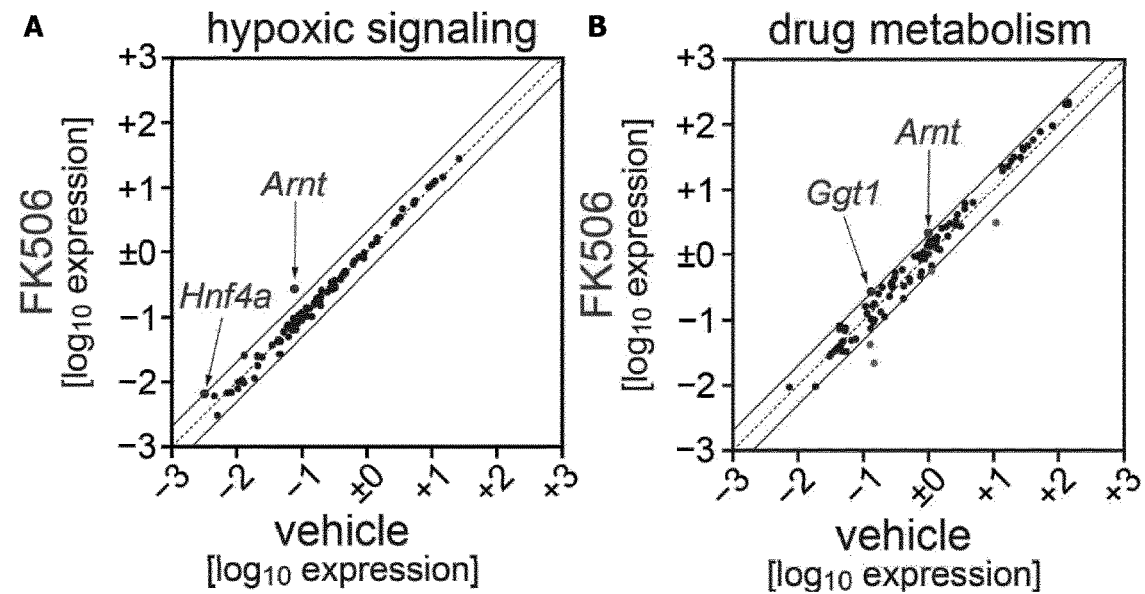
FIG. 30: (A,B) Impact of FK506 on hypoxic signaling and drug metabolism was analyzed by respective array analysis.
Figure 31:
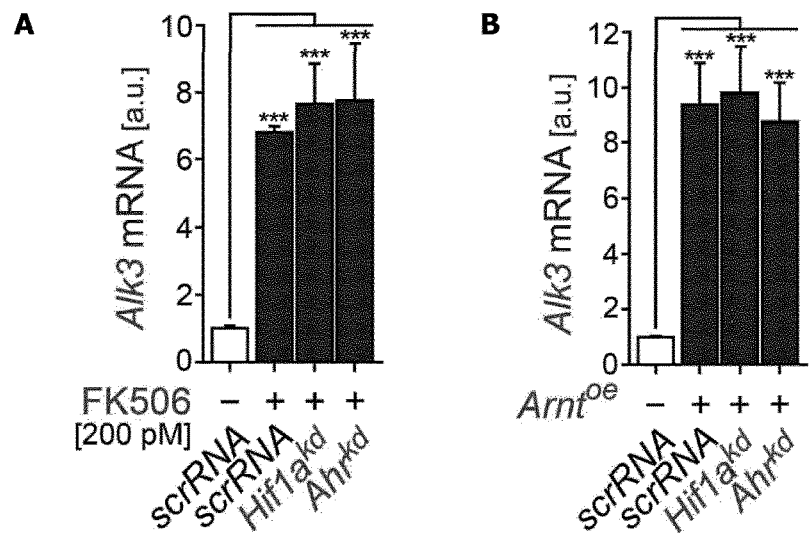
FIG. 31: (A,B) Efficacy of FK506 or Arnt over-expression to induce Alk3 mRNA expression levels in cultured TECs depleted for HIF1α (Hif1akd) or AHR (Ahrkd) was assessed by qRT-PCR (n=3 independent experiments, data are presented as means±s.d., *** p<0.001, values of p were calculated using one-way ANOVA with Bonferroni post-hoc analysis).
Figure 32:
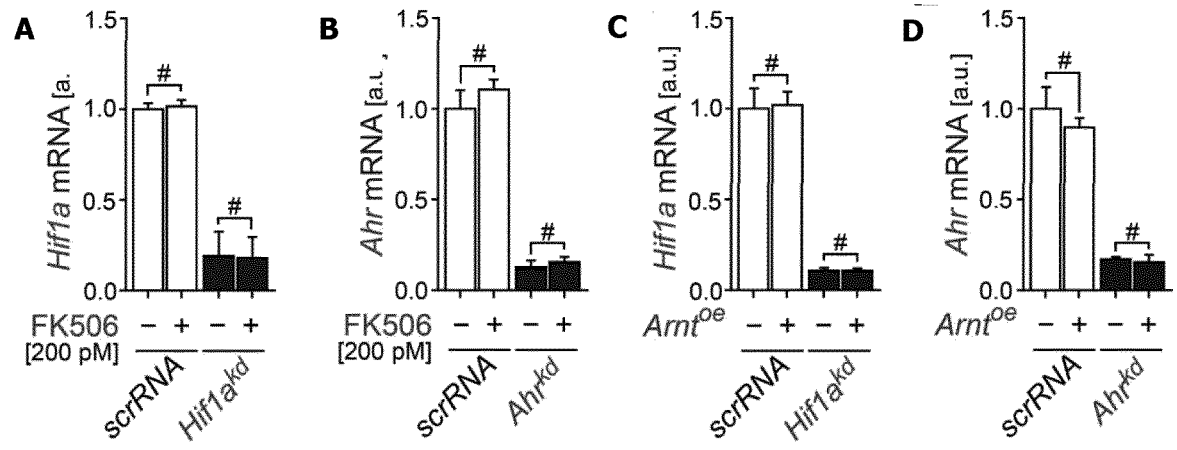
FIG. 32: (A-D) TECs were transfected with either scrambled RNA (scrRNA), siRNA targeting Hif1α (Hif1akd) or Ahr (Ahrkd). Analyzed by qRT-PCR, the bar graphs summarize relative mRNA expression levels in response to either FK506 (200 pM) or transgenic Arnt over-expression (Arntoe, n=3 independent experiments, data are presented as means±s.d., # no significance, values of p were calculated using Student's t test).
Figure 33:
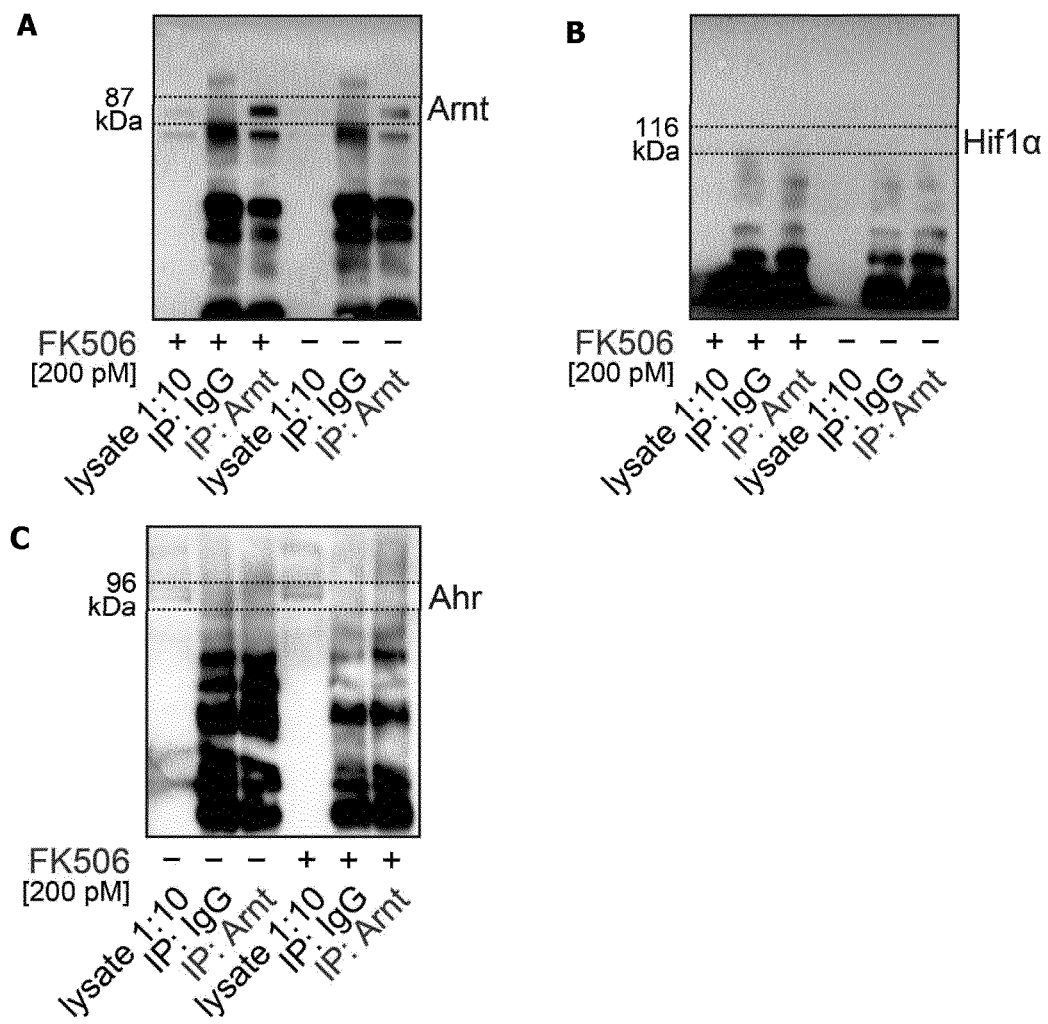
FIG. 33: (A-C) Analyzed by co-immunoprecipitation (CoIP) using antibodies to Arnt (IP: is Arnt), Arnt/Hif1α and Arnt/Ahr interactions were assessed in cultured TECs in response to FK506 (200 pM).
Figure 34:
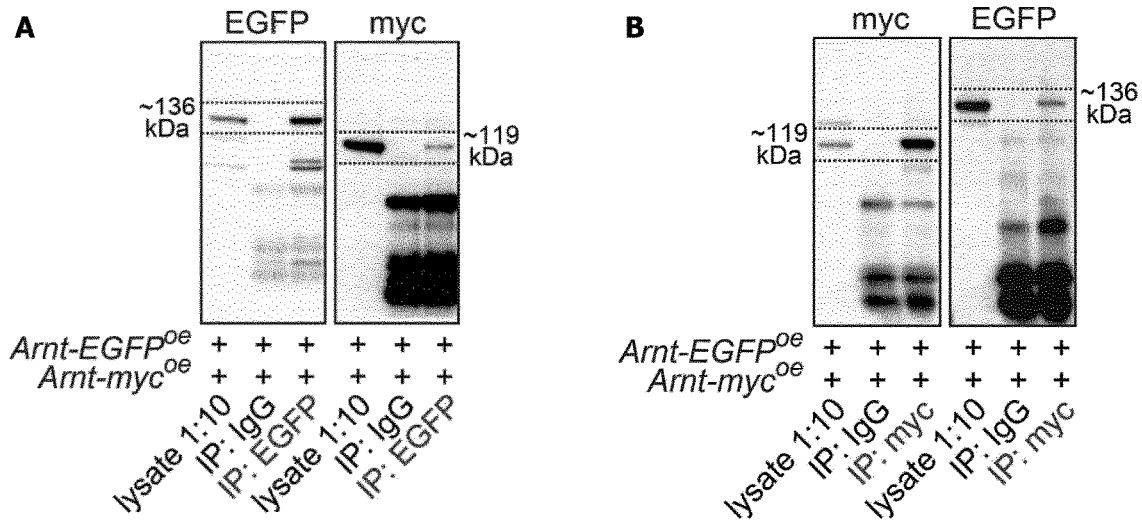
FIG. 34: (A,B) Analyzed by CoIP, homodimer formation was assessed in cultured TECs after EGFP-tagged (Arnt- EGFPoe) and myc-tagged (Arnt-mycoe) ARNT overexpression and pulldown of Arnt-EGFP (IP: EGFP) or Arnt-myc (IP: myc).
Figure 35:
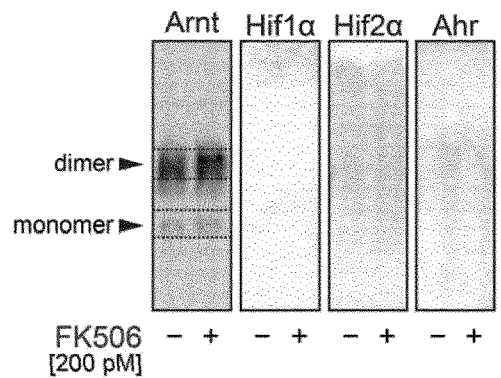
FIG. 35: Dimer formation of Arnt/Arnt, Arnt/Hif1α, Arnt/Hif2α and Arnt/Ahr was assessed by native gel electrophoresis.
Figure 36:
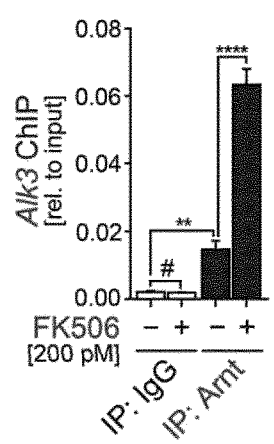
FIG. 36: Binding of Arnt to the Alk3 proximal promoter containing palindromic E-box binding motifs (5'-CACGTG core sequence) was analyzed by ChIP and subsequent target PCR after Arnt pull-down (IP: Arnt, n=3 technical replicates, data are presented as means±s.d.,  p<0.01, ** p<0.0001, # no significance, values of p were calculated using one-way ANOVA with Bonferroni post-hoc analysis).
Figure 37:
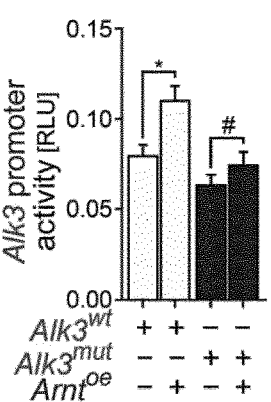
FIG. 37: Analyzed by reporter assays, Alk3 proximal promoter activity was assessed in presence (Alk3 wt) or absence (Alk3mut, CACGTG (SEQ ID NO: 1) to TATATA (SEQ ID NO:2)) of the palindromic E-box motif (n=5 independent experiments, data are presented as means±s.d., * p<0.05, # no significance, values of p were calculated using Student's t test).
Figure 38:
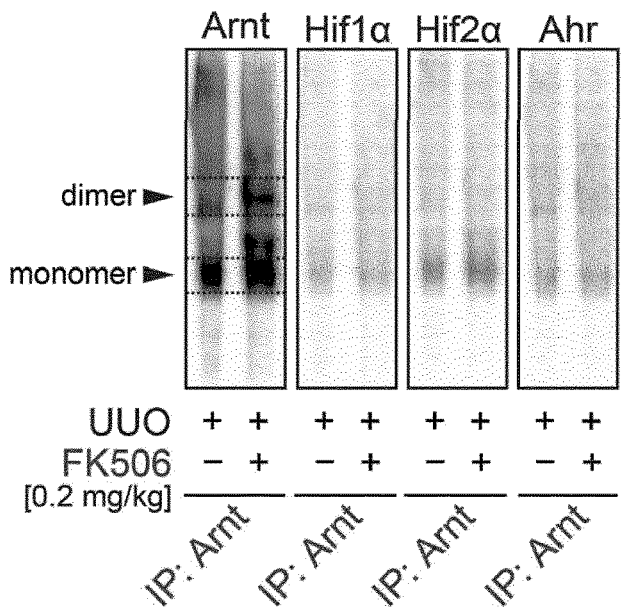
FIG. 38: Dimer formation of Arnt/Arnt, Arnt/Hif1α, Arnt/Hif2α and Arnt/Ahr in total kidney lysates was assessed by native gel electrophoresis after Arnt pulldown.

ARNT (synonym HIF1β) is a member of the PAS domain family and heterodimerizes with other PAS family members to form heterodimeric transcription factors, classically HIF-1α in hypoxia responses the dioxin receptor AHR in xenobiotic signaling (99-112). Furthermore, ARNT forms homodimers with itself and elicits transcriptional activation by binding to the Ebox core sequence CACGTG and the inventors next aimed to further dissect mechanisms underlying FK506-induced, ARNT-dependent transcriptional ALK3 activation. The inventors first performed hypoxia- and drug metabolism mRNA expression arrays on TECs exposed to FK506, revealing that FK506 exposure did not markedly induce pathways involved in hypoxic signaling or drug metabolism (including xenobiotic signaling), while ARNT induction was confirmed (FIG. 30A,B). These observations were further confirmed by preserved effectiveness of FK506 or transgenic ARNT over-expression to induce ALK3 transcription when either HIF1α (Hif1akd) or AHR (Ahrkd) were depleted (FIG. 31A,B and FIG. 32A-D). In addition, co-immunoprecipitation using antibodies to ARNT (IP: Arnt) did not provide evidence for ARNT/HIF1α (hypoxic signaling) or ARNT/AHR (xenobiotic signaling) interaction in cultured TECs in response to FK506 (FIG. 33A-C). As these studies suggested that FK506-induced ALK3 transcription is independent of heterodimeric ARNT activation of hypoxia or xenobiotic signaling, the inventors next aimed to further investigate contribution of ARNT homodimer signaling. To elucidate capacity of ARNT homodimer formation in cultured TECs, the inventors next generated EGFP-tagged (Arnt-EGFPoe) and myc-tagged (Arnt-mycoe) ARNT overexpression plasmids and confirmed formation of ARNT homodimers by coimmunoprecipitation with presence of Arnt-myc after pulldown of Arnt-EGFP (IP: EGFP) and Arnt-EGFP after Arnt-myc pulldown (IP: myc, FIG. 34A,B). Analysis of endogenous ARNT by native gel electrophoresis revealed presence of ARNT dimers within TECs cultivated under standard conditions (FIG. 35). In addition, formation of ARNT dimers was further enhanced upon exposure to FK506 (FIG. 35). The inventors did not detect HIF1α, HIF2α or AHR as constituent of ARNT dimers, further suggesting that transcriptional responses to FK506 in TECs are mediated by homodimerized ARNT (FIG. 35) (102-112). To further substantiate involvement of ARNT homodimers in transcriptional ALK3 regulation, the inventors performed ALK3 ChIP-PCR to analyze ARNT binding to the ARNT homodimer CACGTG target sequence within the proximal ALK3 promoter. Upon exposure to FK506 (associated with high ARNT expression and enhanced ALK3 transcription), the inventors detected significantly increased ARNT binding to its respective motif specific for ARNT homodimers (FIG. 36) (111, 112). Transcriptional ALK3 induction was further confirmed by reporter assays, as ARNT overexpression effectively induced ALK3 proximal promoter activity (Alk3 wt FIG. 37) (113). In contrast, ARNT failed to induce ALK3 transcription when the palindromic E-box motif was disrupted (CACGTG to TATATA, Alk3mut, FIG. 37). In summary, the inventors' studies demonstrate that FK506-induced ALK3 transcription is mediated by ARNT homodimers that bind to its established palindromic E-box motif within the ALK3 promoter, independent of hypoxic of xenobiotic signaling responses requiring heterodimer formation. To verify if observed effects of FK506-induced ALK3 transcription correlating with ARNT homodimer formation in cultured TECs translate to mice, the inventors also analyzed kidneys of mice which had been challenged with UUO and which had been treated with FK506. Analysis of total kidney lysates by immunoprecipitation, native gel analysis and subsequent immunoblotting revealed increased formation of ARNT dimers without interaction with HIF1α, HIF2α or AHR (FIG. 38), confirming a critical role of ARNT homodimerization.

Figure 39:
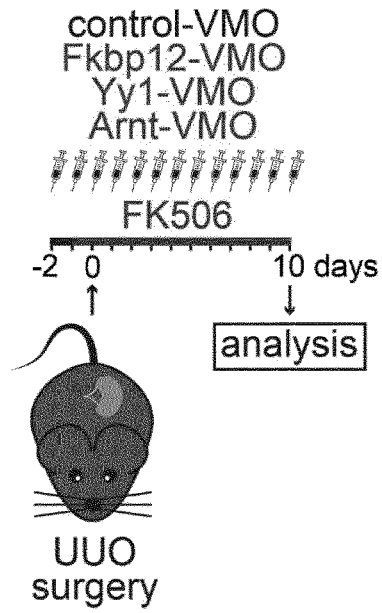
FIG. 39: Mice were treated daily with either intraperitoneal administration of control in vivo-morpholinos (control-VMO), in vivo-morpholinos targeting translational start site of Fkbp12 (Fkbp12-VMO), Yy1 (Yy1-VMO) or Arnt (Arnt-VMO) starting two days prior of surgery. One day prior of UUO surgery, mice were orally treated with either vehicle buffer or FK506 (0.2 mg/kg orally per day).
Figure 40:
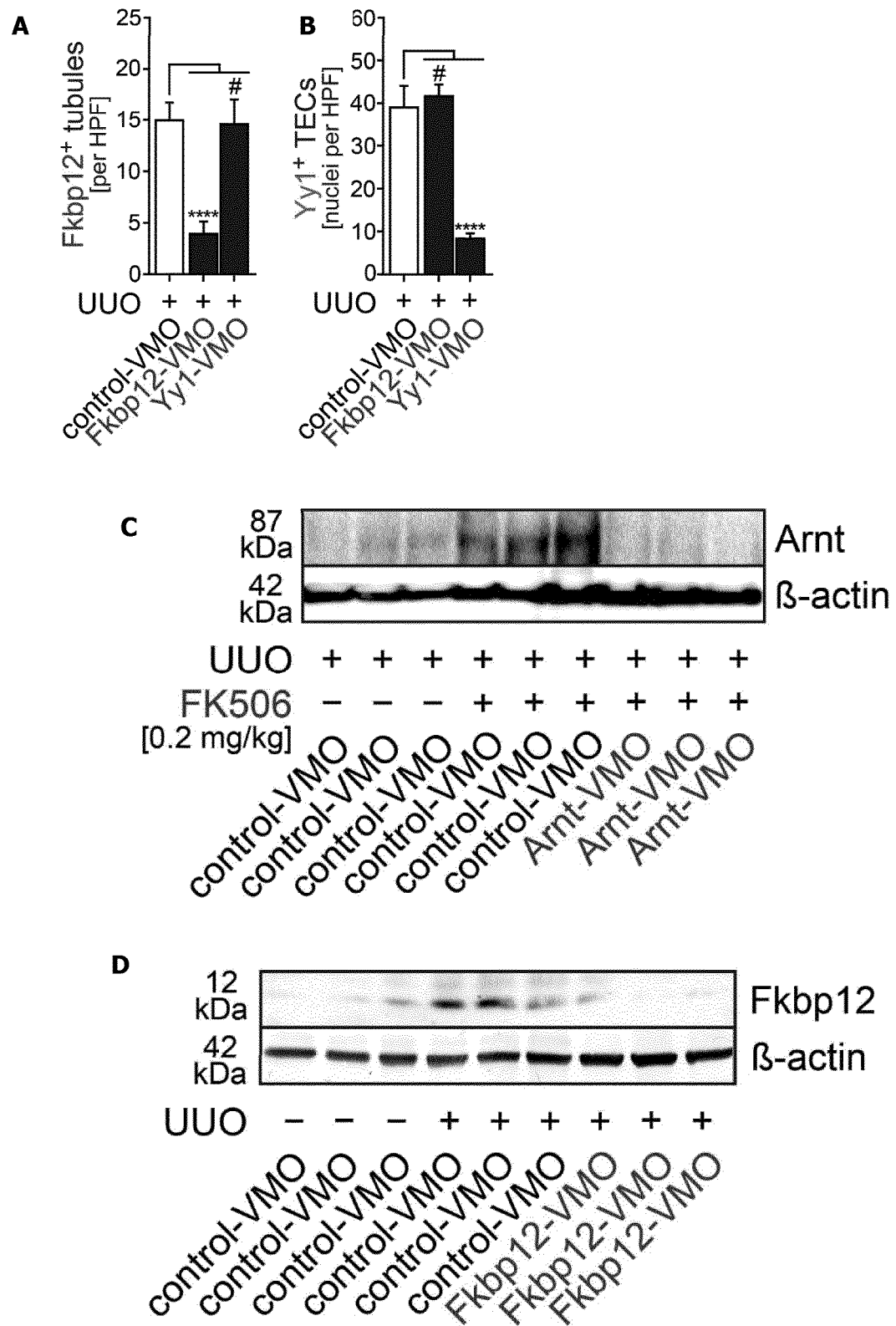
FIG. 40: (A,B) As determined by immunostaining, intrarenal Fkbp12 and Yy1 were assessed (n=6/group, data are presented as means±s.d., **** p<0.0001, # no significance, values of p were calculated using one-way ANOVA with Bonferroni post-hoc analysis). (C) Analyzed by immunoblotting, intrarenal Arnt in mice challenged with UUO is shown. (D) Mice were treated daily with either intraperitoneal administration of control in vivo-morpholinos (control-VMO) or in vivo-morpholinos targeting translational start site of Fkbp12 (Fkbp12-VMO) starting two days prior of surgery, intrarenal Fkbp12 was analyzed by immunoblotting of total kidney lysates.
Figure 41:
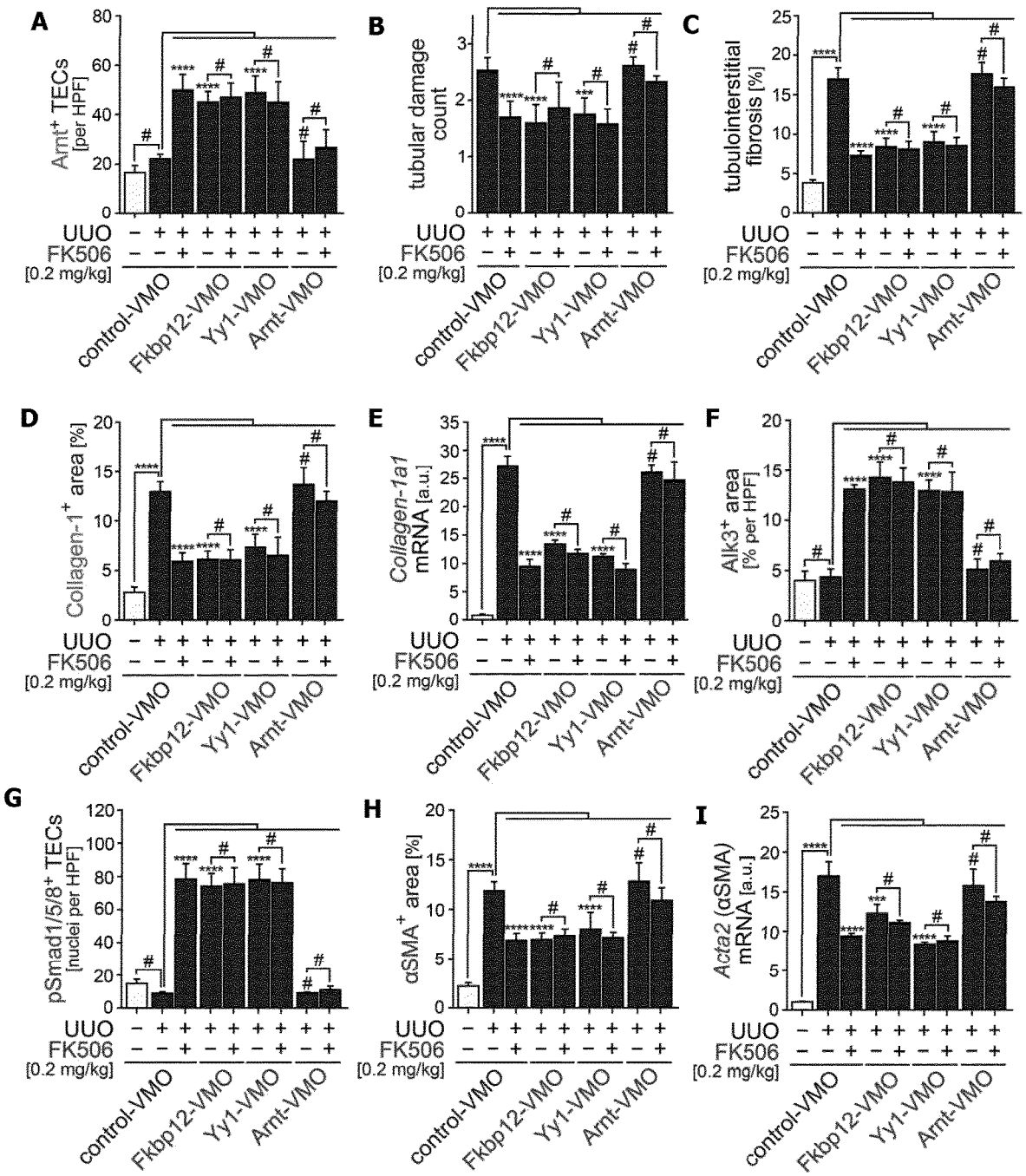
FIG. 41: (A-D) Representative photomicrographs of kidney sections labelled for Arnt (scale bars 25 µm), PAS (scale bars 50 µm), MTS (scale bars 50 µm) and Collagen-1 (scale bars 25 µm) are shown (n=6/group, data are presented as means±s.d., * p<0.001,  p<00001, # no significance, values of p were calculated using one-way ANOVA with Bonferroni post-hoc analysis). (E) Expression levels of Collagen-1a1 was assessed by qRT-PCR (n=3-4/group, data are presented as means±s.d.,  p<0.0001, # no significance, values of p were calculated using one-way ANOVA with Bonferroni post-hoc analysis). (F-H) Representative photomicrographs of kidney sections immunolabelled for Alk3, pSmad1/5/8 or aSMA are analyzed (n=6/group, data are presented as means±s.d.,  p<0.0001, # no significance, values of p were calculated using one-way ANOVA with Bonferroni post-hoc analysis). (I) Expression levels of Acta2 (encoding aSMA) was assessed by qRT-PCR (n=3-4/group, data are presented as means±s.d., * p<0.001, **** p<0.0001, # no significance, values of p were calculated using one-way ANOVA with Bonferroni post-hoc analysis).

Example 2—Selective Modulation of FKBP12/YY1 Signaling Constituents Effectively Modulates Protective ARNT/HIF1β within Chronically Injured Kidneys To elucidate therapeutical implication of the inventors' findings, the inventors next selectively modulated constituents of identified FKBP12/YY1/ARNT signaling axis in mice challenged with UUO by administration of in vivo morpholinos (VMO) targeting translational start sites (FIG. 39 and Table 3) (114, 115). As compared to control-VMO targeting a human R-globin intron mutation (116), administration of VMO targeting FKBP12 (Fkbp12-VMO), YY1 (Yy1-VMO) or ARNT (Arnt-VMO) effectively reduced intrarenal protein levels of their respective transcript (FIG. 40A-D). Administration of Fkbp12-VMO, Yy1-VMO or FK506 equally induced intrarenal ARNT, ALK3 and nuclear pSmad1/5/8 immunostaining, associated with attenuated tubular injury and tubulointerstitial fibrosis (FIG. 41A-I). Administration of FK506 had no additive effects on ALK3 expression, nuclear accumulation of pSmad1/5/8, tubular injury or interstitial fibrosis in cohorts of mice that had also received Fkbp12-VMO or Yy1-VMO (FIG. 41A-I). In addition, administration of Fkbp12-VMO or Yy1-VMO did not further enhance the effect of FK506 on ALK3 expression or reno-protection (FIG. 41A-I), mirroring the effect of genetic YY1 depletion which the inventors had observed in yGT-cre+;Yy1fl/fl conditional knockout mice. In contrast, FK506 failed to induce intrarenal ALK3-dependent BMP signaling responses when intrarenal ARNT induction was depleted (FIG. 41A-I), correlating with failure of FK506 to protect kidneys from tubular injury and progressive fibrotic disease (FIG. 41A-I).

In summary, these studies demonstrate that FKBP12/YY1/ARNT signaling constituents can be effectively targeted with in vivo morpholino approaches to selectively modulate intrarenal ARNT/HIF1β and protective BMP signaling within chronically injured kidneys.

Figure 42:
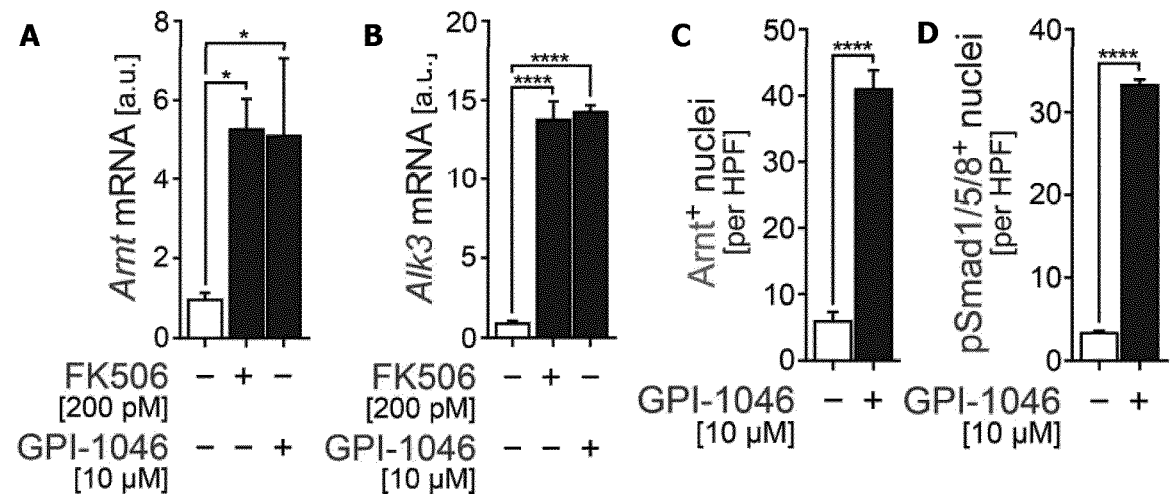
FIG. 42: (A,B) TECs were exposed to DMSO alone (vehicle), DMSO containing FK506 (200 pM) or GPI-1046 (10 µM), relative Arnt and Alk3 mRNA expression levels were analyzed by qRT-PCR (n=3 independent experiments, data are presented as means±s.d., * p<0.05, ** p<0.0001, values of p were calculated using one-way ANOVA with Bonferroni post-hoc analysis). (C,D) Representative photomicrographs of Arnt and phosphorylated Smad1/5/8 complex (pSmad1/5/8) immunostainings overlayed with differential interference contrast (DIC) are analyzed (n=3 independent experiments, data are presented as means±s.d., ** p<0.0001, values of p were calculated using one-way ANOVA with Bonferroni post-hoc analysis).
Figure 43:
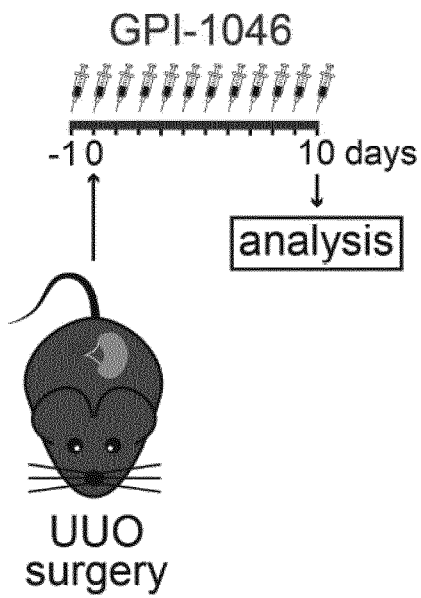
FIG. 43: Mice were challenged with UUO and treated with either vehicle buffer or GPI-1046 (10 mg/kg subcutaneously per day) starting one day prior of surgery.
Figure 44:
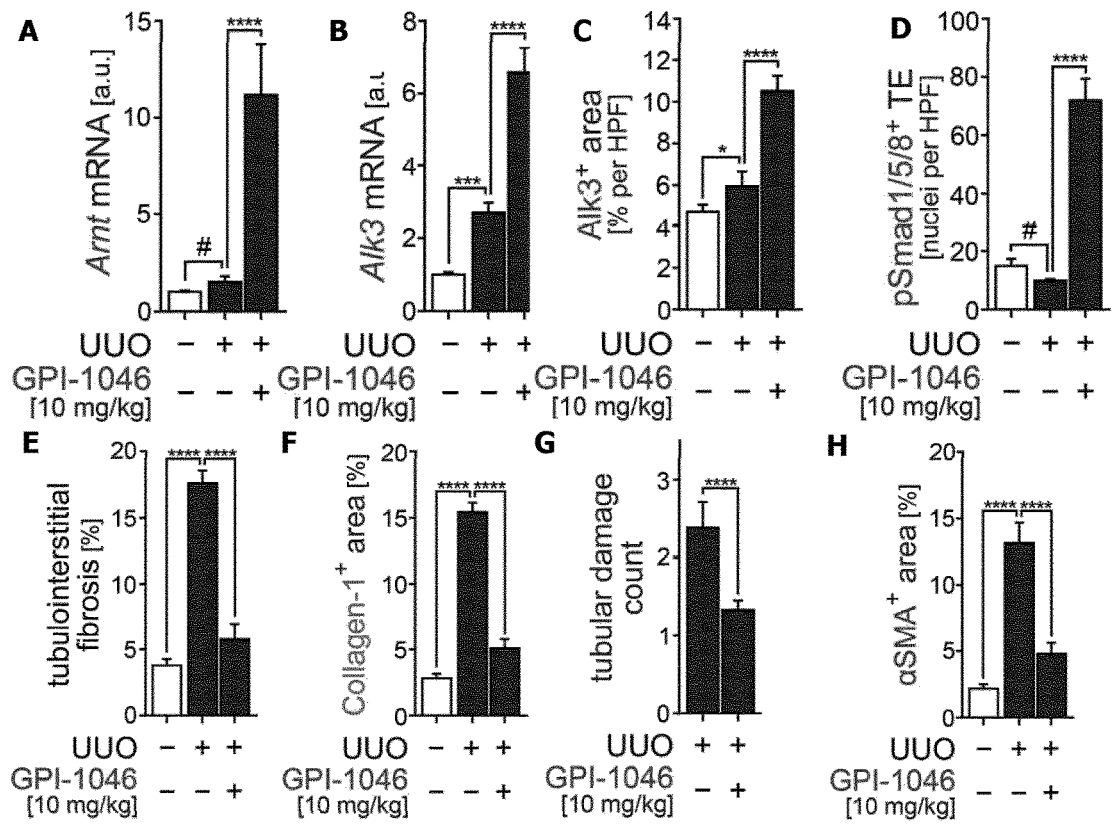
FIG. 44: (A,B) Analyzed by qRT-PCR 10 days after ureteral obstruction, intrarenal Arnt and Alk3 mRNA expression levels are shown (n=4/group, data are presented as means±s.d., * p<0.001, ** p<0.0001, # no significance, values of p were calculated using one-way ANOVA with Bonferroni post-hoc analysis). (C,D) Intrarenal Alk3 (scale bars 25 µm) and pSmad1/5/8 (scale bars 25 µm) were analyzed by immunostaining (n=6/group, data are presented as means±s.d., * p<0.05, ** p<0.0001, # no significance, values of p were calculated using one-way ANOVA with Bonferroni post-hoc analysis). (E,F) The panels show representative photomicrographs of PAS-stained fibrotic kidney sections (scale bars 50 µm) and sections immunolabelled with primary antibodies against Collagen-1 (scale bars 25 µm, n=6/group, data are presented as means±s.d.,  p<0.0001, values of p were calculated using one-way ANOVA with Bonferroni post-hoc analysis). (G,H) Mice were challenged with UUO and treated with either vehicle buffer or GPI-1046 (10 mg/kg subcutaneously per day, respectively) starting one day prior of surgery, representative kidney sections stained for MTS or immunolabelled with aSMA are analyzed (n=6/group, data are presented as means±s.d., ** p<0.0001, values of p were calculated using one-way ANOVA with Bonferroni post-hoc analysis).
Figure 45:
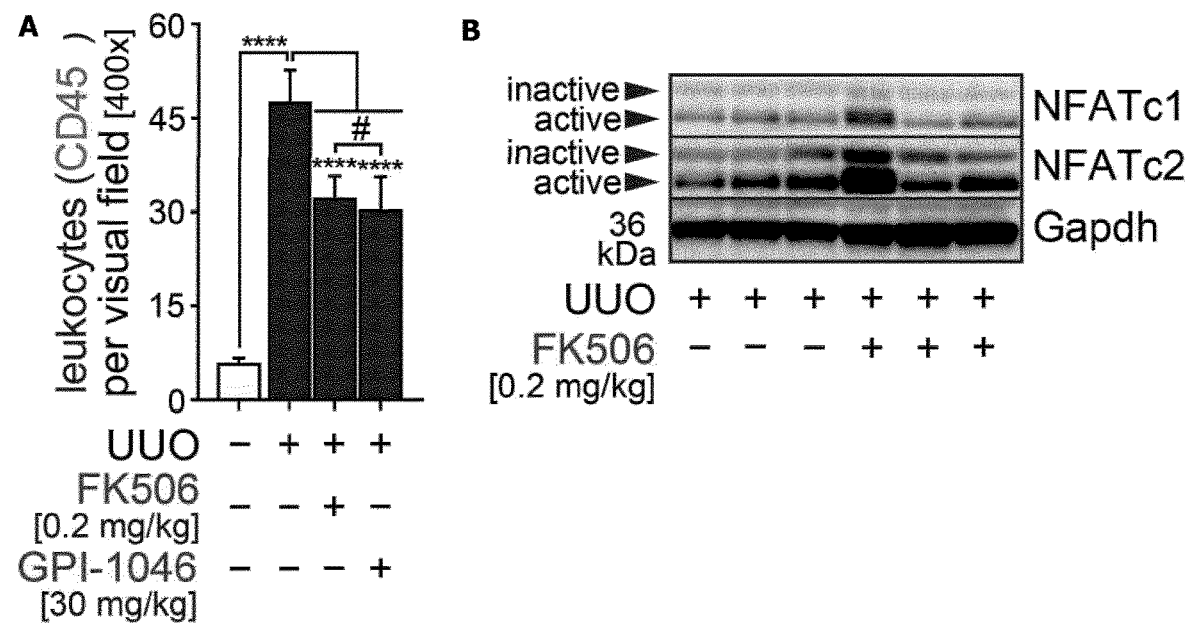
FIG. 45: (A) Mice were challenged with UUO and treated with either vehicle buffer, FK506 (0.2 mg/kg orally per day) or GPI-1046 (30 mg/kg orally per day) starting one day prior of UUO surgery, representative kidney sections immunolabeled with CD45 are analyzed (n=6/group, data are presented as means±s.d., **** p<0.0001, # no significance, values of p were calculated using one-way ANOVA with Bonferroni post-hoc analysis). (B) Intrarenal NFATc1 and NFATc2 were assessed by immunoblotting.
Figure 46:
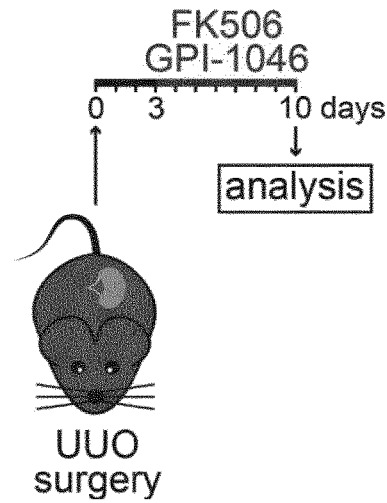
FIG. 46: Mice were challenged with UUO and administered either vehicle buffer or GPI-1046 (30 mg/kg orally per day) starting three days after surgery.
Figure 47:
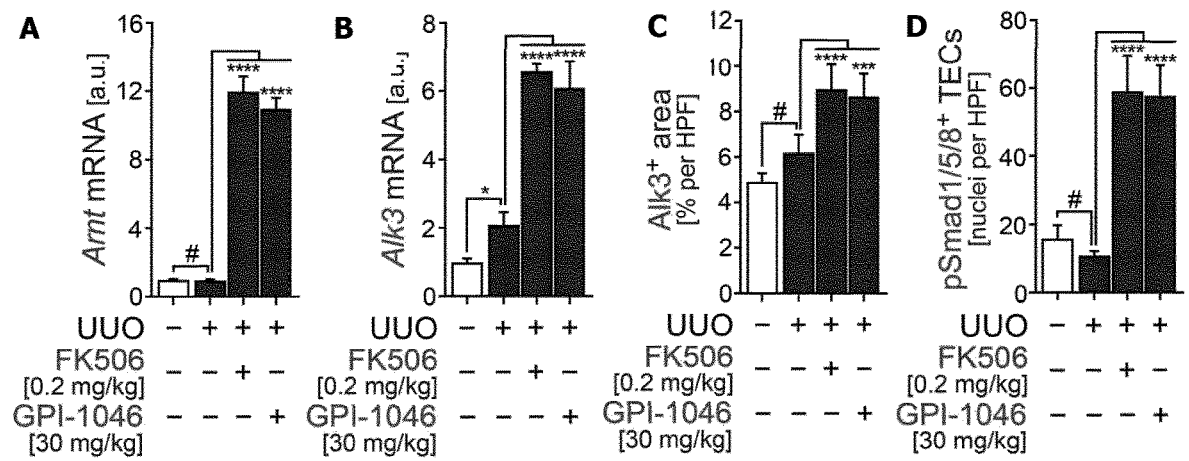
FIG. 47: (A,B) Analyzed by qRT-PCR, intrarenal Arnt and Alk3 mRNA expression levels were assessed (n=4/group, data are presented as means±s.d., * p<0.05, ** p<0.0001, # no significance, values of p were calculated using one-way ANOVA with Bonferroni post-hoc analysis). (C,D) Representative photomicrographs of immunostainings for Alk3 and pSmad1/5/8 are analyzed (n=6/group, data are presented as means±s.d., p<0.01, * p<0.001, ** p<0.0001, # no significance, values of p were calculated using one-way ANOVA with Bonferroni post-hoc analysis).
Figure 48:
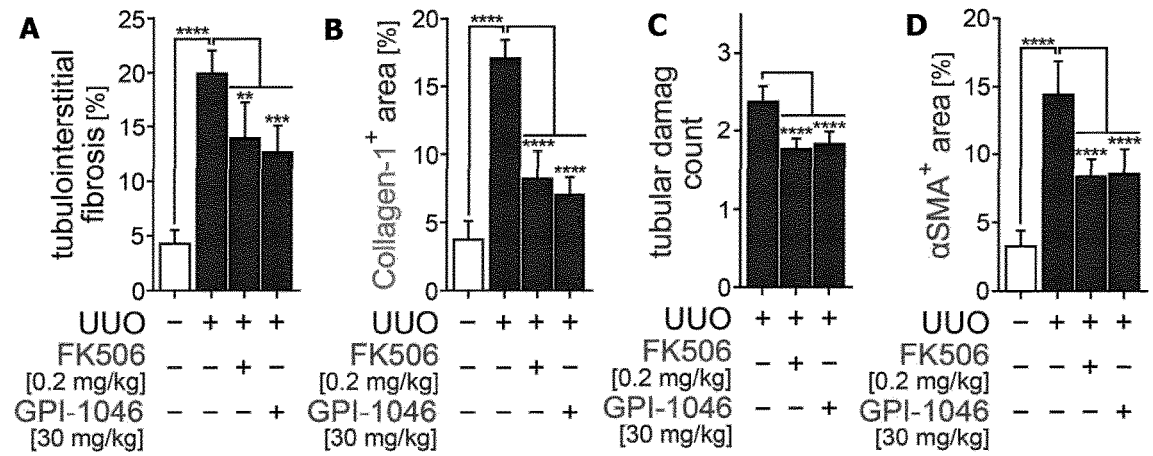
FIG. 48: (A,B) Representative photomicrographs of immunostainings for PAS-stained fibrotic kidney sections and Collagen-1 are analyzed (n=6/group, data are presented as means±s.d., p<0.01, * p<0.001, ** p<0.0001, # no significance, values of p were calculated using one-way ANOVA with Bonferroni post-hoc analysis). (C,D) Mice were challenged with UUO and treated with either vehicle buffer, FK506 (0.2 mg/kg orally per day) or GPI-1046 (30 mg/kg orally per day) starting three days after UUO surgery, representative kidney sections stained for MTS or immunolabelled with aSMA are analyzed (n=6/group, data are presented as means±s.d., ** p<0.0001, values of p were calculated using one-way ANOVA with Bonferroni post-hoc analysis).

Example 3—Selective Targeting of FKBP12 by Non-Immunosuppressive FKBP12 Inhibitor GPI-1046 Effectively Modulates FKBP12/YY1/ARNT Signaling and Protects from Chronic Renal Failure The inventors' studies suggested that observed effect of picomolar FK506 was mediated specifically via its interaction with FKBP12. However, FK506 by no means is specific to FKBP12, suggesting that a more specific drug would be an attractive opportunity (84, 85). Because the inventors' data suggested that picomolar FK506 elicited reno-protective properties independent of calcineurin inhibition, the inventors next explored efficacy of a specific small molecule FKBP12 inhibitor, 3-(3-pyridyl)-1-propyl-(2S)-1-(3,3-dimethyl-1,2-dioxopentyl)-2-pyrrolidinedine carboxylate (GPI-1046), an FK506 derivate without immunosuppressive properties (117), to modulate intrarenal FKBP12/YY1/ARNT/ALK3 signaling and to pre-empt chronic renal injury (118-122). Exposure of cultured TECs to GPI-1046 (10 μM) was equally effective in transcriptional induction of ARNT and ALK3 mRNA expression levels (FIG. 42A,B), associated with activation of canonical BMP signaling responses (FIG. 42C,D). Based on the inventors' previous regimen, the inventors next administered GPI-1046 (10 mg/kg subcutaneously per day) one day prior to UUO challenge (FIG. 43) (118-122). As compared to FK506, non-immunosuppressive GPI-1046 equally induced intrarenal ARNT and ALK3 transcription, BMP signaling responses and protected from tubular injury and renal fibrogenesis (FIG. 44A-H), further supporting that specifically inhibition of immunophilin FKBP12 is involved in modulating intrarenal ARNT/ALK3 signaling and protection from injury independent of calcineurin modulation or immunosuppressive properties and in line with previous reports (29, 117). This is further confirmed by uniform immune cell infiltration in cohorts of mice administered either picomolar FK506 or nonimmunosuppressive GPI-1046 (FIG. 45A), not affecting intrarenal NFAT signaling (FIG. 45B). Upon establishing that the known protective effectiveness of picomolar FK506 is mediated by induction of an FKBP12/YY1/ARNT/ALK3 signaling axis which subsequently induced canonical BMP signaling, and upon establishing that this protective mechanism can be specifically induced by the FKBP12 inhibitor GPI 1046, the inventors next aimed to test if administration of GPI-1046 was also effective to attenuate chronic kidney disease progression when administration is initiated after manifestation of kidney injury. For this reason, the inventors next administered FK506 or GPI-1046 three days after challenging with UUO (FIG. 46). Because previous studies established that GPI-1046 also provides oral bioavailability (118, 119), the inventors administered FK506 or GPI-1046 orally for better comparison (0.2 mg/kg or 30 mg/kg orally per day, respectively). Both, FK506 and small molecule FKBP12 inhibitor GPI-1046 were equally effective in inducing intrarenal ARNT and ALK3 transcription (FIG. 47A,B), associated with enhanced canonical BMP signaling responses (FIG. 47C,D). Activation of intrarenal BMP signaling responses attenuated tubular injury and renal fibrogenesis (48A-D).

In summary, the present studies revealed that interventional induction of an FKBP12/YY1/ARNT/ALK3 signaling axis after manifestation of kidney lesions is still beneficial. The studies further demonstrate that an FKBP12/YY1/ARNT/ALK3 signaling axis can be either induced by picomolar FK506, but also by oral administration of the specific FKBP12 inhibitor GPI-1046.

Figure 49:
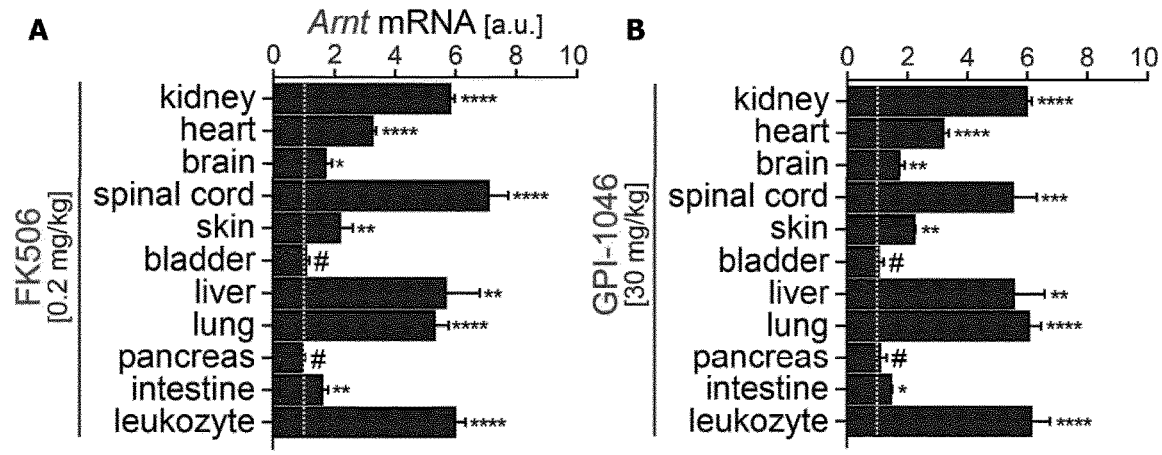
FIG. 49: (A) Analyzed by qRT-PCR, Arnt mRNA expression levels are shown in response to FK506 (0.2 mg/kg orally per day) or GPI-1046 (30 mg/kg orally per day, n=3/group, data are presented as means±s.d., * p<0.05,  p<0.01, ** p<0.0001, # no significance, values of p were calculated using oneway ANOVA with Bonferroni post-hoc analysis in comparison to vehicle-treated control mice).
Figure 50:
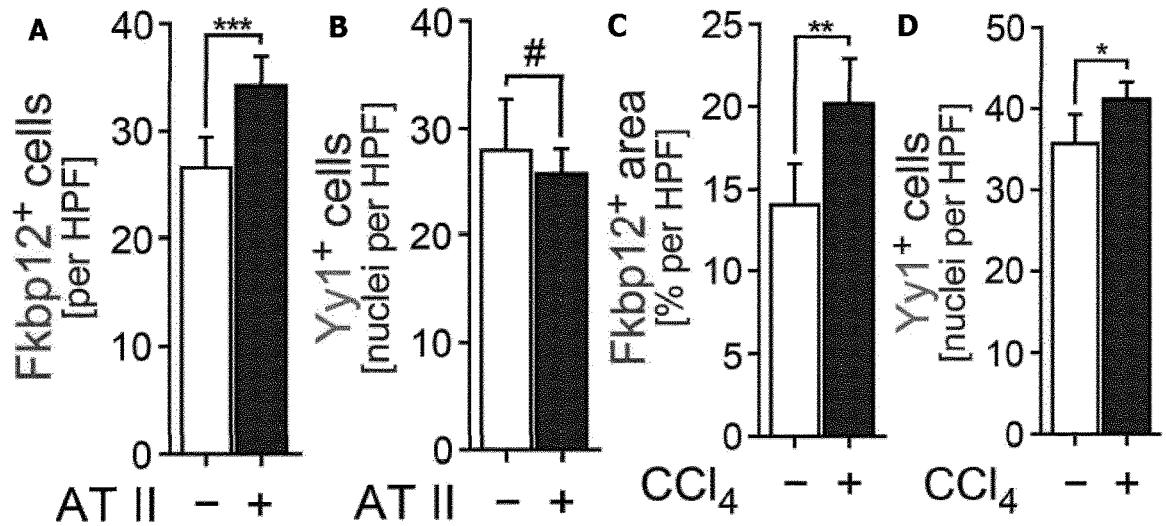
FIG. 50: (A-D) Abundance of Fkbp12 and Yy1 was analyzed by immunostaining (scale bars 25 μm) in AT II-induced cardiomyopathy and CCl4-mediated liver injury (n=5-7/group, data are presented as means±s.d., * p<0.05,  p<0.01, * p<0.001, # no significance, values of p were calculated using Student's t test).
Figure 51:
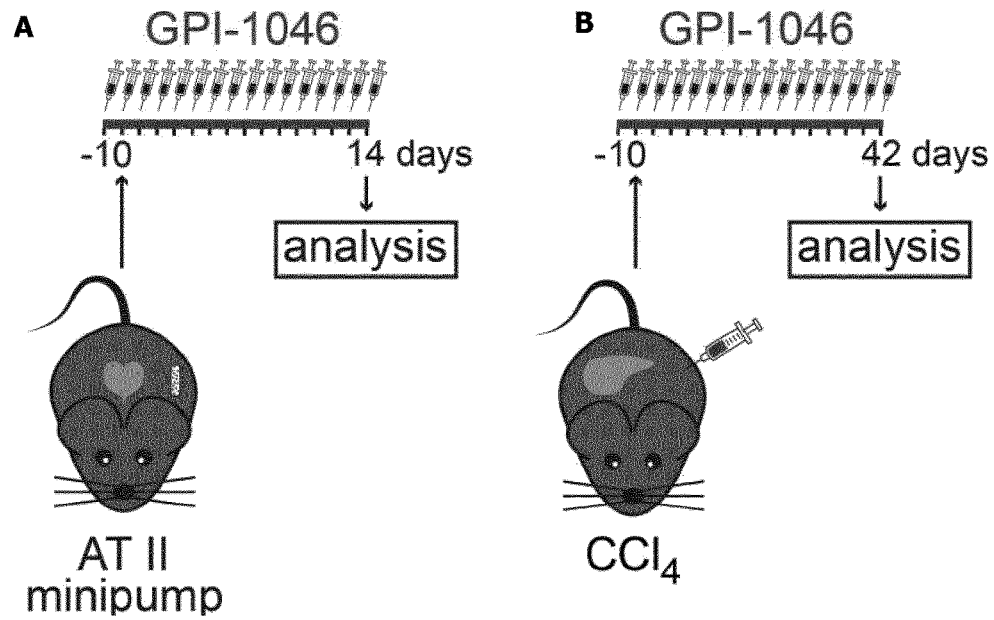
FIG. 51: (A,B) Mice were challenged with AT II delivered by osmotic minipumps or intraperitoneal injections of CCl4, vehicle buffer or GPI-1046 (10 mg/kg subcutaneously per day) were administered starting one day prior.
Figure 52:
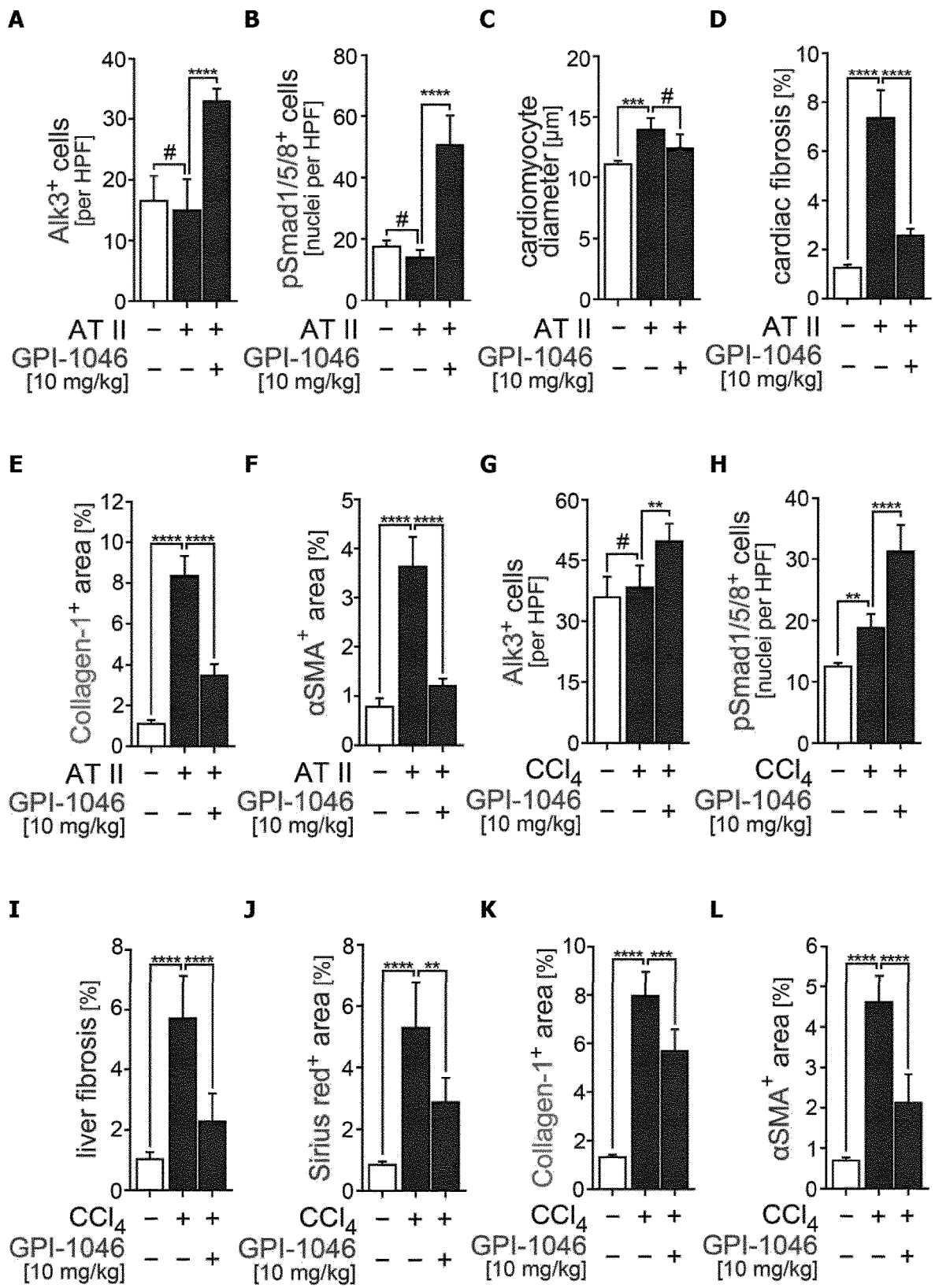
FIG. 52: (A-F) Representative photomicrographs of immunostainings for Alk3, pSmad1/5/8, PAS-stained fibrotic kidney sections, MTS, Collagen-1 and aSMA in mice challenged with AT II are analyzed (n=6/group, data are presented as means±s.d., * p<0.001,  p<0.0001, # no significance, values of p were calculated using one-way ANOVA with Bonferroni post-hoc analysis). (G-L) Representative photomicrographs of immunostainings for Alk3, pSmad1/5/8, MTS-stained fibrotic kidney sections, Sirius red, Collagen-1 and aSMA in mice challenged with CCl4 are analyzed (n=5-7/group, data are presented as means±s.d.,  p<0.01, * p<0.001,  p<0.0001, # no significance, values of p were calculated using one-way ANOVA with Bonferroni post-hoc analysis). (M,N) Mice were treated with GPI-1046 (10 mg/kg subcutaneously per day) and challenged with AT II, Arnt and Alk3 mRNA expression levels in total hearts (n=4/group, data are presented as means±s.d.,  p<0.0001, # no significance, values of p were calculated using one-way ANOVA with Bonferroni post-hoc analysis). (0-R) Systolic, diastolic, mean arterial pressure (MAP) and heart rate beats per minute (BPM) of mice treated with GPI-1046 (10 mg/kg subcutaneously per day) and challenged with AT II are shown (n=6/group, data are presented as aligned dot plots with means±s.d.,  p<0.0001, # no significance, values of p were calculated using one-way ANOVA with Bonferroni post-hoc analysis comparing indicated pairs of columns). (S,T) Measurements of aspartate and alanine aminotransferases in mice challenged with CCl4 are shown (n=5-6/group, data are presented as aligned dot plots with means±s.d., ** p<0.0001, values of p were calculated using one-way ANOVA with Bonferroni post-hoc analysis).
Figure 52:
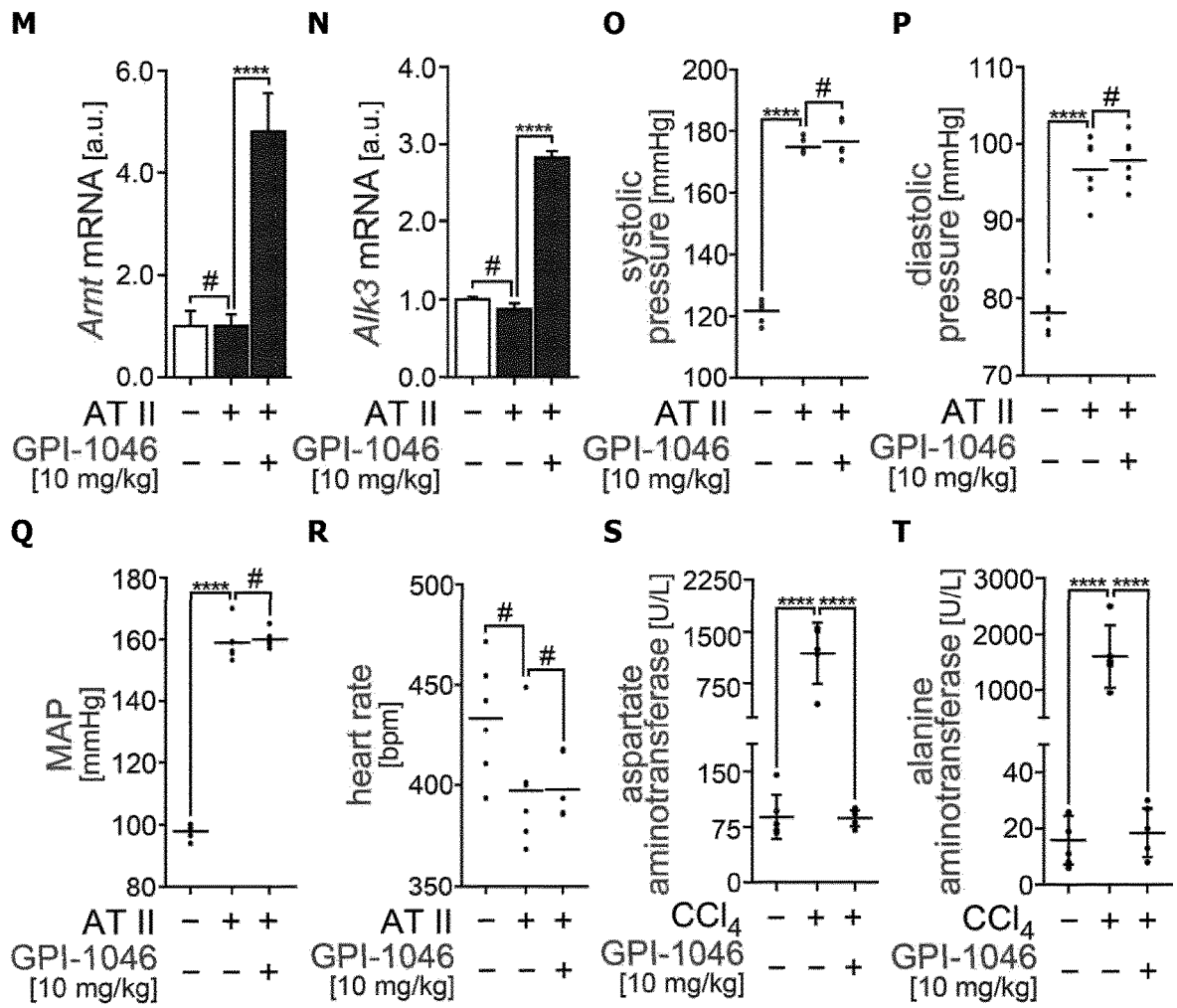

Example 4—Pharmacological Modulation of an FKBP12/YY1/ARNT/ALK3 Signaling Axis Protects from Chronic Injury in the Heart and Liver Because effectiveness of FK506 had been documented in various parenchymal organs (18-35), the inventors finally aimed to explore whether identified FKBP12/Y1/ARNT/ALK3 signaling axis could be equally targeted in organs other than the kidney. For this reason the inventors next analyzed ARNT mRNA expression levels in the kidney, heart, brain, spinal cord, skin, bladder, liver, lung, pancreas and intestine harvested from mice administered FK506 or GPI-1046 (0.2 mg/kg or 30 mg/kg orally per day, respectively). In response to FK506 and GPI-1046, transcriptional ARNT induction was present in the kidney (confirming previous results), but also in the heart, brain, spinal cord, skin, liver, lung and intestine (FIG. 49). Based on robust ARNT induction observed in the heart and liver in response to FK506 and GPI-1046, previous reports that chronic heart failure and liver fibrosis is equally associated with loss of ALK3-dependent BMP signaling responses (61-63), and based on previous studies which reported that FK506 protects from cardiac and hepatic injury and fibrosis (23-26), the inventors next hypothesized that small molecule FKBP12 inhibitor GPI-1046 could equally induce ALK3-dependent BMP signaling responses and protect fibrogenesis in models of chronic cardiac and hepatic injuries. Therefore, the inventors next analyzed presence of an FKBP12/YY1/ARNT/ALK3 signaling axis in rodent models of cardiac fibrosis after continuous minipump delivery of angiotensin II (AT II) and carbon tetrachloride (CCl4)-induced liver failure (63, 123). FKBP12 and YY1 (FIG. 50A-D) were detectable in chronically injured hearts and livers, suggesting that repressive FKBP12/YY1 complexes were equally present. To elucidate if identified FKBP12/YY1/ARNT/ALK3 signaling axis could be equally targeted to protect from chronic heart and liver failure and fibrosis, the inventors next administered GPI-1046 (10 mg/kg subcutaneously per day) one day prior to administration of AT II (FIG. 51A) or CCL4 (FIG. 51B). GPI-1046 was equally effective in induction of activation of ALK3-dependent canonical BMP signaling responses and protection from fibrogenesis in both organ systems (FIG. 52A-T), in line with a substantial body of literature demonstrating that induction of canonical BMP signaling responses mediates anti-fibrotic and pro-regenerative capacity in cardiac and hepatic pathologies (58-63).

In summary, small molecule FKBP12 inhibitor GPI-1046 equally induced intrarenal ARNT/ALK3 and downstream canonical BMP signaling responses, associated with protection from chronic organ failure. Furthermore, an FKBP12/YY1/ARNT/ALK3 signaling axis is also present in the heart and liver, and can be therapeutically targeted with small molecule FKBP12 inhibitor GPI-1046. Because FK506 impacts additional pathways (124-126), direct targeting of FKBP12 with small molecule inhibitors including GPI-1046 may have beneficial effects with regard of organ protection.

Figure 53:
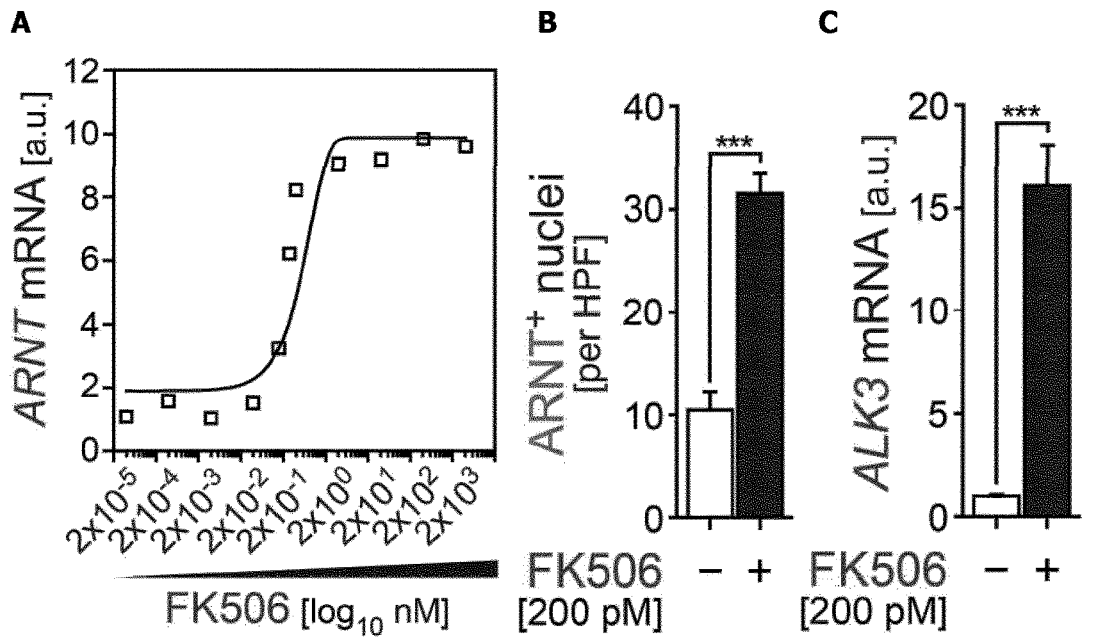
FIG. 53: (A) Human TEC cultures were exposed to DMSO alone (vehicle) or DMSO containing indicated concentrations of FK506, ALK3 mRNA expression was analyzed by qRT-PCR (n=3 independent experiments). (B) Human TEC cultures were exposed to DMSO alone (vehicle) or DMSO containing FK506 (200 pM), representative photomicrographs of Arnt immunostainings overlayed with differential interference contrast (DIC) are analyzed (n=3 independent experiments, data are presented as means±s.d., * p<0.001, values of p were calculated using Student's t test). (C) Analyzed by qRT-PCR, ALK3 mRNA expression levels are shown (n=3 independent experiments, data are presented as means±s.d., * p<0.001, values of p were calculated using Student's t test). (D) Analyzed by SDS-PAGE and subsequent immunoblotting, ALK3 was assessed in response to FK506. (E) Representative photomicrographs of phosphorylated Smad1/5/8 complex (pSmad1/5/8) immunostainings overlayed with differential interference contrast (DIC) are analyzed (n=3 independent experiments, data are presented as means±s.d., ** p<0.01, values of p were calculated using Student's t test).
Figure 53:
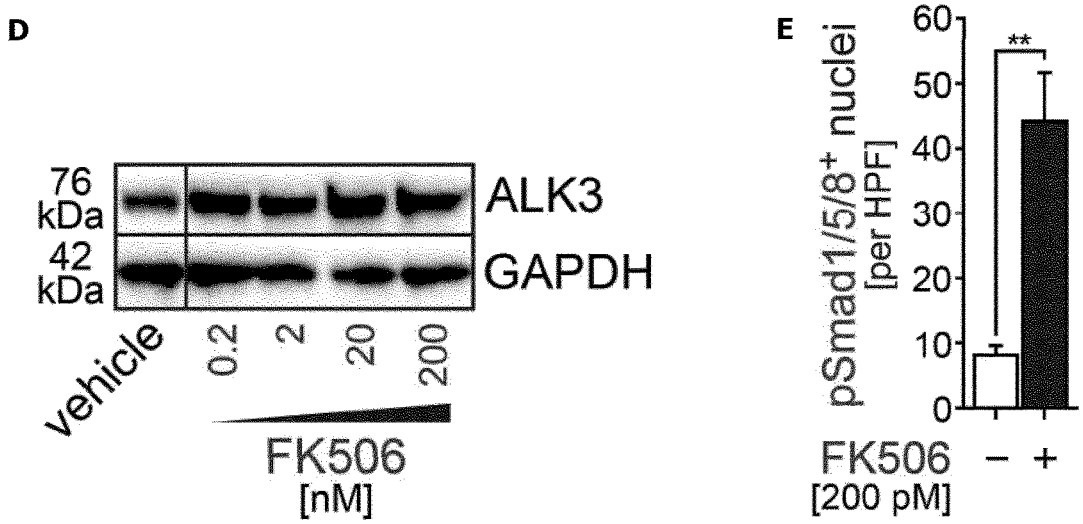
Figure 54:
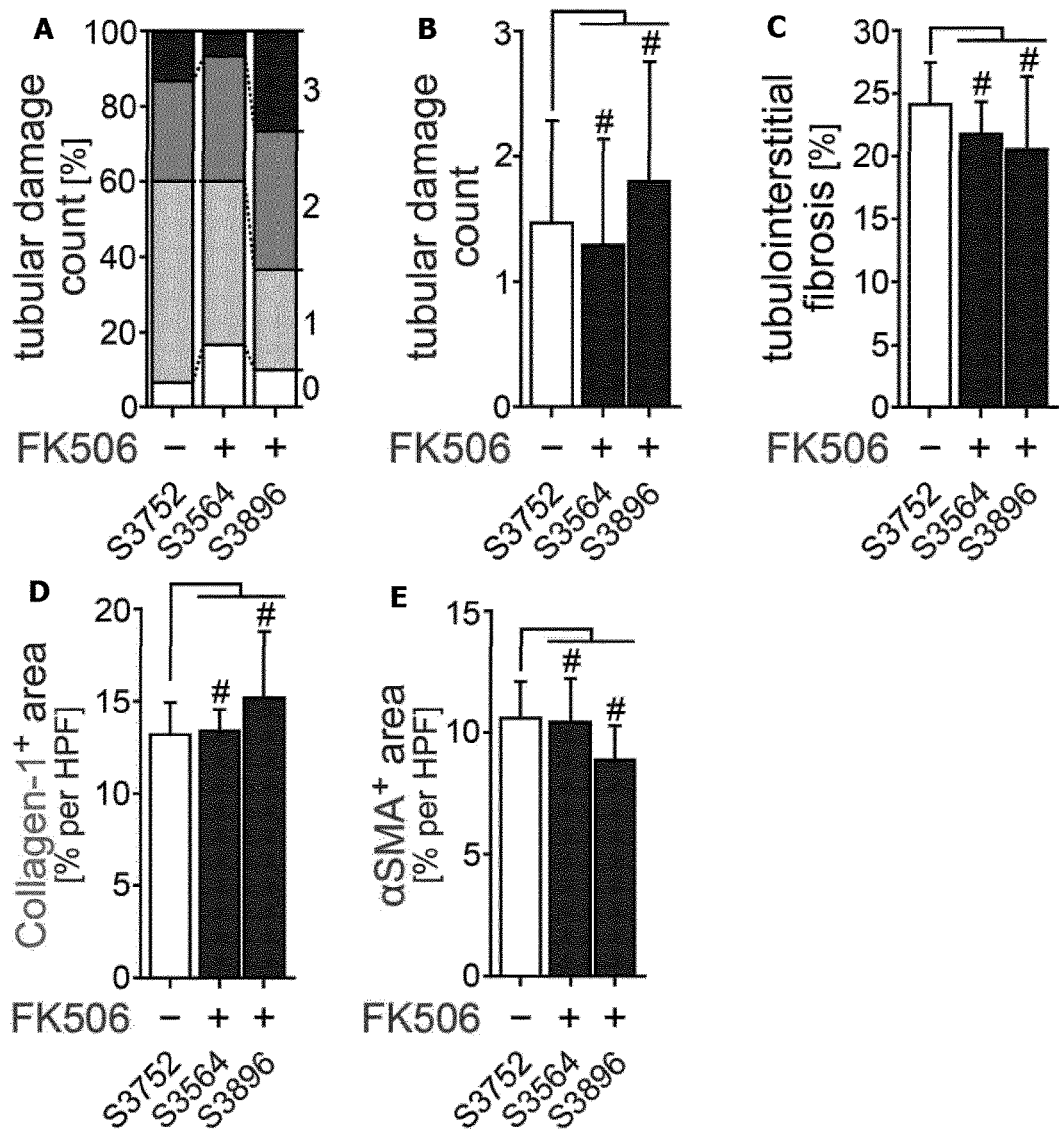
FIG. 54: (A-E) In a small cohort of kidney transplant recipients with comparable histological patterns and immunosuppressive regimens including either CsA or FK506, representative photomicrographs of kidney sections stained for PAS, MTS, immunolabelled for Collagen-1 or aSMA are analyzed (measurements were done in 10 visual fields, data are presented as means±s.d., # no significance, values of p were calculated using one-way ANOVA with Bonferroni post-hoc analysis).
Figure 55:
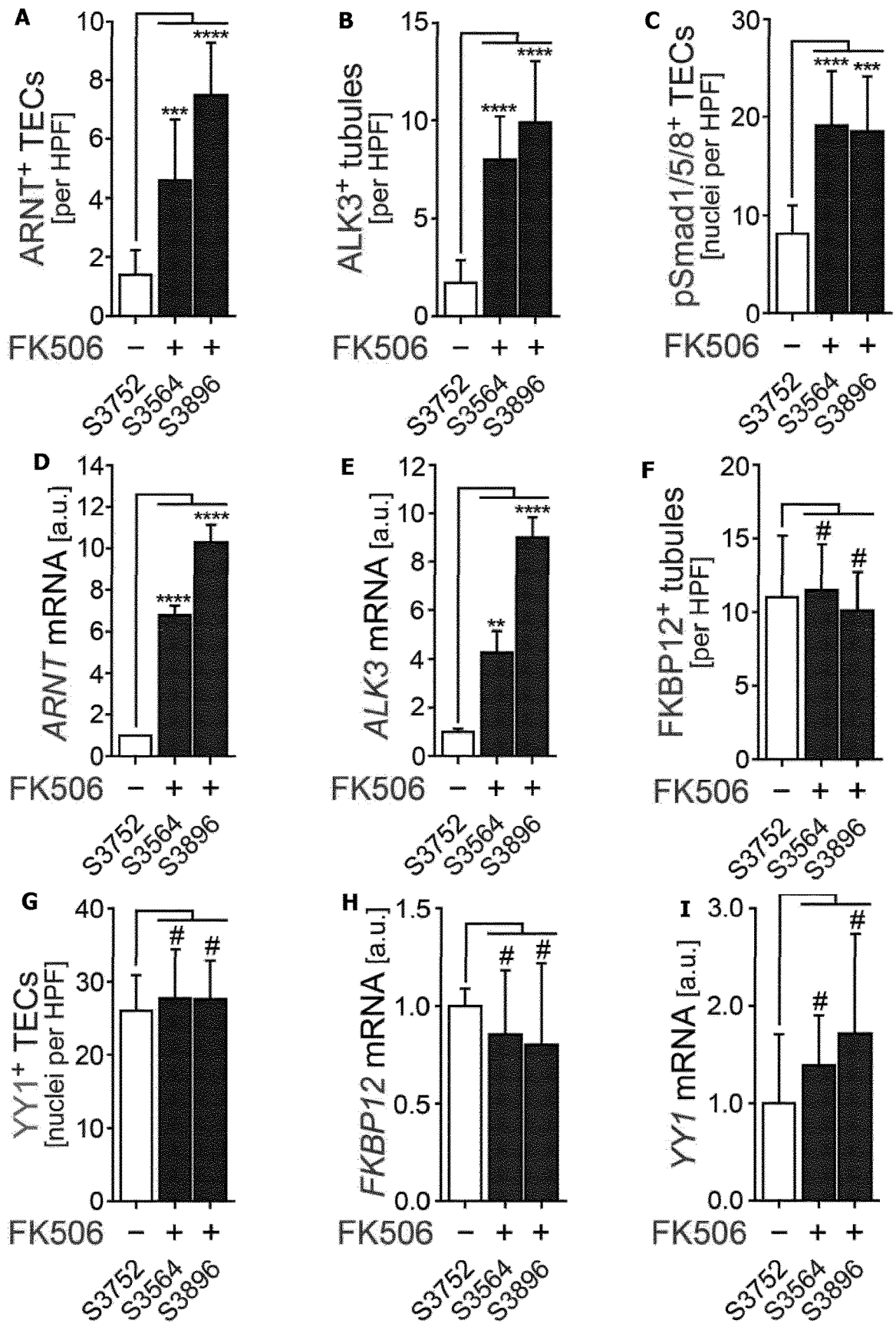
FIG. 55: (A-I) In a small cohort of kidney transplant recipients with comparable histological patterns and immunosuppressive regimens including either CsA or FK506, kidney sections immunolabelled with primary antibodies against ARNT, ALK3, pSmad1/5/8, FKBP12 and YY1 are shown, mRNA expression levels were assessed by qRT-PCR (measurements were done in 10 visual fields for immunostainings and in technical triplicates for qRT-PCR, data are presented as means±s.d.,  p<0.01, * p<0.001, **** p<0.0001, # no significance, values of p were calculated using one-way ANOVA with Bonferroni post-hoc analysis).

Example 5—Evidence for Presence of FKBP12 and YY1 in Human Pathologies and its Modulation with Subsequent ARNT/ALK3 Induction by FK506 in Kidney Allografts With regard of translational implications of the inventors' findings, the inventors next aimed to gain insights into presence of FKBP12/YY1 among different human pathologies: diabetic nephropathy (ID #S3060), hypertensive nephrosclerosis (ID #S3170), FSGS (ID #S3584), autoimmune hepatitis (ID #P11150/17), liver fibrosis (ID #P9446/17), liver cirrhosis (ID #P14203/17), and lung fibrosis (ID #7183/17). FKBP12 and YY1 were equally detectable in various human diseases including injured kidneys (diabetic nephropathy, hypertensive nephrosclerosis, focal-segmental glomerulosclerosis/FSGS), hearts (myocardial infarction, aortic valve stenosis, diabetic cardiomyopathy), livers (autoimmune hepatitis, liver fibrosis, liver cirrhosis) and lungs (lung fibrosis) as prerequisite of identified organ protection mediated by FK506 or GPI-1046. To elucidate whether modulation of an FKBP12/YY1/ARNT/ALK3 signaling axis was not only limited to mice but similarly effective in humans, the inventors next exposed human proximal tubular epithelial cells (HK2 cells) to FK506 and analyzed efficacy to induce ARNT and ALK3-dependent BMP signaling responses. Exposure of human TEC cultures to previous established picomolar FK506 equally induced ARNT and ALK3 transcription (FIG. 53A-C), associated with nuclear accumulation of pSmad1/5/8 (FIG. 53D,E), indicating that FK506 also induces ARNT and ALK3-dependent canonical BMP signaling responses in human TECs. Because FK506 has been in clinical use for decades to prevent rejection of kidney transplants, raising the question of induction of the FKBP12/YY1/ARNT/ALK3 signaling axis within allografts of patients on FK506 containing immunosuppressive regimen. Because FK506 is used at high immunosuppressive doses (with well established adverse toxicity likely masking beneficial effects) and not at low doses at which the inventors observed optimal reno-protection in rodents, the inventors focused in the inventors' analysis on the induction of ARNT expression and subsequent ALK3-mediated BMP signaling responses. For this reason, the inventors analyzed kidney allograft biopsies matched for comparable kidney function, chronic tubular injury and extent of interstitial fibrosis from patients that had either received immunosuppressive regimens based on FK506 (acting via FKBP12) or CsA (acting via cyclophilin, FIG. 54A-E and Table 6). When biopsies were normalized for fibrosis and tubular injury, immunolabelling of ARNT, ALK3 and pSmad1/5/8 were significantly increased in kidney biopsies of patients on an FK506-based immunosuppressive regimen as compared to CsA (FIG. 55A-C). Transcriptional induction of intrarenal ARNT and ALK3 was confirmed by analysis of mRNA expression levels (FIG. 55D,E). Immunolabelling further confirmed presence of FKBP12 and YY1 in all allografts is (FIG. 55 F-I), confirming presence of FKBP12/YY1 within chronically injured kidneys and in line with the inventors' observation in cultured TECs and mice.

In summary, retrospective analysis of renal allografts revealed presence of all constituents involved in identified FKBP12/YY1/ARNT signaling pathway, even though potential beneficial effects are likely masked by CNI toxicity at the immunosuppressive doses that were used. The inventors' analysis also provided evidence for enhanced ALK3 transcription by FK506, and that such increased ALK3 expression correlates with increased ARNT levels.

DISCUSSION

Figure 56:
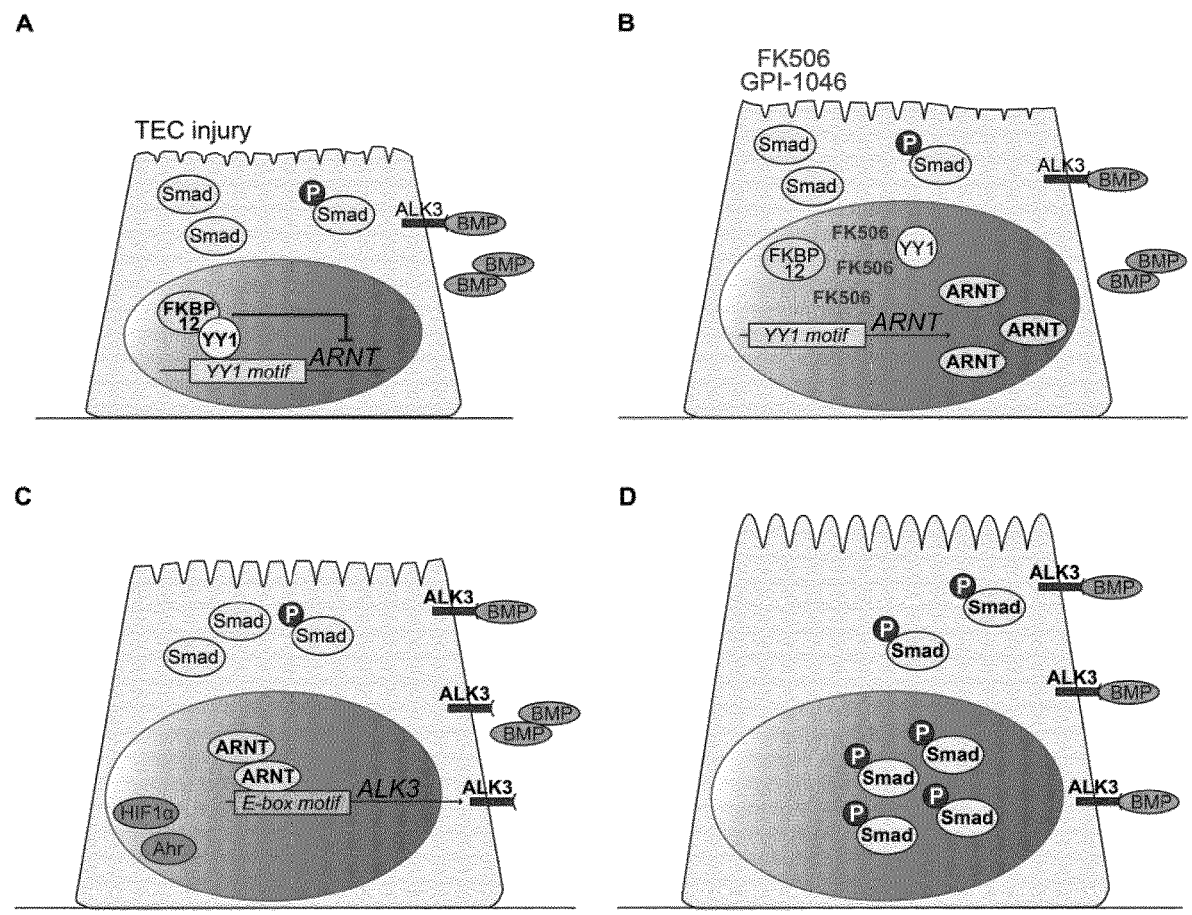
FIG. 56: (A) In injured TECs, FKBP12/YY1 complexes repress ARNT (B) FK506 or GPI-1046 disrupt FKBP12/YY1 interaction, in turn associated with release from transcriptional repression of ARNT (C) ARNT subsequently mediates transcriptional ALK3 induction independent of HIF1α or AHR. (D) Transcriptional ALK3 induction is associated with activation of canonical BMP signaling responses reflected by nuclear translocation of phosphorylated Smad1/5/8.

Progression of CKD is still an unmet biomedical challenge, because once chronic lesions have manifested, no effective therapies are available as of yet for clinical use. Prompted by various studies across multiple organs which demonstrated that FK506 effectively protects various organ systems (18-35), the inventors here aimed to gain insights into the molecular mechanisms underlying successful protection, and to explore whether such pathways could be utilized to inhibit progression of already established chronic kidney injury. The inventors provide evidence that FK506 protects from injury by transcriptional induction of type I BMP receptor ALK3, in line with previous studies demonstrating that low-dose FK506 is capable to induce transcriptional activation and signaling of type I BMP receptors (29, 48-52). The Inventors identified a novel protective mechanism that is controlled by the transcription factor ARNT/HIF1, which effectively inhibits progression of chronic kidney injury by transcriptional ALK3 induction, the principal mediator of anti-fibrotic and pro-regenerative BMP signaling responses. The inventors further report that ARNT expression itself is controlled by the FKBP12/YY1 transcriptional repressor complex (FIG. 56A), and that disruption of such FKBP12/YY1 complexes by picomolar FK506 at sub-immunosuppressive doses, small molecule FKBP12 inhibitor GPI-1046, or by direct targeting of FKBP12/YY1 using in vivo-morpholinos increases ARNT (FIG. 56B). Subsequent activation of ALK3-dependent canonical BMP signaling responses by ARNT homodimer formation (independent of HIF1α or AHR) attenuates chronic organ failure in models of chronic kidney, cardiac and liver injuries (FIG. 56C,D).

To the inventors' knowledge, this is the first report linking FKBP12/YY1 repressor complexes to ARNT transcription and subsequent canonical BMP signaling activation, suggesting FKBP12/YY1 interaction and ARNT as novel therapeutic targets. Furthermore, this is the first report linking FK506 to disruption of FKBP12/YY1 repressor complexes, providing novel mechanistic insights into the protective activity of FK506. This newly identified FKBP12/YY1/ARNT/ALK3 signaling axis is supported by mining of public expression profiling databases in various organs: in context of the kidney, an inverse correlation between intrarenal ALK3 expression and FKBP12/YY1 is confirmed by several array datasets performed in different renal pathologies (accession numbers GSE69438 and GSE66494) (127, 128), and independently confirmed in cohorts of IgA nephropathy (accession number GSE35487) (129), diabetic kidney disease (accession numbers GSE30566 and GSE21785) (130, 131), allograft nephropathy (accession number GSE1563) (132), and microdissected renal tubules from diseased kidneys (accession number GSE48944) (133). A link between FK506 treatment, disruption of FKBP12/YY1 repressor complexes, ARNT and ALK3 is further confirmed by observations that immunosuppressive regimens including FK506 were associated with enhanced intrarenal ARNT and ALK3 transcription when compared to alternative CsA (accession number GSE1563) (132). Hence, identification of the FKBP12/YY1/ARNT/ALK3 signaling axis causally connects two lines of research to protect parenchymal tissues: Several independent studies highlighted efficacy of low-dose FK506 administration to protect against acute experimental injuries including the kidney (19-22), heart (23-25) and liver (26-28), albeit underlying mechanisms were poorly understood. On the other hand, several preclinical studies established beneficial effects of ALK3-mediated BMP signaling in various organs including the kidney (53-57), heart (58-61) and liver (62, 63), and the small molecule ALK3 agonist THR-184 has recently completed successful clinical testing to circumvent acute kidney injury and progressive kidney disease (ClinicalTrials.gov identifier NCT01830920) (53).

At the mechanistic level, the inventors' observation that interaction with FKBP12 turns YY1 into a transcriptional repressor of ALK3, whereas disruption of such interaction voided such repressive activity, is supported by recent findings of FKBP12 enrichment in injured kidneys (134-136), that FKBP12 and YY1 have been described as robust repressors of canonical BMP signaling responses (137, 138), and that interaction of YY1 with specific adaptor proteins (including FKBP12) determines efficacy of transcriptional regulation in a gene context-dependent manner (86-90, 93-95). Transcriptome array datasets performed in HeLa cells confirmed transcriptional ARNT induction when YY1 was depleted (accession number GSE14964) (139). This is supported by publicly available ChIP sequencing array datasets for YY1 target loci (YY1TargetDB) revealing direct binding of YY1 repressor to the ARNT proximal promoter (140). Observed negative correlation between ARNT and FKBP12/YY1 is not limited to the kidney, array datasets from various human tissues identified strongest correlation between ARNT and YY1 compared to other transcriptional factors with known binding sites within the ARNT proximal promoter and confirmed inverse correlation in addition to FKBP12 (accession number GSE3526) (141). When clustered for distinct organ systems, inverse correlation between ARNT and FKBP12/YY1 was primarily detectable in renal, cardiovascular and digestive tissues (confirming the inventors' findings), but also in central nervous systems (accession number GSE3526, Table 7) (141). In this context, previous reports implicate that activation of an YY1 signaling axis is detectable in renal, cardiac, hepatic and pulmonary pathologies, and YY1 depletion protects from chronic organ failure (142-146). The inventors' studies do not preclude the possibility of YY1 effects independent of FKBP12 since YY1 has been shown to mediate fibrosis in the lung, in part through binding to Collagen and αSMA promoters (142). Nevertheless, modulation of newly identified FKBP12/YY1/ARNT signaling axis and associated induction of ALK3-dependent canonical BMP signaling responses may be a promising target in chronic failure of multiple organ systems. In this regard, low-dose FK506 has already entered clinical testing (ClinicalTrials.gov identifier NCT01647945) and shown promise in pulmonary arterial hypertension patients to induce protective BMP signaling responses (147). This is in line with a substantial body of literature demonstrating that induction of BMP signaling mediates antifibrotic and pro-regenerative capacity in various organs including kidney (53-57), heart (58-61), liver (62, 63), lung (64, 65), brain (66, 67), and intestine (68).

To the inventors' knowledge, this is the first report of a causal contribution of dynamic ARNT expression to protection of the kidney or of any other parenchymal organ. In line with reports that ARNT enables proliferation and survival (148, 149), an array-based approach has recently linked loss of ARNT in TECs to accelerated susceptibility towards kidney injury (150). These observations were independently observed in cardiac pathologies (151), further supporting a protective and pro-regenerative role of ARNT. The inventors' data suggests that ARNT homodimerizes to elicit its function to induce ALK3 transcription. ARNT is a member of the PAS domain family predominantly known to heterodimerize with other PAS family members to for heterodimeric transcription factors, classically with an a subunit of HIF or the dioxin receptor AHR to mediate hypoxia or xenobiotic responses by targeting genomic E-box motifs (99-110). In contrast to ARNT heterodimers, the biological role of ARNT homodimers is less known. Current models suggest that E-box motifs contain two half-sites, with each partner's basic region determining half-site specificity and binding properties, and recent studies established that the palindromic E-box motif CACGTG is the critical binding site specific for ARNT homodimers (in contrast to asymmetric E-box motifs in hypoxic/xenobiotic response elements) (111, 112). As ARNT in context of hypoxia or xenobiotic signaling is usually not rate-limiting as it is present in relative excess and physiological changes in protein levels are not significantly affected by hypoxia or xenobiotic responses, the inventors' studies suggest that the fate decision of homodimerization over heterodimerization is in part regulated by endogenous ARNT levels and critical for regulation of FKBP12/YY1/ARNT transcriptional responses. As ARNT homodimerization potentially provides another therapeutic target, additional research is warranted to explore the underlying mechanisms. Observed beneficial efficacy of FK506 was counter-intuitive at first sight, because decades of use as immunosuppressant upon kidney transplantation had revealed its calcineurin inhibitor nephrotoxicity, thereby limiting its clinical use (38, 39). However, the inventors' studies established that FK506-induced organ protection is independent of calcineurin inhibition, and that FKBP12/YY1/ARNT/ALK3 signaling is achieved at picomolar doses which are far below the nanomolar immunosuppressive regimens. Hence, the inventors provide mechanistic evidence for why protective activity of FK506 in interventional therapeutic regimens has remained elusive thus far. Efficacy of the specific FKBP12 inhibitor GPI-1046 to protect and attenuate disease progression in kidney, heart and is liver by induction of FKBP12/YY1/ARNT/ALK3 signaling validated observed efficacy of FK506, and also provides a more specific tool from a translational perspective.

In summary, this newly identified FKBP12/YY1/ARNT/ALK3 signaling axis and its modulation by FK506 or small molecule FKBP12 inhibitor GPI-1046 is supported by various transcriptome array datasets across numerous organs. Finally, the inventors' data demonstrate that low-dose FK506, which has been found to effectively ameliorate acute multiple organ failure (18), independently confirmed in various organs including kidney (19-22), heart (23-25), liver (26-28), lung (18, 29), brain (30, 31), spinal cord (32, 33), skin (34), and intestine (35), is also effective in protection from chronic organ failure. The inventors are aware that FK506 impacts additional pathways (124-126), and thus it is attractive to speculate that direct targeting of FKBP12/YY1 with in vivo-morpholino approaches or small molecule inhibitors including GPI-1046 may have beneficial effects in organ protection.

Example 6—Selective PP2A Inhibition Increases Endogenous ARNT Associated with Enhanced ARNT/HIF1β Homodimer Formation Based on previous reports that combined inhibition of PP1/PP2A with Okadaic acid is capable to induce ARNT/

Figure 57:
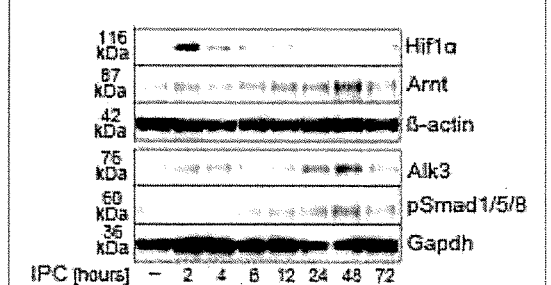
FIGS. 57 & 58: While PP1 inhibition did not affect ARNT/HIF1β homodimer formation, blocking PP2A was associated with enhanced ARNT/HIF1β homodimer formation.
Figure 57:
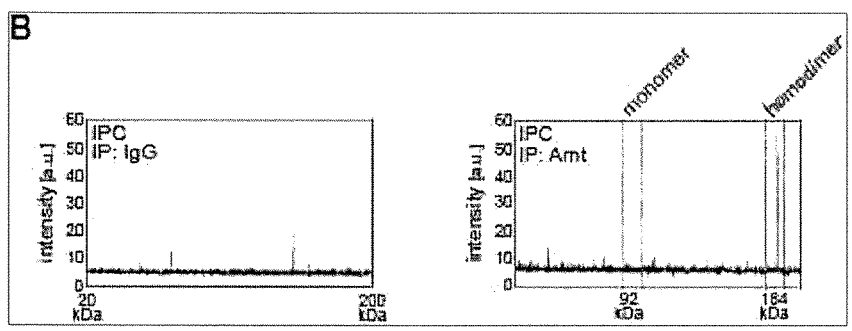
Figure 57:
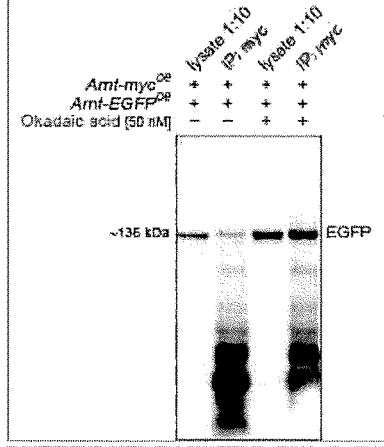
Figure 57:
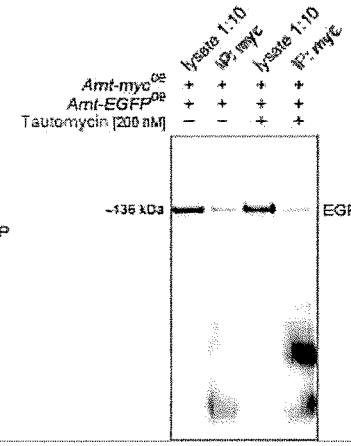
Figure 57:
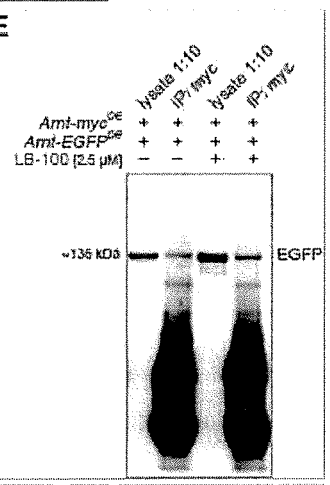
Figure 57:
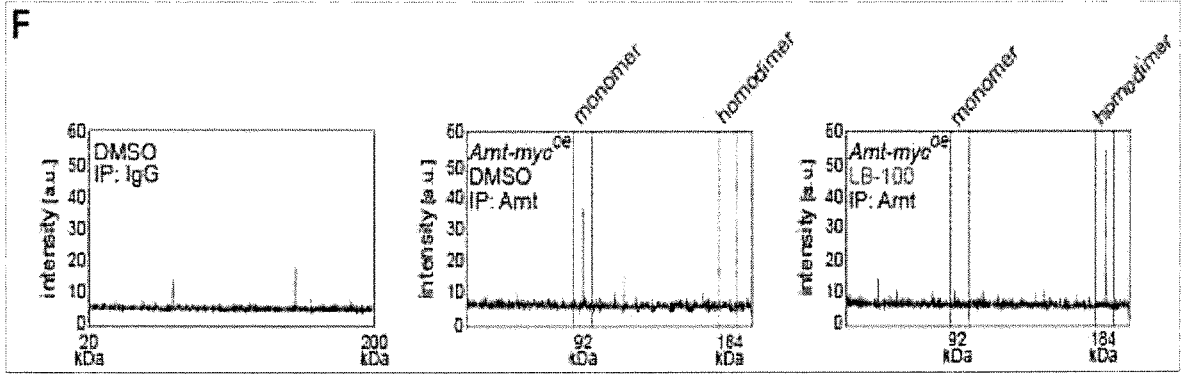
Figure 58:
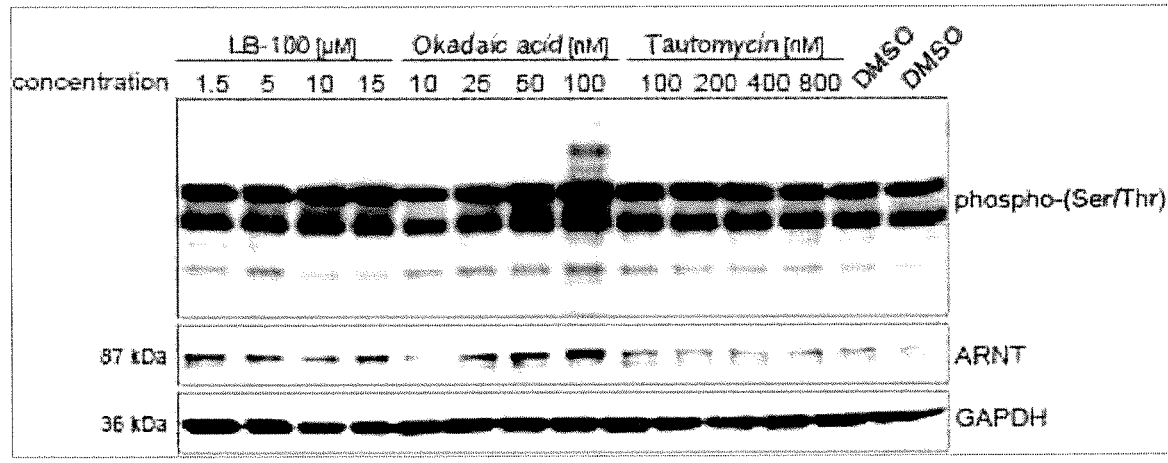
Figure 58:
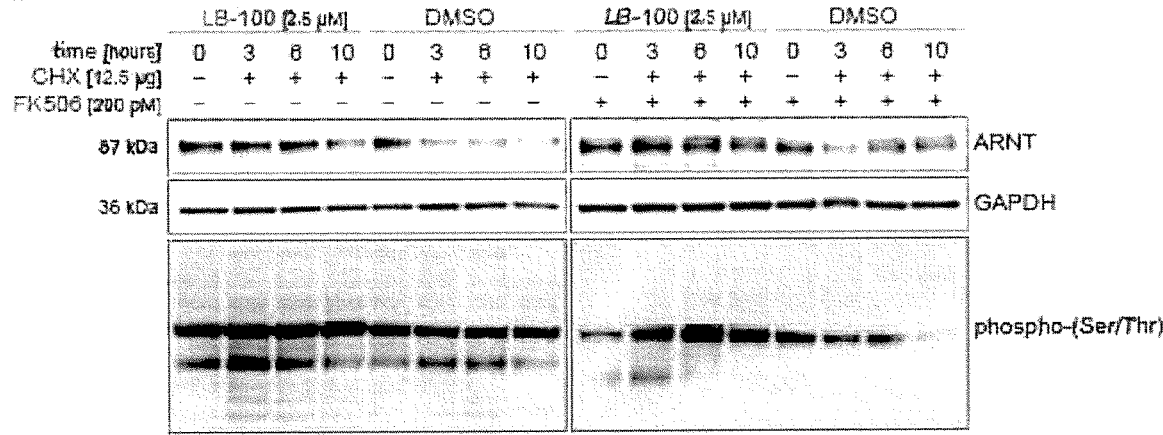
Figure 58:
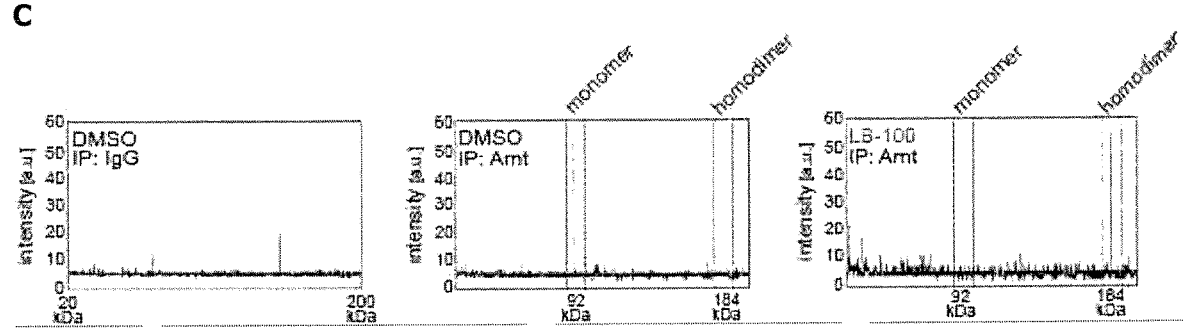
Figure 58:
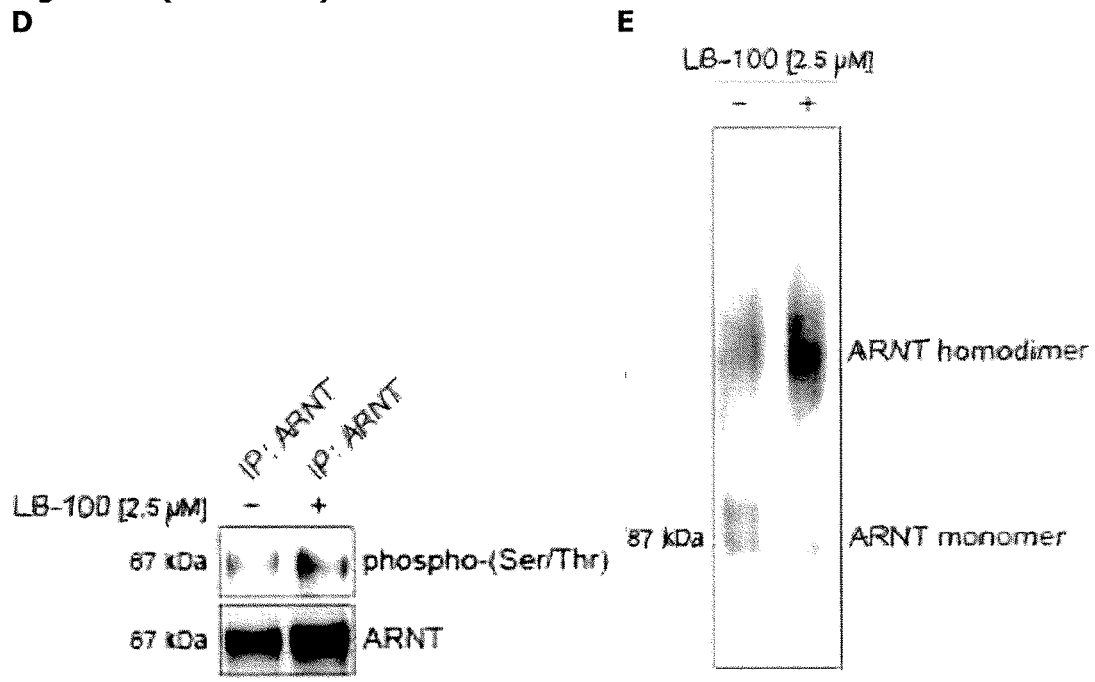

HIF1β homodimer formation and transactivation activity by directly blocking ARNT dephosphorylation (163), the inventors first confirmed enhanced ARNT/HIF1α homodimer formation upon PP1/PP2A inhibition (FIG. 57A). To gain insights into involvement of distinct protein phosphatases, the inventors next specifically blocked PP1 with Tautomycin or PP2A with LB-100 and analyzed efficacy of ARNT/HIF1β homodimer formation (164, 165). While PP1 inhibition did not affect ARNT/HIF1β homodimer formation (FIG. 57B), blocking PP2A was associated with enhanced ARNT/HIF1β homodimer formation (FIG. 57C), indicating PP2A as therapeutical target. These results were further confirmed by mass spectrometry with enhancement of ARNT homodimer formation in the presence of PP2A inhibitor LB-100 (FIG. 57D). See also FIG. 58.

Figure 59:
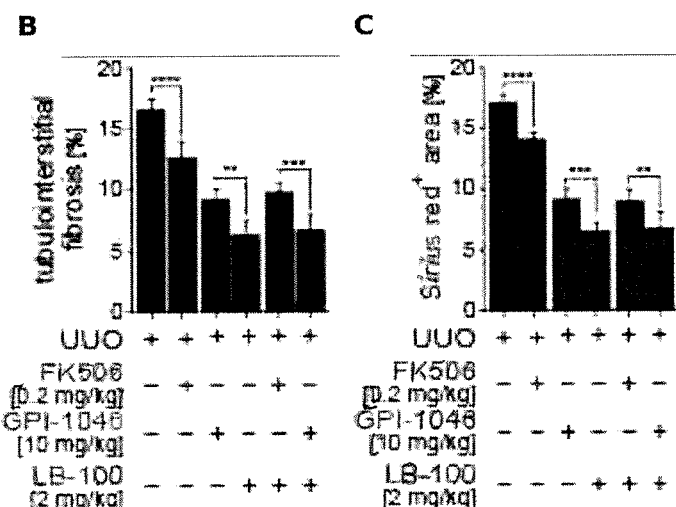
FIG. 59: LB-100 enhances protection by FK506/GPI-1046.
Figure 59:
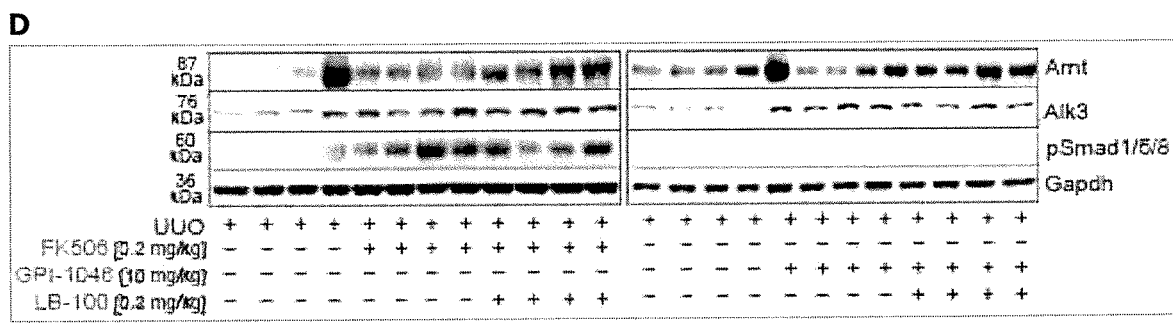

Because LB-100 has been recently developed for in vivo usage to overcome the toxicity of PP2A inhibitors, the inventors next analyzed efficacy of previous established preconditioning regimens with either low-dose FK506 (0.2 mg/kg s.c.) or GPI-1046 (10 mg/kg s.c.) in combination with LB-100 (2 mg/kg). The inventors did not observe any injury in parenchymal organs including kidney, heart, liver, lung, spleen, intestine, pancreas or brain, in line with previous reports (166). Rather, LB-100 enhances protection by FK506/GPI-1046 (FIG. 59). These observations are in line with previous studies reporting protection from myocardial infarction and fibrosis after administration of PP2A inhibitor Fostriecin (167).

In summary, the inventors report that selective PP2A inhibition by LB-100 effectively increases endogenous ARNT by protection from degradation, associated with enhanced ARNT/HIF1β homodimer formation. Enforced ARNT/HIF1β homodimer formation is associated with enhanced protection from chronic organ failure in kidney, heart and liver. In summary, the inventors report a novel approach to induce ARNT/HIF1R homodimer formation, ultimately associated with attenuation of chronic organ failure. Identifying key molecules involved in enforced ARNT homodimer formation show promise in attenuating chronic organ failure of parenchymal organs including kidney, heart and liver.

Example 7—Low-Dose FK506 and GPI-1046 Protect the Kidney in a Diabetic Model of Chronic Kidney Injury With regard of translational implications of our findings, we next aimed to gain insights into presence of FKBP12/YY1 among different human pathologies. FKBP12 and YY1 were equally detectable in various human diseases including injured diabetic nephropathy, hypertensive nephropathy, focal-segmental glomerulosclerosis, autoimmune hepatitis, liver fibrosis, liver cirrhosis and lung fibrosis (histoimmunological data due to bad printing-reproducibility not shown herein) as prerequisite of identified organ protection mediated by ARNT homodimer formation, e.g. as mediated by FK506 or GPI-1046. Based on these observations, we next hypothesized that FK506 and small molecule FKBP12 inhibitor GPI-1046 could equally protect functional parenchyma in an experimental models of diabetic nephropathy (168). Diabetes was induced in 8 to 12 weeks old C57BL/6N mice by a single intraperitoneal injection of streptozotocin (STZ) at 200 mg/kg in 10 mmol/L citrate buffer (pH 4.5), citrate buffer alone was injected as control (168). FK506 (0.2 mg/kg body weight) and GPI-146 (10 mg/kg body weight) in DMSO once daily were applied by subcutaneous injections starting one day prior of STZ administration. At day 3 after STZ injection, diabetes was confirmed by urine dipstick. Mice were sacrificed 8 weeks after STZ injection for further analyses. While streptozotocin (STZ) administration to mice was associated with chronic tubular injury, picomolar FK506 (0.2 mg/kg subcutaneously per day) and GPI-1046 (10 mg/kg subcutaneously per day) were equally effective in protection of functional parenchyma from chronic injury (immunohistology data not shown).

TABLE 1

Pathway analysis in response to FK506 (accession number GSE5258).

| GO term | description | enrichment | p value |
|---|---|---|---|
| GO:2000404 | regulation of T cell migration | 61.20 | $4.81e^{-4}$ |
| GO:2000406 | positive regulation of T cell migration | 61.20 | $4.81e^{-4}$ |
| GO:2000403 | positive regulation of lymphocyte migration | 61.20 | $4.81e^{-4}$ |
| GO:1900025 | negative regulation of substrate adhesion-dependent cell spreading | 43.71 | $9.73e^{-4}$ |
| GO:0000060 | protein import into nucleus, translocation | 14.23 | $5.27e^{-4}$ |
| GO:0071772 | response to BMP | 12.24 | $8.99e^{-4}$ |
| GO:0071773 | cellular response to BMP stimulus | 12.24 | $8.99e^{-4}$ |
| GO:0035023 | regulation of Rho protein signal transduction | 10.41 | $3.83e^{-4}$ |
| GO:0043547 | positive regulation of GTPase activity | 8.63 | $9.17e^{-6}$ |
| GO:0046578 | regulation of Ras protein signal transduction | 8.33 | $3.14e^{-4}$ |
| GO:0051056 | regulation of small GTPase mediated signaling transduction | 7.85 | $1.09e^{-4}$ |
| GO:0043087 | regulation of GTPase activity | 7.77 | $2.50e^{-5}$ |
| GO:0044236 | multicellular organismal metabolic process | 4.54 | $2.76e^{-4}$ |
| GO:0044763 | single-organism cellular process | 1.02 | $7.32e^{-4}$ |

TABLE 2

Motif enrichment analysis of differentially expressed genes induced in response to FK506 (accession number GSE5258).

| transcription factor | association score | p value |
|---|---|---|
| E2F-1/E2F-2 | 6.747 | $1.30e^{-5}$ |
| C-ETS-1 | 6.450 | $2.70e^{-5}$ |
| MAZ | 5.380 | $2.43e^{-4}$ |
| MAX | 5.380 | $2.43e^{-4}$ |
| E2F-1 | 4.705 | $1.01e^{-3}$ |
| TFII-I | 4.593 | $1.34e^{-3}$ |
| SPZ1 | 4.557 | $1.45e^{-3}$ |
| AP-2 | 4.460 | $1.75e^{-3}$ |
| PAX-5 | 4.344 | $2.22e^{-3}$ |
| MAZR | 4.254 | $2.71e^{-3}$ |
| USF1 | 4.201 | $2.94e^{-3}$ |
| EGR-1/EGR-2 | 4.139 | $3.20e^{-3}$ |
| PEA3 | 3.950 | $4.92e^{-3}$ |
| ATF6 | 3.887 | $5.72e^{-3}$ |
| ARNT | 3.823 | $6.58e^{-3}$ |
| SP1 | 3.785 | $6.93e^{-3}$ |
| SP1/SP3 | 3.778 | $7.02e^{-3}$ |
| SP1/SP2 | 3.777 | $7.04e^{-3}$ |
| YY1 | 3.776 | $7.06e^{-3}$ |
| STRA13 | 3.762 | $7.31e^{-3}$ |
| AHR/ARNT | 3.725 | $7.89e^{-3}$ |
| PAX-9A | 3.719 | $7.95e^{-3}$ |
| RELA | 3.638 | $9.37e^{-3}$ |
| ATF-1/ATF- | 23.524 | $1.15e^{-2}$ |
| MAX | 3.519 | $1.17e^{-2}$ |
| C-MAF | 3.509 | $1.17e^{-2}$ |
| ATF3 | 3.465 | $1.29e^{-2}$ |
| TEL-2α/TEL-2β | 3.457 | $1.32e^{-2}$ |
| n-MYC | 3.435 | $1.38e^{-2}$ |
| DP-1/E2F-1 | 3.422 | $1.44e^{-2}$ |

TABLE 2-continued

Motif enrichment analysis of differentially expressed genes induced in response to FK506 (accession number GSE5258).

| transcription factor | association score | p value |
|---|---|---|
| CHCH | 3.368 | $1.53e^{-2}$ |
| MOVO-β | 3.363 | $1.56e^{-2}$ |
| NERF-1α | 3.304 | $1.76e^{-2}$ |
| USF1 | 3.272 | $1.93e^{-2}$ |
| NF-κB1/NF-κB2 | 3.191 | $2.28e^{-2}$ |
| SREBP-1 | 3.178 | $2.36e^{-2}$ |
| ELF-1 | 3.146 | $2.50e^{-2}$ |
| CREB/CREB-β | 3.101 | $2.61e^{-2}$ |
| BRCA1 | 3.085 | $2.67e^{-2}$ |
| NRF-1 | 3.076 | $2.70e^{-2}$ |
| ZF5 | 3.070 | $2.75e^{-2}$ |
| HIF-1α | 2.996 | $3.31e^{-2}$ |
| USF1 | 2.989 | $3.36e^{-2}$ |
| CREB | 2.989 | $3.36e^{-2}$ |
| GABP-α/GABP-β1 | 2.978 | $3.43e^{-2}$ |
| AHR | 2.954 | $3.56e^{-2}$ |
| AP-2α | 2.853 | $4.25e^{-2}$ |
| ATF4 | 2.819 | $4.54e^{-2}$ |
| EGR-4 | 2.811 | $4.58e^{-2}$ |
| ELK-1 | 2.780 | $4.89e^{-2}$ |
| AP-2γ | 2.769 | $4.96e^{-2}$ |

TABLE 3

Sequence alignment of Fkbp12-VMO.

| description | maximal score | total score | query cover | E value | identity | accession |
|---|---|---|---|---|---|---|
| *Mus musculus* FK506 binding protein 1a (Fkbp1a), transcript variant 3, non-coding RNA | 50.1 | 50.1 | 100% | 3.00E−06 | 100% | NR_126058.1 |
| *Mus musculus* FK506 binding protein 1a (Fkbp1a), transcript variant 6 mRNA | 50.1 | 50.1 | 100% | 3.00E−06 | 100% | NM_001302080.1 |
| *Mus musculus* FK506 binding protein 1a (Fkb1a), transcript variant 5, mRNA | 50.1 | 50.1 | 100% | 3.00E−06 | 100% | NM_001302079.1 |
| *Mus musculus* FK506 binding protein 1a (Fkbp1a), transcript variant 4, mRNA | 50.1 | 50.1 | 100% | 3.00E−06 | 100% | NM_001302078.1 |
| *Mus musculus* FK506 binding protein 1a (Fkbp1a), transcript variant 2, mRNA | 50.1 | 50.1 | 100% | 3.00E−06 | 100% | NM_001302077.1 |
| *Mus musculus* FK506 binding protein 1a (Fkb1a), transcript variant 1, mRNA | 50.1 | 50.1 | 100% | 3.00E−06 | 100% | NM_008019.3 |
| PREDICTED: *Mus musculus* pregnancy specific glycoprotein 19 (Psg19), transcript variant X1, mRNA | 32.2 | 32.2 | 64% | 0.65 | 100% | XM_006540007.3 |
| PREDICTED: *Mus musculus* pregnancy-specific glycoprotein 22 (Psg22), transcript variant X1, mRNA | 32.2 | 32.2 | 64% | 0.65 | 100% | XM_017322233.1 |
| *Mus musculus* pregnancy-specific glycoprotein 22 (Psg22), mRNA | 32.2 | 32.2 | 64% | 0.65 | 100% | NM_001004152.2 |
| *Mus musculus* pregnancy specific glycoprotein 19 (Psg19), mRNA | 32.2 | 32.2 | 64% | 0.65 | 100% | NM_011964.2 |
| *Mus musculus* aminolevulinic acid synthase 2, erythroid (Alas2), transcript variant 2, mRNA | 32.2 | 32.2 | 64% | 0.65 | 100% | NM_001102446.1 |
| *Mus musculus* aminolevulinic acid synthase 2, erythroid (Alas2), transcript variant 1, mRNA | 32.2 | 32.2 | 64% | 0.65 | 100% | NM_009653.3 |
| PREDICTED: *Mus musculus* NHS-like 2 (Nhsl2), transcript variant X4, mRNA | 30.2 | 30.2 | 76% | 2.6 | 95% | XM_006527721.3 |
| PREDICTED: *Mus musculus* dynamin 2 (Dnm2), transcript variant X18, mRNA | 30.2 | 30.2 | 60% | 2.6 | 100% | XM_006509985.3 |
| PREDICTED: *Mus musculus* dynamin 2 (Dnm2), transcript variant X15, mRNA | 30.2 | 30.2 | 60% | 2.6 | 100% | XM_017313129.1 |
| PREDICTED: *Mus musculus* dynamin 2 (Dnm2), transcript variant X14, mRNA | 30.2 | 30.2 | 60% | 2.6 | 100% | XM_006509982.2 |
| PREDICTED: *Mus musculus* dynamin 2 (Dnm2), transcript variant X13, mRNA | 30.2 | 30.2 | 60% | 2.6 | 100% | XM_006509981.2 |
| PREDICTED: *Mus musculus* dynamin 2 (Dnm2), transcript variant X12 mRNA | 30.2 | 30.2 | 60% | 2.6 | 100% | XM_017313128.1 |
| PREDICTED: *Mus musculus* dynamin 2 (Dnm2), transcript variant X11, mRNA | 30.2 | 30.2 | 60% | 2.6 | 100% | XM_017313127.1 |
| PREDICTED: *Mus musculus* dynamin 2 (Dnm2), transcript variant X10, mRNA | 30.2 | 30.2 | 60% | 2.6 | 100% | XM_017313126.1 |
| PREDICTED: *Mus musculus* dynamin 2 (Dnm2), transcript variant X9, mRNA | 30.2 | 30.2 | 60% | 2.6 | 100% | XM_006509980.2 |
| PREDICTED: *Mus musculus* dynamin 2 (Dnm2), transcript variant X7, mRNA | 30.2 | 30.2 | 60% | 2.6 | 100% | XM_006509978.2 |
| PREDICTED: *Mus musculus* dynamin 2 (Dnm2), transcript variant X5, mRNA | 30.2 | 30.2 | 60% | 2.6 | 100% | XM_017313125.1 |
| PREDICTED: *Mus musculus* dynamin 2 (Dnm2), transcript variant X4, mRNA | 30.2 | 30.2 | 60% | 2.6 | 100% | XM_006509976.2 |

TABLE 3-continued

Sequence alignment of Fkbp12-VMO.

| description | maximal score | total score | query cover | E value | identity | accession |
| --- | --- | --- | --- | --- | --- | --- |
| PREDICTED: *Mus musculus* discs, large (*Drosophila*) homolog-associated protein 3 (Dlgap3), transcript variant X3, mRNA | 30.2 | 30.2 | 76% | 2.6 | 95% | XM_006503105.3 |
| PREDICTED: *Mus musculus* discs, large (*Drosophila*) homolog-associated protein 3 (Dlgap3), transcript variant X2, mRNA | 30.2 | 30.2 | 76% | 2.6 | 95% | XM_006503104.3 |
| PREDICTED: *Mus musculus* discs, large (*Drosophila*) homolog-associated protein 3 (Dlgap3), transcript variant X1, mRNA | 30.2 | 30.2 | 76% | 2.6 | 95% | XM_011240537.2 |
| PREDICTED: *Mus musculus* dynamin 1 (Dnm1), transcript variant X18, misc_RNA | 30.2 | 30.2 | 60% | 2.6 | 100% | XR_374058.3 |
| PREDICTED: *Mus musculus* dynamin 1 (Dnm1), transcript variant X16, misc_RNA | 30.2 | 30.2 | 60% | 2.6 | 100% | XR_001780678.1 |
| PREDICTED: *Mus musculus* dynamin 1 (Dnm1), transcript variant X15, misc_RNA | 30.2 | 30.2 | 60% | 2.6 | 100% | XR_001780675.1 |
| PREDICTED: *Mus musculus* dynamin 1 (Dnm1), transcript variant X10, mRNA | 30.2 | 30.2 | 60% | 2.6 | 100% | XM_017315328.1 |
| PREDICTED: *Mus musculus* dynamin 1 (Dnm1), transcript variant X9, mRNA | 30.2 | 30.2 | 60% | 2.6 | 100% | XM_006497659.3 |
| PREDICTED: *Mus musculus* dynamin 1 (Dnm1), transcript variant X8, mRNA | 30.2 | 30.2 | 60% | 2.6 | 100% | XM_006497658.3 |
| PREDICTED: *Mus musculus* dynamin 1 (Dnm1), transcript variant X5, mRNA | 30.2 | 30.2 | 60% | 2.6 | 100% | XM_006497654.3 |
| PREDICTED: *Mus musculus* tripartite motif containing 9 (Trim9), transcript variant X12, mRNA | 30.2 | 30.2 | 60% | 2.6 | 100% | XM_006516407.3 |
| PREDICTED: *Mus musculus* tripartite motif containing 9 (Trim9), transcript variant X11, misc_RNA | 30.2 | 30.2 | 60% | 2.6 | 100% | XR_381560.3 |
| PREDICTED: *Mus musculus* tripartite motif containing 9 (Trim9), transcript variant X10, mRNA | 30.2 | 30.2 | 60% | 2.6 | 100% | XM_006516406.3 |
| PREDICTED: *Mus musculus* tripartite motif containing 9 (Trim9), transcript variant X9, mRNA | 30.2 | 30.2 | 60% | 2.6 | 100% | XM_006516405.3 |
| PREDICTED: *Mus musculus* tripartite motif containing 9 (Trim9), transcript variant X8, mRNA | 30.2 | 30.2 | 60% | 2.6 | 100% | XM_006516404.3 |
| PREDICTED: *Mus musculus* tripartite motif containing 9 (Trim9), transcript variant X7, mRNA | 30.2 | 30.2 | 60% | 2.6 | 100% | XM_006516403.3 |
| PREDICTED: *Mus musculus* tripartite motif containing 9 (Trim9), transcript variant X6, mRNA | 30.2 | 30.2 | 60% | 2.6 | 100% | XM_006516402.3 |
| PREDICTED: *Mus musculus* tripartite motif containing 9 (Trim9), transcript variant X5, mRNA | 30.2 | 30.2 | 60% | 2.6 | 100% | XM_017315265.1 |
| PREDICTED: *Mus musculus* tripartite motif containing 9 (Trim9), transcript variant X4, mRNA | 30.2 | 30.2 | 60% | 2.6 | 100% | XM_017315264.1 |
| PREDICTED: *Mus musculus* tripartite motif containing 9 (Trim9), transcript variant X3, mRNA | 30.2 | 30.2 | 60% | 2.6 | 100% | XM_006516401.3 |
| PREDICTED: *Mus musculus* tripartite motif containing 9 (Trim9), transcript variant X2, mRNA | 30.2 | 30.2 | 60% | 2.6 | 100% | XM_017315263.1 |
| PREDICTED: *Mus musculus* tripartite motif-containing 9 (Trim9), transcript variant X1, mRNA | 30.2 | 30.2 | 60% | 2.6 | 100% | XM_006516400.3 |
| PREDICTED: *Mus musculus* armadillo repeat containing 9 (Armc9), transcript variant X11, mRNA | 30.2 | 52.5 | 96% | 2.6 | 91% | XM_006529960.3 |
| PREDICTED: *Mus musculus* dynamin 1 (Dnm1), transcript variant X17, misc_RNA | 30.2 | 30.2 | 60% | 2.6 | 100% | XR_374057.2 |
| PREDICTED: *Mus musculus* dynamin 1 (Dnm1), transcript variant X14, misc_RNA | 30.2 | 30.2 | 60% | 2.6 | 100% | XR_374055.2 |
| PREDICTED: *Mus musculus* dynamin 1 (Dnm1), transcript variant X13, mRNA | 30.2 | 30.2 | 60% | 2.6 | 100% | XM_006497662.2 |
| PREDICTED: *Mus musculus* dynamin 1 (Dnm1), transcript variant X12, mRNA | 30.2 | 30.2 | 60% | 2.6 | 100% | XM_006497661.2 |
| PREDICTED: *Mus musculus* dynamin 1 (Dnm1), transcript variant X11, mRNA | 30.2 | 30.2 | 60% | 2.6 | 100% | XM_006497660.2 |
| PREDICTED: *Mus musculus* dynamin 1 (Dnm1), transcript variant X7, mRNA | 30.2 | 30.2 | 60% | 2.6 | 100% | XM_006497653.2 |

TABLE 3-continued

Sequence alignment of Fkbp12-VMO.

| description | maximal score | total score | query cover | E value | identity | accession |
|---|---|---|---|---|---|---|
| PREDICTED: *Mus musculus* dynamin 1 (Dnm1), transcript variant X6, mRNA | 30.2 | 30.2 | 60% | 2.6 | 100% | XM_006497655.2 |
| PREDICTED: *Mus musculus* dynamin 1 (Dnm1), transcript variant X4, mRNA | 30.2 | 30.2 | 60% | 2.6 | 100% | XM_006497652.2 |
| PREDICTED: *Mus musculus* dynamin 1 (Dnm1), transcript variant X3, mRNA | 30.2 | 30.2 | 60% | 2.6 | 100% | XM_006497651.2 |
| PREDICTED: *Mus musculus* dynamin 1 (Dnm1), transcript variant X2, mRNA | 30.2 | 30.2 | 60% | 2.6 | 100% | XM_006497650.2 |
| PREDICTED: *Mus musculus* dynamin 1 (Dnm1), transcript variant X1, mRNA | 30.2 | 30.2 | 60% | 2.6 | 100% | XM_006497649.2 |
| Mus *musculus* discs, large (*Drosophila*) homolog-associated protein 3 (Dlgap3), transcript variant 2, mRNA | 30.2 | 30.2 | 76% | 2.6 | 95% | NM_001302081.1 |
| *Mus musculus* discs, large (*Drosophila*) homolog-associated protein 3 (Dlgap3), transcript variant 1, mRNA | 30.2 | 30.2 | 76% | 2.6 | 95% | NM_198618.5 |
| *Mus musculus* dynamin 1 (Dnm1), transcript variant 3, non-coding RNA | 30.2 | 30.2 | 60% | 2.6 | 100% | NR_125959.1 |
| *Mus musculus* dynamin 1 (Dnm1), transcript variant 2, mRNA | 30.2 | 30.2 | 60% | 2.6 | 100% | NM_001301737.1 |
| *Mus musculus* dynamin 1 (Dnm1), transcript variant 1, mRNA | 30.2 | 30.2 | 60% | 2.6 | 100% | NM_010065.3 |
| PREDICTED: *Mus musculus* dynamin 2 (Dnm2), transcript variant X16, mRNA | 30.2 | 30.2 | 60% | 2.6 | 100% | XM_006509983.1 |
| PREDICTED: *Mus musculus* dynamin 2 (Dnm2), transcript variant X8, mRNA | 30.2 | 30.2 | 60% | 2.6 | 100% | XM_006509979.1 |
| PREDICTED: *Mus musculus* dynamin 2 (Dnm2), transcript variant X6, mRNA | 30.2 | 30.2 | 60% | 2.6 | 100% | XM_006509977.1 |
| PREDICTED: *Mus musculus* dynamin 2 (Dnm2), transcript variant X3, mRNA | 30.2 | 30.2 | 60% | 2.6 | 100% | XM_006509975.1 |
| PREDICTED: *Mus musculus* dynamin 2 (Dnm2), transcript variant X2, mRNA | 30.2 | 30.2 | 60% | 2.6 | 100% | XM_006509974.1 |
| PREDICTED: *Mus musculus* dynamin 2 (Dnm2), transcript variant X1, mRNA | 30.2 | 30.2 | 60% | 2.6 | 100% | XM_006509973.1 |
| PREDICTED: *Mus musculus* fat mass and obesity associated (Fto), transcript variant X1, mRNA | 30.2 | 30.2 | 60% | 2.6 | 100% | XM_006531036.1 |
| *Mus musculus* tripartite motif-containing 9 (Trim9), transcript variant 6, mRNA | 30.2 | 30.2 | 60% | 2.6 | 100% | NM_001286388.1 |
| *Mus musculus* tripartite motif-containing 9 (Trim9), transcript variant 5, mRNA | 30.2 | 30.2 | 60% | 2.6 | 100% | NM_001286387.1 |
| *Mus musculus* tripartite motif-containing 9 (Trim9), transcript variant 4, mRNA | 30.2 | 30.2 | 60% | 2.6 | 100% | NM_001286386.1 |
| *Mus musculus* dynamin 2 (Dnm2), transcript variant 4, mRNA | 30.2 | 30.2 | 60% | 2.6 | 100% | NM_001253894.1 |
| *Mus musculus* dynamin 2 (Dnm2), transcript variant 3, mRNA | 30.2 | 30.2 | 60% | 2.6 | 100% | NM_007871.2 |
| *Mus musculus* dynamin 2 (Dnm2), transcript variant 2, mRNA | 30.2 | 30.2 | 60% | 2.6 | 100% | NM_001039520.2 |
| *Mus musculus* dynamin 2 (Dnm2), transcript variant 1, mRNA | 30.2 | 30.2 | 60% | 2.6 | 100% | NM_001253893.1 |
| *Mus musculus* fat mass and obesity associated (Fto), mRNA | 30.2 | 30.2 | 60% | 2.6 | 100% | NM_011936.2 |
| *Mus musculus* tripartite motif-containing 9 (Trim9), transcript variant 3, mRNA | 30.2 | 30.2 | 60% | 2.6 | 100% | NM_001110203.1 |
| *Mus musculus* tripartite motif-containing 9 (Trim9), transcript variant 2, mRNA | 30.2 | 30.2 | 60% | 2.6 | 100% | NM_001110202.1 |
| *Mus musculus* tripartite motif-containing 9 (Trim9), transcript variant 1, mRNA | 30.2 | 30.2 | 60% | 2.6 | 100% | NM_053167.3 |
| *Mus musculus* WAP, FS, Ig, KU, and NTR-containing protein 1 (Wfikkn1), mRNA | 30.2 | 30.2 | 60% | 2.6 | 100% | NM_001100454.1 |
| PREDICTED: *Mus musculus* intestinal cell kinase (Ick), transcript variant X2, mRNA | 28.2 | 28.2 | 56% | 10 | 100% | XM_006511305.3 |
| PREDICTED: *Mus musculus* hydroxysteroid dehydrogenase like 1 (Hsdl1), transcript variant X7, misc_RNA | 28.2 | 28.2 | 56% | 10 | 100% | XR_001778478.1 |
| PREDICTED: *Mus musculus* hydroxysteroid dehydrogenase like 1 (Hsdl1), transcript variant X4, mRNA | 28.2 | 28.2 | 56% | 10 | 100% | XM_006531397.3 |
| PREDICTED: *Mus musculus* hydroxysteroid dehydrogenase like 1 (Hsdl1), transcript variant X3, mRNA | 28.2 | 28.2 | 56% | 10 | 100% | XM_006531395.3 |
| PREDICTED: *Mus musculus* hydroxysteroid dehydrogenase like 1 (Hsdl1), transcript variant X2, mRNA | 28.2 | 28.2 | 56% | 10 | 100% | XM_006531394.3 |

TABLE 3-continued

Sequence alignment of Fkbp12-VMO.

| description | maximal score | total score | query cover | E value | identity | accession |
|---|---|---|---|---|---|---|
| PREDICTED: *Mus musculus* hydroxysteroid dehydrogenase like 1 (Hsdl1), transcript variant X1, mRNA | 28.2 | 28.2 | 56% | 10 | 100% | XM_006531393.3 |
| PREDICTED: *Mus musculus* kinesin family member C3 (Kifc3), transcript variant X7, mRNA | 28.2 | 28.2 | 56% | 10 | 100% | XM_017312585.1 |
| PREDICTED: *Mus musculus* kinesin family member C3 (Kifc3), transcript variant X6, mRNA | 28.2 | 28.2 | 56% | 10 | 100% | XM_006530723.3 |
| PREDICTED: *Mus musculus* uncharacterized LOC108167423 (LOC108167423), transcript variant X2, ncRNA | 28.2 | 28.2 | 56% | 10 | 100% | XR_001778116.1 |
| PREDICTED: *Mus musculus* uncharacterized LOC108167423 (LOC108167423), transcript variant X1, ncRNA | 28.2 | 28.2 | 56% | 10 | 100% | XR_001778115.1 |
| PREDICTED: *Mus musculus* IQ motif containing GTPase activating protein 1 (Iqgap1), transcript variant X3, misc_RNA | 28.2 | 52.5 | 80% | 10 | 100% | XR_001785567.1 |
| PREDICTED: *Mus musculus* IQ motif containing GTPase activating protein 1 (Iqgap1), transcript variant X2, misc_RNA | 28.2 | 28.2 | 56% | 10 | 100% | XR_391347.3 |
| PREDICTED: *Mus musculus* IQ motif containing GTPase activating protein 1 (Iqgap1), transcript variant X1, mRNA | 28.2 | 52.5 | 80% | 10 | 100% | XM_006540950.3 |
| PREDICTED: *Mus musculus* chloride channel, voltage-sensitive 1 (Clcn1), transcript variant X3, mRNA | 28.2 | 28.2 | 56% | 10 | 100% | XM_006505477.3 |
| PREDICTED: *Mus musculus* adrenergic receptor kinase, beta 2 (Adrbk2), transcript variant X3, misc_RNA | 28.2 | 28.2 | 56% | 10 | 100% | XR_880393.2 |
| PREDICTED: *Mus musculus* adrenergic receptor kinase, beta 2 (Adrbk2), transcript variant X1, misc_RNA | 28.2 | 28.2 | 56% | 10 | 100% | XR_389274.3 |
| PREDICTED: *Mus musculus* predicted gene 15800 (Gm15800), transcript variant X11, mRNA | 28.2 | 50.5 | 76% | 10 | 100% | XM_006530360.3 |
| PREDICTED: *Mus musculus* predicted gene 15800 (Gm15800), transcript variant X10, mRNA | 28.2 | 28.2 | 56% | 10 | 100% | XM_006530359.3 |

TABLE 4

Sequence alignment of Yy1-VMO.

| description | maximal score | total score | query cover | E value | identity | accession |
|---|---|---|---|---|---|---|
| PREDICTED: *Mus musculus* YY1 transcription factor (Yy1), transcript variant X1, mRNA | 50.1 | 50.1 | 100% | 3.00E−06 | 100% | XM_006515820.3 |
| *Mus musculus* YY1 transcription factor (Yy1), mRNA | 50.1 | 50.1 | 100% | 3.00E−06 | 100% | NM_009537.3 |
| PREDICTED: *Mus musculus* dystonin (Dst), transcript variant X30, mRNA | 28.2 | 28.2 | 56% | 10 | 100% | XM_006495691.3 |
| PREDICTED: *Mus musculus* dystonin (Dst), transcript variant X29, mRNA | 28.2 | 28.2 | 56% | 10 | 100% | XM_006495690.3 |
| PREDICTED: *Mus musculus* dystonin (Dst), transcript variant X28, mRNA | 28.2 | 28.2 | 56% | 10 | 100% | XM_017314868.1 |
| PREDICTED: *Mus musculus* dystonin (Dst), transcript variant X27, mRNA | 28.2 | 28.2 | 56% | 10 | 100% | XM_006495688.3 |
| PREDICTED: *Mus musculus* dystonin (Dst), transcript variant X26, mRNA | 28.2 | 28.2 | 56% | 10 | 100% | XM_017314848.1 |
| PREDICTED: *Mus musculus* dystonin (Dst), transcript variant X24, mRNA | 28.2 | 28.2 | 56% | 10 | 100% | XM_006495685.2 |
| PREDICTED: *Mus musculus* dystonin (Dst), transcript variant X23, mRNA | 28.2 | 28.2 | 56% | 10 | 100% | XM_006495684.3 |
| PREDICTED: *Mus musculus* dystonin (Dst), transcript variant X22, mRNA | 28.2 | 28.2 | 56% | 10 | 100% | XM_017314811.1 |
| PREDICTED: *Mus musculus* dystonin (Dst), transcript variant X21, mRNA | 28.2 | 28.2 | 56% | 10 | 100% | XM_006495682.2 |

TABLE 4-continued

Sequence alignment of Yy1-VMO.

| description | maximal score | total score | query cover | E value | identity | accession |
|---|---|---|---|---|---|---|
| PREDICTED: *Mus musculus* dystonin (Dst), transcript variant X20, mRNA | 28.2 | 28.2 | 56% | 10 | 100% | XM_017314794.1 |
| PREDICTED: *Mus musculus* dystonin (Dst), transcript variant X19, mRNA | 28.2 | 28.2 | 56% | 10 | 100% | XM_006495680.3 |
| PREDICTED: *Mus musculus* dystonin (Dst), transcript variant X18, mRNA | 28.2 | 28.2 | 56% | 10 | 100% | XM_006495679.3 |
| PREDICTED: *Mus musculus* dystonin (Dst), transcript variant X17, mRNA | 28.2 | 28.2 | 56% | 10 | 100% | XM_006495678.3 |
| PREDICTED: *Mus musculus* dystonin (Dst), transcript variant X16, mRNA | 28.2 | 28.2 | 56% | 10 | 100% | XM_017314750.1 |
| PREDICTED: *Mus musculus* dystonin (Dst), transcript variant X15, mRNA | 28.2 | 28.2 | 56% | 10 | 100% | XM_017314741.1 |
| PREDICTED: *Mus musculus* dystonin (Dst), transcript variant X14, mRNA | 28.2 | 28.2 | 56% | 10 | 100% | XM_006495674.3 |
| PREDICTED: *Mus musculus* dystonin (Dst), transcript variant X13, mRNA | 28.2 | 28.2 | 56% | 10 | 100% | XM_017314722.1 |
| PREDICTED: *Mus musculus* dystonin (Dst), transcript variant X12, mRNA | 28.2 | 28.2 | 56% | 10 | 100% | XM_017314716.1 |
| PREDICTED: *Mus musculus* dystonin (Dst), transcript variant X11, mRNA | 28.2 | 28.2 | 56% | 10 | 100% | XM_017314712.1 |
| PREDICTED: *Mus musculus* dystonin (Dst), transcript variant X10, mRNA | 28.2 | 28.2 | 56% | 10 | 100% | XM_017314706.1 |
| PREDICTED: *Mus musculus* dystonin (Dst), transcript variant X9, mRNA | 28.2 | 28.2 | 56% | 10 | 100% | XM_006495669.3 |
| PREDICTED: *Mus musculus* dystonin (Dst), transcript variant X8, mRNA | 28.2 | 28.2 | 56% | 10 | 100% | XM_017314689.1 |
| PREDICTED: *Mus musculus* dystonin (Dst), transcript variant X7, mRNA | 28.2 | 28.2 | 56% | 10 | 100% | XM_017314687.1 |
| PREDICTED: *Mus musculus* dystonin (Dst), transcript variant X6, mRNA | 28.2 | 28.2 | 56% | 10 | 100% | XM_017314676.1 |
| PREDICTED: *Mus musculus* dystonin (Dst), transcript variant X5, mRNA | 28.2 | 28.2 | 56% | 10 | 100% | XM_017314665.1 |
| PREDICTED: *Mus musculus* dystonin (Dst), transcript variant X4, mRNA | 28.2 | 28.2 | 56% | 10 | 100% | XM_017314651.1 |
| PREDICTED: *Mus musculus* dystonin (Dst), transcript variant X3, mRNA | 28.2 | 28.2 | 56% | 10 | 100% | XM_006495666.3 |
| PREDICTED: *Mus musculus* dystonin (Dst), transcript variant X2, mRNA | 28.2 | 28.2 | 56% | 10 | 100% | XM_017314635.1 |
| PREDICTED: *Mus musculus* dystonin (Dst), transcript variant X1, mRNA | 28.2 | 28.2 | 56% | 10 | 100% | XM_017314621.1 |
| *Mus musculus* active BCR-related gene (Abr), transcript variant 3, mRNA | 28.2 | 28.2 | 56% | 10 | 100% | NM_198895.2 |
| *Mus musculus* dystonin (Dst), transcript variant 3, mRNA | 28.2 | 28.2 | 56% | 10 | 100% | NM_133833.3 |
| *Mus musculus* dystonin (Dst), transcript variant 2, mRNA | 28.2 | 28.2 | 56% | 10 | 100% | NM_134448.3 |
| *Mus musculus* dystonin (Dst), transcript variant 1, mRNA | 28.2 | 28.2 | 56% | 10 | 100% | NM_001276764.1 |
| *Mus musculus* insulin-like 3 (Insl3), mRNA | 28.2 | 28.2 | 56% | 10 | 100% | NM_013564.7 |
| PREDICTED: *Mus musculus* SREBF chaperone (Scap), transcript variant X3, mRNA | 26.3 | 26.3 | 52% | 40 | 100% | XM_006512085.3 |
| PREDICTED: *Mus musculus* SREBF chaperone (Scap), transcript variant X1, mRNA | 26.3 | 26.3 | 52% | 40 | 100% | XM_006512084.3 |
| PREDICTED: *Mus musculus* synuclein, alpha interacting protein (synphilin) (Sncaip), transcript variant X2, mRNA | 26.3 | 26.3 | 52% | 40 | 100% | XM_006526192.3 |
| PREDICTED: *Mus musculus* HMG box domain containing 3 (Hmgxb3), transcript variant X1, mRNA | 26.3 | 26.3 | 52% | 40 | 100% | XM_017317779.1 |
| PREDICTED: *Mus musculus* exocyst complex component 3 (Exoc3), transcript variant X3, mRNA | 26.3 | 26.3 | 52% | 40 | 100% | XM_017315474.1 |
| PREDICTED: *Mus musculus* exocyst complex component 3 (Exoc3), transcript variant X1, mRNA | 26.3 | 26.3 | 52% | 40 | 100% | XM_006517191.2 |
| PREDICTED: *Mus musculus* SREBF chaperone (Scap), transcript variant X2, mRNA | 26.3 | 26.3 | 52% | 40 | 100% | XM_006512083.2 |
| *Mus musculus* SREBF chaperone (Scap), transcript variant 1, mRNA | 26.3 | 26.3 | 52% | 40 | 100% | NM_001001144.3 |
| Mus musculus SREBF chaperone (Scap), transcript variant 2, mRNA | 26.3 | 26.3 | 52% | 40 | 100% | NM_001103162.2 |

TABLE 4-continued

Sequence alignment of Yy1-VMO.

| description | maximal score | total score | query cover | E value | identity | accession |
|---|---|---|---|---|---|---|
| *Mus musculus* forkhead box F1 (Foxf1), mRNA | 26.3 | 26.3 | 52% | 40 | 100% | NM_010426.2 |
| *Mus musculus* MARVEL (membrane-associating) domain containing 3 (Marveld3), transcript variant 1, mRNA | 26.3 | 26.3 | 52% | 40 | 100% | NM_028584.3 |
| Mus *musculus* MARVEL (membrane-associating) domain containing 3 (Marveld3), transcript variant 2, mRNA | 26.3 | 26.3 | 52% | 40 | 100% | NM_212447.2 |
| *Mus musculus* insulinoma-associated 1 (Insm1), mRNA | 26.3 | 26.3 | 52% | 40 | 100% | NM_016889.3 |
| *Mus musculus* serine (or cysteine) peptidase inhibitor, clade E, member 1 (Serpine1), mRNA | 26.3 | 26.3 | 52% | 40 | 100% | NM_008871.2 |
| *Mus musculus* HMG box domain containing 3 (Hmgxb3), transcript variant 2, mRNA | 26.3 | 26.3 | 52% | 40 | 100% | NM_134134.2 |
| *Mus musculus* HMG box domain containing 3 (Hmgxb3), transcript variant 1, mRNA | 26.3 | 26.3 | 52% | 40 | 100% | NM_178277.1 |
| *Mus musculus* ATPase, H+ transporting, lysosomal V1 subunit E1 (Atp6v1e1), mRNA | 26.3 | 26.3 | 52% | 40 | 100% | NM_007510.2 |
| PREDICTED: *Mus musculus* poly (ADP-ribose) polymerase family, member 3 (Parp3), transcript variant X4, misc_RNA | 26.3 | 26.3 | 52% | 40 | 100% | XR_001778888.1 |
| PREDICTED: *Mus musculus* poly (ADP-ribose) polymerase family, member 3 (Parp3), transcript variant X2, mRNA | 26.3 | 26.3 | 52% | 40 | 100% | XM_006511719.3 |
| PREDICTED: *Mus musculus* cDNA sequence BC017158 (BC017158), transcript variant X3, mRNA | 26.3 | 26.3 | 52% | 40 | 100% | XM_011241784.2 |
| PREDICTED: *Mus musculus* DEAD (Asp-Glu-Ala-Asp) box polypeptide 54 (Ddx54), transcript variant X1, misc_RNA | 26.3 | 26.3 | 52% | 40 | 100% | XR_878688.2 |
| PREDICTED: *Mus musculus* actin filament associated protein 1-like 2 (Afap1l2), transcript variant X5, mRNA | 26.3 | 26.3 | 52% | 40 | 100% | XM_017318171.1 |
| PREDICTED: *Mus musculus* actin filament associated protein 1-like 2 (Afap1l2), transcript variant X4, mRNA | 26.3 | 26.3 | 52% | 40 | 100% | XM_017318170.1 |
| PREDICTED: *Mus musculus* actin filament associated protein 1-like 2 (Afap1l2), transcript variant X2, mRNA | 26.3 | 26.3 | 52% | 40 | 100% | XM_017318169.1 |
| PREDICTED: *Mus musculus* actin filament associated protein 1-like 2 (Afap1l2), transcript variant X1, mRNA | 26.3 | 26.3 | 52% | 40 | 100% | XM_017318168.1 |
| PREDICTED: *Mus musculus* predicted gene, 31348 (Gm31348), transcript variant X4, ncRNA | 26.3 | 26.3 | 52 | 40 | 100% | XR_001779509.1 |
| PREDICTED: *Mus musculus* predicted gene, 31348 (Gm31348), transcript variant X3, ncRNA | 26.3 | 26.3 | 52% | 40 | 100% | XR_001779508.1 |
| PREDICTED: *Mus musculus* predicted gene, 31348 (Gm31348), transcript variant X1, ncRNA | 26.3 | 26.3 | 52% | 40 | 100% | XR_373640.3 |
| *Mus musculus* poly (ADP-ribose) polymerase family, member 3 (Parp3), transcript variant 1, mRNA | 26.3 | 26.3 | 52% | 40 | 100% | NM_001311150.1 |
| *Mus musculus* poly (ADP-ribose) polymerase family, member 3 (Parp3), transcript variant 2, mRNA | 26.3 | 26.3 | 52% | 40 | 100% | NM_145619.3 |
| PREDICTED: *Mus musculus* actin filament associated protein 1-like 2 (Afap1l2), transcript variant X3, mRNA | 26.3 | 26.3 | 52% | 40 | 100% | XM_006527024.2 |
| PREDICTED: *Mus musculus* poly (ADP-ribose) polymerase family, member 3 (Parp3), transcript variant X3, mRNA | 26.3 | 26.3 | 52% | 40 | 100% | XM_006511720.1 |
| PREDICTED: *Mus musculus* poly (ADP-ribose) polymerase family, member 3 (Parp3), transcript variant X1, mRNA | 26.3 | 26.3 | 52% | 40 | 100% | XM_006511718.1 |
| *Mus musculus* linterleukin-1 receptor-associated kinase 1 (Irak1), transcript variant 1, mRNA | 26.3 | 26.3 | 68% | 40 | 94% | NM_001177973.1 |

TABLE 4-continued

Sequence alignment of Yy1-VMO.

| description | maximal score | total score | query cover | E value | identity | accession |
|---|---|---|---|---|---|---|
| *Mus musculus* interleukin-1 receptor-associated kinase 1 (Irak1), transcript variant 3, mRNA | 26.3 | 26.3 | 68% | 40 | 94% | NM_001177975.1 |
| *Mus musculus* interleukin-1 receptor-associated kinase 1 (Irak1), transcript variant 2, mRNA | 26.3 | 26.3 | 68% | 40 | 94% | NM_001177976.1 |
| *Mus musculus* interleukin-1 receptor-associated kinase 1 (Irak1), transcript variant 5, mRNA | 26.3 | 26.3 | 68% | 40 | 94% | NM_001177974.1 |
| *Mus musculus* actin filament associated protein 1-like 2 (Afap1l2), transcript variant 2, mRNA | 26.3 | 26.3 | 52% | 40 | 100% | NM_001177797.1 |
| *Mus musculus* actin filament associated protein 1-like 2 (Afap1l2), transcript variant 1, mRNA | 26.3 | 26.3 | 52% | 40 | 100% | NM_001177796.1 |
| *Mus musculus* actin filament associated protein 1-like 2 (Afap1l2), transcript variant 3, mRNA | 26.3 | 26.3 | 52% | 40 | 100% | NM_146102.2 |
| *Mus musculus* interleukin-1 receptor-associated kinase 1 binding protein 1 (Irak1bp1), transcript variant 2, mRNA | 26.3 | 26.3 | 68% | 40 | 94% | NM_001168240.1 |
| *Mus musculus* interleukin-1 receptor-associated kinase 1 binding protein 1 (Irak1bp1), transcript variant 1, mRNA | 26.3 | 26.3 | 68% | 40 | 94% | NM_022986.4 |
| *Mus musculus* interleukin-1 receptor-associated kinase 1 (Irak1), transcript variant 4, mRNA | 26.3 | 26.3 | 68% | 40 | 94% | NM_008363.2 |
| *Mus musculus* DEAD (Asp-Glu-Ala-Asp) box polypeptide 54 (Ddx54), mRNA | 26.3 | 26.3 | 52% | 40 | 100% | NM_028041.2 |
| *Mus musculus* tet methylcytosine dioxygenase 3 (Tet3), transcript variant 1, mRNA | 24.3 | 24.3 | 48% | 159 | 100% | NM_001347313.1 |
| PREDICTED: *Mus musculus* RIKEN cDNA C330020E22 gene (C330020E22Rik), transcript variant X13, ncRNA | 24.3 | 24.3 | 48% | 159 | 100% | XR_390177.3 |
| PREDICTED: *Mus musculus* RIKEN cDNA C330020E22 gene (C330020E22Rik), transcript variant X12, ncRNA | 24.3 | 24.3 | 48% | 159 | 100% | XR_882416.2 |
| PREDICTED: *Mus musculus* RIKEN cDNA C330020E22 gene (C330020E22Rik), transcript variant X11, ncRNA | 24.3 | 24.3 | 48% | 159 | 100% | XR_882415.2 |
| PREDICTED: *Mus musculus* RIKEN cDNA C330020E22 gene (C330020E22Rik), transcript variant X5, ncRNA | 24.3 | 24.3 | 48% | 159 | 100% | XR_882414.2 |
| PREDICTED: *Mus musculus* RIKEN cDNA C330020E22 gene (C330020E22Rik), transcript variant X10, ncRNA | 24.3 | 24.3 | 48% | 159 | 100% | XR_882413.2 |
| PREDICTED: *Mus musculus* coiled-coil domain containing 33 (Ccdc33), transcript variant X8, mRNA | 24.3 | 24.3 | 48% | 159 | 100% | XM_006511257.3 |
| PREDICTED: *Mus musculus* coiled-coil domain containing 33 (Ccdc33), transcript variant X7, mRNA | 24.3 | 24.3 | 48% | 159 | 100% | XM_017313448.1 |
| PREDICTED: *Mus musculus* coiled-coil domain containing 33 (Ccdc33), transcript variant X6, mRNA | 24.3 | 24.3 | 48% | 159 | 100% | XM_006511254.3 |
| PREDICTED: *Mus musculus* coiled-coil domain containing 33 (Ccdc33), transcript variant X5, mRNA | 24.3 | 24.3 | 48% | 159 | 100% | XM_017313447.1 |
| PREDICTED: *Mus musculus* coiled-coil domain containing 33 (Ccdc33), transcript variant X4, mRNA | 24.3 | 24.3 | 48% | 159 | 100% | XM_017313446.1 |
| PREDICTED: *Mus musculus* coiled-coil domain containing 33 (Ccdc33), transcript variant X3, mRNA | 24.3 | 24.3 | 48% | 159 | 100% | XM_017313445.1 |
| PREDICTED: *Mus musculus* coiled-coil domain containing 33 (Ccdc33), transcript variant X2, mRNA | 24.3 | 24.3 | 48% | 159 | 100% | XM_017313444.1 |

TABLE 4-continued

Sequence alignment of Yy1-VMO.

| description | maximal score | total score | query cover | E value | identity | accession |
|---|---|---|---|---|---|---|
| PREDICTED: *Mus musculus* DIS3 like exosome 3'-5' exoribonuclease (Dis3l), transcript variant X3, mRNA | 24.3 | 24.3 | 48% | 159 | 100% | XM_006510982.3 |
| PREDICTED: *Mus musculus* DIS3 like exosome 3'-5' exoribonuclease (Dis3l), transcript variant X2, mRNA | 24.3 | 24.3 | 48% | 159 | 100% | XM_006510983.3 |
| PREDICTED: *Mus musculus* asparaginyl-tRNA synthetase 2 (mitochondrial)(putative) (Nars2), transcript variant X16, misc_RNA | 24.3 | 24.3 | 48% | 159 | 100% | XR_001785558.1 |
| PREDICTED: *Mus musculus* asparaginyl-tRNA synthetase 2 (mitochondrial)(putative) (Nars2), transcript variant X15, misc_RNA | 24.3 | 24.3 | 48% | 159 | 100% | XR_001785557.1 |
| PREDICTED: *Mus musculus* asparaginyl-tRNA synthetase 2 (mitochondrial)(putative) (Nars2), transcript variant X14, misc_RNA | 24.3 | 24.3 | 48% | 159 | 100% | XR_001785556.1 |
| PREDICTED: *Mus musculus* asparaginyl-tRNA synthetase 2 (mitochondrial)(putative) (Nars2), transcript variant X13, misc_RNA | 24.3 | 24.3 | 48% | 159 | 100% | XR_001785555.1 |
| *Mus musculus* FERM domain containing 4A (Frmd4a), transcript variant 4, mRNA | 24.3 | 24.3 | 48% | 159 | 100% | NM_001347086.1 |

TABLE 5

Sequence alignment of Arnt-VMO.

| description | maximal score | total score | query cover | E value | identity | accession |
|---|---|---|---|---|---|---|
| PREDICTED: *Mus musculus* aryl hydrocarbon receptor nuclear translocator (Arnt), transcript variant X5, misc_RNA | 50.1 | 50.1 | 100% | 3.00E−06 | 100% | XR_001783644.1 |
| PREDICTED: *Mus musculus* aryl hydrocarbon receptor nuclear translocator (Arnt), transcript variant X4, misc_RNA | 50.1 | 50.1 | 100% | 3.00E−06 | 100% | XR_001783643.1 |
| PREDICTED: *Mus musculus* aryl hydrocarbon receptor nuclear translocator (Arnt), transcript variant X2, mRNA | 50.1 | 50.1 | 100% | 3.00E−06 | 100% | XM_006500931.3 |
| PREDICTED: *Mus musculus* aryl hydrocarbon receptor nuclear translocator (Arnt), transcript variant X1, mRNA | 50.1 | 50.1 | 100% | 3.00E−06 | 100% | XM_006500930.3 |
| PREDICTED: *Mus musculus* aryl hydrocarbon receptor nuclear translocator (Arnt), transcript variant X6, mRNA | 50.1 | 50.1 | 100% | 3.00E−06 | 100% | XM_006500933.2 |
| *Mus musculus* aryl hydrocarbon receptor nuclear translocator (Arnt), transcript variant 2, mRNA | 50.1 | 50.1 | 100% | 3.00E−06 | 100% | NM_009709.4 |
| *Mus musculus* aryl hydrocarbon receptor nuclear translocator (Arnt), transcript variant 1, mRNA | 50.1 | 50.1 | 100% | 3.00E−06 | 100% | NM_001037737.2 |
| PREDICTED: *Mus musculus* UDP-GlcNAc:betaGal beta-1,3-N-acetylglucosaminyltransferase 4 (B3gnt4), transcript variant X3, mRNA | 30.2 | 30.2 | 60% | 2.6 | 100% | XM_011248200.2 |
| PREDICTED: *Mus musculus* UDP-GlcNAc:betaGal beta-1,3-N-acetylglucosaminyltransferase 4 (B3gnt4), transcript variant X1, mRNA | 30.2 | 30.2 | 60% | 2.6 | 100% | XM_011248199.2 |
| PREDICTED: *Mus musculus* uncharacterized LOC666331 (LOC666331), transcript variant X1, mRNA | 28.2 | 28.2 | 56% | 10 | 100% | XM_006533962.2 |
| PREDICTED: *Mus musculus* predicted gene, 35562 (Gm35562), transcript variant X11, ncRNA | 28.2 | 28.2 | 56% | 10 | 100% | XR_878497.1 |
| PREDICTED: *Mus musculus* predicted gene, 35562 (Gm35562), transcript variant X10, ncRNA | 28.2 | 28.2 | 56% | 10 | 100% | XR_878495.1 |
| *Mus musculus* uncharacterized LOC666331 (LOC666331), mRNA | 28.2 | 28.2 | 56% | 10 | 100% | NM_001256318.1 |

TABLE 5-continued

Sequence alignment of Arnt-VMO.

| description | maximal score | total score | query cover | E value | identity | accession |
|---|---|---|---|---|---|---|
| PREDICTED: *Mus musculus* predicted gene, 29862 (Gm29862), transcript variant X5, ncRNA | 28.2 | 28.2 | 56% | 10 | 100% | XR_872158.2 |
| PREDICTED: *Mus musculus* predicted gene, 29862 (Gm29862), transcript variant X4, ncRNA | 28.2 | 28.2 | 56% | 10 | 100% | XR_872157.2 |
| PREDICTED: *Mus musculus* predicted gene, 29862 (Gm29862), transcript variant X3, ncRNA | 28.2 | 28.2 | 56% | 10 | 100% | XR_380917.3 |
| PREDICTED: *Mus musculus* predicted gene, 29862 (Gm29862), transcript variant X2, ncRNA | 28.2 | 28.2 | 56% | 10 | 100% | XR_001779668.1 |
| PREDICTED: *Mus musculus* predicted gene, 29862 (Gm29862), transcript variant X1, ncRNA | 28.2 | 28.2 | 56% | 10 | 100% | XR_872156.2 |
| PREDICTED: *Mus musculus* insulin-like growth factor I receptor (Igf1r), transcript variant X6, mRNA | 26.3 | 26.3 | 52% | 40 | 100% | XM_017321986.1 |
| PREDICTED: *Mus musculus* insulin-like growth factor I receptor (Igf1r), transcript variant X5, mRNA | 26.3 | 26.3 | 52% | 40 | 100% | XM_006540645.3 |
| PREDICTED: *Mus musculus* insulin-like growth factor I receptor (Igf1r), transcript variant X4, mRNA | 26.3 | 26.3 | 52% | 40 | 100% | XM_006540644.3 |
| PREDICTED: *Mus musculus* insulin-like growth factor I receptor (Igf1r), transcript variant X3, mRNA | 26.3 | 26.3 | 52% | 40 | 100% | XM_006540643.3 |
| PREDICTED: *Mus musculus* insulin-like growth factor I receptor (Igf1r), transcript variant X2, mRNA | 26.3 | 26.3 | 52% | 40 | 100% | XM_006540642.3 |
| PREDICTED: *Mus musculus* insulin-like growth factor I receptor (Igf1r), transcript variant X1, mRNA | 26.3 | 26.3 | 52% | 40 | 100% | XM_006540641.3 |
| PREDICTED: *Mus musculus* argininosuccinate lyase (Asl, transcript variant X2, mRNA | 26.3 | 26.3 | 84% | 40 | 100% | XM_017320601.1 |
| PREDICTED: *Mus musculus* transmembrane protein 68 (Tmem68), transcript variant X4, misc_RNA | 26.3 | 26.3 | 52% | 40 | 100% | XR_390344.2 |
| PREDICTED: *Mus musculus* transmembrane protein 68 (Tmem68), transcript variant X3, mRNA | 26.3 | 26.3 | 52% | 40 | 100% | XM_006538270.3 |
| PREDICTED: *Mus musculus* transmembrane protein 68 (Tmem68), transcript variant X2, mRNA | 26.3 | 26.3 | 52% | 40 | 100% | XM_006538269.3 |
| PREDICTED: *Mus musculus* transmembrane protein 68 (Tmem68), transcript variant X1, misc_RNA | 26.3 | 26.3 | 52% | 40 | 100% | XR_001784202.1 |
| PREDICTED: *Mus musculus* neuregulin 2 (Nrg2), transcript variant X1, mRNA | 26.3 | 26.3 | 52% | 40 | 100% | XM_006525461.3 |
| PREDICTED: *Mus musculus* transcription factor 20 (Tcf20), transcript variant X6, mRNA | 26.3 | 26.3 | 52% | 40 | 100% | XM_011245554.2 |
| PREDICTED: *Mus musculus* transcription factor 20 (Tcf20), transcript variant X5, mRNA | 26.3 | 26.3 | 52% | 40 | 100% | XM_011245553.2 |
| PREDICTED: *Mus musculus* transcription factor 20 (Tcf20), transcript variant X4, mRNA | 26.3 | 26.3 | 52% | 40 | 100% | XM_011245552.2 |
| PREDICTED: *Mus musculus* transcription factor 20 (Tcf20), transcript variant X2, mRNA | 26.3 | 26.3 | 52% | 40 | 100% | XM_006520732.2 |
| PREDICTED: *Mus musculus* transcription factor 20 (Tcf20), transcript variant X1, mRNA | 26.3 | 26.3 | 52% | 40 | 100% | XM_011245551.2 |
| PREDICTED: *Mus musculus* trans-acting transcription factor 8 (Sp8), transcript variant X8, mRNA | 26.3 | 26.3 | 52% | 40 | 100% | XM_006515988.3 |
| PREDICTED: *Mus musculus* trans-acting transcription factor 8 (Sp8), transcript variant X7, mRNA | 26.3 | 26.3 | 52% | 40 | 100% | XM_006515987.3 |
| PREDICTED: *Mus musculus* trans-acting transcription factor 8 (Sp8), transcript variant X6 mRNA | 26.3 | 26.3 | 52% | 40 | 100% | XM_006515986.3 |

TABLE 5-continued

Sequence alignment of Arnt-VMO.

| description | maximal score | total score | query cover | E value | identity | accession |
|---|---|---|---|---|---|---|
| PREDICTED: *Mus musculus* trans-acting transcription factor 8 (Sp8), transcript variant X5, mRNA | 26.3 | 11. | 52% | 40 | 100% | XM_006515985.3 |
| PREDICTED: *Mus musculus* trans-acting transcription factor 8 (Sp8), transcript variant X4, mRNA | 26.3 | 26.3 | 52% | 40 | 100% | XM_006515984.3 |
| PREDICTED: *Mus musculus* trans-acting transcription factor 8 (Sp8), transcript variant X3, mRNA | 26.3 | 26.3 | 52% | 40 | 100% | XM_011244124.2 |
| PREDICTED: *Mus musculus* trans-acting transcription factor 8 (Sp8), transcript variant X2, mRNA | 26.3 | 26.3 | 52% | 40 | 100% | XM_006515983.3 |
| PREDICTED: *Mus musculus* trans-acting transcription factor 8 (Sp8), transcript variant X1, mRNA | 26.3 | 26.3 | 52% | 40 | 100% | XM_006515982.3 |
| PREDICTED: *Mus musculus* transcription factor 20 (Tcf20), transcript variant X3, mRNA | 26.3 | 26.3 | 52% | 40 | 100% | XM_006520733.1 |
| PREDICTED: *Mus musculus* sodium channel, voltage-gated, type V, alpha (Scn5a), transcript variant X4, mRNA | 26.3 | 26.3 | 52% | 40 | 100% | XM_006511997.1 |
| PREDICTED: *Mus musculus* sodium channel, voltage-gated, type V, alpha (Scn5a), transcript variant X3, mRNA | 26.3 | 26.3 | 52% | 40 | 100% | XM_006511996.1 |
| PREDICTED: *Mus musculus* sodium channel, voltage-gated, type V, alpha (Scn5a), transcript variant X2, mRNA | 26.3 | 26.3 | 52% | 40 | 100% | XM_006511995.1 |
| PREDICTED: *Mus musculus* sodium channel, voltage-gated, type V, alpha (Scn5a), transcript variant X1, mRNA | 26.3 | 26.3 | 52% | 40 | 100% | XM_006511993.1 |
| *Mus musculus* sodium channel, voltage-gated, type V, alpha (Scn5a), transcript variant 2, mRNA | 26.3 | 26.3 | 52% | 40 | 100% | NM_001253860.1 |
| *Mus musculus* sodium channel, voltage-gated, type V, alpha (Scn5a), transcript variant 1, mRNA | 26.3 | 26.3 | 52% | 40 | 100% | NM_021544.4 |
| *Mus musculus* trans-acting transcription factor 8 (Sp8), mRNA | 26.3 | 26.3 | 52% | 40 | 100% | NM_177082.4 |
| *Mus musculus* BCL2-associated athanogene 3 (Bag3), mRNA | 26.3 | 26.3 | 52% | 40 | 100% | NM_013863.5 |
| *Mus musculus* transcription factor 20 (Tcf20), transcript variant 1, mRNA | 26.3 | 26.3 | 52% | 40 | 100% | NM_001114140.1 |
| *Mus musculus* transcription factor 20 (Tcf20), transcript variant 2, mRNA | 26.3 | 26.3 | 52% | 40 | 100% | NM_013836.3 |
| *Mus musculus* transmembrane protein 68 (Tmem68), mRNA | 26.3 | 26.3 | 52% | 40 | 100% | NM_028097.3 |
| *Mus musculus* insulin like growth factor I receptor (Igf1r), mRNA | 26.3 | 26.3 | 52% | 40 | 100% | NM_010513.2 |
| *Mus musculus* receptor tyrosine kinase-like orphan receptor 2 (Ror2), mRNA | 26.3 | 26.3 | 52% | 40 | 100% | NM_013846.3 |
| *Mus musculus* tRNA methyltransferase O (Trmo), transcript variant 2, mRNA | 24.3 | 24.3 | 48% | 159 | 100% | NM_001347095.1 |
| *Mus musculus* transforming growth factor, beta 2 (Tgfb2), transcript variant 1, mRNA | 24.3 | 24.3 | 48% | 159 | 100% | NM_009367.4 |
| *Mus musculus* transforming growth factor, beta 2 (Tgfb2), transcript variant 2, mRNA | 24.3 | 24.3 | 48% | 159 | 100% | NM_001329107.1 |
| PREDICTED: *Mus musculus* predicted gene, 33746 (Gm33746), transcript variant X3, ncRNA | 24.3 | 24.3 | 48% | 159 | 100% | XR_001778574.1 |
| PREDICTED: *Mus musculus* predicted gene, 33746 (Gm33746), transcript variant X2, ncRNA | 24.3 | 24.3 | 48% | 159 | 100% | XR_379069.3 |
| PREDICTED: *Mus musculus* predicted gene, 33746 (Gm33746), transcript variant X1, ncRNA | 24.3 | 24.3 | 48% | 159 | 100% | XR_001778573.1 |
| PREDICTED: *Mus musculus* cytosolic thiouridylase subunit 2 (Ctu2), transcript variant X3, mRNA | 24.3 | 24.3 | 48% | 159 | 100% | XM_011248490.2 |
| PREDICTED: *Mus musculus* cytosolic thiouridylase subunit 2 (Ctu2), transcript variant X2, mRNA | 24.3 | 24.3 | 48% | 159 | 100% | XM_011248489.2 |
| PREDICTED: *Mus musculus* cytosolic thiouridylase subunit 2 (Ctu2), transcript variant X1, misc_RNA | 24.3 | 24.3 | 48% | 159 | 100% | XR_878872.2 |

TABLE 5-continued

Sequence alignment of Arnt-VMO.

| description | maximal score | total score | query cover | E value | identity | accession |
|---|---|---|---|---|---|---|
| PREDICTED: *Mus musculus* nuclear factor of activated T cells 5 (Nfat5), transcript variant X3, mRNA | 24.3 | 24.3 | 48% | 159 | 100% | XM_006531193.3 |
| PREDICTED: *Mus musculus* nuclear factor of activated T cells 5 (Nfat5), transcript variant X2, mRNA | 24.3 | 24.3 | 48% | 159 | 100% | XM_006531192.3 |
| PREDICTED: *Mus musculus* nuclear factor of activated T cells 5 (Nfat5), transcript variant X1, mRNA | 24.3 | 24.3 | 48% | 159 | 100% | XM_006531191.3 |
| PREDICTED: *Mus musculus* glycerol-3-phosphate acyltransferase 4 (Gpat4), transcript variant X1, mRNA | 24.3 | 24.3 | 48% | 159 | 100% | XM_011242104.2 |
| PREDICTED: *Mus musculus* predicted gene, 39079 (Gm39079), ncRNA | 24.3 | 24.3 | 48% | 159 | 100% | XR_869909.2 |
| PREDICTED: *Mus musculus* RIKEN cDNA 9430038I01 gene (9430038I01Rik), transcript variant X4, mRNA | 24.3 | 24.3 | 48% | 159 | 100% | XM_006508331.3 |
| PREDICTED: *Mus musculus* RIKEN cDNA 9430038I01 gene (9430038I01Rik), transcript variant X3, mRNA | 24.3 | 24.3 | 48% | 159 | 100% | XM_006508329.3 |
| PREDICTED: *Mus musculus* RIKEN cDNA 9430038I01 gene (9430038I01Rik), transcript variant X2, mRNA | 24.3 | 24.3 | 48% | 159 | 100% | XM_011241949.2 |
| PREDICTED: *Mus musculus* RIKEN cDNA 9430038I01 gene (9430038I01Rik), transcript variant X1, mRNA | 24.3 | 24.3 | 48% | 159 | 100% | XM_011241948.2 |
| PREDICTED: *Mus musculus* signal-induced proliferation-associated 1 like 3 (Sipa1l3), transcript variant X15 mRNA | 24.3 | 24.3 | 48% | 159 | 100% | XM_006540405.2 |
| PREDICTED: *Mus musculus* signal-induced proliferation-associated 1 like 3 (Sipa1l3 transcript variant X14, mRNA | 24.3 | 24.3 | 48% | 159 | 100% | XM_011250732.2 |
| PREDICTED: *Mus musculus* signal-induced proliferation-associated 1 like 3 (Sipa1l3), transcript variant X13, mRNA | 24.3 | 24.3 | 48% | 159 | 100% | XM_006540404.3 |
| PREDICTED: *Mus musculus* signal-induced proliferation-associated 1 like 3 (Sipa1l3), transcript variant X11, mRNA | 24.3 | 24.3 | 48% | 159 | 100% | XM_006540402.3 |
| PREDICTED: *Mus musculus* signal-induced proliferation-associated 1 like 3 (Sipa1l3), transcript variant X10, mRNA | 24.3 | 24.3 | 48% | 159 | 100% | XM_006540401.3 |
| PREDICTED: *Mus musculus* signal-induced proliferation-associated 1 like 3 (Sipa1l3), transcript variant X9, mRNA | 24.3 | 24.3 | 48% | 159 | 100% | XM_006540400.3 |
| PREDICTED: *Mus musculus* signal-induced proliferation-associated 1 like 3 (Sipa1l3), transcript variant X8, mRNA | 24.3 | 24.3 | 48% | 159 | 100% | XM_006540399.3 |
| PREDICTED: *Mus musculus* signal-induced proliferation-associated 1 like 3 (Sipa1l3), transcript variant X7, mRNA | 24.3 | 24.3 | 48% | 159 | 100% | XM_011250731.2 |
| PREDICTED: *Mus musculus* signal-induced proliferation-associated 1 like 3 (Sipa1l3), transcript variant X6, mRNA | 24.3 | 24.3 | 48% | 159 | 100% | XM_011250730.2 |
| PREDICTED: *Mus musculus* signal-induced proliferation-associated 1 like 3 (Sipa1l3), transcript variant X5, mRNA | 24.3 | 24.3 | 48% | 159 | 100% | XM_011250729.2 |
| PREDICTED: *Mus musculus* signal-induced proliferation-associated 1 like 3 (Sipa1l3), transcript variant X4, mRNA | 24.3 | 24.3 | 48% | 159 | 100% | XM_011250728.2 |
| PREDICTED: *Mus musculus* signal-induced proliferation-associated 1 like 3 (Sipa1l3), transcript variant X3, mRNA | 24.3 | 24.3 | 48% | 159 | 100% | XM_006540397.3 |
| PREDICTED: *Mus musculus* signal-induced proliferation-associated 1 like 3 (Sipa1l3), transcript variant X2, mRNA | 24.3 | 24.3 | 48% | 159 | 100% | XM_017312346.1 |
| PREDICTED: *Mus musculus* signal-induced proliferation-associated 1 like 3 (Sipa1l3), transcript variant X1, mRNA | 24.3 | 24.3 | 48% | 159 | 100% | XM_011250727.2 |
| PREDICTED: *Mus musculus* acid phosphatase, testicular (Acpt), transcript variant X5, mRNA | 24.3 | 24.3 | 48% | 159 | 100% | XM_011250772.2 |
| PREDICTED: *Mus musculus* acid phosphatase, testicular (Acpt), transcript variant X4, mRNA | 24.3 | 24.3 | 48% | 159 | 100% | XM_017321902.1 |

TABLE 5-continued

Sequence alignment of Arnt-VMO.

| description | maximal score | total score | query cover | E value | identity | accession |
|---|---|---|---|---|---|---|
| PREDICTED: *Mus musculus* acid phosphatase, testicular (Acpt), transcript variant X3, mRNA | 24.3 | 24.3 | 48% | 159 | 100% | XM_017321901.1 |
| PREDICTED: *Mus musculus* acid phosphatase, testicular (Acpt), transcript variant X2, mRNA | 24.3 | 24.3 | 48% | 159 | 100% | XM_006540531.3 |
| PREDICTED: *Mus musculus* acid phosphatase, testicular (Acpt), transcript variant X1, mRNA | 24.3 | 24.3 | 48% | 159 | 100% | XM_006540530.3 |
| PREDICTED: *Mus musculus* tRNA methyltransferase O (Trmo), transcript variant X4, mRNA | 24.3 | 24.3 | 48% | 159 | 100% | XM_017320423.1 |
| PREDICTED: *Mus musculus* tRNA methyltransferase O (Trmo), transcript variant X1, mRNA | 24.3 | 24.3 | 48% | 159 | 100% | XM_017320422.1 |
| PREDICTED: *Mus musculus* RIKEN cDNA 1700024P16 gene (1700024P16Rik), transcript variant X1, mRNA | 24.3 | 24.3 | 48% | 159 | 100% | XM_017320219.1 |
| PREDICTED: *Mus musculus* glial cell line derived neurotrophic factor family receptor alpha 4 (Gfra4), transcript variant X3, misc_RNA | 24.3 | 24.3 | 48% | 159 | 100% | XR_001780826.1 |
| PREDICTED: *Mus musculus* neuropilin (NRP) and tolloid (TLL)-like 1 (Neto1), transcript variant X12, mRNA | 24.3 | 24.3 | 48% | 159 | 100% | XM_011247081.2 |
| *Mus musculus* N-acetylglucosamine-1-phosphotransferase, gamma subunit (Gnptg), transcipt variant 2, mRNA | 24.3 | 24.3 | 48% | 159 | 100% | NM_001346737.1 |

TABLE 6

Kidney transplant patient characteristics.

| ID# | % fibrosis | pre-medication | disease | Creatinine [mg/dl] | BUN [mg/dl] | eGFR [mL/min] |
|---|---|---|---|---|---|---|
| S3752 | 25-30 | CsA | FSGS | 3.3 | 56 | 25 |
| S3564 | 20 | FK506 | nephro-sclerosis | 3.2 | 74 | 16 |
| S3896 | 15-20 | FK506 | ADPKD | 3.0 | 97 | 23 |

TABLE 7

In publicly available datasets (accession number GSE3526), expression levels of ARNT inversely correlated with FKBP12 and YY1 expression levels is not limited to the kidney (renal cortex), but also evident in cardiovascular, digestive and central nervous systems (slope, $r^2$ and values of p were calculated by linear regression).

| system | comparison | slope | $r^2$ | p value |
|---|---|---|---|---|
| renal cortex | ARNT vs. FKBP12 | −2.6 ± 0.4 | 0.9618 | 0.0193 |
| | ARNT vs. YY1 | −0.6 ± 0.0 | 0.9922 | 0.0039 |
| cardiovascular | ARNT vs. FKBP12 | −1.8 ± 0.8 | 0.2843 | 0.0606 |
| | ARNT vs. YY1 | −1.1 ± 0.5 | 0.3012 | 0.0521 |
| digestive | ARNT vs. FKBP12 | −1.2 ± 0.5 | 0.1439 | 0.0093 |
| | ARNT vs. YY1 | −0.7 ± 0.3 | 0.1152 | 0.0210 |
| central nervous | ARNT vs. FKBP12 | −0.9 ± 0.3 | 0.0590 | 0.0015 |
| | ARNT vs. YY1 | −1.1 ± 0.2 | 0.2368 | <0.0001 |
| lymphatic | ARNT vs. FKBP12 | −0.9 ± 0.7 | 0.1129 | 0.2032 |
| | ARNT vs. YY1 | −0.7 ± 0.8 | 0.0503 | 0.4037 |
| reproductive | ARNT vs. FKBP12 | −0.6 ± 0.5 | 0.0345 | 0.2931 |
| | ARNT vs. YY1 | −0.7 ± 0.4 | 0.1119 | 0.0531 |
| endocrine | ARNT vs. FKBP12 | −0.6 ± 0.7 | 0.0290 | 0.4055 |
| | ARNT vs. YY1 | −2.0 ± 0.6 | 0.2917 | 0.0044 |
| peripheral nervous | ARNT vs. FKBP12 | −0.4 ± 0.7 | 0.0169 | 0.5447 |
| | ARNT vs. YY1 | −0.5 ± 0.3 | 0.0911 | 0.1517 |
| respiratory | ARNT vs. FKBP12 | 1.7 ± 1.4 | 0.1708 | 0.2689 |
| | ARNT vs. YY1 | 0.6 ± 0.4 | 0.2667 | 0.1546 |

TABLE 8

In vivo-morpholino sequences.

| VMO | sequence | SEQ ID NO | supplier |
|---|---|---|---|
| control-VMO | 5'-CCTCTTACCTCAG TTACAATTTATA-3' | 7 | Gene Tools, Philomath, USA (1) |
| Arnt-VMO | 5'-AAGAGCCACTCCG CAGATTAGGCAC-3' | 8 | Gene Tools, Philomath, USA (1) |
| Fkbp12-VMO | 5'-AGATGGTCTCCAC CTGCACTCCCAT-3' | 9 | Gene Tools, Philomath, USA (1) |
| Yy1-VMO | 5'-TGTAGAGGGTGTC GCCCGAGGCCAT-3' | 10 | Gene Tools, Philomath, USA (1) |

TABLE 9

Oligonucleotide sequences for qRT-PCR.

| gene | forward primer sequence<br>reverse primer sequence | SEQ ID NO | supplier |
|---|---|---|---|
| Acta2<br>(mouse) | 5'-CTCTTCCAGCCATCTTTCATTG-3'<br>5'-GTTGTTAGCATAGAGATCCTTCCT-3' | 11<br>12 | PrimerDesign,<br>Southampton, UK |
| Actb<br>(mouse) | undisclosed<br>undisclosed | | PrimerDesign,<br>Southampton, UK |
| Ahr<br>(mouse) | 5'-GCCCTTCCCGCAAGATGTTAT-3'<br>5'-TCAGCAGGGGTGGACTTTAAT-3' | 13<br>14 | Eurofins MWG<br>Operon (2) |
| Alk3<br>(mouse) | 5'-TGTCATTCTAGCCATGTTTTACC-3'<br>5'-ACCAAGGATCAGATGTGAGAC-3' | 15<br>16 | PrimerDesign,<br>Southampton, UK |
| ALK3<br>(human) | 5'-GGACATTGCTTTGCCATCATAG-3'<br>5'-GGGCTTTTGGAGAATCTTTGC-3' | 17<br>18 | PrimerDesign,<br>Southampton, UK |
| Alk5<br>(mouse) | 5'-TCTGCATTGCACTTATGCTGA-3'<br>5'-AAAGGGCGATCTAGTGATGGA-3' | 19<br>20 | Eurofins MWG<br>Operon (2) |
| Alk6<br>(mouse) | 5'-GCGGCCTATGCCATTTACAC-3'<br>5'-AGTCTCGATGGGCGATTGC-3' | 21<br>22 | Eurofins MWG<br>Operon (3) |
| Ar<br>(mouse) | 5'-AAGAGCCGCTGAAGGGAAA-3'<br>5'-GAGACGACAAGATGGGCAAAT-3' | 23<br>24 | PrimerDesign,<br>Southampton, UK |
| Arnt<br>(mouse) | 5'-CCTTCAGTGCTATGTCTCTTCC-3'<br>5'-CAGTCTCAGGAGGAAAGTTGGA-3' | 25<br>26 | PrimerDesign,<br>Southampton, UK |
| ARNT<br>(human) | 5'-AGAGAGACTTGCCAGGGAAAAT-3'<br>5'-AGTTCTGTGATGTAGGCTGTCA-3' | 27<br>28 | PrimerDesign,<br>Southampton, UK |
| Cebpb<br>(mouse) | 5'-ACGGGACTGACGCAACAC-3'<br>5'-AACAAAAACAAAACCAAAAACATCAAC-3' | 29<br>30 | PrimerDesign,<br>Southampton, UK |
| Col1a1<br>(mouse) | 5'-ATGGATTCCCGTTCGAGTACG-3'<br>5'-TCAGCTGGATAGCGACATCG-3' | 31<br>32 | Eurofins MWG<br>Operon (4, 5) |
| Creb1<br>(mouse) | 5'-TTGAGTAAGGCTGAGCATGATC-3'<br>5'-TCTTAACTTTAAACTGCGGAACAC-3' | 33<br>34 | PrimerDesign,<br>Southampton, UK |
| Fkbp12<br>(mouse) | 5'-CTATGCCTATGGAGCCACCG-3'<br>5'-ATCCACGTGCAGAGCTAAGG-3' | 35<br>36 | Eurofins MWG<br>Operon (6) |
| FKBP12<br>(human) | 5'-GTGGAAACCATCTCCCCAGG-3'<br>5'-CCATCTTCAAGCATCCCGGT-3' | 37<br>38 | Eurofins MWG<br>Operon (6) |
| Fkbp25<br>(mouse) | 5'-TTCTGCAGGATCACGGTTCA-3'<br>5'-TGGTCCTTATTAGCAGTCTTGGC-3' | 39<br>40 | Eurofins MWG<br>Operon (6) |
| Fkbp38<br>(mouse) | 5'-GCTGGGAGACTGCGATGTTA-3'<br>5'-GTATGGGCTCCTGCTGCC-3' | 41<br>42 | Eurofins MWG<br>Operon (6) |
| Fkbp52<br>(mouse) | 5'-ACCGCGTACTTCAAGGAAGG-3'<br>5'-ACCGGAGAAGCTAGACTCGT-3' | 43<br>44 | Eurofins MWG<br>Operon (6) |
| Gapdh<br>(mouse) | undisclosed<br>undisclosed | | PrimerDesign,<br>Southampton, UK |
| GAPDH<br>(human) | undisclosed<br>undisclosed | | PrimerDesign,<br>Southampton, UK |
| Gata3<br>(mouse) | 5'-GAAGACTTTATTGTACCTGGATAGC-3'<br>5'-TGGACATCAGACTTAGTGGTTTC-3' | 45<br>46 | PrimerDesign,<br>Southampton, UK |
| Hif1a<br>(mouse) | 5'-TCACCAGACAGAGCAGGAAA-3'<br>5'-GCGAAGCTATTGTCTTTGGG-3' | 47<br>48 | Eurofins MWG<br>Operon (7) |
| Max<br>(mouse) | 5'-GTGAGTGAGTGAGCGAGTGA-3'<br>5'-GGAGGGGTGGAGGGAAGG-3' | 49<br>50 | PrimerDesign,<br>Southampton, UK |
| Yy1<br>(mouse) | 5'-GCCCTTTCAGTGCACATTCG-3'<br>5'-CTCCGGTATGGATTCGCACA-3' | 51<br>52 | Eurofins MWG<br>Operon (6) |
| YY1<br>(human) | 5'-AACAGGCATCCCGAGTTCAG-3'<br>5'-GCGGTGGTACAGATGCTTCA-3' | 53<br>54 | Eurofins MWG<br>Operon (6) |

TABLE 10

Oligonucleotide sequences for ChIP.

| gene | forward primer sequence reverse primer sequence | SEQ ID NO | supplier |
|---|---|---|---|
| Arnt motif (mouse) | 5'-GACTTCAGTTCAGCCGGCTC TC-3' | 55 | Eurofins MWG |
| | 5'-CTCTGGTTCTGGCCCGCCGG GAGG-3' | 56 | Operon |

LIST OF REFERENCES

1. Tampe D, and Zeisberg M. Potential approaches to reverse or repair renal fibrosis. *Nat Rev Nephrol.* 2014; 10(4): 226-37.
2. Yang L, Besschetnova T Y, Brooks C R, Shah J V, and Bonventre J V. Epithelial cell cycle arrest in G2/M mediates kidney fibrosis after injury. *Nat Med.* 2010; 16(5): 535-43, 1p following 143.
3. Lovisa S, LeBleu V S, Tampe B, Sugimoto H, Vadnagara K, Carstens J L, Wu C C, Hagos Y, Burckhardt B C, Pentcheva-Hoang T, et al. Epithelial-to-mesenchymal transition induces cell cycle arrest and parenchymal damage in renal fibrosis. *Nat Med.* 2015; 21(9):998-1009.
4. Kapitsinou P P, and Haase V H. Molecular mechanisms of ischemic preconditioning in the kidney. *Am J Physiol Renal Physiol.* 2015; 309(10):F821-34.
5. Joo J D, Kim M, D'Agati V D, and Lee H T. Ischemic preconditioning provides both acute and delayed protection against renal ischemia and reperfusion injury in mice. *J Am Soc Nephrol.* 2006; 17(11):3115-23.
6. Yoon Y E, Lee K S, Choi K H, Kim K H, Yang S C, and Han W K. Preconditioning strategies for kidney ischemia reperfusion injury: implications of the "time-window" in remote ischemic preconditioning. *PLoS One.* 2015; 10(4): e0124130.
7. Kapitsinou P P, Sano H, Michael M, Kobayashi H, Davidoff O, Bian A, Yao B, Zhang M Z, Harris R C, Duffy K J, et al. Endothelial HIF-2 mediates protection and recovery from ischemic kidney injury. *J Clin Invest.* 2014; 124(6):2396-409.
8. Ma D, Lim T, Xu J, Tang H, Wan Y, Zhao H, Hossain M, Maxwell P H, and Maze M. Xenon preconditioning protects against renal ischemic-reperfusion injury via HIF-1alpha activation. *J Am Soc Nephrol.* 2009; 20(4): 713-20.
9. Er F, Nia A M, Dopp H, Hellmich M, Dahlem K M, Caglayan E, Kubacki T, Benzing T, Erdmann E, Burst V, et al. Ischemic preconditioning for prevention of contrast medium-induced nephropathy: randomized pilot RenPro Trial (Renal Protection Trial). *Circulation.* 2012; 126(3): 296-303.
10. Kelsey R. Acute kidney injury: Ischaemic preconditioning for preventing contrastinduced AKI. *Nat Rev Nephrol.* 2012; 8(9):492.
11. Murry C E, Jennings R B, and Reimer K A. Preconditioning with ischemia: a delay of lethal cell injury in ischemic myocardium. *Circulation.* 1986; 74(5):1124-36.
12. Iliodromitis E K, Lazou A, and Kremastinos D T. Ischemic preconditioning: protection against myocardial necrosis and apoptosis. *Vasc Health Risk Manag.* 2007; 3(5):629-37.
13. Soncul H, Oz E, and Kalaycioglu S. Role of ischemic preconditioning on ischemia reperfusion injury of the lung. *Chest.* 1999; 115(6):1672-7.
14. Clavien P A, Yadav S, Sindram D, and Bentley R C. Protective effects of ischemic preconditioning for liver resection performed under inflow occlusion in humans. *Ann Surg.* 2000; 232(2):155-62.
15. Aksoyek S, Cinel I, Avian D, Cinel L, Ozturk C, Gurbuz P, Nayci A, and Oral U. Intestinal ischemic preconditioning protects the intestine and reduces bacterial translocation. *Shock.* 2002; 18(5):476-80.
16. Zahir K S, Syed S A, Zink J R, Restifo R J, and Thomson J G. Ischemic preconditioning improves the survival of skin and myocutaneous flaps in a rat model. *Plast Reconstr Surg.* 1998; 102(1):140-50; discussion 51-2.
17. Jensen H A, Loukogeorgakis S, Yannopoulos F, Rimpilainen E, Petzold A, Tuominen H, Lepola P, Macallister R J, Deanfield J E, Makela T, et al. Remote ischemic preconditioning protects the brain against injury after hypothermic circulatory arrest. *Circulation.* 2011; 123(7): 714-21.
18. Stringa P, Lausada N, Romanin D, Portiansky E, Zanuzzi C, Machuca M, Gondolesi G, and Rumbo M. Pretreatment Combination Reduces Remote Organ Damage Secondary to Intestinal Reperfusion Injury in Mice: Follow-up Study. *Transplant Proc.* 2016; 48(1):210-6.
19. Yang C W, Ahn H J, Han H J, Kim W Y, Li C, Shin M J, Kim S K, Park J H, Kim Y S, Moon I S, et al. Pharmacological preconditioning with low-dose cyclosporine or FK506 reduces subsequent ischemia/reperfusion injury in rat kidney. *Transplantation.* 2001; 72(11):1753-9.
20. Yang C W, Ahn H J, Jung J Y, Kim W Y, Li C, Choi B S, Kim H W, Kim Y S, Moon I S, Kim J, et al. Preconditioning with cyclosporine A or FK506 differentially regulates mitogen activated protein kinase expression in rat kidneys with ischemia/reperfusion injury. *Transpantation.* 2003; 75(1):20-4.
21. Cicora F, Roberti J, Vasquez D, Guerrieri D, Lausada N, Cicora P, Palti G, Chuluyan E, Gonzalez P, Stringa P, et al. Preconditioning donor with a combination of tacrolimus and rapamacyn to decrease ischaemia-reperfusion injury in a rat syngenic kidney transplantation model. *Clin Exp Immunol.* 2012; 167(1):169-77.
22. Sakr M, Zetti G, McClain C, Gavaler J, Nalesnik M, Todo S, Starzl T, and Van Thiel D. The protective effect of FK506 pretreatment against renal ischemia/reperfusion injury in rats. *Transplantation.* 1992; 53(5):987-91.
23. Cumming D V, Heads R J, Coffin R S, Yellon D M, and Latchman D S. Pharmacological preconditioning of primary rat cardiac myocytes by FK506. *Basic Res Cardiol.* 1996; 91(5):367-73.
24. Feng X, Li J, Liu J, Jin, Liu X, Du H, Zhang L, Sun Z, and Li X. Protective effect of FK506 on myocardial ischemia/reperfusion injury by suppression of CaN and ASK1 signaling circuitry. *Cardiovasc Toxcol.* 2011; 11(1):18-27.
25. Ko S F, Yip H K, Leu S, Lee C C, Sheu J J, Lee C C, Ng S H, Huang C C, Chen M C, and Sun C K. Therapeutic potential of tacrolimus on acute myocardial infarction in minipigs: analysis with serial cardiac magnetic resonance and changes at histological and protein levels. *Biomed Res Int.* 2014; 2014(524078.
26. Huser N, Doll D, Altomonte J, Werner M, Kriner, Preissel A, Thorban S, and Matevossian E. Graft preconditioning with low-dose tacrolimus (FK506) and nitric oxide inhibitor aminoguanidine (AGH) reduces ischemia/reperfusion injury after liver transplantation in the rat. *Arch Pharm Res.* 2009; 32(2):215-20.

27. Garcia-Criado F J, Palma-Vargas J M, Valdunciel-Garcia J J, Toledo A H, Misawa K, Gomez-Alonso A, and Toledo-Pereyra L H. Tacrolimus (FK506) down-regulates free radical tissue levels, serum cytokines, and neutrophil infiltration after severe liver ischemia. *Transplantation.* 1997; 64(4):594-8.

28. Oltean M, Zhu C, Mera S, Pullerits R, Mattsby-Baltzer I, Molne J, Hallberg E, Blomgren K, and Olausson M. Reduced liver injury and cytokine release after transplantation of preconditioned intestines. *J Surg Res.* 2009; 154(1):30-7.

29. Spiekerkoetter E, Tian X, Cai J, Hopper R K, Sudheendra D, Li C G, El-Bizri N, Sawada H, Haghighat R, Chan R, et al. FK506 activates BMPR2, rescues endothelial dysfunction, and reverses pulmonary hypertension. *J Clin Invest.* 2013; 123(8):3600-13.

30. Sharkey J, and Butcher S P. Immunophilins mediate the neuroprotective effects of FK506 in focal cerebral ischaemia. *Nature.* 1994; 371(6495):336-9.

31. Labrande C, Velly L, Canolle B, Guillet B, Masmejean F, Nieoullon A, and Pisano P. Neuroprotective effects of tacrolimus (FK506) in a model of ischemic cortical cell cultures: role of glutamate uptake and FK506 binding protein 12 kDa. *Neuroscience.* 2006; 137(1): 231-9.

32. Pan F, Cheng Y X, Tao F H, Zhu C L, Li Z H, Tao H Y, He B, Yu L, Liu Y, and Tang H. [Protective effect of tacrolimus postconditioning on oxidative stress injury provoked by spinal cord ischemia-reperfusion in rats]. *Zhonghua Yi Xue Za Zhi.* 2013; 93(47):3796-800.

33. Pan F, Cheng Y X, Zhu C L, Tao F H, Li Z H, Tao H Y, He B, Yu L, Ji P, and Tang H. Tacolimus postconditioning alleviates apoptotic cell death in rats after spinal cord ischemia-reperfusion injury via up-regulating protein-serine-threonine kinases phosphorylation. *J Huazhong Univ Sci Technolog Med Sci.* 2013; 33(6):852-6.

34. Nezami B G, Rahimpour S, Sianati S, Kalbasi Anaraki D, Sadeghi M, Ghasemi M, and Dehpour A R. Pharmacological preconditioning of random-pattern skin flaps with local FK506 in nicotine-treated rats: interaction with nitric oxide system. *J Plast Reconstr Aesthet Surg.* 2009; 62(12):e643-4.

35. Stringa P, Romanin D, Lausada N, Machuca M, Raimondi J C, Cabanne A, Rumbo M, and Gondolesi G. Ischemic preconditioning and tacrolimus pretreatment as strategies to attenuate intestinal ischemia-reperfusion injury in mice. *Transplant Proc.* 2013; 45(6):2480-5.

36. Ho S, Clipstone N, Timmermann L, Northrop J, Graef I, Fiorentino D, Nourse J, and Crabtree G R. The mechanism of action of cyclosporin A and FK506. *Clin Immunol Immunopathol.* 1996; 80(3 Pt 2):S40-5.

37. Schreiber S L, and Crabtree G R. The mechanism of action of cyclosporin A and FK506. *Immunol Today.* 1992; 13(4):136-42.

38. Ekberg H, Tedesco-Silva H, Demirbas A, Vitko S, Nashan B, Gurkan A, Margreiter R, Hugo C, Grinyo J M, Frei U, et al. Reduced exposure to calcineurin inhibitors in renal transplantation. *NEng J Med.* 2007; 357(25): 2562-75.

39. Naesens M, Kuypers D R, and Sarwal M. Calcineurin inhibitor nephrotoxicity. *Clin J Am Soc Nephrol* 2009; 4(2):481-508.

40. Jiang H, Yang X, Soriano R N, Fujimura T, Krishnan K, and Kobayashi M. Distinct patterns of cytokine gene suppression by the equivalent effective doses of cyclosporine and tacrolimus in rat heart allografts. *Immunobiology.* 2000; 202(3):280-92.

41. Karamperis N, Povlsen J V, Hojskov C, Poulsen J H, Pedersen A R, and Jorgensen K A. Comparison of the pharmacokinetics of tacrolimus and cyclosporine at equivalent molecular doses. *Transplant Proc.* 2003; 35(4):1314-8.

42. Pardo R, Colin E, Regulier E, Aebischer P, Deglon N, Humbert S, and Saudou F. Inhibition of calcineurin by FK506 protects against polyglutamine-huntingtin toxicity through an increase of huntingtin phosphorylation at S421. *J Neurosc,* 2006; 26(5):1635-45.

43. Dunn S E, Burns J L, and Michel R N. Calcineurin is required for skeletal muscle hypertrophy. *J Biol Chem.* 1999; 274(31):21908-12.

44. Lamb J, Crawford E D, Peck D, Modell J W, Blat I C, Wrobel M J, Lerner J, Brunet J P, Subramanian A, Ross K N, et al. The Connectivity Map: using gene-expression signatures to connect small molecules, genes, and disease. *Science.* 2006; 313(5795):1929-35.

45. Hieronymus H, Lamb J, Ross K N, Peng X P, Clement C, Rodina A, Nieto M, Du J, Stegmaier K, Raj S M, et al. Gene expression signature-based chemical genomic prediction identifies a novel class of HSP90 pathway modulators. *Cancer Cell.* 2006; 10(4):321-30.

46. Eden E, Navon R, Steinfeld I, Lipson D, and Yakhini Z. GOrilla: a tool for discovery and visualization of enriched GO terms in ranked gene lists. *BMC Bioinformatics.* 2009; 10:48.

47. Eden E, Lipson D, Yogev S, and Yakhini Z. Discovering motifs in ranked lists of DNA sequences. *PLoS Comput Biol.* 2007; 3(3):e39.

48. Shin K, Lim A, Zhao C, Sahoo D, Pan Y, Spiekerkoetter E, Liao J C, and Beachy P A. Hedgehog signaling restrains bladder cancer progression by eliciting stromal production of urothelial differentiation factors. *Cancer Cell.* 2014; 26(4):521-33.

49. Tateishi K, Higuchi C, Ando W, Nakata K, Hashimoto J, Hart D A, Yoshikawa H, and Nakamura N. The immunosuppressant FK506 promotes development of the chondrogenic phenotype in human synovial stromal cells via modulation of the Smad signaling pathway. *Osteoarthritis Cartilage.* 2007; 15(6):709-18.

50. Ma C H, Brenner G J, Omura T, Samad O A, Costigan M, Inquimbert P, Niederkofler V, Salie R, Sun C C, Lin H Y, et al. The BMP coreceptor RGMb promotes while the endogenous BMP antagonist noggin reduces neurite outgrowth and peripheral nerve regeneration by modulating BMP signaling. *J Neurosci.* 2011; 31(50):18391-400.

51. Darcy A, Meltzer M, Miller J, Lee S, Chappell S, Ver Donck K, and Montano M. A novel library screen identifies immunosuppressors that promote osteoblast differentiation. *Bone.* 2012; 50(6):1294-303.

52. Albinana V, Sanz-Rodriguez F, Recio-Poveda L, Bernabeu C, and Botella L M. Immunosuppressor FK506 increases endoglin and activin receptor-like kinase 1 expression and modulates transforming growth factor-beta1 signaling in endothelial cells. *Mol Pharmacol.* 2011; 79(5):833-43.

53. Sugimoto H, LeBleu V S, Bosukonda D, Keck P, Taduri G, Bechtel W, Okada H, Carlson W, Jr., Bey P, Rusckowski M, et al. Activin-like kinase 3 is important for kidney regeneration and reversal of fibrosis. *Nat Med.* 2012; 18(3):396-404.

54. Zeisberg M, Hanai J, Sugimoto H, Mammoto T, Charytan D, Strutz F, and Kalluri R. BMP-7 counteracts TGF-beta1-induced epithelial-to-mesenchymal transition and reverses chronic renal injury. *Nat Med.* 2003; 9(7): 964-8.

55. Zeisberg M, Bottiglio C, Kumar N, Maeshima Y, Strutz F, Muller G A, and Kalluri R. Bone morphogenic protein-7 inhibits progression of chronic renal fibrosis associated with two genetic mouse models. *Am J Physiol Renal Physiol.* 2003; 285(6):F1060-7.

56. Zeisberg M, Shah A A, and Kalluri R. Bone morphogenic protein-7 induces mesenchymal to epithelial transition in adult renal fibroblasts and facilitates regeneration of injured kidney. *J Biol Chem.* 2005; 280(9):8094-100.

57. Vukicevic S, Basic V, Rogic D, Basic N, Shih M S, Shepard A, Jin D, Dattatreyamurty B, Jones W, Dorai H, et al. Osteogenic protein-1 (bone morphogenetic protein-7) reduces severity of injury after ischemic acute renal failure in rat. *J Clin Invest.* 1998; 102(1):202-14.

58. Zeisberg E M, Tarnavski 0, Zeisberg M, Dorfman A L, McMullen J R, Gustafsson E, Chandraker A, Yuan X, Pu W T, Roberts A B, et al. Endothelial-to-mesenchymal transition contributes to cardiac fibrosis. *Nat Med.* 2007; 13(8):952-61.

59. Xu X, Friehs I, Zhong Hu T, Melnychenko I, Tampe B, Alnour F, Iascone M, Kalluri R, Zeisberg M, Del Nido P J, et al. Endocardial fibroelastosis is caused by aberrant endothelial to mesenchymal transition. *Circ Res.* 2015; 116(5):857-66.

60. Xu X, Tan X, Tampe B, Nyamsuren G, Liu X, Maier L S, Sossalla S, Kalluri R, Zeisberg M, Hasenfuss G, et al. Epigenetic balance of aberrant Rasall promoter methylation and hydroxymethylation regulates cardiac fibrosis. *Cardiovasc Res.* 2015; 105(3):279-91.

61. Merino D, Villar A V, Garcia R, Tramullas M, Ruiz L, Ribas C, Cabezudo S, Nistal J F, and Hurle M A. BMP-7 attenuates left ventricular remodelling under pressure overload and facilitates reverse remodelling and functional recovery. *Cardiovasc Res.* 2016; 110(3):331-45.

62. Sugimoto H, Yang C, LeBleu V S, Soubasakos M A, Giraldo M, Zeisberg M, and Kalluri R. BMP-7 functions as a novel hormone to facilitate liver regeneration. *FASEB J.* 2007; 21(1): 256-64.

63. Zeisberg M, Yang C, Martino M, Duncan M B, Rieder F, Tanjore H, and Kalluri R. Fibroblasts derive from hepatocytes in liver fibrosis via epithelial to mesenchymal transition. *J Biol Chem.* 2007; 282(32):23337-47.

64. Yang G, Zhu Z, Wang Y, Gao A, Niu P, and Tian L. Bone morphogenetic protein-7 inhibits silica-induced pulmonary fibrosis in rats. *Toxicol Lett.* 2013; 220(2):103-8.

65. Myllarniemi M, Lindholm P, Ryynanen M J, Kliment C R, Salmenkivi K, Keski-Oja J, Kinnula V L, Oury T D, and Koli K. Gremlin-mediated decrease in bone morphogenetic protein signaling promotes pulmonary fibrosis. *Am J Respir Crit Care Med.* 2008; 177(3):321-9.

66. Chang C F, Lin S Z, Chiang Y H, Morales M, Chou J, Lein P, Chen H L, Hoffer B J, and Wang Y. Intravenous administration of bone morphogenetic protein-7 after ischemia improves motor function in stroke rats. *Stroke.* 2003; 34(2):558-64.

67. Lin S Z, Hoffer B J, Kaplan P, and Wang Y. Osteogenic protein-1 protects against cerebral infarction induced by MCA ligation in adult rats. *Stroke.* 1999; 30(1):126-33.

68. Flier S N, Tanjore H, Kokkotou E G, Sugimoto H, Zeisberg M, and Kalluri R. Identification of epithelial to mesenchymal transition as a novel source of fibroblasts in intestinal fibrosis. *J Biol Chem.* 2010; 285(26):20202-12.

69. Feng X H, and Derynck R. Specificity and versatility in tgf-beta signaling through Smads. *Annu Rev Cell Dev Biol.* 2005; 21:659-93.

70. Massague J. TGF-beta signal transduction. *Annu Rev Biochem.* 1998; 67:753-91.

71. Alarcon C, Zaromytidou A I, Xi Q, Gao S, Yu J, Fujisawa S, Barlas A, Miller A N, Manova-Todorova K, Macias M, et al. Nuclear CDKs drive Smad transcriptional activation and turnover in BMP and TGF-beta pathways. *Cell.* 2009; 139(4):757-69.

72. Yu P B, Hong C C, Sachidanandan C, Babitt I L, Deng D Y, Hoyng S A, Lin H Y, Bloch K D, and Peterson R T. Dorsomorphin inhibits BMP signals required for embryogenesis and iron metabolism. *Nat Chem Biol.* 2008; 4(1):33-41.

73. Whissell G, Montagni E, Martinelli P, Hernando-Momblona X, Sevillano M, Jung P, Cortina C, Calon A, Abuli A, Castells A, et al. The transcription factor GATA6 enables self-renewal of colon adenoma stem cells by repressing BMP gene expression. *Nat Cell Bio.* 2014; 16(7):695-707.

74. Cuny G D, Yu P B, Laha J K, Xing X, Liu J F, Lai C S, Deng D Y, Sachidanandan C, Bloch K D, and Peterson R T. Structure-activity relationship study of bone morphogenetic protein (BMP) signaling inhibitors. *Bioorg Med Chem Lett* 2008; 18(15):4388-92.

75. Haverty T P, Kelly C J, Hines W H, Amenta P S, Watanabe M, Harper R A, Kefalides N A, and Neilson E G. Characterization of a renal tubular epithelial cell line which secretes the autologous target antigen of autoimmune experimental interstitial nephritis. *J Cell Biol.* 1988; 107(4): 1359-68.

76. Laskow D A, Vincenti F, Neylan J F, Mendez R, and Matas A J. An open-label, concentration-ranging trial of FK506 in primary kidney transplantation: a report of the United States Multicenter FK506 Kidney Transplant Group. *Transplantation.* 1996; 62(7):900-5.

77. Shen N, Lin H, Wu T, Wang D, Wang W, Xie H, Zhang J, and Feng Z. Inhibition of TGF-beta1-receptor post-translational core fucosylation attenuates rat renal interstitial fibrosis. *Kidney Int.* 2013; 84(1):64-77.

78. Laping N J. ALK5 inhibition in renal disease. *Curr Opin Pharmacol.* 2003; 3(2):204-8.

79. Moon J A, Kim H T, Cho I S, Sheen Y Y, and Kim D K. IN-1130, a novel transforming growth factor-beta type I receptor kinase (ALK5) inhibitor, suppresses renal fibrosis in obstructive nephropathy. *Kidney Int.* 2006; 70(7): 1234-43.

80. Piscione T D, Phan T, and Rosenblum N D. BMP7 controls collecting tubule cell proliferation and apoptosis via Smad1-dependent and -independent pathways. *Am J Physiol Renal Physiol.* 2001; 280(1):F19-33.

81. Blank U, Brown A, Adams D C, Karolak M J, and Oxburgh L. BMP7 promotes proliferation of nephron progenitor cells via a JNK-dependent mechanism. *Development* 2009; 136(21): 3557-66.

82. Muthukrishnan S D, Yang X, Friesel R, and Oxburgh L. Concurrent BMP7 and FGF9 signalling governs AP-1 function to promote self-renewal of nephron progenitor cells. *Nat Commun.* 2015; 6: 10027.

83. Meng X M, Chung A C, and Lan H Y. Role of the TGF-beta/BMP-7/Smad pathways in renal diseases. *Clin Sci (Lond).* 2013; 124(4):243-54.

84. Siekierka J J, Hung S H, Poe M, Lin C S, and Sigal N H. A cytosolic binding protein for the immunosuppressant FK506 has peptidyl-proly isomerase activity but is distinct from cyclophilin. *Nature.* 1989; 341(6244):755-7.

85. Liu J, Farmer J D, Jr., Lane W S, Friedman J, Weissman I, and Schreiber S L. Calcineurin is a common target of cyclophilin-cyclosporin A and FKBP-FK506 complexes. *Cell* 1991; 66(4): 807-15.

86. Galvin K M, and Shi Y. Multiple mechanisms of transcriptional repression by YY1. *Mol Cell Biol.* 1997; 17(7):3723-32.

87. Yang W M, Inouye C J, and Seto E. Cyclophilin A and FKBP12 interact with YY1 and alter its transcriptional activity. *J Biol Chem.* 1995; 270(25):15187-93.

88. Kunz J, Loeschmann A, Deuter-Reinhard M, and Hall M N. FAP1, a homologue of human transcription factor NF-X1, competes with rapamycin for binding to FKBP12 in yeast. *Mol Microbiol.* 2000; 37(6):1480-93.

89. Yang W M, Yao Y L, and Seto E. The FK506-binding protein 25 functionally associates with histone deacetylases and with transcription factor YY1. *EMBO J.* 2001; 20(17):4814-25.

90. Helander S, Montecchio M, Lemak A, Fares C, Almlof J, Li Y, Yee A, Arrowsmith C H, Dhe-Paganon S, and Sunnerhagen M. Basic Tilted Helix Bundle—a new protein fold in human FKBP25/FKBP3 and HectD1. *Biochem Biophys Res Commun.* 2014; 447(1):26-31.

91. Szklarczyk D, Franceschini A, Wyder S, Forslund K, Heller D, Huerta-Cepas J, Simonovic M, Roth A, Santos A, Tsafou K P, et al. STRING v10: protein-protein interaction networks, integrated over the tree of life. *Nucleic Acids Res.* 2015; 43: D447-52.

92. Roider H G, Kanhere A, Manke T, and Vingron M. Predicting transcription factor affinities to DNA from a biophysical model. *Bioinformatics.* 2007; 23(2):134-41.

93. Gordon S, Akopyan G, Garban H, and Bonavida B. Transcription factor YY1: structure, function, and therapeutic implications in cancer biology. *Oncogene.* 2006; 25(8):1125-42.

94. Shi Y, Seto E, Chang L S, and Shenk T. Transcriptional repression by YY1, a human GLI-Kruppel-related protein, and relief of repression by adenovirus E1A protein. *Cell.* 1991; 67(2): 377-88.

95. Shi Y, Lee J S, and Galvin K M. Everything you have ever wanted to know about Yin Yang 1. *Biochim Biophys Acta.* 1997; 1332(2):F49-66.

96. Schneider-Poetsch T, Ju J, Eyler D E, Dang Y, Bhat S, Merrick W C, Green R, Shen B, and Liu J O. Inhibition of eukaryotic translation elongation by cycloheximide and lactimidomycin. *Nat Chem Bio.* 2010; 6(3):209-17.

97. Adams K W, and Cooper G M. Rapid turnover of mcl-1 couples translation to cell survival and apoptosis. *J Biol Chem.* 2007; 282(9):6192-200.

98. Heinemeyer T, Wingender E, Reuter I, Hermjakob H, Kel A E, Kel O V, Ignatieva E V, Ananko E A, Podkolodnaya O A, Kolpakov F A, et al. Databases on transcriptional regulation: TRANSFAC, TRRD and COMPEL. *Nucleic Acids Res.* 1998; 26(1):362-7.

99. Maltepe E, Schmidt J V, Baunoch D, Bradfield C A, and Simon M C. Abnormal angiogenesis and responses to glucose and oxygen deprivation in mice lacking the protein ARNT. *Nature.* 1997; 386(6623):403-7.

100. Chilov D, Camenisch G, Kvietikova I, Ziegler U, Gassmann M, and Wenger R H. Induction and nuclear translocation of hypoxia-inducible factor-1 (HIF-1): heterodimerization with ARNT is not necessary for nuclear accumulation of HIF-1alpha. *J Cell Sci.* 1999; 112 (Pt 8):1203-12.

101. Sekine H, Mimura J, Yamamoto M, and Fujii-Kuriyama Y. Unique and overlapping transcriptional roles of arylhydrocarbon receptor nuclear translocator (Arnt) and Arnt2 in xenobiotic and hypoxic responses. *J Biol Chem.* 2006; 281(49):37507-16.

102. Wood S M, Gleadle J M, Pugh C W, Hankinson O, and Ratcliffe P J. The role of the aryl hydrocarbon receptor nuclear translocator (ARNT) in hypoxic induction of gene expression. Studies in ARNT-deficient cells. *J Biol Chem.* 1996; 271(25):15117-23.

103. Antonsson C, Arulampalam V, Whitelaw M L, Pettersson S, and Poellinger L. Constitutive function of the basic helix-loop-helix/PAS factor Arnt. Regulation of target promoters via the E box motif. *J Biol Chem.* 1995; 270(23):13968-72.

104. Hapgood J, Cuthill S, Denis M, Poellinger L, and Gustafsson J A. Specific protein—DNA interactions at a xenobiotic-responsive element: copurification of dioxin receptorand DNA-binding activity. *Proc Natl Acad Sci USA.* 1989; 86(1):60-4.

105. Hoffman E C, Reyes H, Chu F F, Sander F, Conley L H, Brooks B A, and Hankinson O. Cloning of a factor required for activity of the Ah (dioxin) receptor. *Science.* 1991; 252(5008): 954-8.

106. Ramadoss P, and Perdew G H. The transactivation domain of the Ah receptor is a key determinant of cellular localization and ligand-independent nucleocytoplasmic shuttling properties. *Biochemistry.* 2005; 44(33):11148-59.

107. Safe S. Molecular biology of the Ah receptor and its role in carcinogenesis. *Toxicol Lett.* 2001; 120(1-3):1-7.

108. Whitlock J P, Jr. Induction of cytochrome P4501A1. *Annu Rev Pharmacol Toxicol.* 1999; 39: 103-25.

109. Li H, Dong L, and Whitlock J P, Jr. Transcriptional activation function of the mouse Ah receptor nuclear translocator. *J Biol Chem.* 1994; 269(45):28098-105.

110. Ma Q, Dong L, and Whitlock J P, Jr. Transcriptional activation by the mouse Ah receptor. Interplay between multiple stimulatory and inhibitory functions. *J Biol Chem.* 1995; 270(21): 12697-703.

111. Swanson H I, Chan W K, and Bradfield C A. DNA binding specificities and pairing rules of the Ah receptor, ARNT, and SIM proteins. *J Biol Chem.* 1995; 270(44):26292-302.

112. Sogawa K, Nakano R, Kobayashi A, Kikuchi Y, Ohe N, Matsushita N, and Fujii-Kuriyama Y. Possible function of Ah receptor nuclear translocator (Arnt) homodimer in transcriptional regulation. *Proc Natl Acad Sci USA.* 1995; 92(6):1936-40.

113. Li L C, and Dahiya R. MethPrimer: designing primers for methylation PCRs. *Bioinformatics.* 2002; 18(11):1427-31.

114. Morcos P A, Li Y, and Jiang S. Vivo-Morpholinos: a non-peptide transporter delivers Morpholinos into a wide array of mouse tissues. *Biotechnques.* 2008; 45(6):613-4, 6, 8 passim.

115. Blum M, De Robertis E M, Wallingford J B, and Niehrs C. Morpholinos: Antisense and Sensibility. *Dev Cell.* 2015; 35(2):145-9.

116. Grande M T, Sanchez-Laorden B, Lopez-Blau C, De Frutos C A, Boutet A, Arevalo M, Rowe R G, Weiss S J, Lopez-Novoa J M, and Nieto M A. Snail-induced partial epithelial-to-mesenchymal transition drives renal fibrosis in mice and can be targeted to reverse established disease. *Nat Med.* 2015; 21(9):989-97.

117. Sun F, Li P, Ding Y, Wang L, Bartlam M, Shu C, Shen B, Jiang H, Li S, and Rao Z. Design and structure-based study of new potential FKBP12 inhibitors. *Biophys J.* 2003; 85(5): 3194-201.

118. Steiner J P, Hamilton G S, Ross D T, Valentine H L, Guo H, Connolly M A, Liang S, Ramsey C, Li J H, Huang W, et al. Neurotrophic immunophilin ligands stimulate structural and functional recovery in neurodegenerative animal models. *Proc Natl Acad Sci USA*. 1997; 94(5): 2019-24.
119. Valentine H, Chen Y, Guo H, McCormick J, Wu Y, Sezen S F, Hoke A, Burnett A L, and Steiner J P. Neuroimmunophilin ligands protect cavernous nerves after crush injury in the rat: new experimental paradigms. *Eur Urol*. 2007; 51(6):1724-31.
120. Tanaka K, Fujita N, and Ogawa N. Immunosuppressive (FK506) and nonimmunosuppressive (GPI1046) immunophilin ligands activate neurotrophic factors in the mouse brain. *Brain Res*. 2003; 970(1-2):250-3.
121. Zhang C, Steiner J P, Hamilton G S, Hicks T P, and Poulter M O. Regeneration of dopaminergic function in 6-hydroxydopamine-lesioned rats by neuroimmunophilin ligand treatment. *J Neurosci* 2001; 21(15):RC156.
122. Li F, Omori N, Hayashi T, Jin G, Sato K, Nagano I, Shoji M, and Abe K. Protection against ischemic brain damage in rats by immunophilin ligand GPI-1046. *J Neurosci Res*. 2004; 76(3):383-9.
123. Matsumoto E, Sasaki S, Kinoshita H, Kito T, Ohta H, Konishi M, Kuwahara K, Nakao K, and Itoh N. Angiotensin II-induced cardiac hypertrophy and fibrosis are promoted in mice lacking Fgf16. *Genes Cells*. 2013; 18(7):544-53.
124. Glynne R, Akkaraju S, Healy J I, Rayner J, Goodnow C C, and Mack D H. How self tolerance and the immunosuppressive drug FK506 prevent B-cell mitogenesis. *Nature*. 2000; 403(6770):672-6.
125. Rodriguez-Hernandez C J, Sanchez-Perez I, Gil-Mascarell R, Rodriguez-Afonso A, Torres A, Perona R, and Murguia J R. The immunosuppressant FK506 uncovers a positive regulatory cross-talk between the Hog1 and Gcn2p pathways. *J Biol Chem*. 2003; 278(36):33887-95.
126. Zawadzka M, and Kaminska B. Immunosuppressant FK506 affects multiple signaling pathways and modulates gene expression in astrocytes. *Mol Cell Neurosci*. 2003; 22(2):202-9.
127. Ju W, Nair V, Smith S, Zhu L, Shedden K, Song P X, Mariani L H, Eichinger F H, Berthier C C, Randolph A, et al. Tissue transcriptome-driven identification of epidermal growth factor as a chronic kidney disease biomarker. *Sci Transl Med*. 2015; 7(316):316ra193.
128. Nakagawa S, Nishihara K, Miyata H, Shinke H, Tomita E, Kajiwara M, Matsubara T, Iehara N, Igarashi Y, Yamada H, et al. Molecular Markers of Tubulointerstitial Fibrosis and Tubular Cell Damage in Patients with Chronic Kidney Disease. *PLoS One*. 2015; 10(8): e0136994.
129. Reich H N, Tritchler D, Cattran D C, Herzenberg A M, Eichinger F, Boucherot A, Henger A, Berthier C C, Nair V, Cohen C D, et al. A molecular signature of proteinuria in glomerulonephritis. *PLoS One*. 2010; 5(10):e13451.
130. Woroniecka K I, Park A S, Mohtat D, Thomas D B, Pullman J M, and Susztak K. Transcriptome analysis of human diabetic kidney disease. *Diabetes*. 2011; 60(9): 2354-69.
131. Schmid H, Boucherot A, Yasuda Y, Henger A, Brunner B, Eichinger F, Nitsche A, Kiss E, Bleich M, Grone H J, et al. Modular activation of nuclear factor-kappaB transcriptional programs in human diabetic nephropathy. *Diabetes*. 2006; 55(11):2993-3003.
132. Flechner S M, Kurian S M, Head S R, Sharp S M, Whisenant T C, Zhang J, Chismar J D, Horvath S,Mondala T, Gilmartin T, et al. Kidney transplant rejection and tissue injury by gene profiling of biopsies and peripheral blood lymphocytes. *Am J Transplant*. 2004; 4(9): 1475-89.
133. Ko Y A, Mohtat D, Suzuki M, Park A S, Izquierdo M C, Han S Y, Kang H M, Si H, Hostetter T, Pullman J M, et al. Cytosine methylation changes in enhancer regions of core pro-fibrotic genes characterize kidney fibrosis development. *Genome Bio*. 2013; 14(10):R108.
134. Feng W, Tang R, Ye X, Xue C, and Liao Y. Identification of Genes and Pathways Associated with Kidney Ischemia-Reperfusion Injury by Bioinformatics Analyses. *Kidney Blood Press Res*. 2016; 41(1):48-54.
135. Grigoryev D N, Liu M, Cheadle C, Barnes K C, and Rabb H. Genomic profiling of kidney ischemia-reperfusion reveals expression of specific alloimmunity-associated genes: Linking "immune" and "nonimmune" injury events. *Transplant Proc*. 2006; 38(10):3333-6.
136. Gunther O P, Lin D, Balshaw R F, Ng R T, Hollander Z, Wilson-McManus J, McMaster W R, McManus B M, Keown P A, and Biomarkers in Transplantation T. Effects of sample timing and treatment on gene expression in early acute renal allograft rejection. *Transplantation*. 2011; 91(3):323-9.
137. Kurisaki K, Kurisaki A, Valcourt U, Terentiev A A, Pardali K, Ten Dijke P, Heldin C H, Ericsson J, and Moustakas A. Nuclear factor YY1 inhibits transforming growth factor beta- and bone morphogenetic protein-induced cell differentiation. *Mol Cell Biol*. 2003; 23(13): 4494-510.
138. Shen Q, Little S C, Xu M, Haupt J, Ast C, Katagiri T, Mundlos S, Seemann P, Kaplan F S, Mullins M C, et al. The fibrodysplasia ossificans progressiva R206H ACVR1 mutation activates BMP-independent chondrogenesis and zebrafish embryo ventralization. *J Clin Invest*. 2009; 119(11): 3462-72.
139. Chen L, Shioda T, Coser K R, Lynch M C, Yang C, and Schmidt E V. Genome-wide analysis of YY2 versus YY1 target genes. *Nucleic Acids Res*. 2010; 38(12):4011-26.
140. Guo A M, Sun K, Su X, Wang H, and Sun H. YY1TargetDB: an integral information resource for Yin Yang 1 target loci. *Database (Oxford)*. 2013; 2013: bat007.
141. Roth R B, Hevezi P, Lee J, Willhite D, Lechner S M, Foster A C, and Zlotnik A. Gene expression analyses reveal molecular relationships among 20 regions of the human CNS. *Neurogenetics*. 2006; 7(2):67-80.
142. Liang S, Cuevas G, Tizani S, Salas T, Liu H, Li B, and Habib S L. Novel mechanism of regulation of fibrosis in kidney tumor with tuberous sclerosis. *Mol Cancer*. 2013; 12:49.
143. Stauffer B L, Dockstader K, Russell G, Hijmans J, Walker L, Cecil M, Demos-Davies K, Medway A, McKinsey T A, and Sucharov C C. Transgenic over-expression of YY1 induces pathologic cardiac hypertrophy in a sex-specific manner. *Biochem Biophys Res Commun*. 2015; 462(2):131-7.
144. Lin X, Sime P J, Xu H, Williams M A, LaRussa L, Georas S N, and Guo J. Yin yang 1 is a novel regulator of pulmonary fibrosis. *Am J Respir Crit Care Med*. 2011; 183(12):1689-97.
145. Guo J, Yao H, Lin X, Xu H, Dean D, Zhu Z, Liu G, and Sime P. IL-13 induces YY1 through the AKT pathway in lung fibroblasts. *PLoS One*. 2015; 10(3):e0119039.
146. Lu Y, Ma Z, Zhang Z, Xiong X, Wang X, Zhang H, Shi G, Xia X, Ning G, and Li X. Yin Yang 1 promotes hepatic steatosis through repression of farnesoid X receptor in obese mice. *Gut*. 2014; 63(1):170-8.

147. Spiekerkoetter E, Sung Y K, Sudheendra D, Bill M, Aldred M A, van de Veerdonk M C, Vonk Noordegraaf A, Long-Boyle J, Dash R, Yang P C, et al. Low-Dose FK506 (Tacrolimus) in End-Stage Pulmonary Arterial Hypertension. *Am J Respir Crit Care Med.* 2015; 192(2):254-7.
148. Gardella K A, Muro I, Fang G, Sarkar K, Mendez O, and Wright C W. Aryl hydrocarbon receptor nuclear translocator (ARNT) isoforms control lymphoid cancer cell proliferation through differentially regulating tumor suppressor p53 activity. *Oncotarget.* 2016; 7(10): 10710-22.
149. Chan Y Y, Kalpana S, Chang W C, Chang W C, and Chen B K. Expression of aryl hydrocarbon receptor nuclear translocator enhances cisplatin resistance by upregulating MDR1 expression in cancer cells. *Mol Pharmacol.* 2013; 84(4):591-602.
150. Lee J Y, Tokumoto M, Hwang G W, Lee M Y, and Satoh M. Identification of ARNT regulated BIRC3 as the target factor in cadmium renal toxicity. *Sci Rep.* 2017; 7(1): 17287.
151. Wu R, Chang H C, Khechaduri A, Chawla K, Tran M, Chai X, Wagg C, Ghanefar M, Jiang X, Bayeva M, et al. Cardiac-specific ablation of ARNT leads to lipotoxicity and cardiomyopathy. *J Clin Invest.* 2014; 124(11):4795-806.
152. LeBleu V S, Taduri G, O'Connell J, Teng Y, Cooke V G, Woda C, Sugimoto H, and Kalluri R. Origin and function of myofibroblasts in kidney fibrosis. *Nat Med.* 2013; 19(8):1047-53.
153. Tampe B, Tampe D, Zeisberg E M, Muller G A, Bechtel-Walz W, Koziolek M, Kalluri R, and Zeisberg M. Induction of Tet3-dependent Epigenetic Remodeling by Low-dose Hydralazine Attenuates Progression of Chronic Kidney Disease. *EBioMedicine.* 2015; 2(1):19-36.
154. Tampe B, Tampe D, Muller C A, Sugimoto H, LeBleu V, Xu X, Muller G A, Zeisberg E M, Kalluri R, and Zeisberg M. Tet3-mediated hydroxymethylation of epigenetically silenced genes contributes to bone morphogenic protein 7-induced reversal of kidney fibrosis. *J Am Soc Nephrol.* 2014; 25(5):905-12.
155. Saito S, Tampe B, Muller G A, and Zeisberg M. Primary cilia modulate balance of canonical and non-canonical Wnt signaling responses in the injured kidney. *Fibrogenesis Tissue Repair.* 2015; 8:6.
156. Zhao X, Ho D, Gao S, Hong C, Vatner D E, and Vatner S F. Arterial Pressure Monitoring in Mice. *Curr Protoc Mouse Biol.* 2011; 1:105-22.
157. Altschul S F, Madden T L, Schaffer A A, Zhang J, Zhang Z, Miller W, and Lipman D J. Gapped BLAST and PSI-BLAST: a new generation of protein database search programs. *Nucleic Acids Res.* 1997; 25(17):3389-402.
158. Bechtel W, McGoohan S, Zeisberg E M, Muller G A, Kalbacher H, Salant D J, Muller C A, Kalluri R, and Zeisberg M. Methylation determines fibroblast activation and fibrogenesis in the kidney. *Nat Med.* 2010; 16(5):544-50.
159. Rung J, and Brazma A. Reuse of public genome-wide gene expression data. *Nat Rev Genet.* 2013; 14(2):89-99.
160. Spandidos A, Wang X, Wang H, and Seed B. PrimerBank: a resource of human and mouse PCR primer pairs for gene expression detection and quantification. *Nucleic Acids Res.* 2010; 38(Database issue):D792-9.
161. Ye J, Coulouris G, Zaretskaya I, Cutcutache I, Rozen S, and Madden T L. Primer-BLAST: a tool to design target-specific primers for polymerase chain reaction. *BMC Bioinformatics.* 2012; 13: 134.
162. Forristal C E, Brown A L, Helwani F M, Winkler I G, Nowlan B, Barbier V, Powell R J, Engler G A, Diakiw S M, Zannettino A C, et al. Hypoxia inducible factor (HIF)-2alpha accelerates disease progression in mouse models of leukemia and lymphoma but is not a poor prognosis factor in human AML. *Leukemia.* 2015; 29(10):2075-85.
163. Levine S L, and Perdew G H. Okadaic acid increases ARNT homodimer transactivation potential. *Cell Biol Toxicol.* 2002; 18(2):109-20.
164. MacKintosh C, and Klumpp S. Tautomycin from the bacterium *Streptomyces verticillatus*. Another potent and specific inhibitor of protein phosphatases 1 and 2A. *FEBS Lett.* 1990; 277(1-2): 137-40.
165. Hong C S, Ho W, Zhang C, Yang C, Elder J B, and Zhuang Z. LB100, a small molecule inhibitor of PP2A with potent chemo- and radio-sensitizing potential. *Cancer Bio Ther.* 2015; 16(6):821-33.
166. Lu J, Zhuang Z, Song D K, Mehta G U, Ikejiri B, Mushlin H, Park D M, and Lonser R R. The effect of a PP2A inhibitor on the nuclear receptor corepressor pathway in glioma. *J Neurosurg.* 2010; 113(2):225-33.
167. Weinbrenner C, Baines C P, Liu G S, Armstrong S C, Ganote C E, Walsh A H, Honkanen R E, Cohen M V, and Downey J M. Fostriecin, an inhibitor of protein phosphatase 2A, limits myocardial infarct size even when administered after onset of ischemia. *Circulation.* 1998; 98(9):899-905.
168. Sugimoto H, Grahovac G, Zeisberg M, and Kalluri R. Renal fibrosis and glomerulosclerosis in a new mouse model of diabetic nephropathy and its regression by bone morphogenic protein-7 and advanced glycation end product inhibitors. *Diabetes.* 2007; 56(7): 1825-33.

The invention claimed is:

1. A method for the prevention, treatment and/or delaying progression of chronic injury, progressive loss of functional parenchymal cells, or fibrosis of an organ of a subject in need thereof, comprising the step of administering an agent to said subject to increase homodimer-formation of ARNT in said organ.

2. The method of claim 1, wherein the increased homodimer-formation of ARNT is to increase the expression of ALK3.

3. The method of claim 1, wherein the increased homodimer-formation of ARNT is by an increased expression of ARNT.

4. The method of claim 1, wherein the increased homodimer formation of ARNT is to protect said organ against chronic injury, progressive loss of functional parenchymal cells, or fibrosis.

5. The method of claim 1, wherein said chronic injury, progressive loss of functional parenchymal cells, or fibrosis is caused by a chronic progressive disease, or by a long-term exposure to a substance which is toxic for said organ, or by a long-term ischemia.

6. The method of claim 1, wherein the organ is selected from the group consisting of kidney, heart, intestine, spleen, lung, liver, brain, spinal cord, skin, and pancreas.

7. The method of claim 1 wherein said method is:
(i) for the prevention, treatment and/or for delaying progression of a condition selected from the group consisting of chronic kidney disease; or
(ii) for the prevention of and/or for delaying progression to end-stage renal disease; or
(iii) for the prevention, treatment, and/or for delaying progression of pulmonary fibrosis; or
(iv) for the prevention, treatment, and/or for delaying progression of a fibrosis selected from the group consisting of cystic fibrosis, idiopathic pulmonary fibrosis, progressive massive fibrosis, liver cirrhosis, artrial fibrosis of the heart, endomyocardial fibrosis, glial scar of the brain, keloid of the skin, and Crohn's disease of the intestine; or
(v) for the prevention, treatment, and/or for delaying progression of chronic cardiac injury; or
(vi) for protecting from impairment of organ function or histopathological patterns of chronified injury, applied before, during, or after injury; or
(vii) for the treatment or prevention of diabetes mellitus.

8. The method of claim 1, wherein said agent is an inhibitor of protein phosphatase 2A (PP2A) activity.

9. The method of claim 8, wherein said inhibitor is:
(a) a siRNA, or
(b) a vivo morpholino, or (c) a small molecule selected from the group consisting of (i) an oxabicycloheptane or oxabicycloheptene, (ii) okadaic acid, (iii) fostriecin, and (iv) calyculin A.

10. The method of claim 1, wherein said agent is an inhibitor of the transcriptional repressor complex FKBP12/YY1.

11. The method of claim 10, wherein said agent is an inhibitor of FKBP12 or an inhibitor of YY1.

12. The method of claim 10, wherein said agent is an inhibitor of FKBP12 selected from the group consisting of a small molecule, a siRNA, and a vivo morpholino.

13. The method of claim 12, wherein said inhibitor of FKBP12 is:
(a) a small molecule selected from the group consisting of (i) a pipecolic acid derivative, (ii) rapamycin, FK 506 and derivatives thereof; or
(b) a vivo morpholino comprising the sequence shown in SEQ ID NO: 9.

14. The method of claim 10, wherein said agent is an inhibitor of YY1 selected from the group consisting of a vivo morpholino and a siRNA.

15. The method of claim 14, wherein said inhibitor of YY1 is a vivo morpholino comprising the sequence shown in SEQ ID NO: 10.

16. The method of claim 1, wherein said agent is an expression construct, which is capable of over-expressing ARNT in said organ.

17. The method of claim 16, wherein said expression of ARNT is under the control of a constitutive promoter, an inducible promoter, or a promoter which selectively expresses ARNT in said organ.

18. The method of claim 1, wherein the agent is a combination of at least two of (i) an inhibitor of protein phosphatase 2A (PP2A) activity, (ii) an inhibitor of the transcriptional repressor complex FKBP12/YY1, and (iii) an expression construct, which is capable of over-expressing ARNT in said organ.

19. The method of claim 1, wherein the agent is a combination of (i) an inhibitor of protein phosphatase 2A (PP2A) activity, and (ii) an inhibitor of the transcriptional repressor complex FKBP12/YY1.

20. The method of claim 19, wherein the agent is a combination of (i) GPI 1046; (ii) FK-506 or a derivative thereof; and (iii) LB100.

21. The method of claim 9, wherein the oxabicycloheptane or oxabicycloheptene is LB-100, LB-102 or LB-107.

22. The method of claim 13, wherein the pipecolic acid derivative is GPI 1046, GPI 1044, GPI 1102, GPI 1116, or GPI 1206.

23. The method of claim 13, wherein the vivo morpholino consists of the sequence shown in SEQ ID NO: 9.

24. The method of claim 15, wherein the vivo morpholino consists of the sequence shown in SEQ ID NO: 10.

* * * * *

SEQUENCE LISTING

```
<160> NUMBER OF SEQ ID NOS: 56

<210> SEQ ID NO 1
<211> LENGTH: 6
<212> TYPE: DNA
<213> ORGANISM: Artificial
<220> FEATURE:
<223> OTHER INFORMATION: palindromic E-box motif

<400> SEQUENCE: 1 cacgtg                                                              6

<210> SEQ ID NO 2
<211> LENGTH: 6
```

```
<212> TYPE: DNA
<213> ORGANISM: Artificial
<220> FEATURE:
<223> OTHER INFORMATION: mutated palindromic E-box motif

<400> SEQUENCE: 2 tatata                                                             6

<210> SEQ ID NO 3
<211> LENGTH: 27
<212> TYPE: DNA
<213> ORGANISM: Artificial
<220> FEATURE:
<223> OTHER INFORMATION: Primer

<400> SEQUENCE: 3
gggggtaccg aggtagtgac agttctt                                     27

<210> SEQ ID NO 4
<211> LENGTH: 18
<212> TYPE: DNA
<213> ORGANISM: Artificial
<220> FEATURE:
<223> OTHER INFORMATION: Primer

<400> SEQUENCE: 4
ccctgcattc attactca                                               18

<210> SEQ ID NO 5
<211> LENGTH: 38
<212> TYPE: DNA
<213> ORGANISM: Artificial
<220> FEATURE:
<223> OTHER INFORMATION: Primer

<400> SEQUENCE: 5
gtgatccgga gaacgctata tactccacgt tcctcccg                         38

<210> SEQ ID NO 6
<211> LENGTH: 20
<212> TYPE: DNA
<213> ORGANISM: Artificial
<220> FEATURE:
<223> OTHER INFORMATION: Primer

<400> SEQUENCE: 6
gtagcgaaag cctggtttcg                                             20

<210> SEQ ID NO 7
<211> LENGTH: 25
<212> TYPE: DNA
<213> ORGANISM: Artificial
<220> FEATURE:
<223> OTHER INFORMATION: control VMO

<400> SEQUENCE: 7
cctcttacct cagttacaat ttata                                       25

<210> SEQ ID NO 8
<211> LENGTH: 25
<212> TYPE: DNA
<213> ORGANISM: Artificial
<220> FEATURE:
<223> OTHER INFORMATION: Arnt-VMO

<400> SEQUENCE: 8
```
aagagccact ccgcagatta ggcac								25

<210> SEQ ID NO 9
<211> LENGTH: 25
<212> TYPE: DNA
<213> ORGANISM: Artificial
<220> FEATURE:
<223> OTHER INFORMATION: Fkbp12-VMO

<400> SEQUENCE: 9
agatggtctc cacctgcact cccat								25

<210> SEQ ID NO 10
<211> LENGTH: 25
<212> TYPE: DNA
<213> ORGANISM: Artificial
<220> FEATURE:
<223> OTHER INFORMATION: Yy1-VMO

<400> SEQUENCE: 10
tgtagagggt gtcgcccgag gccat								25

<210> SEQ ID NO 11
<211> LENGTH: 22
<212> TYPE: DNA
<213> ORGANISM: Mus musculus

<400> SEQUENCE: 11
ctcttccagc catctttcat tg								22

<210> SEQ ID NO 12
<211> LENGTH: 24
<212> TYPE: DNA
<213> ORGANISM: Mus musculus

<400> SEQUENCE: 12
gttgttagca tagagatcct tcct								24

<210> SEQ ID NO 13
<211> LENGTH: 21
<212> TYPE: DNA
<213> ORGANISM: Mus musculus

<400> SEQUENCE: 13
gcccttcccg caagatgtta t									21

<210> SEQ ID NO 14
<211> LENGTH: 21
<212> TYPE: DNA
<213> ORGANISM: Mus musculus

<400> SEQUENCE: 14
tcagcagggg tggactttaa t									21

<210> SEQ ID NO 15
<211> LENGTH: 23
<212> TYPE: DNA
<213> ORGANISM: Mus musculus

<400> SEQUENCE: 15
tgtcattcta gccatgtttt acc								23

<210> SEQ ID NO 16
<211> LENGTH: 21

```
<212> TYPE: DNA
<213> ORGANISM: Mus musculus

<400> SEQUENCE: 16
accaaggatc agatgtgaga c                                              21

<210> SEQ ID NO 17
<211> LENGTH: 22
<212> TYPE: DNA
<213> ORGANISM: Homo sapiens

<400> SEQUENCE: 17
ggacattgct ttgccatcat ag                                             22

<210> SEQ ID NO 18
<211> LENGTH: 21
<212> TYPE: DNA
<213> ORGANISM: Homo sapiens

<400> SEQUENCE: 18
gggcttttgg agaatctttg c                                              21

<210> SEQ ID NO 19
<211> LENGTH: 21
<212> TYPE: DNA
<213> ORGANISM: Mus musculus

<400> SEQUENCE: 19
tctgcattgc acttatgctg a                                              21

<210> SEQ ID NO 20
<211> LENGTH: 21
<212> TYPE: DNA
<213> ORGANISM: Mus musculus

<400> SEQUENCE: 20
aaagggcgat ctagtgatgg a                                              21

<210> SEQ ID NO 21
<211> LENGTH: 20
<212> TYPE: DNA
<213> ORGANISM: Mus musculus

<400> SEQUENCE: 21
gcggcctatg ccatttacac                                                20

<210> SEQ ID NO 22
<211> LENGTH: 19
<212> TYPE: DNA
<213> ORGANISM: Mus musculus

<400> SEQUENCE: 22
agtctcgatg ggcgattgc                                                 19

<210> SEQ ID NO 23
<211> LENGTH: 19
<212> TYPE: DNA
<213> ORGANISM: Mus musculus

<400> SEQUENCE: 23
aagagccgct gaagggaaa                                                 19

<210> SEQ ID NO 24
```

-continued

<210> SEQ ID NO 24
<211> LENGTH: 21
<212> TYPE: DNA
<213> ORGANISM: Mus musculus

<400> SEQUENCE: 24
gagacgacaa gatgggcaaa t                                          21

<210> SEQ ID NO 25
<211> LENGTH: 22
<212> TYPE: DNA
<213> ORGANISM: Mus musculus

<400> SEQUENCE: 25
ccttcagtgc tatgtctctt cc                                         22

<210> SEQ ID NO 26
<211> LENGTH: 22
<212> TYPE: DNA
<213> ORGANISM: Mus musculus

<400> SEQUENCE: 26
cagtctcagg aggaaagttg ga                                         22

<210> SEQ ID NO 27
<211> LENGTH: 22
<212> TYPE: DNA
<213> ORGANISM: Homo sapiens

<400> SEQUENCE: 27
agagagactt gccagggaaa at                                         22

<210> SEQ ID NO 28
<211> LENGTH: 22
<212> TYPE: DNA
<213> ORGANISM: Homo sapiens

<400> SEQUENCE: 28
agttctgtga tgtaggctgt ca                                         22

<210> SEQ ID NO 29
<211> LENGTH: 18
<212> TYPE: DNA
<213> ORGANISM: Mus musculus

<400> SEQUENCE: 29
acgggactga cgcaacac                                              18

<210> SEQ ID NO 30
<211> LENGTH: 27
<212> TYPE: DNA
<213> ORGANISM: Mus musculus

<400> SEQUENCE: 30
aacaaaaaca aaaccaaaaa catcaac                                    27

<210> SEQ ID NO 31
<211> LENGTH: 21
<212> TYPE: DNA
<213> ORGANISM: Mus musculus

<400> SEQUENCE: 31
atggattccc gttcgagtac g                                          21

-continued

```
<210> SEQ ID NO 32
<211> LENGTH: 20
<212> TYPE: DNA
<213> ORGANISM: Mus musculus

<400> SEQUENCE: 32
tcagctggat agcgacatcg                                                  20

<210> SEQ ID NO 33
<211> LENGTH: 22
<212> TYPE: DNA
<213> ORGANISM: Mus musculus

<400> SEQUENCE: 33
ttgagtaagg ctgagcatga tc                                               22

<210> SEQ ID NO 34
<211> LENGTH: 24
<212> TYPE: DNA
<213> ORGANISM: Mus musculus

<400> SEQUENCE: 34
tcttaacttt aaactgcgga acac                                             24

<210> SEQ ID NO 35
<211> LENGTH: 20
<212> TYPE: DNA
<213> ORGANISM: Mus musculus

<400> SEQUENCE: 35
ctatgcctat ggagccaccg                                                  20

<210> SEQ ID NO 36
<211> LENGTH: 20
<212> TYPE: DNA
<213> ORGANISM: Mus musculus

<400> SEQUENCE: 36
atccacgtgc agagctaagg                                                  20

<210> SEQ ID NO 37
<211> LENGTH: 20
<212> TYPE: DNA
<213> ORGANISM: Homo sapiens

<400> SEQUENCE: 37
gtggaaacca tctccccagg                                                  20

<210> SEQ ID NO 38
<211> LENGTH: 20
<212> TYPE: DNA
<213> ORGANISM: Homo sapiens

<400> SEQUENCE: 38
ccatcttcaa gcatcccggt                                                  20

<210> SEQ ID NO 39
<211> LENGTH: 20
<212> TYPE: DNA
<213> ORGANISM: Mus musculus

<400> SEQUENCE: 39
ttctgcagga tcacggttca                                                  20
```

```
<210> SEQ ID NO 40
<211> LENGTH: 23
<212> TYPE: DNA
<213> ORGANISM: Mus musculus

<400> SEQUENCE: 40
tggtccttat tagcagtctt ggc                                              23

<210> SEQ ID NO 41
<211> LENGTH: 20
<212> TYPE: DNA
<213> ORGANISM: Mus musculus

<400> SEQUENCE: 41
gctgggagac tgcgatgtta                                                  20

<210> SEQ ID NO 42
<211> LENGTH: 18
<212> TYPE: DNA
<213> ORGANISM: Mus musculus

<400> SEQUENCE: 42
gtatgggctc ctgctgcc                                                    18

<210> SEQ ID NO 43
<211> LENGTH: 20
<212> TYPE: DNA
<213> ORGANISM: Mus musculus

<400> SEQUENCE: 43
accgcgtact tcaaggaagg                                                  20

<210> SEQ ID NO 44
<211> LENGTH: 20
<212> TYPE: DNA
<213> ORGANISM: Mus musculus

<400> SEQUENCE: 44
accggagaag ctagactcgt                                                  20

<210> SEQ ID NO 45
<211> LENGTH: 25
<212> TYPE: DNA
<213> ORGANISM: Mus musculus

<400> SEQUENCE: 45
gaagacttta ttgtacctgg atagc                                            25

<210> SEQ ID NO 46
<211> LENGTH: 23
<212> TYPE: DNA
<213> ORGANISM: Mus musculus

<400> SEQUENCE: 46
tggacatcag acttagtggt ttc                                              23

<210> SEQ ID NO 47
<211> LENGTH: 20
<212> TYPE: DNA
<213> ORGANISM: Mus musculus

<400> SEQUENCE: 47
tcaccagaca gagcaggaaa                                                  20
```

<210> SEQ ID NO 48
<211> LENGTH: 20
<212> TYPE: DNA
<213> ORGANISM: Mus musculus

<400> SEQUENCE: 48
gcgaagctat tgtctttggg                                              20

<210> SEQ ID NO 49
<211> LENGTH: 20
<212> TYPE: DNA
<213> ORGANISM: Mus musculus

<400> SEQUENCE: 49
gtgagtgagt gagcgagtga                                              20

<210> SEQ ID NO 50
<211> LENGTH: 18
<212> TYPE: DNA
<213> ORGANISM: Mus musculus

<400> SEQUENCE: 50
ggaggggtgg agggaagg                                                18

<210> SEQ ID NO 51
<211> LENGTH: 20
<212> TYPE: DNA
<213> ORGANISM: Mus musculus

<400> SEQUENCE: 51
gccctttcag tgcacattcg                                              20

<210> SEQ ID NO 52
<211> LENGTH: 20
<212> TYPE: DNA
<213> ORGANISM: Mus musculus

<400> SEQUENCE: 52
ctccggtatg gattcgcaca                                              20

<210> SEQ ID NO 53
<211> LENGTH: 20
<212> TYPE: DNA
<213> ORGANISM: Homo sapiens

<400> SEQUENCE: 53
aacaggcatc ccgagttcag                                              20

<210> SEQ ID NO 54
<211> LENGTH: 20
<212> TYPE: DNA
<213> ORGANISM: Homo sapiens

<400> SEQUENCE: 54
gcggtggtac agatgcttca                                              20

<210> SEQ ID NO 55
<211> LENGTH: 22
<212> TYPE: DNA
<213> ORGANISM: Mus musculus

<400> SEQUENCE: 55

```
gacttcagtt cagccggctc tc                                              22

<210> SEQ ID NO 56
<211> LENGTH: 24
<212> TYPE: DNA
<213> ORGANISM: Mus musculus

<400> SEQUENCE: 56
ctctggttct ggcccgccgg gagg                                            24
```